(12) United States Patent
Reddiboyana et al.

(10) Patent No.: US 9,949,189 B2
(45) Date of Patent: Apr. 17, 2018

(54) SYSTEMS AND METHODS FOR ESTABLISHING AND MAINTAINING MULTIPLE CELLULAR CONNECTIONS AND/OR INTERFACES

(75) Inventors: Murali Reddiboyana, Bangalore (IN); John L. Tomici, Southold, NY (US); Prabhakar R. Chitrapu, Blue Bell, PA (US); Alexander Reznik, Titusville, NJ (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 76 days.

(21) Appl. No.: 14/232,195

(22) PCT Filed: Jul. 11, 2012

(86) PCT No.: PCT/US2012/046283
§ 371 (c)(1),
(2), (4) Date: Apr. 2, 2014

(87) PCT Pub. No.: WO2013/009892
PCT Pub. Date: Jan. 17, 2013

(65) Prior Publication Data
US 2014/0219248 A1    Aug. 7, 2014

Related U.S. Application Data

(60) Provisional application No. 61/506,635, filed on Jul. 11, 2011.

(51) Int. Cl.
*H04W 36/14* (2009.01)
*H04W 76/02* (2009.01)
(Continued)

(52) U.S. Cl.
CPC ......... *H04W 36/14* (2013.01); *H04W 76/025* (2013.01); *H04W 36/0027* (2013.01); *H04W 76/041* (2013.01)

(58) Field of Classification Search
CPC ......... H04W 36/0055; H04W 36/0083; H04W 36/14; H04W 36/0022; H04W 36/30;
(Continued)

(56) References Cited

U.S. PATENT DOCUMENTS

2007/0153793 A1* 7/2007 Jiang ................ H04L 1/1867
370/390
2007/0213060 A1* 9/2007 Shaheen ............... H04W 36/10
455/436
(Continued)

FOREIGN PATENT DOCUMENTS

| EP | 1646189 A1 | 4/2006 |
|----|-----------|--------|
| WO | WO 2008/008964 A2 | 1/2008 |
| WO | WO 2011/063850 A1 | 6/2011 |

OTHER PUBLICATIONS

3rd Generation Partnership Project (3GPP), TR 23.861 V1.3.0, "3rd Generation Partnership Project; Technical Specification Group Services and System Aspects; Multi access PDN connectivity and IP flow mobility (Release 9)", Sep. 2009, 49 pages.
(Continued)

*Primary Examiner* — Andrew Chriss
*Assistant Examiner* — Atique Ahmed
(74) *Attorney, Agent, or Firm* — Condo Roccia Koptiw LLP

(57) ABSTRACT

Systems and methods for providing multiple connections or interfaces at the same time may be disclosed herein. For example, in an embodiment, a first RRC connection may be established between a wireless transmit and receive unit (WTRU) or user equipment (UE) and network node such as an eNB and a second RRC connection may be established
(Continued)

Logical S1-connections for UE across multiple eNBs between the WTRU or UE and the network node such as the eNB or another network node such as another eNB. The first RRC connection and the second RRC connections may then be maintained in parallel (e.g. at the same time).

25 Claims, 86 Drawing Sheets

(51) Int. Cl.
*H04W 36/00* (2009.01)
*H04W 76/04* (2009.01)

(58) Field of Classification Search
CPC ......... H04L 12/18; H04L 45/16; H04L 45/74; H04L 12/1886; H04L 12/185
USPC ...... 370/235, 331, 335, 390; 455/404.1, 502
See application file for complete search history.

(56) References Cited

U.S. PATENT DOCUMENTS

| | | | |
|---|---|---|---|
| 2010/0080116 A1* | 4/2010 | Agashe | H04W 36/08 370/216 |
| 2010/0080172 A1 | 4/2010 | Jin et al. | |
| 2010/0091653 A1* | 4/2010 | Koodli | H04W 36/0027 370/235 |
| 2010/0195621 A1* | 8/2010 | Kekki | H04W 48/17 370/332 |
| 2011/0051685 A1* | 3/2011 | Saitou | H04W 36/02 370/331 |
| 2011/0176680 A1* | 7/2011 | Wu | H04W 12/04 380/277 |
| 2011/0194535 A1* | 8/2011 | Johansson | H04W 28/24 370/331 |
| 2012/0270545 A1* | 10/2012 | Zhao | H04W 72/00 455/435.1 |
| 2012/0302196 A1* | 11/2012 | Chin | H04L 65/1073 455/404.1 |

OTHER PUBLICATIONS

3rd Generation Partnership Project (3GPP), TS 23.261 V10.1.0, "3rd Generation Partnership Project; Technical Speciation Group Services and System Aspects; IP flow mobility and seamless Wireless Local Area Network (WLAN) offload; Stage 2 (Release 10)", Sep. 2010, 22 pages.
3rd Generation Partnership Project (3GPP), TS 23.402 V10.3.0, 3rd Generation Partnership Project; Technical Specification Group Services and System Aspects; Architecture enhancements for non-3GPP accesses (Release 10), Mar. 2011, 227 pages.
3rd Generation Partnership Project (3GPP), TS 24.302 V10.3.1, 3rd Generation Partnership Project; Technical Specification Group Core Network and Terminals; Access to the 3GPP Evolved Packet Core (EPC) via non-3GPP access networks; Stage 3 (Release 10), Apr. 2011, 57 pages.
3rd Generation Partnership Project (3GPP), TR 21.905 V10.3.0, "Technical Specification Group Services and System Aspects, Vocabulary for 3GPP Specifications (Release 10)", Mar. 2011, 63 pages.
3rd Generation Partnership Project (3GPP), TS 23.003 V10.1.0, "Technical Specification Group Core Network and Terminals, Numbering, Addressing and Identification (Release 10)", Mar. 2011, 79 pages.
3rd Generation Partnership Project (3GPP), TS 23.401 V10.3.0, "Technical Specification Group Services and System Aspects, General Packet Radio Service (GPRS) Enhancements for Evolved Universal Terrestrial Radio Access Network (E-UTRAn) Access (Release 10)", Mar. 2011, 278 pages.
3rd Generation Partnership Project (3GPP), TS 24.008 V10.1.0, "Mobile Radio Interface Layer 3 Specification, Core Network Protocols, Stage 3 (Release 10)", Dec. 2010, 625 pages.
3rd Generation Partnership Project (3GPP), TS 24.301 V10.2.0, "Technical Specification Group Core Network and Terminals, Non-Access-Stratum (NAS) Protocol for Evolved Packet System (EPS), Stage 3 (Release 10)", Mar. 2011, 315 pages.
3rd Generation Partnership Project (3GPP), TS 29.207 V6.5.0 , " Technical Specification Group Core Network and Terminals, Policy Control Over Go Interface (Release 6)", Sep. 2005, 59 pages.
3rd Generation Partnership Project (3GPP), TS 29.274 V10.2.0, "Technical Specification Group Core Network and Terminals, 3GPP Evolved Packet System (EPS Evolved General Packet Radio Service (GPRS) Tunnelling Protocol for Control plane (GTPv2-C), Stage 3 (Release 10)", Mar. 2011, 181 pages.
3rd Generation Partnership Project (3GPP), TS 29.281 V10.1.0, "Technical Specification Group Core Network and Terminals, General Packet Radio System (GPRS) Tunnelling Protocol User Plane (GTPv1-U) (Release 10)", Mar. 2011, 25 pages.
3rd Generation Partnership Project (3GPP), TS 33.401 V10.0.0, "Technical Specification Group Services and System Aspects, 3GPP System Architecture Evolution (SAE), Security Architecture (Release 10)", Mar. 2011, 113 pages.
3rd Generation Partnership Project (3GPP), TS 36.401 V10.1.0, "Technical Specification Group Radio Access Network, Evolved Universal Terrestrial Radio Access Network (E-UTRAN), Architecture Description (Release 10)", Mar. 2011, 20 pages.
3rd Generation Partnership Project (3GPP), TS 36.413 V10.1.0, "Technical Specification Group Radio Access Network, Evolved Universal Terrestrial Radio Access Network (E-UTRAN), S1 Application Protocol (S1AP) (Release 10)", Mar. 2011, 256 pages.

* cited by examiner macro eNB network architecture

HeNB without CGW eNB-SGW tunnels two default bearers of different PDN connections map to different PDNs UE initiated dedicated bearer deactivation FIG. 21
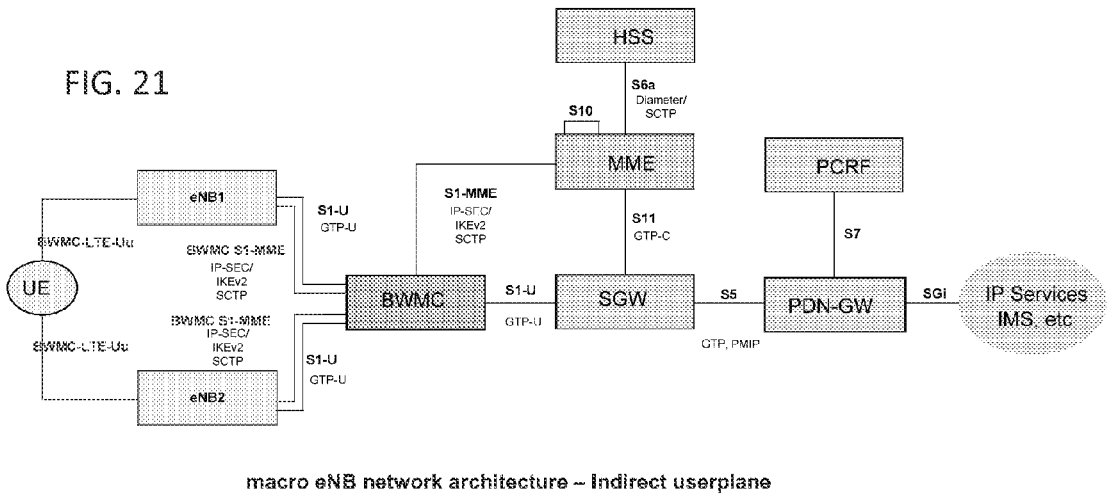
macro eNB network architecture – Indirect userplane
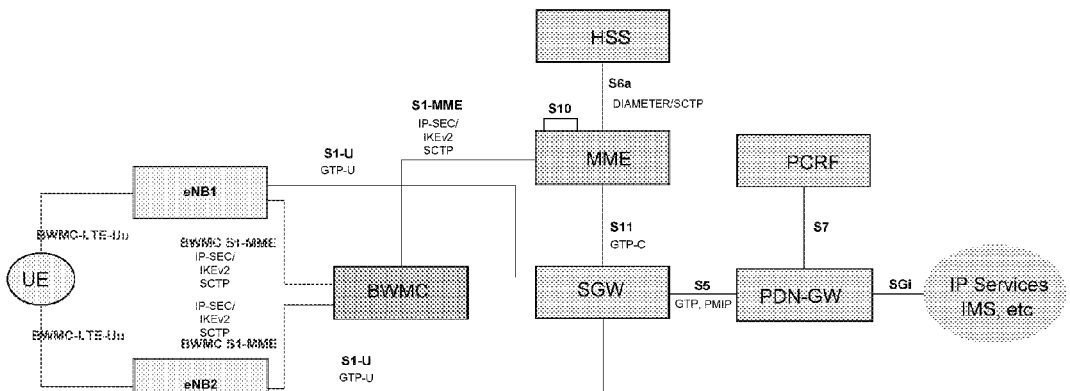
macro eNB network architecture – Direct userplane(eNB-SGW)
FIG. 22 eNB-SGW broken tunnels at BWMC two default bearers of different PDN connections map to same PDN

US 9,949,189 B2

SYSTEMS AND METHODS FOR ESTABLISHING AND MAINTAINING MULTIPLE CELLULAR CONNECTIONS AND/OR INTERFACES

CROSS-REFERENCE TO RELATED APPLICATIONS

This application is a 35 U.S.C. § 371 National Stage of PCT Application No. PCT/US2012/046283, filed Jul. 11, 2012, which claims the benefit of U.S. Provisional Application No. 61/506,635, filed Jul. 11, 2011, entitled "Systems and Methods for Establishing and Maintaining Multiple Cellular Connections and/or Interfaces," the contents of each are hereby incorporated by reference herein.

BACKGROUND

Today, a device such as user equipment that may be used in a communication system may be connected to a network node such as an eNB. When the network node may be degraded or additional bandwidth may be available on another network node such as another eNB, a connection such as an RRC connection to the other network node may be established and a connection such as an RRC connection to the original network node may be torn down. Currently, one connection with one network node may be established, maintained, and/or supported at one time or at the same time.

SUMMARY

Systems and methods for providing multiple connections (e.g. cellular connections) at the same time may be disclosed herein. For example, in an embodiment, a first RRC connection may be established between a wireless transmit and receive unit (WTRU) or user equipment (UE) and a network node such as an eNB and a second RRC connection may be established between the WTRU or UE and the network node such as the eNB or another network node such as another eNB. The first RRC connection and the second RRC connection may then be maintained in parallel (e.g. at the same time). Additional RRC connections (e.g. a third RRC connection, a fourth RRC connection, and the like) may also be established and maintained in parallel with the first and second RRC connections.

According to an embodiment, a first bearer and a second bearer that may be independent of the first bearer (e.g. the first and second bearer may be independent of each other) may also be provided and/or used herein. For example, the WTRU or UE may be attached to a core network via the first network node and the first bearer may be established between the WTRU or UE and the core network via the first network node and a second bearer may be established between the WTRU or UE and the core network via the second network node. In an embodiment, no connection may exist between the second network node and the core network. The core network may establish the second bearer via the second network node using signaling via the first network node and the second bearer is modified using signaling via the first network node. Additionally, the first bearer may be associated with the first RRC connection and the second bearer may be associated with the second RRC connection.

In example embodiments, at least a portion of an IP flow may be configured to be moved from the first RRC connection to the second RRC connection and/or the first bearer may be configured to be moved from the first RRC connection to the second RRC connection.

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to any limitations that solve any or all disadvantages noted in any part of this disclosure.

BRIEF DESCRIPTION OF THE DRAWINGS

A more detailed understanding of the embodiments disclosed herein may be had from the following description, given by way of example in conjunction with the accompanying drawings.

FIG. 21 is a block diagram illustrating another example system in which management of flow communication flow at an IP layer may be performed.

FIG. 22 is a block diagram illustrating another example system in which management of flow communication flow at an IP layer may be performed.

DETAILED DESCRIPTION

Figure 1:
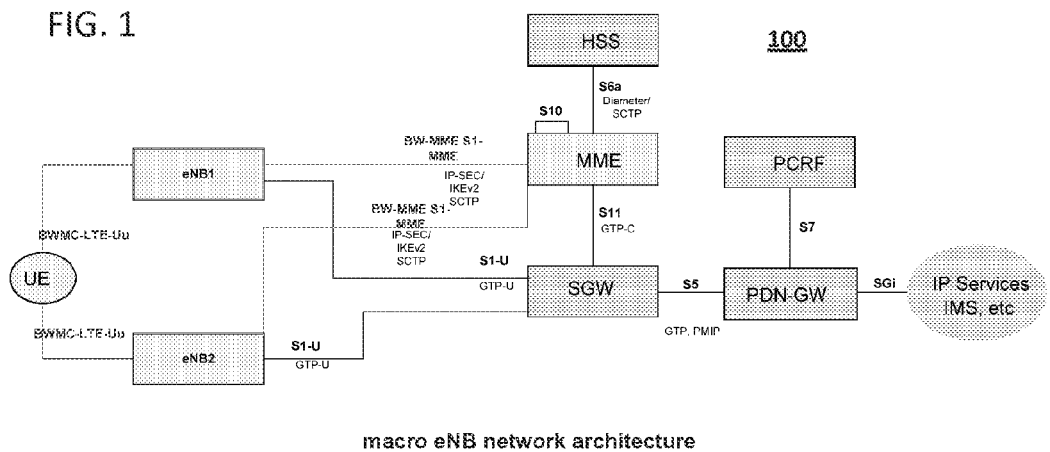
FIG. 1 is a block diagram illustrating example system in which management of flow communication flow at an IP layer may be performed.

A detailed description of illustrative embodiments will now be described with reference to the various Figures. Although this description provides a detailed example of possible implementations, it should be noted that the details are intended to be exemplary and in no way limit the scope of the application.

Systems and/or methods for providing multiple radio resource control (RRC) connections within a communication network may be disclosed herein. As described above, typically one RRC connection may be provided and/or used in one communication network. Systems and methods disclosed herein may maintain multiple RRC connections within a communication network.

For example, as more and more small cells (e.g., microcells, picocells, femtocells, and the like) may be deployed, a user's mobile equipment (UE) may establish multiple simultaneous connections with multiple radio stations (e.g. Node Bs (NBs), evolved NBs (eNBs), Home NBs (HNBs). Home eNBs (HeNBs), base stations (BSs), and the like.). In such embodiments, data rates may be increased by aggregating bandwidth across the multiple connections; load balancing may be achieved by moving data from a heavily loaded connection to a lightly loaded one; fault tolerance and robustness may be provided by using the good connection when the other fails or otherwise is degraded; and the like. Current solutions (e.g. a soft handover, CoMP, and/or CA) may be provided at the radio interface protocols level. Unfortunately, this may call for tight coordination between the multiple radio connections as described herein. The IP-protocol-level coordinated multi-point transmission of packet data communications described herein may have an advantage of looser coordination between the multiple connections and of re-using existing IP-Flow Mobility solutions such as DSMIP, PMIP, and the like.

The methods, systems and apparatuses for IP-Level Coordinated Multi-Point Transmission of Packet-Data Communications, as described herein, may be implemented as cellular network extensions enabling IP flow management for a UE across simultaneous connections with multiple (H)eNBs and multiple RRC connections. As described in more detail below, the UE may initiate connectivity with multiple (H)eNBs simultaneously such that the UE may make use of the available interfaces for uplink and downlink traffic. Once registered with a network such as a LTE network, the UE may send out or exchange the control and/or user plane messages or data on an available interface. The UE may choose an available interface for uplink traffic, and the UE may accept downlink traffic on an available interface. Additionally, such an embodiment may be viewed as an application of 3GPP/Non 3GPP interworking solutions to a 3GPP solution where the interworking may apply across multiple eNBs or base stations belonging to 2G or 3G (e.g. UMTS, HSPA) or 4G (e.g. LTE, LTE-A) access networks. This may be an advantage over a current soft handover, coordinated multi-point (CoMP), and/or carrier aggregation (CA) solutions or methods, which may be restricted to a single radio access network due to tight coordination requirements.

FIG. 1 is a block diagram illustrating example system 10 in which management of communication flows at an IP layer (e.g. IP flow management) may be performed. The system 10 may include various elements which may and may not be in FIG. 1. Details of an example architecture of a system and its associated elements, which may be representative of the system 10 and its elements, may be described with reference to FIGS. 84A-84E. According to an embodiment, the system 10 may be a mobile wireless broadband standard Long Term Evolution (LTE) and its associated Evolved Packet System (EPS) architecture. Additionally, the system (or methods) such as the system 10 described herein for IP-Level Coordinated Multi-Point Transmission of Packet-Data Communications may be formatted in accordance with other mobile wireless protocols such as GPRS, UMTS, HSPA, LTE-A, and the like.

According to example embodiments, a UE and an eNB1 may be configured to be communicatively coupled and may be configured to establish connections therebetween using a first LTE-Uu interface such as LTE-Uu1. The UE and an eNB2 may be configured to be communicatively coupled and may be configured to establish connections therebetween using a second LTE-Uu interface such as LTE-Uu2. The LTE-Uu1 and LTE-Uu2 may define respective protocol stacks. The LTE-Uu1 and LTE-Uu2 interfaces, protocol stacks and elements thereof may be defined in accordance with LTE (e.g. as currently promulgated) along with changes, modifications and/or the like thereto disclosed herein.

Figure 2:
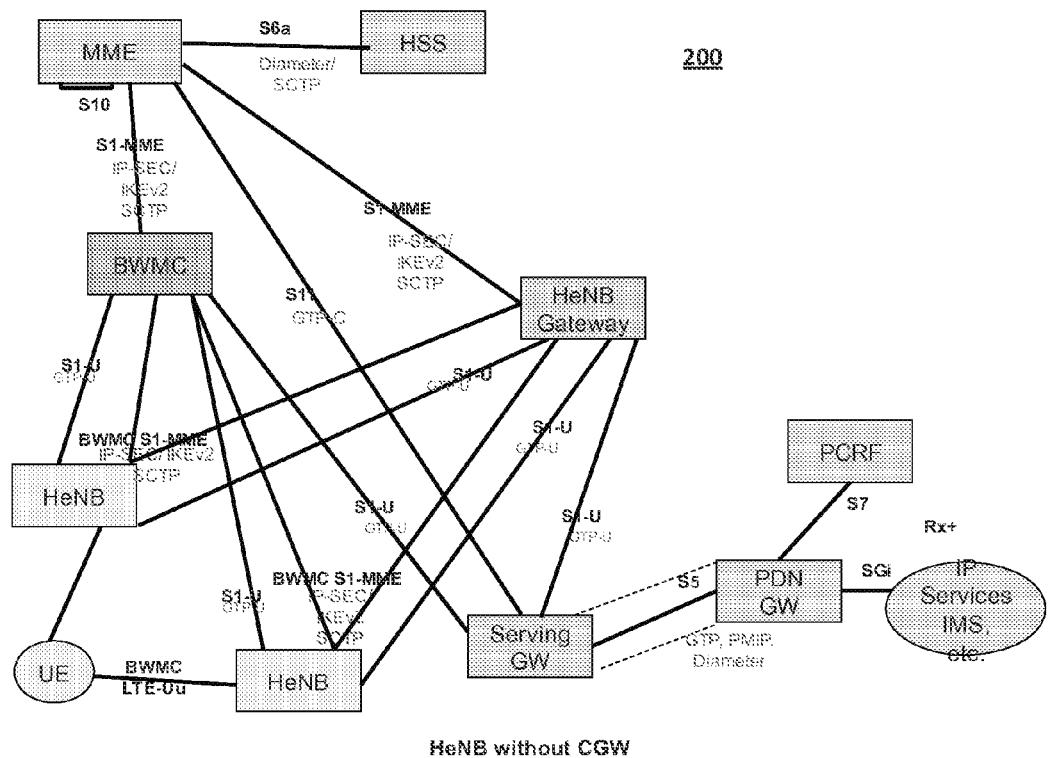
FIG. 2 is a block diagram illustrating another example system in which management of flow communication flow at an IP layer may be performed.
Figure 3:
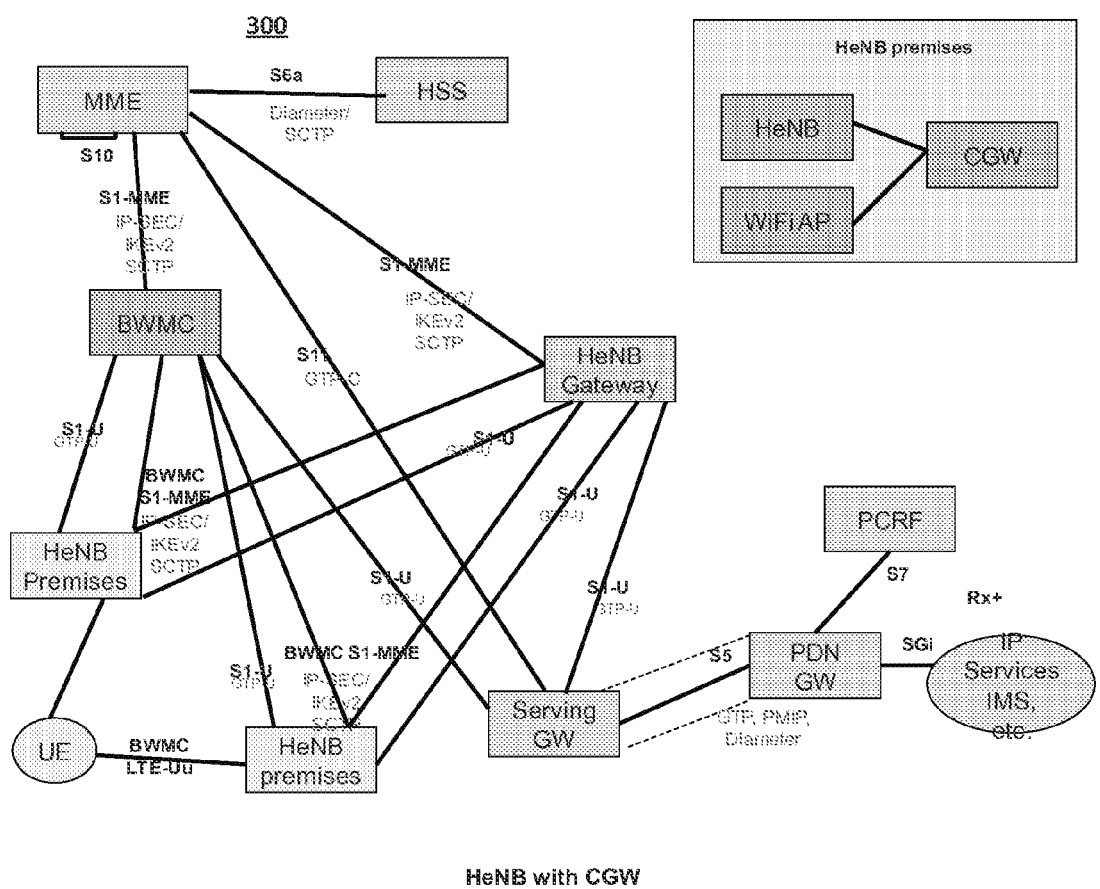
FIG. 3 is a block diagram illustrating another example system in which management of flow communication flow at an IP layer may be performed.

FIG. 2 is a block diagram illustrating alternative example system 20 in which IP flow management may be performed. The system 20 of FIG. 2 may be similar to the system 10 of FIG. 1 (e.g. except as described herein). As shown in FIG. 2, the eNB and eNB2 may be replaced by two home eNBs (HeNBs) such as HeNB1 and HeNB2. Also, the system 20 may include a HeNB gateway (HeNB-GW) communicatively coupled between the HeNB1 and HeNB2 and a serving gateway (SGW).

Figure 4:
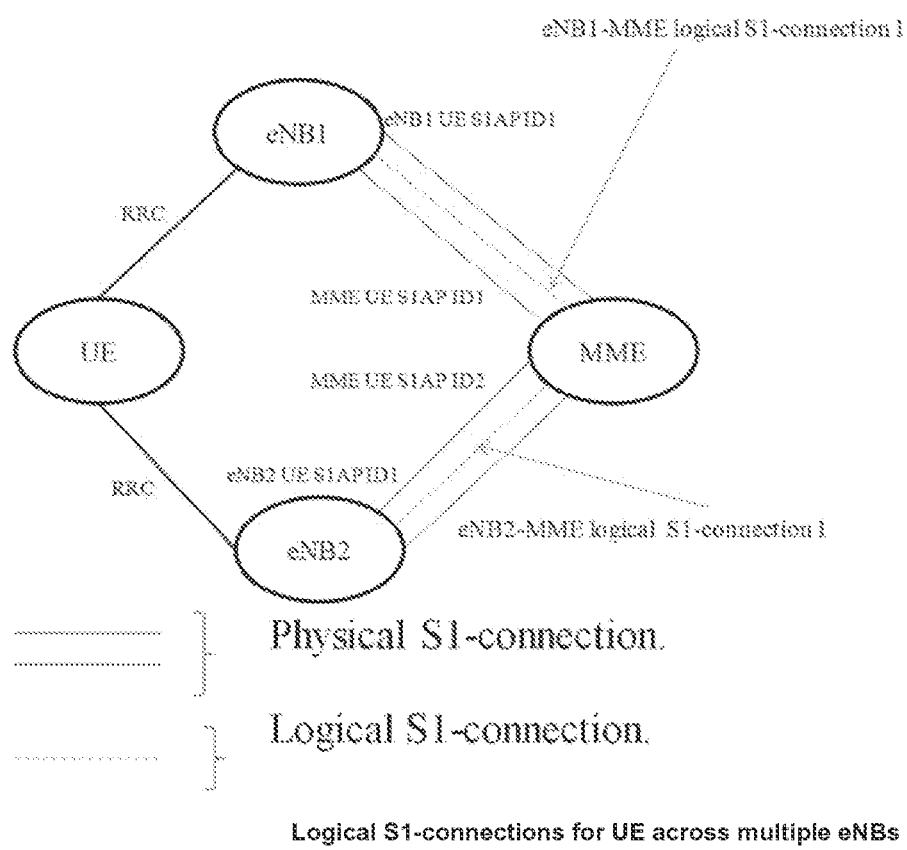
FIG. 4 is a block diagram illustrating a portion of the system of any of FIGS. 1-3 and certain connections between elements of such system.

FIG. 4 is a block diagram illustrating a portion of the system 10 and certain connections between elements of the system 10. As shown in FIG. 4, a first RRC connection may be established between the UE and eNB1. Additionally, a second RRC connection may be established between the UE and eNB2.

Additionally, logical S1 connections for the UE (e.g. UE-associated logical S1-connections) may be established between the eNB1 and MME (e.g. eNB1-MME logical S1-connection 1) and between the eNB2 and MME (e.g. eNB2-MME logical S1-connection 1). The eNB1-MME logical S1-connection 1 and the eNB2-MME logical S1-connection 1 may be identified by respective identities MME UE S1AP ID, eNB UE S1AP ID. For example, the eNB1-MME logical S1-connection 1 may be identified by identities eNB1 UE S1AP ID1, MME UE S1AP ID1. The eNB2-MME logical S1-connection 1 may be identified by identities eNB2 UE S1AP ID1, MME UE S1AP ID2.

According to example embodiments, for a received UE associated S1-AP message, the MME may identify the associated UE via uplink messages based on the MME UE S1AP ID IE, and the appropriate eNB may identify the associated UE via downlink messages based on the eNB UE S1AP ID IE. The eNBs and MME may generate a unique eNB UE S1AP ID and MME UE S1AP ID locally. Also, when multiple eNB(s) connect to the MME, the MME may maintain a corresponding number of UE-associated logical S1-connections for each UE on eNB-MME interface.

Figure 5:
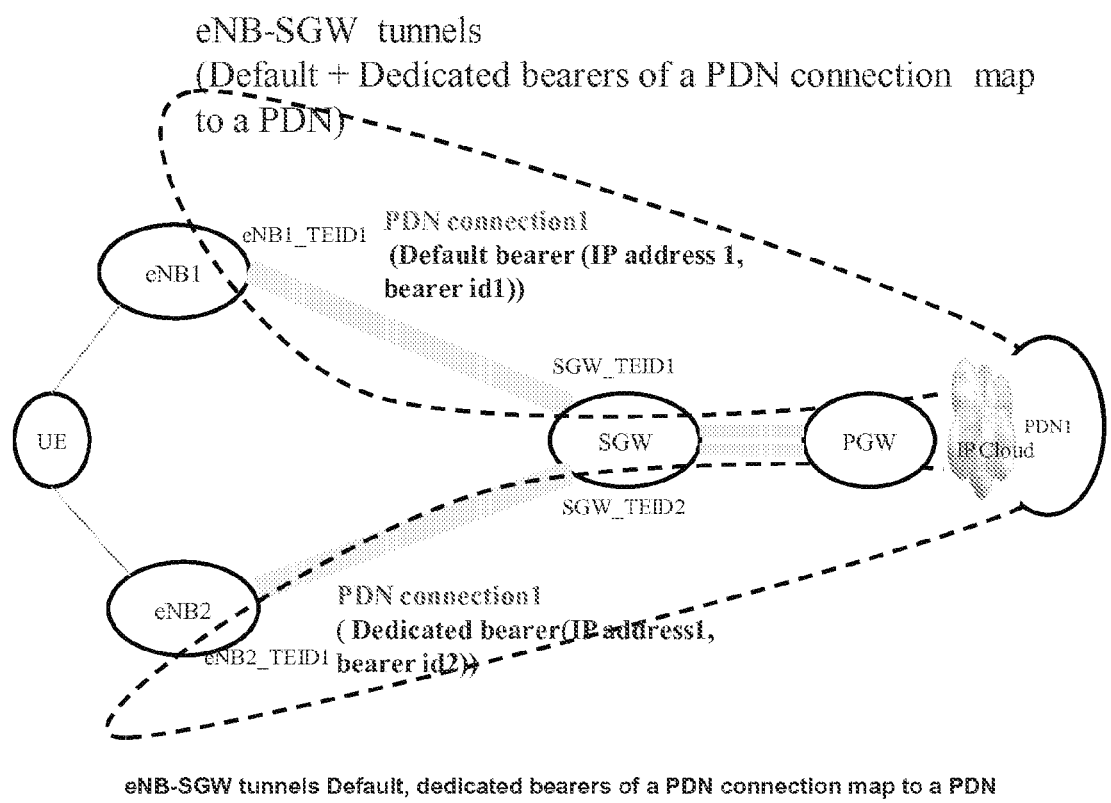
FIG. 5 is a diagram illustrating an example PDN connection map of eNB-SGW tunnels of default and dedicated bearers of a PDN connection.

FIG. 5 is a diagram illustrating an example PDN connection map (e.g. that may be established by the MME) of eNB-SGW tunnels of default and dedicated bearers of a PDN connection (e.g. PDN connection 1). In an example embodiment, for example, because the default and dedicated bearers belong to the same PDN connection 1, such bearers may share the same IP address, but such bearers may have different bearer ids. As shown in FIG. 5, the PDN connection map may include an eNB1-SGW tunnel of the default bearer of the PDN connection 1 such as PDN connection 1 (default bearer (IP address 1, bearer id1)). The PDN connection map may also include an eNB2-SGW tunnel of the dedicated bearer of the PDN connection 1, such as PDN connection 1 (dedicated bearer (IP address 1, bearer id2)).

In an embodiment, the eNB1-SGW tunnel may define two tunnel endpoints (TEs), and in general, each of the TEs may be identified with a TE identifier (TEID), an IP address and a UDP port number. The TEID may unambiguously identify the TE in scope of a path. For example, the TEIDs for eNB1-SGW tunnel may be represented by eNB1_TEID1 and SGW_TEID1. The eNB2-SGW tunnel may also defines two TEs, for example, represented by eNB2 TEID1 and SGW_TEID2.

Figure 6:
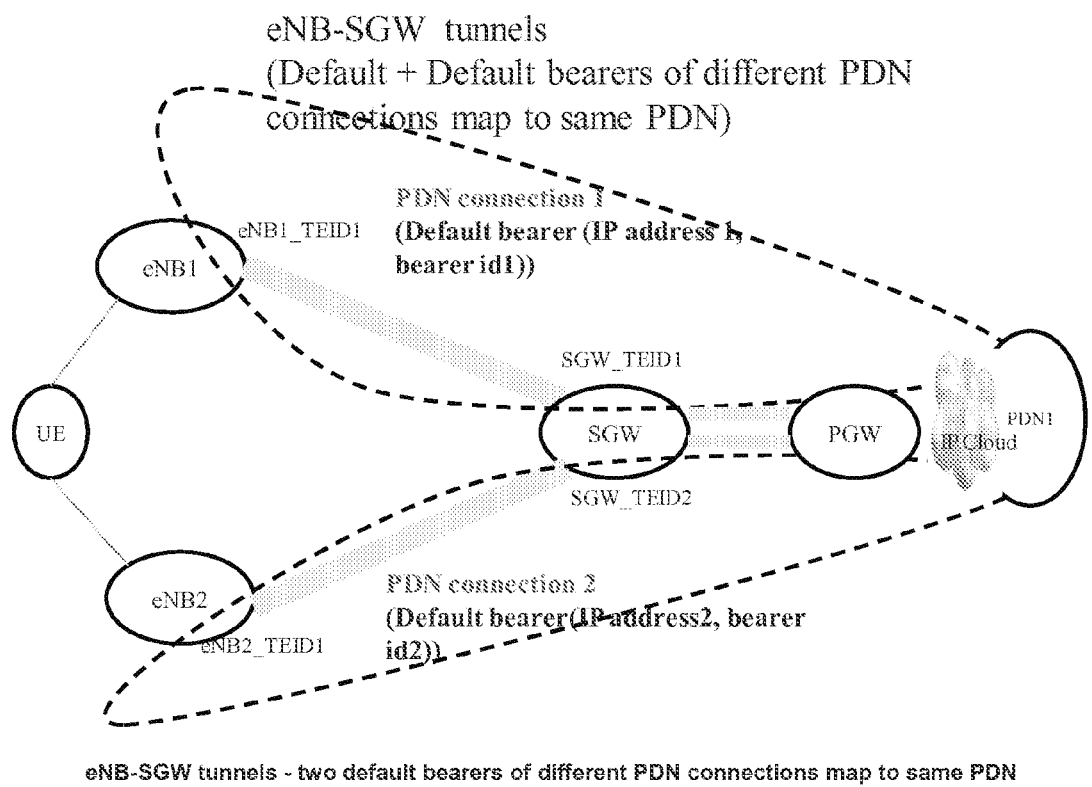
FIG. 6 is a diagram illustrating an example PDN connection map of eNB-SGW tunnels of two default bearers of respective PDN connections to the same PDN.
Figure 7:
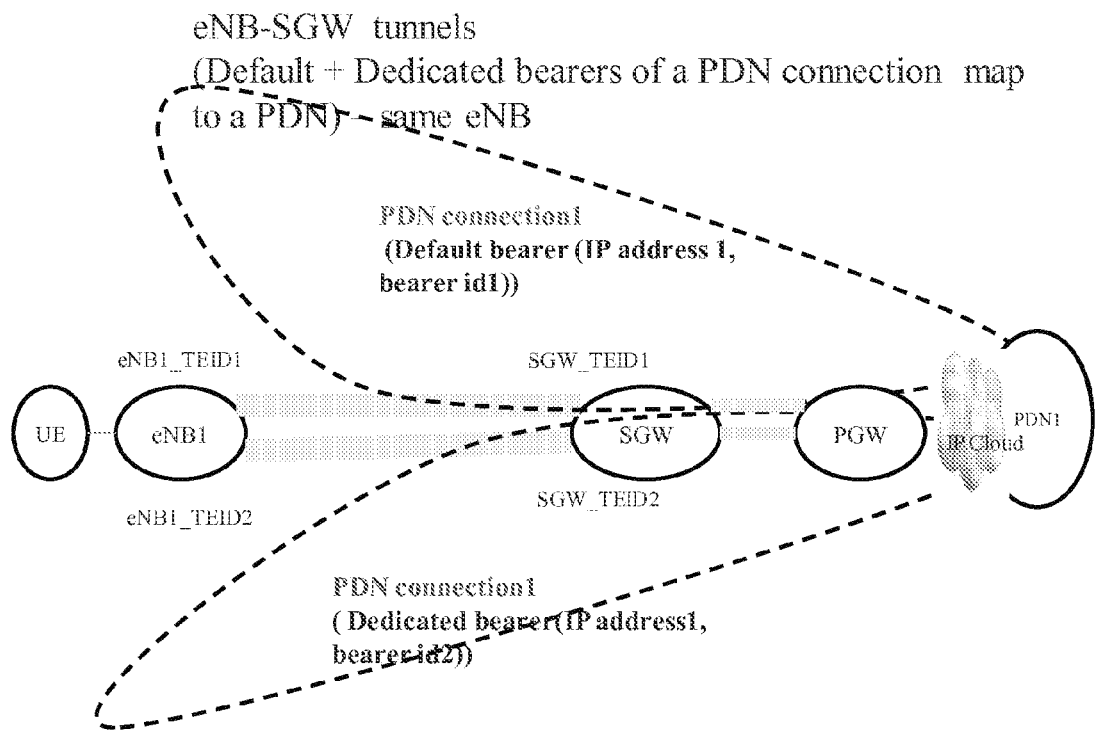
FIG. 7 is a diagram illustrating an example PDN connection map of eNB-SGW tunnels of default and dedicated bearers of a PDN connection to the same PDN from a single base station.

FIG. 6 is a diagram illustrating an example PDN connection map (e.g. that may be established by the MME) of eNB-SGW tunnels of two default bearers of respective PDN connections such as PDN connection 1 and PDN connection 2 associated with, for example, the same PDN. In an embodiment, the bearers associated therewith or used thereby may have different IP addresses as well as different bearer ids. As shown in FIG. 6, the PDN connection map may include an eNB1-SGW tunnel of the default bearer of the PDN connection 1 such as PDN connection 1 (default bearer (IP address 1, bearer id1)). The PDN connection map may also include an eNB2-SGW tunnel of the default bearer of the PDN connection 2 such as PDN connection 2 (default bearer (IP address 2, bearer id2)).

Similar to embodiments described above, the eNB1-SGW tunnel may define two TEs. The TEIDs for eNB1-SGW tunnel may be represented by eNB1_TEID1 and SGW_TEID1. The eNB2-SGW tunnel may further define two TEs and the associated TEIDs may be represented by eNB2_TEID1 and SGW_TEID2.

Figure 8:
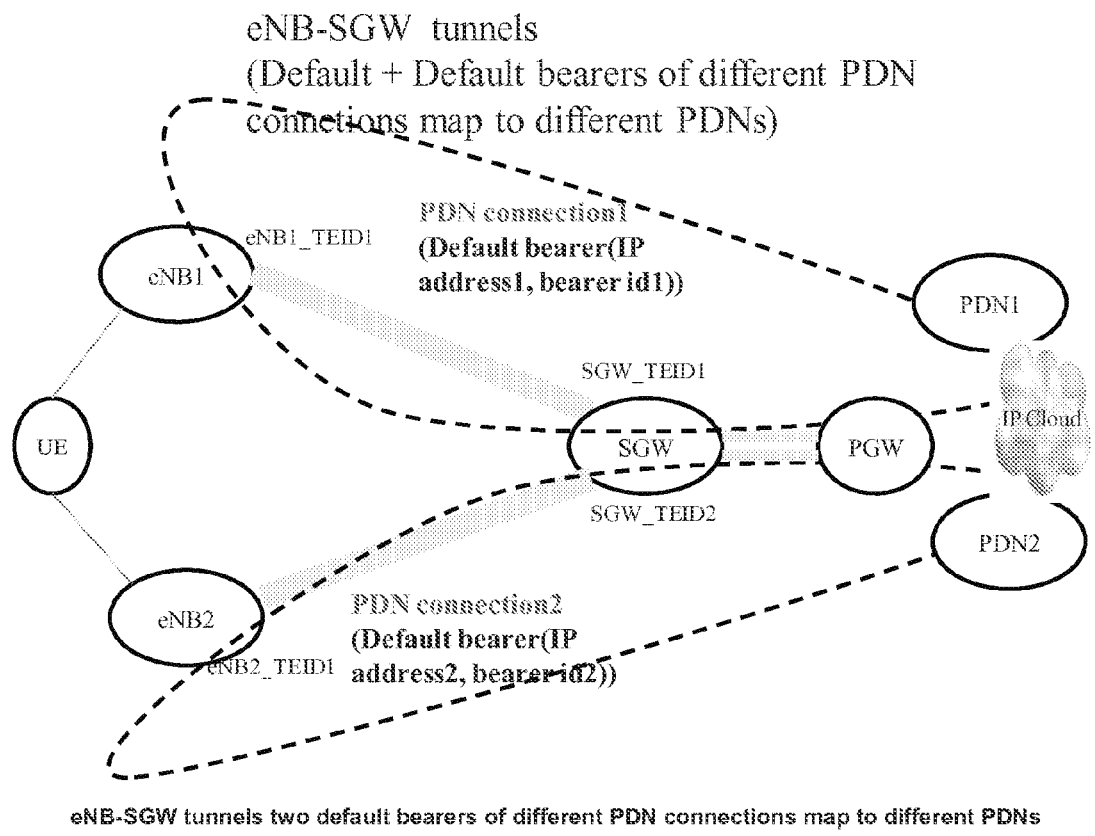
FIG. 8 is a diagram illustrating an example PDN connection map of eNB-SGW tunnels of two default bearers of respective PDN connections to different PDNs.
Figure 9:
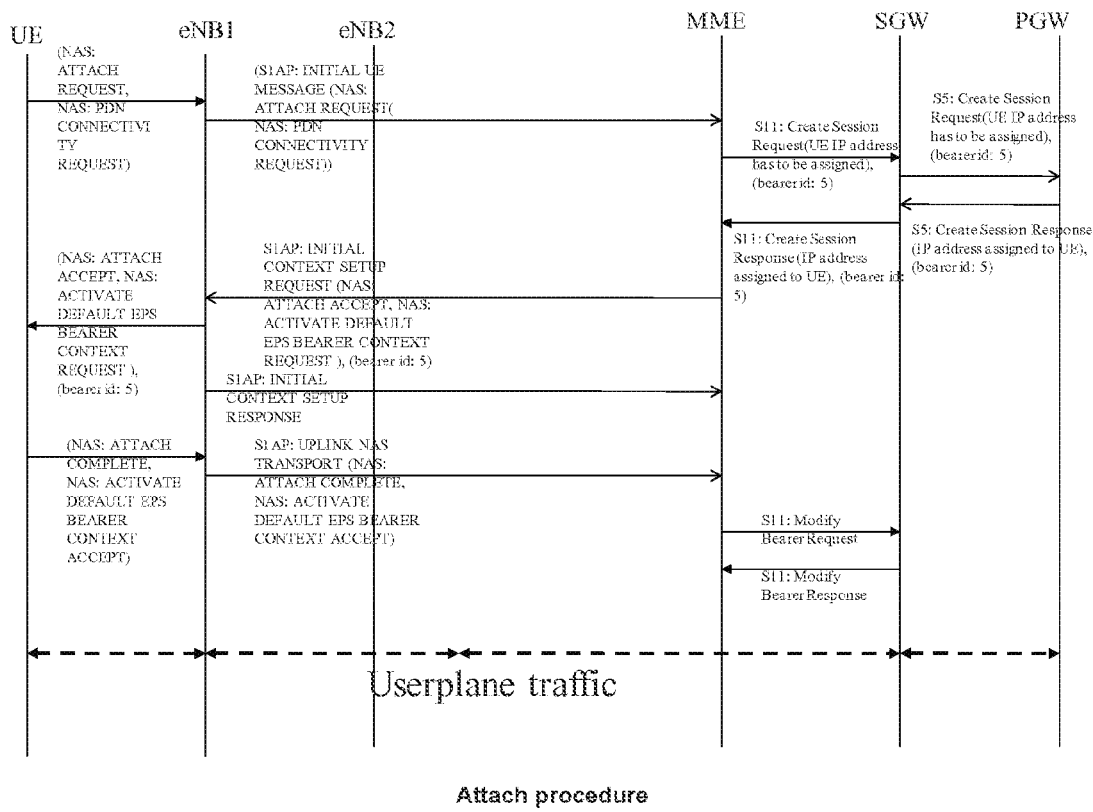
FIGS. 9-20 are message sequence charts illustrating call flows for performing one or more of procedures or functions described herein.

FIG. 8 is a diagram illustrating an example PDN connection map (e.g. that may be established by the MME) of eNB-SGW tunnels of two default bearers of respective PDN connections such as PDN connection 1 and PDN connection 2 associated with, for example, different PDNs. According to an example embodiment (e.g. because the default bearers may belong to different PDN connections), such bearers may have different IP addresses. The bearers may also have different bearer ids. As shown in FIG. 8, the PDN connection map may include an eNB1-SGW tunnel of the default bearer of the PDN connection 1 such as PDN connection 1 (default bearer (IP address 1, bearer id1). The PDN connection map may also include an eNB2-SGW tunnel of the default bearer of the PDN connection 2 such as PDN connection 2 (default bearer (IP address 2, bearer id2).

Similar to embodiments described above, the eNB1-SGW tunnel may define two TEs, and the TEIDs for eNB1-SGW tunnel may be represented by eNB1_TEID1 and SGW_TEID1. The eNB2-SGW tunnel may also define two TEs, and the associated TEIDs may be represented by eNB2_TEID1 and SGW_TEID2. According to an example embodiment, the (H)eNBs may belong to a same tracking area, and may be served by the same MME and SGW. Further, the UE may be capable of accessing multiple (H)eNBs at the same time.

Additionally, in embodiments, separate tunnels may be created from (H)eNBs to the SGW with QoS treatment for the default and/or dedicated bearers. For example, based on S1-U information available at the SGW, the SGW may send the traffic on the respective tunnels (TEIDs) to the respective (H)eNBs. As such TEIDs may be mapped to bearers on (H)eNBs, the data may be sent to the UE on such bearers by (H)eNBs. The UE may send then send user plane data to (H)eNBs. The (H)eNBs, based on the S1-U information available, may send the traffic on the respective tunnel (TEID) to the SGW.

BWM-MME functions may be provided and/or used as described herein. For example, the MME may be configured to perform bandwidth management (BWM-MME) functions. The BWM-MME functions may include one or more of the following: an Attach/Registration procedure, a Detach/Deregistration procedure; a PDN connectivity request on multiple interfaces, uplink traffic on multiple interfaces, downlink traffic on multiple interfaces, Capability to have default and dedicated bearers of a PDN across (H)eNBs, load balancing (e.g., distribution of dedicated bearers across (H)eNBs), failover (e.g., re-establishing bearers on available interfaces during unavailability of any interface), and the like.

An attach and/or registration procedure on multiple interfaces may also be provided and/or performed. For example, a UE and LTE network may perform or use an attach procedure to carry out registration of the UE with or via the LTE network. In one embodiment, the UE may send to the eNB1, via the LTE-Uu1, an attach request. Alternatively and/or additionally, the UE may choose an LTE-Uu interface associated with the other eNBs (e.g. eNB2) that may be available. The eNB1 and MME may then create a S1-MME logical S1-connection 1, and may send (e.g. to the MME) a first NAS:ATTACH-REQUEST message and a first NAS: PDN CONNECTIVITY REQUEST message. The S1-U tunnels may then be established between a (H)eNB and SGW.

In one embodiment, after establishing RRC connections with available (H)eNBs, the UE may send a NAS:ATTACH REQUEST message on an LTE-Uu interface with a (H)eNB (e.g. LTE-Uu1) to register with the network. After the registration and/or attach procedure may be performed or completed, the UE may then send a NAS:PDN CONNECTIVITY REQUEST OR NAS:BEARER RESOURCE ALLOCATION REQUEST on secondary LTE-Uu interfaces (e.g., LTE-Uu2) to use secondary (H)eNBs.

Additionally, a detach and/or deregistration procedure on multiple interfaces may be provided and/or performed. For example, a UE and/or a network may initiate a detach. For a UE initiated detach, the UE may have an option of sending a detach request on any (H)eNB that may be connected to the MME. The MME, in turn, may clean up S1-MME connections (e.g. physical and/or logical) between the (H)eNBs and the MME. For a network (e.g., HSS/MME/PGW/SGW) initiated detach, the MME may send a detach request to the UE on (H)eNBs, and may clean up S1-MME connections (e.g. physical and/or logical) between the (H)eNBs and the MME.

In an embodiment, when default and/or dedicated bearers of a PDN may be distributed across multiple (H)eNBs, and a default bearer of a PDN may be released by, for example, the UE, MME, SGW, and/or PGW, the MME may send to the respective (H)eNBs appropriate S1AP:E-RAB RELEASE COMMANDS having the corresponding bearer ids in the NAS PDUs. According to an example embodiment, the UE should not send multiple detach requests to the MME, but the MME may be handle such multiple requests if they may occur.

A PDN connectivity request on multiple interfaces may also be provided and/or used. For example, the PDN connection creation procedure may be used by a UE to create a stand-alone PDN connection. The UE may obtain an IP address for a newly created PDN connection. In an embodiment, "stand-alone" may refer to the case of PDN connection creation rather than a combination of the attach and PDN connection procedures.

When a standalone PDN connectivity request may be received from a UE on a (H)eNB, the MME may follow a standard procedure to setup a PDN connection. The PDN connectivity request may be on a (H)eNB that may be different from the (H)eNB where the attach procedure may have been performed or done.

The default and/or dedicated bearers of a PDN may be distributed across multiple (H)eNBs, but each of them may have the same UE IP address. In such an embodiment, such (H)eNBs may be served by the same SGW. For a PDN, the bearers may have the same UE IP address. According to an embodiment, multiple links may have multiple IP addresses. The bearers (e.g. default and/or dedicated bearers) of the PDN may map to different (H)eNBs, for example, to have single UE IP addresses. In some embodiments, the UE may have multiple (e.g. 8) different PDN connections and, as such, multiple (e.g. 8) different IP addresses.

Uplink traffic and/or downlink traffic on multiple interfaces may be provided and/or used as described herein. For example, a UE may send across user plane traffic (e.g. uplink) on multiple bearers that may have been created. In an embodiment, the (H)eNB may use a TEID of a SGW for the bearer to send the user plane traffic. Additionally, the SGW may use the TEID(s) of (H)eNB(s) for the bearer to send the user plane traffic (e.g. downlink).

A capability to have default and/or dedicated bearers of a PDN across (H)eNBs may be provided as described herein. For example, a MME may distribute the default and/or dedicated bearers of a PDN across multiple (H)eNBs (e.g., (H)eNBs that may be served by the same SGW). During a detach, when a default bearer or default bearers of a PDN may be released, the MME may release the dedicated bearers of the PDN (e.g. even if the dedicated bearers may be spread across multiple (H)eNBs).

Additionally, load balancing including distribution of dedicated bearers across (H)eNBs. For example, a MME may distribute the dedicated bearers of a PDN across multiple (H)eNBs based on, for example, loading conditions of the network. The MME may select one or more lightly loaded (H)eNBs to establish dedicated bearers. In such examples, the MME may use each of the interfaces available to the UE.

A failover including re-establishing bearers on available interfaces during an unavailability of an interface may be provided and/or used. For example, a MME may re-establish the bearers on available (H)eNBs, when the MME may detect that one or more of the (H)eNBs may be down.

Message sequence charts (MSCs) or flows that may illustrate methods or procedures may be provided and/or used as described herein. FIGS. 9-20 depict MSCs illustrating call flows for performing one or more of BWM-MME functions. The MSCs may be described below with reference to FIGS. 1-8. Authentication related message exchanges between UE/MME/HSS may also be provided and/or used.

In one embodiment, a S1AP message (e.g. S1AP:INITIAL UE MESSAGE) from an eNB1 to a MME may be sent and/or received. For example, in a call flow, when the MME may receive a S1AP message from eNB1, the S1AP message may include the eNB UE S1AP ID parameter and/or IE set to eNB1 UE S1AP ID1. The S1AP message may not include the MME UE S1AP ID parameter and/or IE, because no logical S1-connection (e.g. eNB1-MME logical S1-connection 1) may exist for the combination of the eNB1, MME, and/or UE. The eNB1 may generate a unique eNB1 UE S1AP ID1, and may include it in the S1AP message. The MME may generate a unique MME UE S1AP ID1 for a newly created logical S1-connection (e.g. eNB1-MME logical S1-connection 1) for the combination of the eNB1, MME, and/or UE.

A S1AP message (e.g. a reply to a S1AP:INITIAL UE MESSAGE) from a MME to eNB1 may be sent and/or received. For example, in a call flow, when the eNB1 may receive a S1AP message from the MME, the S1AP message may include the eNB UE S1AP ID parameter and/or IE set to eNB1 UE S1AP ID1 and the MME UE S1AP ID parameter and/or IE set to MME UE S1AP ID1. The above procedure or method may be applicable for eNB2 as well.

A S1AP message (e.g. except S1AP:INITIAL UE MESSAGE) from an eNB1 to a MME may be sent and/or received. For example, in a call flow, when the MME may receive a S1AP message from the eNB1, the S1AP message may include the eNB UE S1AP ID parameter and/or IE set to eNB1 UE S1AP ID1, and the MME UE S1AP ID parameter and/or IE set to MME UE S1AP ID1.

Additionally, a S1AP message (e.g. except S1AP:INITIAL UE MESSAGE) from a MME to an eNB1 may be sent and/or received. For example, in a call flow, when the eNB1 may receive a S1AP message from the MME, the S1AP message may include the eNB UE S1AP ID parameter and/or IE set to eNB1 UE S1AP ID1, and the MME UE S1AP ID parameter and/or IE set to MME UE S1AP ID1. The above procedure or method may be applicable for eNB2 as well.

Example procedures and/or methods for distributing default and/or dedicated bearers of a PDN across (H)eNBs may be provided and/or used. In one embodiment, the default and/or dedicated bearers may have the same IP address, but different bearer ids. The default and or dedicated bearers of a PDN may be distributed across multiple (H)eNBs by performing an attach procedure followed by a UE initiated dedicated bearer activation. An example attach procedure (e.g. an LTE attach procedure or method) that may be used herein may be illustrated in FIG. 9. According to an example embodiment, the attach procedure (e.g. shown in FIG. 9) may be performed to register the UE with the LTE network.

Figure 10:
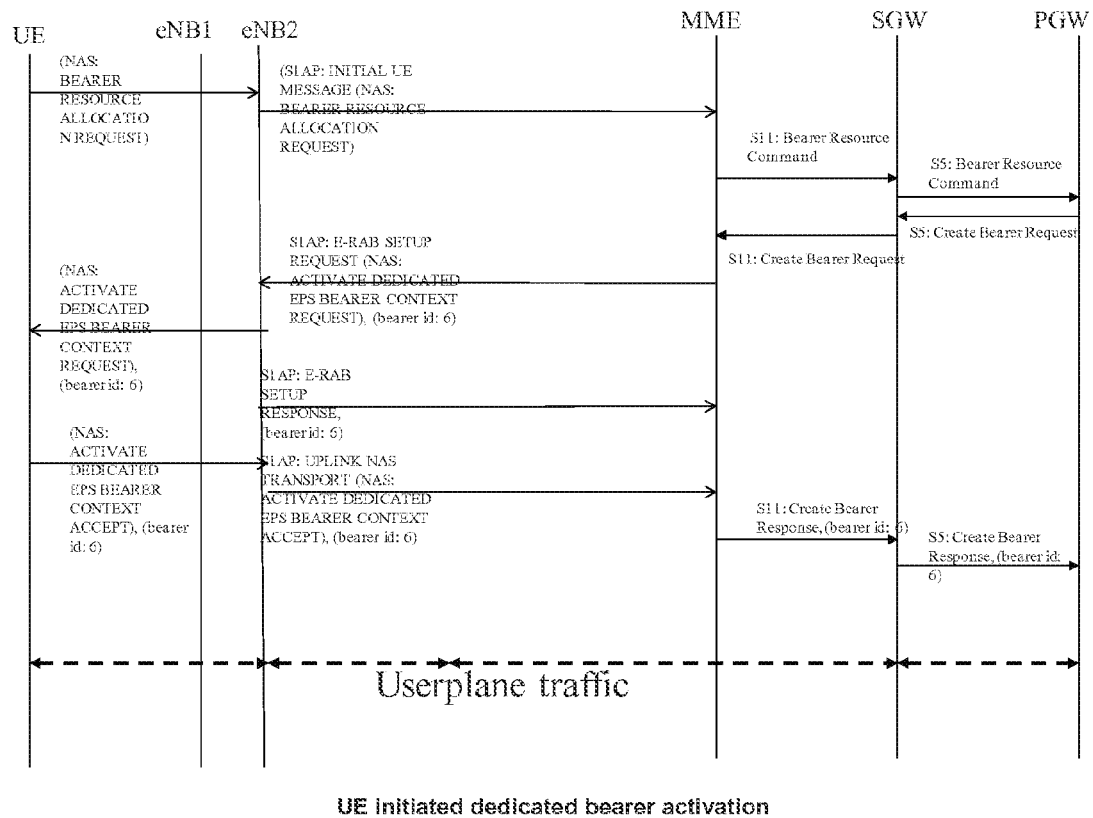
Figure 11:
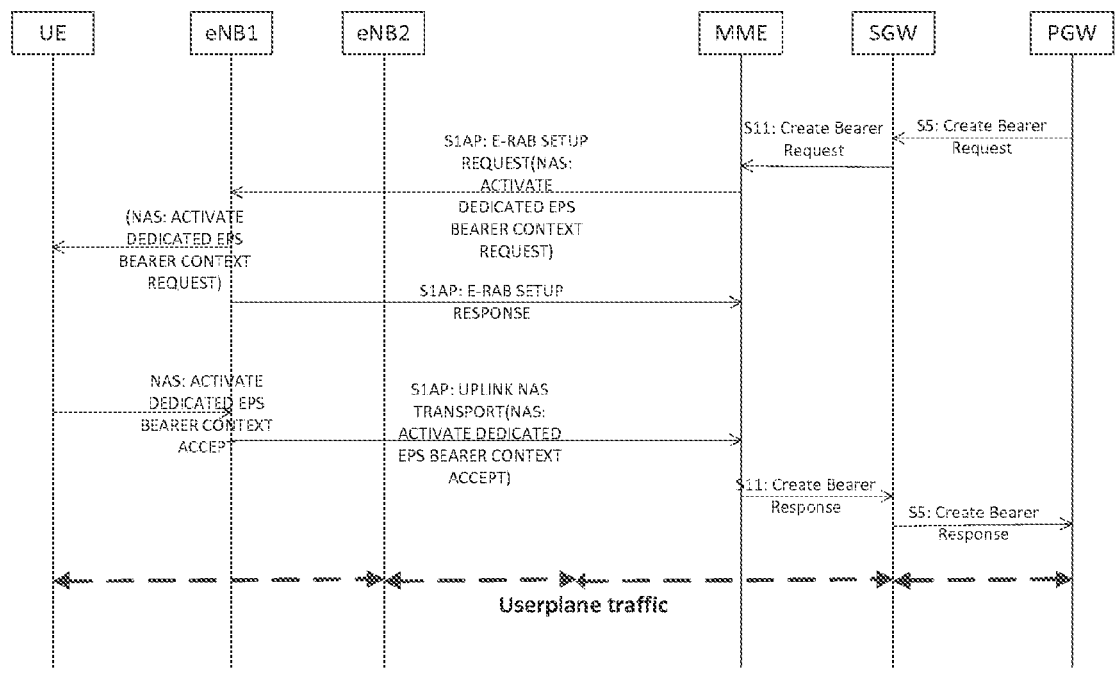
Figure 12:
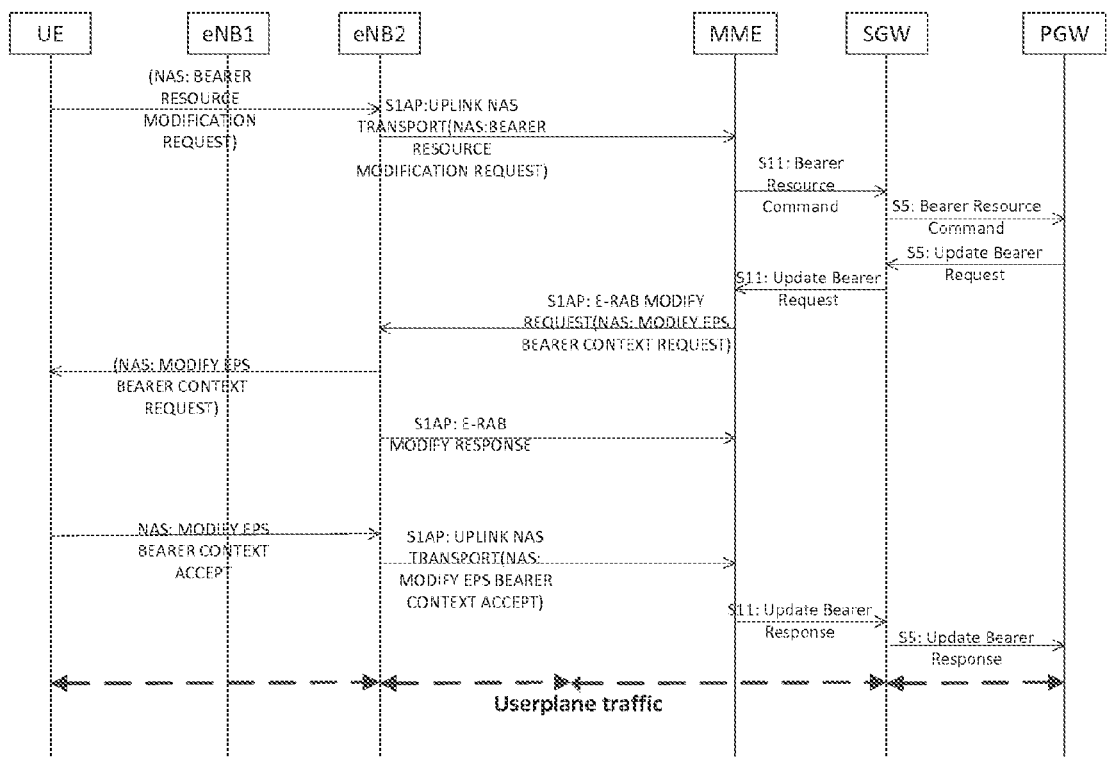
Figure 13:
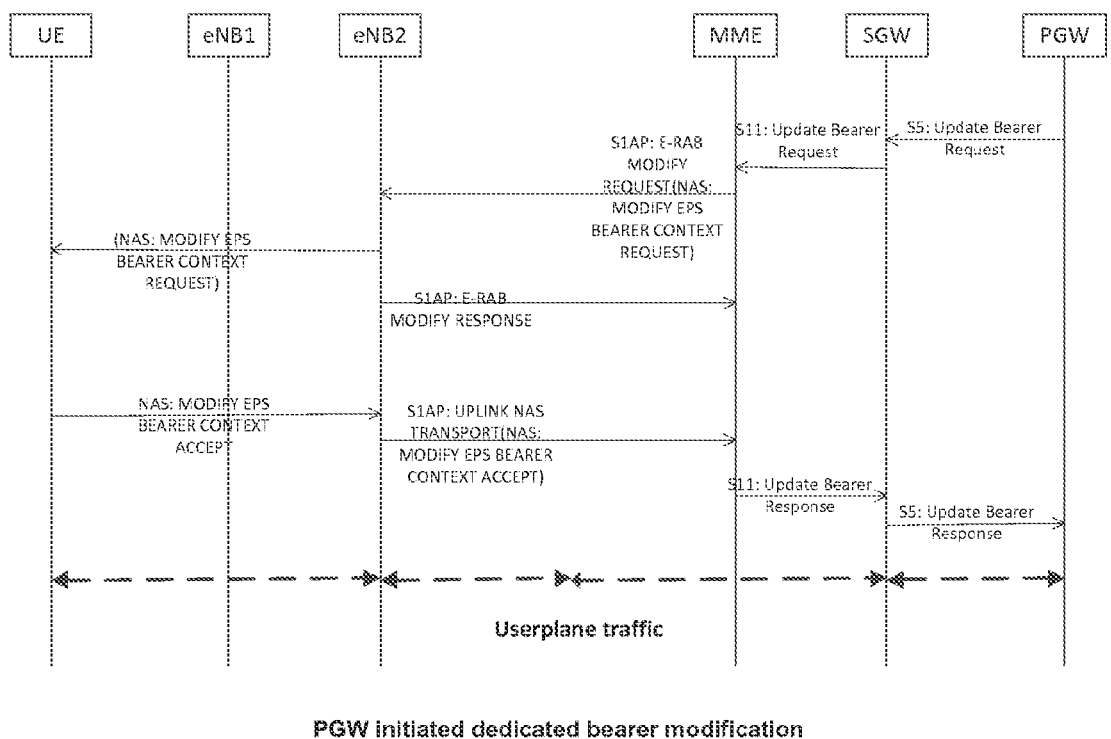
Figure 14:
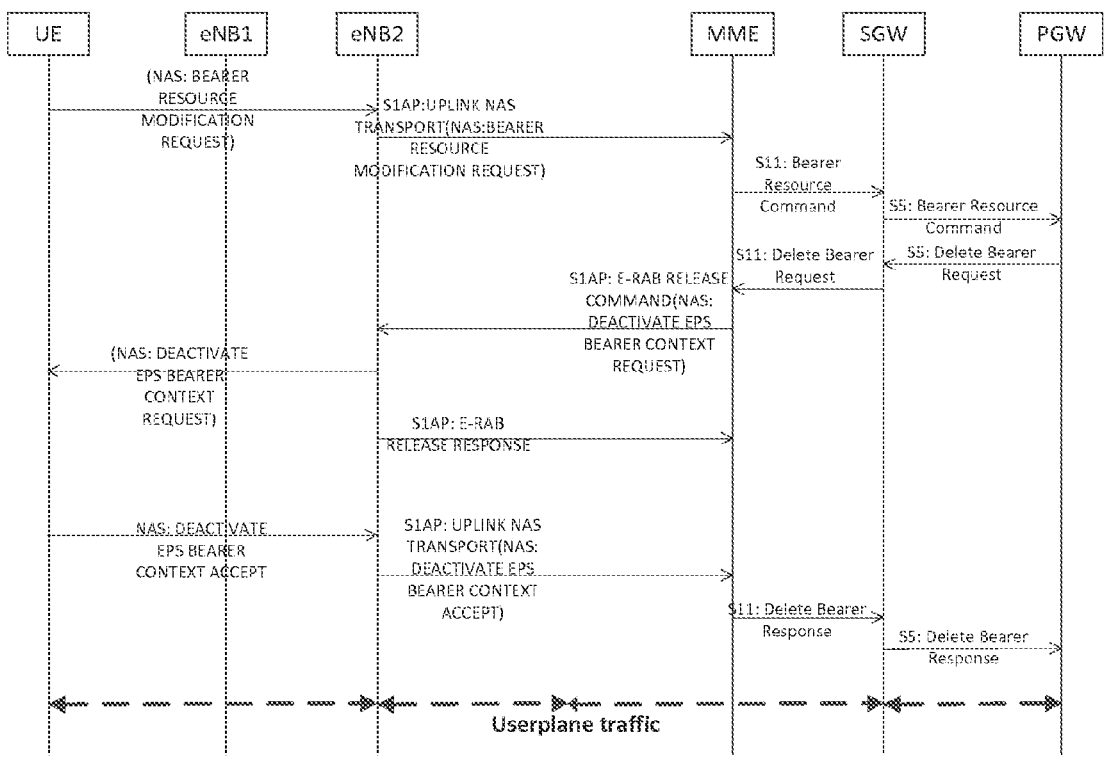
Figure 15:
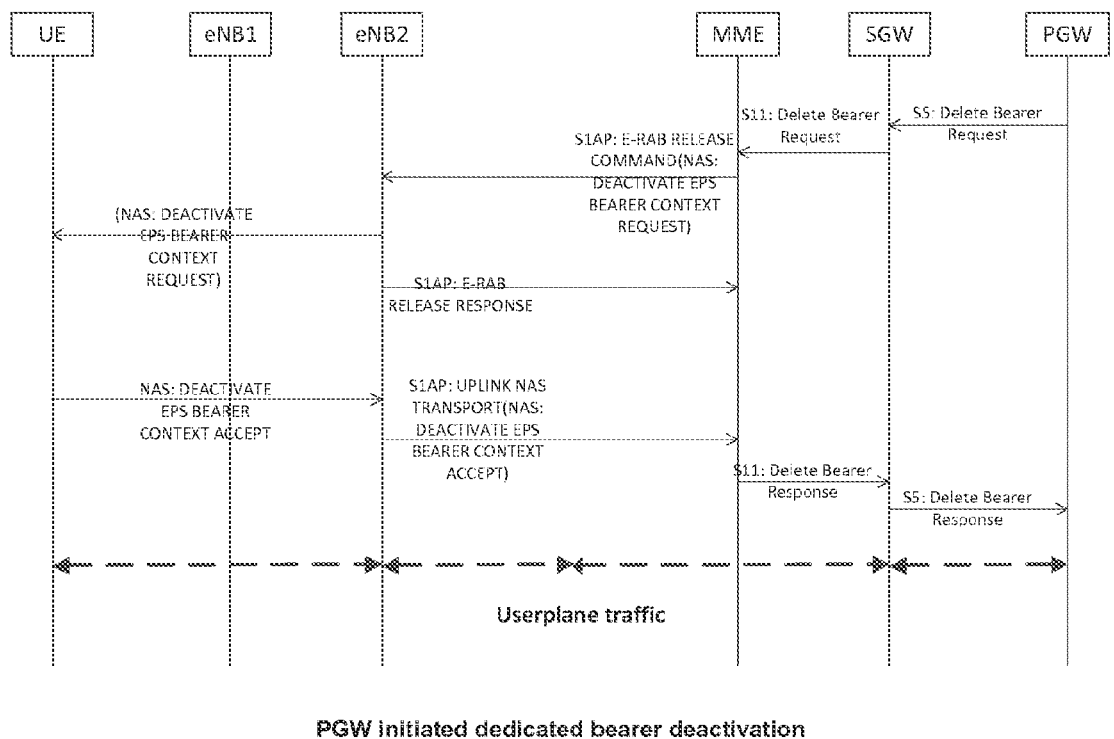

FIG. 10 illustrates an example embodiment of the UE-initiated dedicated bearer activation that may be used or performed as described herein. As shown in FIG. 10, in one embodiment, the UE may request a dedicated bearer when a bearer may be used with certain QoS. The UE may include the LBI (e.g. default bearer "Linked Bearer Identity") in a NAS:BEARER RESOURCE ALLOCATION REQUEST to inform the network (e.g. one or more of the MME/SGW/PGW) that the dedicated bearer may be associated with the LBI of the PDN connection. The UE-initiated dedicated bearer activation shown in FIG. 10 may be performed (e.g. assuming an RRC connection exists between the UE and the eNB2).

The UE may send to the eNB2 a NAS:BEARER RESOURCE ALLOCATION REQUEST with parameters for the desired QoS. The UE may include the default bearer id/LBD:id5 that may have been created, for example, during the attach procedure. By using the default bearer id LBI:id5, the UE may indicate that the requested dedicated bearer may be associated with default bearer id5/PDN connection.

In an example embodiment, responsive to the NAS: BEARER RESOURCE ALLOCATION REQUEST, the eNB2 may forward to the MME the NAS:BEARER RESOURCE ALLOCATION REQUEST) in a S1AP:INITIAL UE MESSAGE. Additionally, responsive to the S1AP: INITIAL UE MESSAGE, the MME may initiate a dedicated bearer activation procedure with the SGW, by sending, via a S11 interface, a Bearer Resource Command. The MME may include a LBI (a Linked EPS Bearer Id) that may have been received from NAS:BEARER RESOURCE ALLOCATION REQUEST.

Additionally, the SGW may send a Bearer Resource Command to the PGW, via a S5 interface, to prepare the PGW for a dedicated bearer activation procedure. The SGW may include the LBI. In an embodiment, the PGW may also send a Create Bearer Request to the SGW via a S5 interface and may include in the request the LBI that may have been received from such Bearer Resource Command the EPS bearer id:0, the PGW S5-U, and/or the PGW_TEID. By sending EPS bearer id:0, the PGW may indicate and may expect or request the MME to assign proper bearer id. Additionally, the SGW may send the Create Bearer Request to the MME, via a S11 interface and may include in the request the LBI that may have been received from the Bearer Resource Command, the EPS bearer id:0, the S1-U and the SGW TEID (SGW_TEID2). By sending EPS bearer id:0, the SGW may indicate and may expect or request the MME to assign proper bearer id.

The MME may identify an unused bearer (e.g. id:6), and may send to the eNB2 a S1AP:E-RAB SETUP REQUEST including a NAS:ACTIVATE DEDICATED EPS BEARER CONTEXT REQUEST. The S1AP:E-RAB SETUP REQUEST may include the bearer id:6, the QoS, and the SGW S1-U TEID (SGW_TEID2) for the bearer. The dedicated bearer may have the same IP address as the default bearer of such a PDN connection (e.g., IP address 1 in FIG. 5). The eNB2 may set up the EPS bearer id:6 and may forward to the UE a NAS:ACTIVATE DEDICATED EPS BEARER CONTEXT REQUEST having the bearer id:6.

According to an embodiment, after establishing the bearer on the eNB2, the eNB2 may send a S1AP:E-RAB SETUP RESPONSE to the MME. Such a S1AP:E-RAB SETUP RESPONSE may include the bearer id:6 and/or the MME S1-U IP address and TEID (eNB2_TEID1). The S1AP:E-RAB SETUP RESPONSE may also include the list of bearers that may have been successfully setup on eNB2.

The UE may establish the dedicated bearer and may send a NAS:ACTIVATE DEDICATED EPS BEARER CONTEXT ACCEPT having bearer id:6 to the eNB2. The eNB2, in turn, may send a S1AP:UPLINK NAS TRANSPORT message to the MME. The S1AP:UPLINK NAS TRANSPORT message may include a NAS:ACTIVATE DEDICATED EPS BEARER CONTEXT ACCEPT and the bearer id:6.

The MME may then send a Create Bearer Response having bearer id:6 to the SGW via a S11 interface. The MME may include the eNB2 S1-U IP address, eNB2_TEID1 and LBI (e.g. default bearer) in the Create Bearer Response. The SGW may send the Create Bearer Response including bearer id:6 to the PGW via a S5 interface. The SGW may include the LBI (e.g. default bearer) in the Create Bearer Response.

For UL user plane data, the eNB2 may send such UL user data to the SGW on the S1-U using the SGW IP address and SGW_TEID2. For DL user plane data, the SGW may send such DL user data to the eNB2 on the S1-U using eNB2 IP address and eNB2_TEID1.

As such, in example embodiments, a NAS:BEARER RESOURCE ALLOCATION REQUEST may be included in a S1-AP:INITIAL UE MESSAGE on secondary eNB (e.g. eNB2). Additionally, the MME may receive request for Dedicated Bearer from an eNB (e.g. eNB2), with a request to link this Dedicated Bearer with a Default Bearer that may have been set up via a different eNB (e.g. eNB1). Current 3GPP procedures may cause the MME to get confused and possibly reject such a request. According to embodiments herein, the MME receives such a request (e.g. does not reject it) and may associate the Default and Dedicated Bearers from two physically different eNBs.

According to embodiments, additional procedures and/or methods may be provided, performed, and/or used including PGW-Initiated Dedicated Bearer Activation, UE initiated Dedicated Bearer Modification, PGW-initiated Dedicated Bearer modification, UE initiated Dedicated Bearer Deactivation, PGW-Initiated Dedicated Bearer Deactivation, and the like may also be provided and/or used (e.g. as shown in FIGS. 11-15).

Additionally, PDN connection procedures and/or methods may be provided, performed, and/or used. For example, procedures and/or methods for distributing default bearers of multiple PDNs across multiple (H)eNBs may be provided, used, and/or performed. In an embodiment, the default bearers of multiple PDNs may be distributed across multiple (H)eNBs by performing an attach procedure followed by a UE initiated PDN connect procedure.

Figure 16:
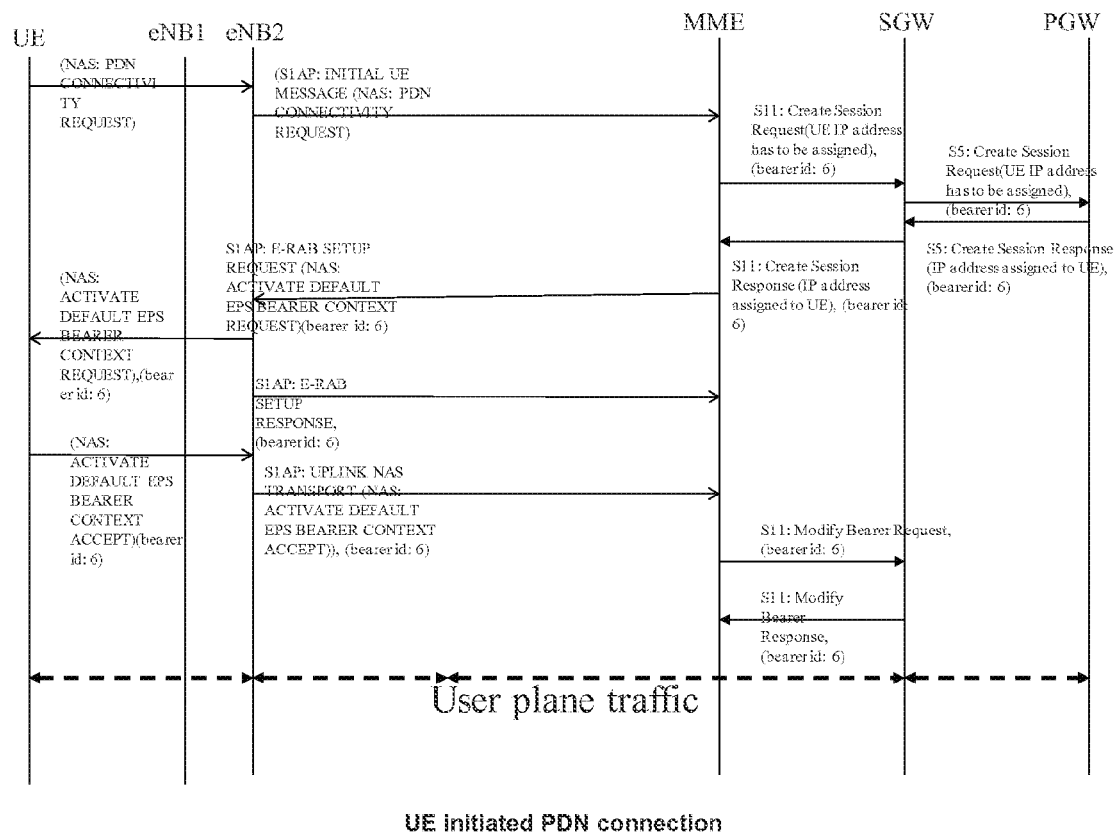

Additionally, a UE initiated PDN connection may be established (e.g. via a procedure and/or methods). For example, as shown in FIG. 16, a UE-initiated PDN connection may be performed. In one embodiment, the default bearers of the PDN connections may have the different IP addresses and different bearer ids.

For example, the UE may request a standalone PDN Connection when the UE may want a connection to a different PDN. A new IP address may be assigned by the PGW for the new PDN connection. The UE-initiated PDN connection shown in FIG. 16 may assume an RRC connection may exist between the UE and the eNB2. In one embodiment, the UE-initiated PDN connection is carried out after an attach procedure may be performed using the eNB1, for example. The attach procedure performed using the eNB1 may be carried out as described above.

The UE may also send to the eNB2 a NAS:PDN CONNECTIVITY REQUEST. The NAS:PDN CONNECTIVITY REQUEST may include PDN type and APN (Access Point Name) parameters, for example.

According to an example embodiment, responsive to the NAS:PDN CONNECTIVITY REQUEST, the eNB2 and the MME may establish the eNB2-MME logical S1-connection and may forward the PDN CONNECTIVITY REQUEST to the MME in a S1AP:INITIAL UE MESSAGE. The MME may initiate the PDN connection procedure described herein with the SGW responsive to the S1AP:INITIAL UE MESSAGE by sending a Create Session Request via a S11 interface. The MME may identify an unused bearer id (in this embodiment, for example, bearer id:6)) and may send across the S11 interface a Create Session Request. A new UE IP address may then be assigned for the PDN.

The SGW may send the Create Session Request to the PGW, via the S5 interface, to prepare the PGW for PDN connection procedure. The PGW, in turn, may send the Create Session Response to SGW via the S5 interface. Such a S5:Create Session Response may include the bearer id:6, PGW control and user plane address, TEIDs, UL TFT (Uplink Traffic Flow Template), a new IP address for the newly created PDN connection, and the like.

The SGW may send a Create Session Response to MME via the S11 interface. Such a S11:Create Session Response may include the PGW control and data plane IP address along with TEIDs, S11 Control IP and TEID, SGW side of S1-U IP and TEID (SGW_TEID2) a bearer id, and the like. The SGW may create a bearer (e.g. EPS bearer) context with UL TFT and, if appropriate, the new IP address that may be assigned to UE.

The MME may send a S1AP:E-RAB SETUP REQUEST to the eNB2. The S1AP:E-RAB SETUP REQUEST may include a NAS:ACTIVATE DEFAULT EPS BEARER CONTEXT REQUEST. The S1AP:E-RAB SETUP REQUEST may include the bearer id:6, QoS, and SGW S1-U TEID (SGW_TEID2) for this bearer. The default bearer of the new PDN connection has a different IP address that the default bearer of the existing PDN connection.

The eNB2 may set up the EPS bearer id:6 and may forward to the UE the NAS:ACTIVATE DEFAULT EPS BEARER CONTEXT REQUEST). After establishing the bearer on the eNB2, the eNB2 may send a S1AP:E-RAB SETUP RESPONSE to the MME. The S1AP:E-RAB SETUP RESPONSE may include the bearer id:6 and the eNB2 S1-U IP and TEID (eNB2_TEID1). The S1AP:E-RAB SETUP RESPONSE may also include a list of bearers that may have been successfully setup on the eNB2.

The UE may establish the bearer and may send to the eNB2 a NAS:ACTIVATE DEFAULT EPS BEARER CONTEXT ACCEPT. Such a NAS:ACTIVATE DEFAULT EPS BEARER CONTEXT ACCEPT may carry the bearer id:6. The eNB2 may send to the MME a S1AP:UPLINK NAS TRANSPORT message. The S1AP:UPLINK NAS TRANSPORT message may include the NAS:ACTIVATE DEFAULT EPS BEARER CONTEXT ACCEPT and the bearer id:6.

The MME may also send to the SGW across the S11 interface a Modify Bearer Request. Such a S11:Modify Bearer Request may include the bearer id:6. The MME may also include the eNB2 S1-U IP and eNB2_TEID1 in the S1:Modify Bearer Request. The SGW may send the Modify Bearer Response to the MME across the S11 interface, for example, after storing the eNB2 S1-U IP and eNB2_TEID1. According to an embodiment, the S11:Modify Bearer Response may include the bearer id:6.

For UL user plane data, the eNB2 may send such UL user data to the SGW on the S1-U using the SGW IP address and the SGW_TEID2. For the DL user plane data, the SGW may send such DL user data to the eNB2 on the S1-U using the eNB2 IP address and eNB2_TEID1.

Figure 17:
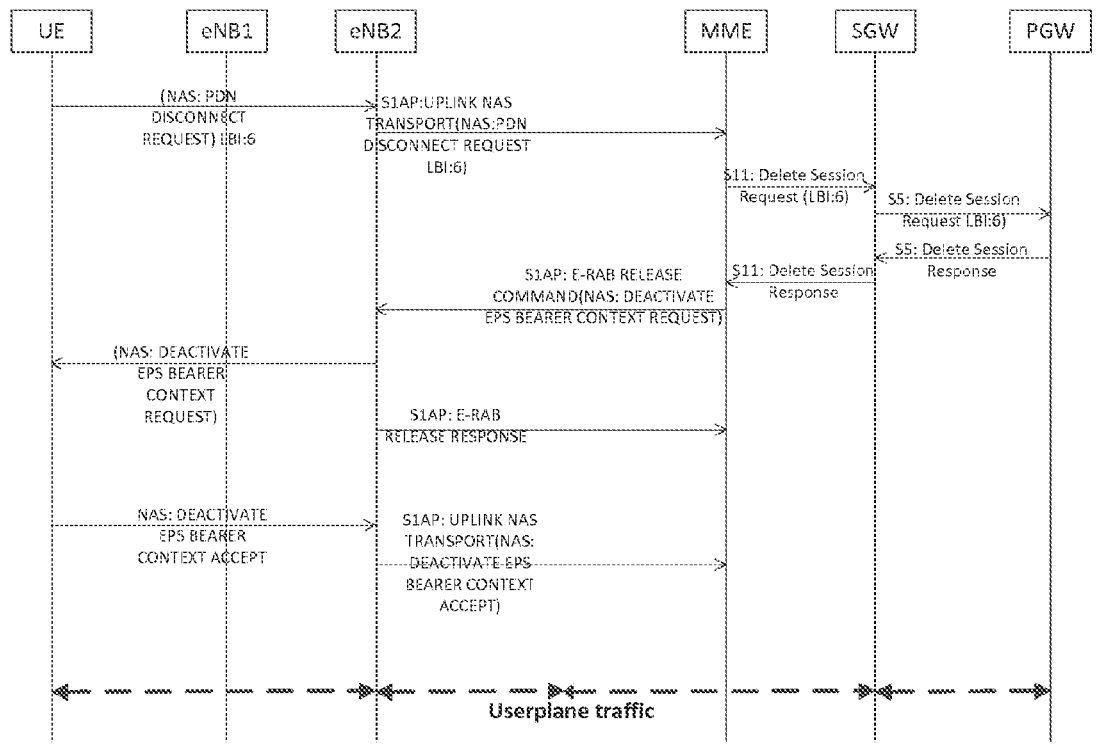

In an embodiment, a UE-initiated PDN disconnect may also be provided and/or used. For example, as shown in FIG. 17, a UE-initiated PDN disconnect may be performed. In one embodiment, the default bearers of the PDN connections may have different IP addresses and different bearer ids.

The UE may initiate the UE-initiated PDN disconnect, for example, to release a PDN connection it may no longer be using (e.g. it may no longer need). The UE-initiated PDN disconnect shown in FIG. 17, assumes an RRC connection exists between the UE and the eNB2.

In one embodiment, the UE-initiated PDN connection disconnect is carried out after an attach procedure is performed using the eNB1. The attach procedure performed using the eNB1 may be carried out as described above.

In one embodiment, the UE-initiated PDN disconnect may be carried out after an attach procedure may be performed using the eNB1 and a UE-initiated PDN connection may be performed using the eNB2. The attach procedure performed using the eNB1 may be carried out as described above, and the UE-initiated PDN connection on the eNB2 may be carried out as using the UE-initiated PDN connection as described above.

For example, the UE may send to the eNB2 a NAS:PDN DISCONNECT REQUEST. The NAS:PDN DISCONNECT REQUEST may include the LBI and the EBI. If or when a S1 logical connection may already exists between the eNB2 and MME, the NAS:PDN DISCONNECT REQUEST may be forwarded in to the MME in a S1AP:UPLINK NAS TRANSPORT message.

The MME may initiate the PDN disconnect procedure with SGW, by sending across the S11 interface a Delete Session Request. The MME may include the LBI of the PDN connection in the S11:Delete Session Request.

The SGW, in turn, may send the Delete Session Request to PGW, via the S5 interface, to prepare the PGW for PDN disconnect procedure. After deleting the PDN connection, the PGW may send the Delete Session Response to SGW via the S5 interface. Similarly, the SGW may send the Delete Session Response to MME, via the S11 interface, after deleting the PDN connection.

The MME, in turn, may send a S1AP:E-RAB RELEASE COMMAND to the eNB2. Such a S1AP:E-RAB RELEASE COMMAND may include a NAS:DEACTIVATE EPS BEARER CONTEXT REQUEST. The S1AP:E-RAB RELEASE COMMAND may also include a list of EPS bearer IDs that may belong to the PDN, including the EBI:6 for the standalone PDN connection.

The eNB2 may release the bearer of the PDN connection and may forward to the UE the NAS:DEACTIVATE EPS BEARER CONTEXT REQUEST. After releasing the bearer on the eNB2, the eNB2 may send a S1AP:E-RAB RELEASE RESPONSE to the MME. The S1AP:E-RAB RELEASE RESPONSE may include the bearer id:6 and/or a list of bearers that may have been successfully released on eNB2.

The UE may release the bearer and may send a NAS:DEACTIVATE EPS BEARER CONTEXT ACCEPT to the eNB2. The NAS:DEACTIVATE EPS BEARER CONTEXT ACCEPT may include the bearer id:6. The eNB2 may send a S1AP:UPLINK NAS TRANSPORT message to the MME. The S1AP:UPLINK NAS TRANSPORT message may include the NAS:DEACTIVATE EPS BEARER CONTEXT ACCEPT and/or the bearer id:6.

Figure 18:
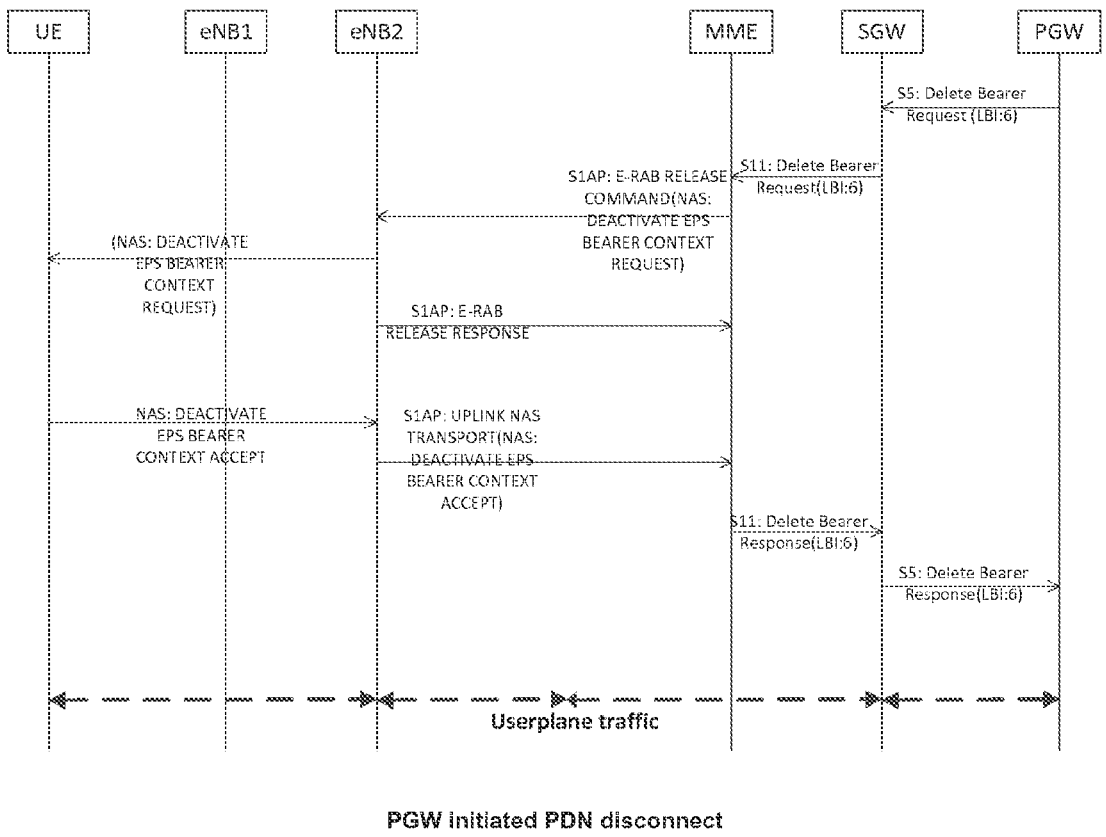

In example embodiments, a PGW-initiated PDN disconnect (e.g. as shown in FIG. 18) may be provided, performed, and/or used.

Figure 19:
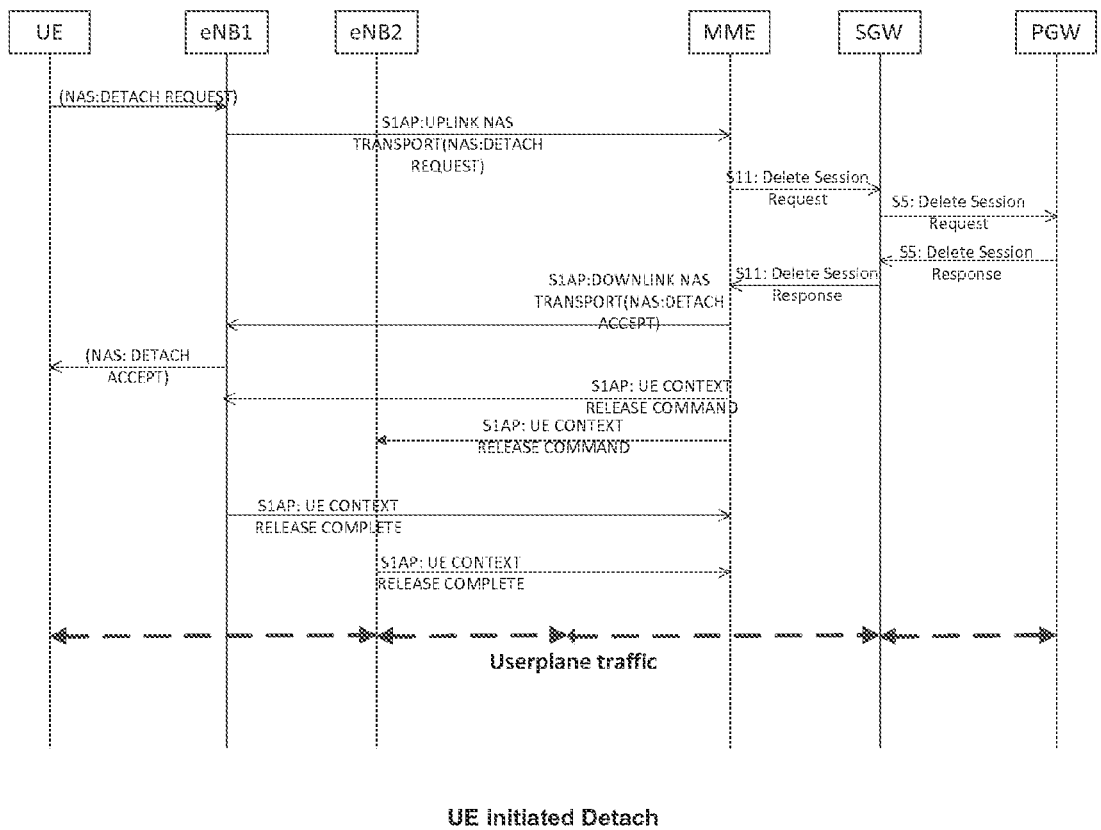

Detach procedures or methods may be provided, performed, and/or used. For example, as shown in FIG. 19, a UE-initiated detach is performed. In one embodiment, the default bearers of the multiple PDN connections may have the different IP addresses and different bearer ids. The UE may initiate the detach request to cause the UE to de-register from the network. The UE-initiated detach shown in FIG. 19 may assume an RRC connection may exist between the UE and the eNB2.

In one embodiment, the UE-initiated detach may be carried out after an attach procedure may be performed using the eNB1 and a UE-initiated dedicated bearer activation may be performed using the eNB2. The attach procedure performed using the eNB1 may be carried out as described above, and the UE-initiated dedicated bearer activation on the eNB2 may be carried out using UE-initiated dedicated bearer activation as described above.

The UE may send a NAS:DETACH REQUEST to eNB1. If or when a S1 logical connection may exist between the eNB1 and MME, the NAS:DETACH REQUEST may be forwarded in S1AP:UPLINK NAS TRANSPORT. Responsive to the S1AP:UPLINK NAS TRANSPORT, the MME may initiate the detach procedure with SGW, for example, by sending a Delete Session Request across the S11 interface. The MME may include LBI of the PDN connection in the S1:Delete Session Request. If the UE may have more than one PDN connection, for each PDN connection, the MME may send across the S11 interface corresponding Delete Session Requests.

The SGW may send the Delete Session Request to PGW, via the S5 interface, to delete the PDN connection. After deleting the PDN connection, the PGW may send a Delete Session Response across the S5 interface to the SGW. The SGW, for example, after deleting the PDN connection, may send the Delete Session Response across S11 interface to MME.

The MME may then send a S1AP:DOWNLINK NAS TRANSPORT message to the eNB1. This S1AP:DOWNLINK NAS TRANSPORT message may include a NAS:DETACH ACCEPT. The MME may also send a S1AP:UE CONTEXT RELEASE COMMAND to eNB1 and eNB2 to tear down both the S1-MME logical connections. In embodiments, RRC connections from the UE to eNB1 and eNB2 may be released as well, for example, after receiving RRC ConnectionRelease from the eNB1 and eNB2.

The eNB1 may release the bearers related to the UE, may send a S1AP:UE CONTEXT RELEASE COMPLETE to the MME, and may tear down the S1-MME logical connection from eNB1 standpoint. The eNB2 may release the bearers related to the UE, may send a S1AP:UE CONTEXT RELEASE COMPLETE to the MME, and may tear down the S1-MME logical connection from eNB2 standpoint. The MME may then free up both the S1-MME logical connections on or from its end.

In an example embodiment, as the S1-U tunnels may be released at the eNB1 and eNB2, UL user plane traffic may not be sent across. Additionally, as the S1-U tunnels may be released at the eNB1 and eNB2, DL user plane traffic may not be sent across.

Figure 20:
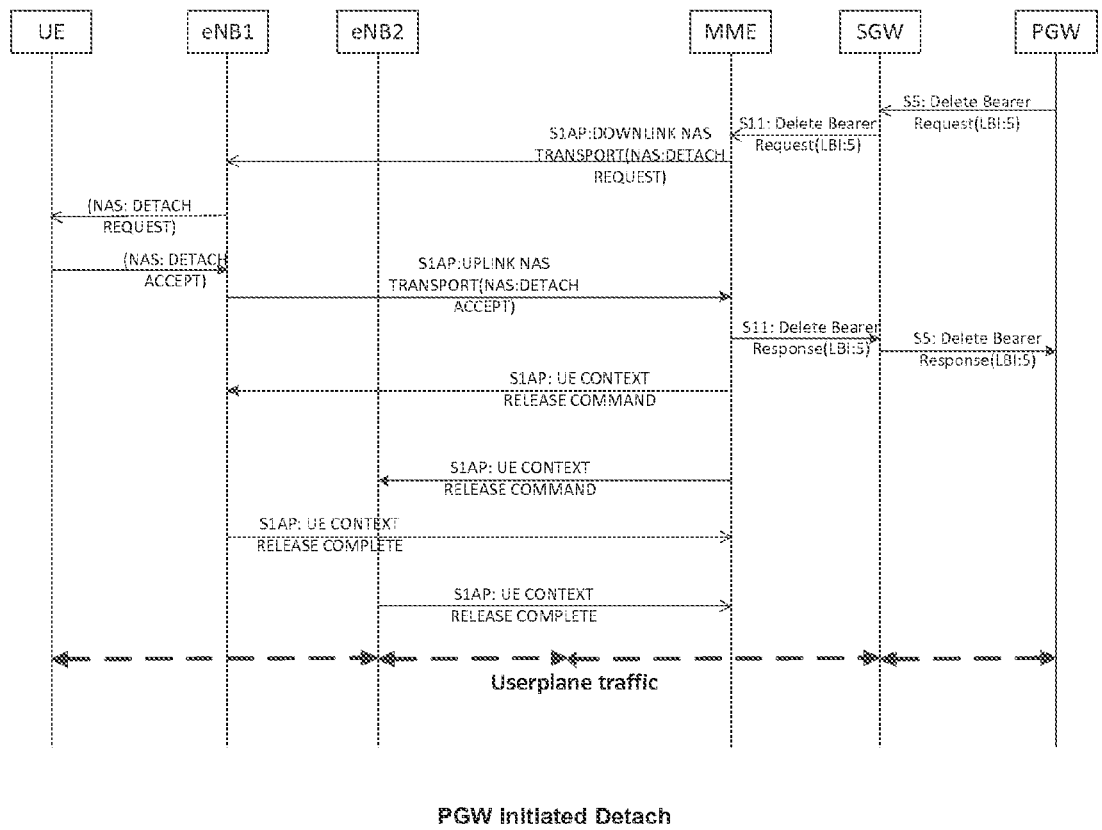

A PGW-Initiated Detach may also be performed. For example, as shown in FIG. 20, a PGW-initiated detach is performed. In one embodiment, the default bearers of the multiple PDN connections may have the different IP addresses and different bearer ids. In one embodiment, the default and dedicated bearers of the PDN connection may have the same IP addresses, but different bearer ids.

The PGW may initiate the detach to trigger or may otherwise cause the UE to de-register from the network. The PGW-initiated detach shown in FIG. 20 may assume an RRC connection may exist between the UE and the eNB2.

In one embodiment, the PGW-initiated detach may be carried out after an attach procedure may be performed using the eNB1, and a UE-initiated dedicated bearer activation may be performed using the eNB2. The attach procedure performed using the eNB1 may be carried out as described above, and the UE-initiated dedicated bearer activation on the eNB2 may be carried out as using UE-initiated dedicated bearer activation as described above.

The PGW may send a Delete Bearer Request to the SGW via the S5 interface. Such a S5:Delete Bearer Request may include the LBI:5 to cause deletion of the PDN connection.

When the default bearer and dedicated bearers may belong to the same PDN connection, the PGW detach may be triggered as a result of the S5:Delete Bearer Request including the LBI:5.

The SGW may send the Delete Bearer Request to MME via the S5 interface. Such a S5:Delete Bearer Request may include the LBI:5 as well. If or when the SGW may include LBI:5, the PDN connection may be deleted. When default bearer and dedicated bearers belong to the same PDN connection, detach may be triggered as a result of the S5:Delete Bearer Request including the LBI:5.

The MME may send a S1AP:DOWNLINK NAS TRANSPORT message to the eNB1. The S1AP:DOWNLINK NAS TRANSPORT message may include a NAS: DETACH REQUEST. The eNB1 may then send the NAS: DETACH REQUEST to the UE. The UE may send a NAS:DETACH ACCEPT to eNB1. The eNB1 may send a S1AP:UPLINK NAS TRANSPORT message to the MME. Such a S1AP:UPLINK NAS TRANSPORT message may include the NAS:DETACH ACCEPT. The MME may send a Delete Bearer Response to the SGW across the S11 interface. The SGW may the Delete Bearer Response to the PGW via the S11 interface.

The MME may send a S1AP:UE CONTEXT RELEASE COMMAND to the eNB1 and eNB2 to tear down both the S1-MME logical connections. In example embodiments, RRC connections from the UE to eNB1 and eNB2 may be released, for example, after receiving RRC Connection Release messages from the eNB1 and eNB2.

The eNB1 may release the bearers related to the UE, may send a S1AP:UE CONTEXT RELEASE COMPLETE to the MME, and may tear down the S1-MME connection from eNB1 standpoint. The eNB2 may release the bearers related to the UE, send a S1AP:UE CONTEXT RELEASE COMPLETE to the MME, and tear down the S1-MME connection from eNB2 standpoint. The MME may then free up both the S1-MME connections from its end.

In embodiments, as the S1-U tunnels may be released at the eNB1 and eNB2, UL user plane traffic may not be sent across the UL. As all the S1-U tunnels are released at the eNB1 and eNB2, DL user plane traffic may not be sent across the DL, as well.

FIG. 21 is a block diagram illustrating another example system 40 in which IP flow management may be performed. The system 40 may include a large number of elements that may or may not be shown in FIG. 21. Details of example architecture of a system and its associated elements may be described with reference to FIGS. 84A-84E. According to an embodiment, the system 40 may be described with reference to mobile wireless broadband standard LTE and its associated EPS architecture. The system 40 of FIG. 21 may be similar to the system 10 of FIG. 1.

As shown in FIG. 21, the system 40 may include a bandwidth management controller (BWMC) that may be placed or positioned between the (H)eNBs and the MME. A BWMC S1-MME link may be established between each of the (H)eNBs and the BWMC. Multiple (H)eNBs may connect to a single BWMC. A S1-MME link may be established between the BWMC and the MME. For the MME, the BWMC may operate as an eNB, hiding, for example, the details of (H)eNBs. The BWMC may be a network function between multiple (H)eNBs (e.g. the eNB, and eNB2) and the MME in a network such as an LTE network. The BWMC may receive control messages from different (H)eNBs and may forward them to the MME and vice versa. The BWMC may receive user plane traffic from different (H)eNBs and may forward them to a SGW and vice versa. The UE may make use of the available interfaces for uplink and/or downlink traffic with the help of the BWMC. The BWMC may intelligently route the control messages and user plane traffic.

FIG. 22 is a block diagram illustrating another example system 50 in which IP flow management may be performed. Similar to the system 40 of FIG. 21, the system 50 of FIG. 22 may include the BWMC. In this embodiment, the eNB1 and eNB2 may establish the S1-U directly with the SGW instead of indirectly via the BWMC of the system 40 of FIG. 21.

Figure 23:
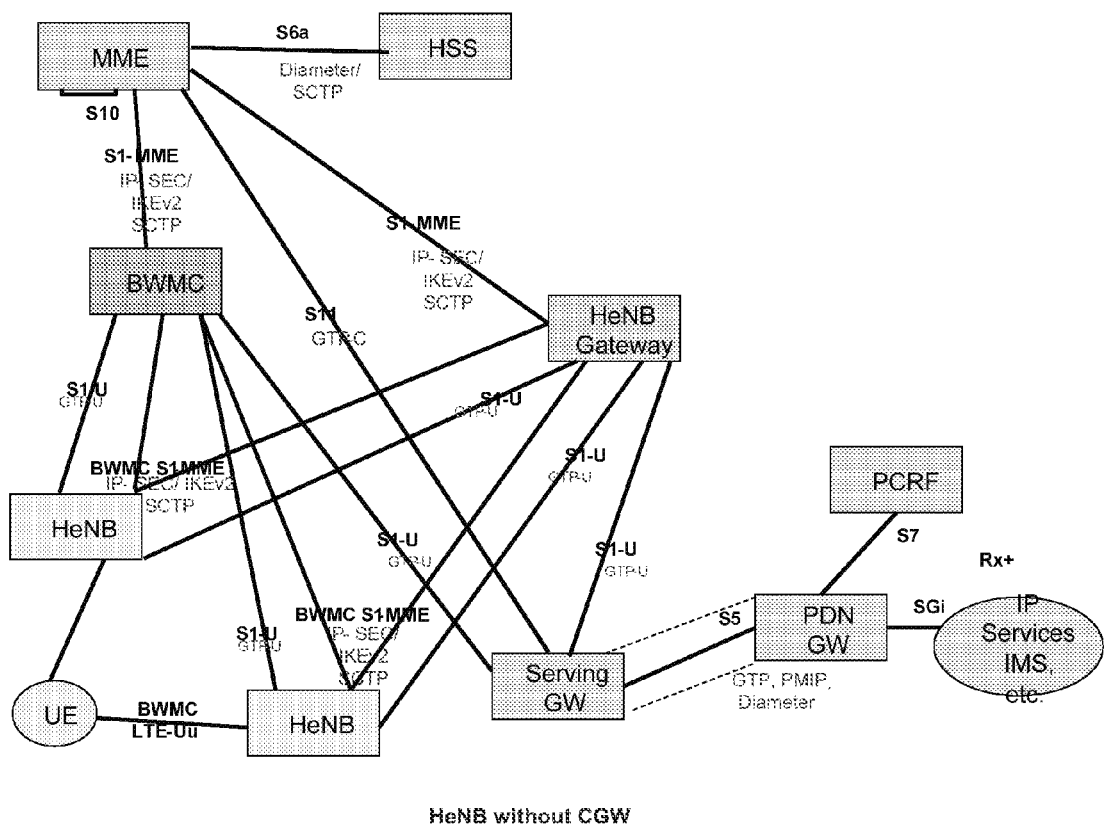
FIGS. 23-24 are block diagrams illustrating another example system in which management of flow communication flow at an IP layer may be performed.
Figure 24:
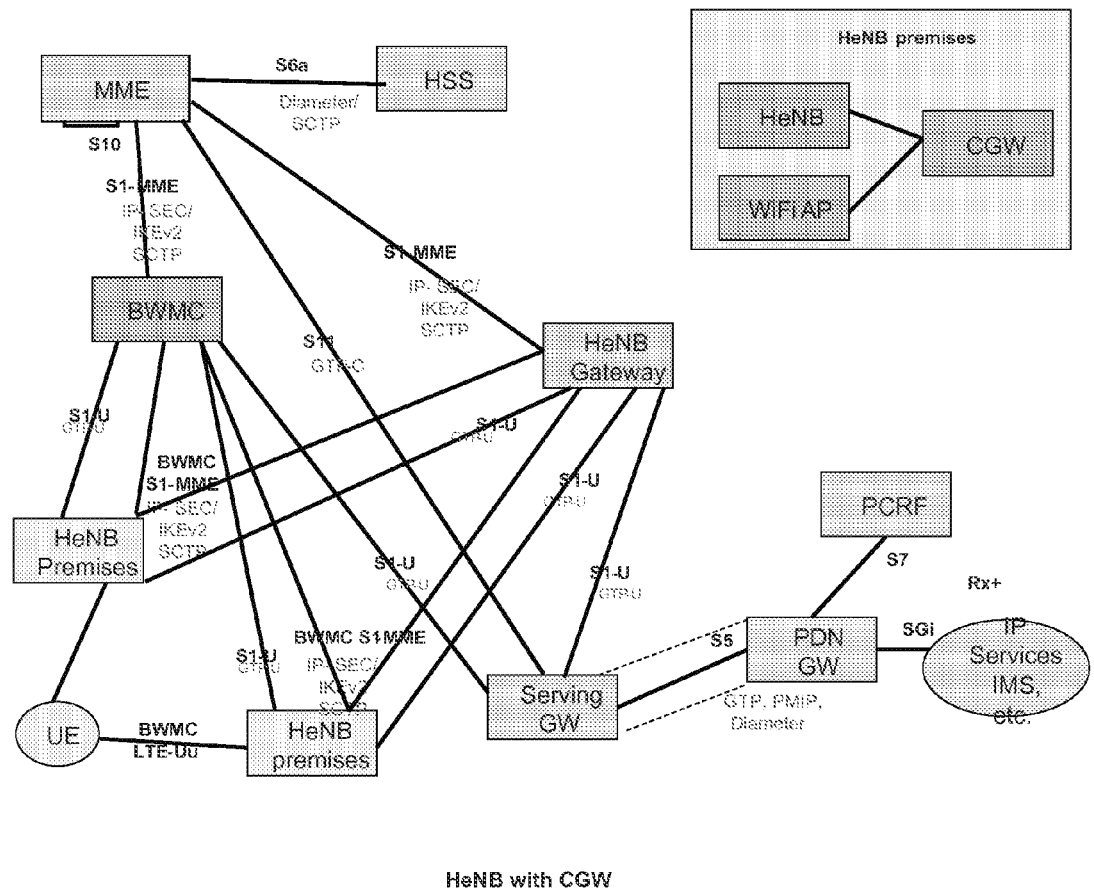

FIG. 23 is a block diagram illustrating alternative example system 60 in which IP flow management may be performed. The system 60 of FIG. 23 may be similar to the system 50 of FIG. 22, except as described herein. As shown in FIG. 23, the eNB1 and eNB2 may be replaced by two home eNBs (HeNBs) such as HeNB1 and HeNB2. Also, the system 50 may include a HeNB-GW communicatively coupled between the HeNB1 and HeNB2 and a SGW.

The HeNB-GW may be configured to be communicatively coupled with one or more of the following: the MME using the S1-MME interface, the SGW using a corresponding S1-U interface, and the HeNB1 and HeNB2 using respective S1-U interfaces and respective S1-MME interfaces. The S1-MME and S1-U interfaces, protocol stacks and elements thereof may be defined in accordance with LTE (e.g. as currently promulgated) along with appropriate changes, modifications and/or the like thereto disclosed herein.

Figure 25:
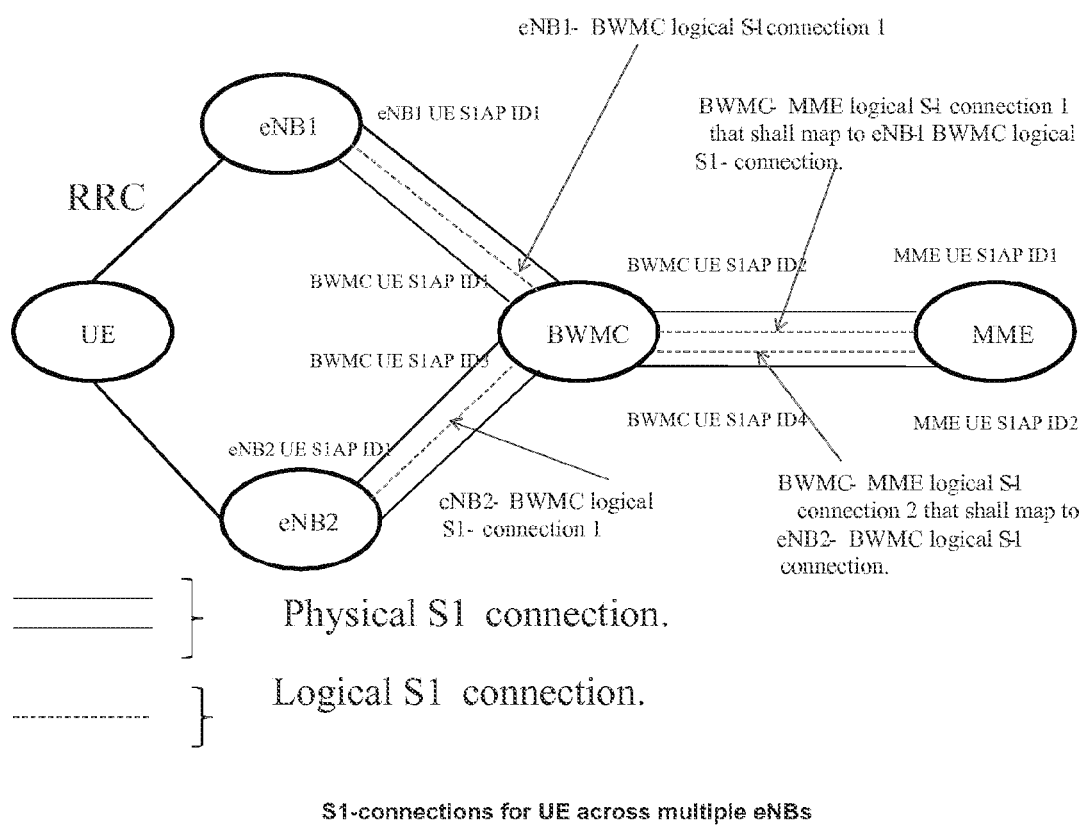
FIG. 25 is a block diagram illustrating at least a portion of an example system in which IP flow management may be performed.
Figure 26:
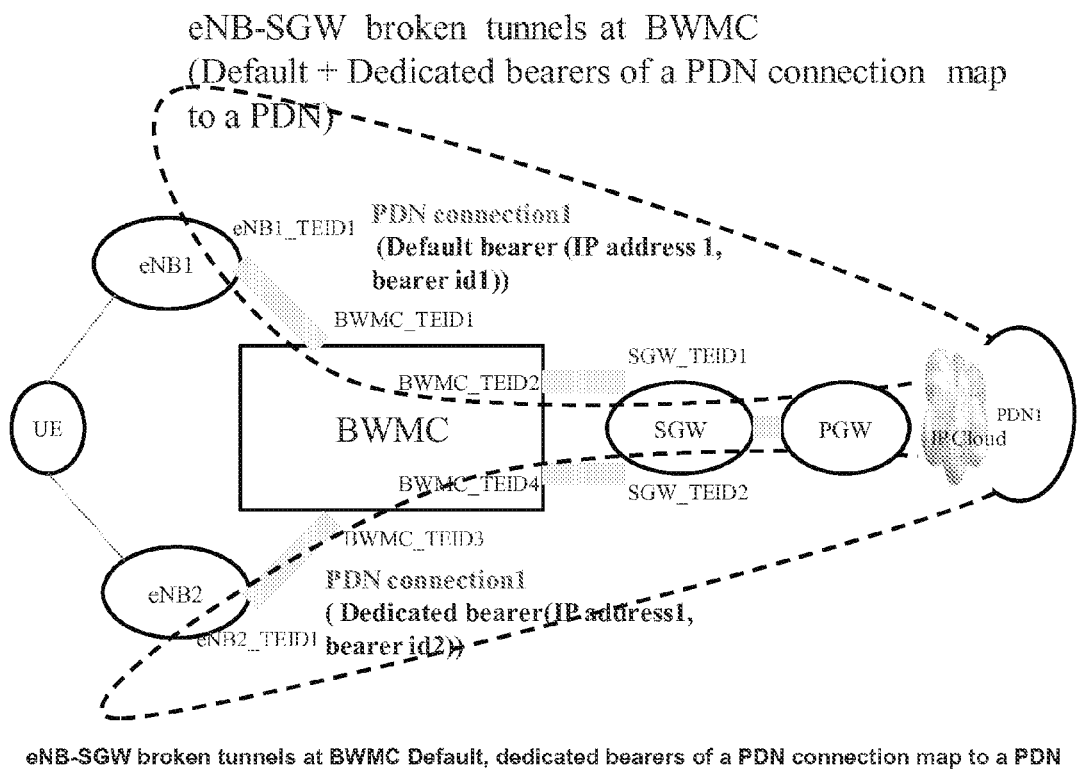
FIG. 26 is a diagram illustrating an example PDN connection map of eNB-SGW broken tunnels at a BWMC of two default bearers of different PDN connections to same PDN.
Figure 27:
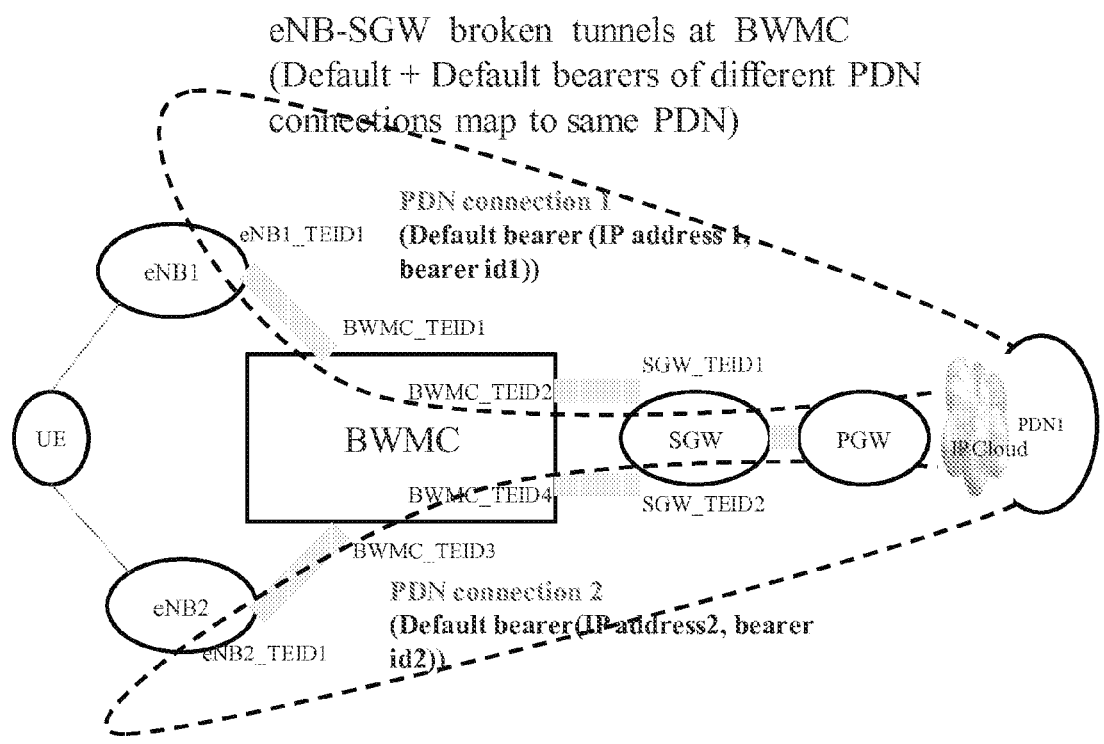
FIG. 27 is a diagram illustrating an example PDN connection map of eNB-SGW broken tunnels at BWMC of default and default bearers of a PDN connection to a PDN from the same eNB.
Figure 28:
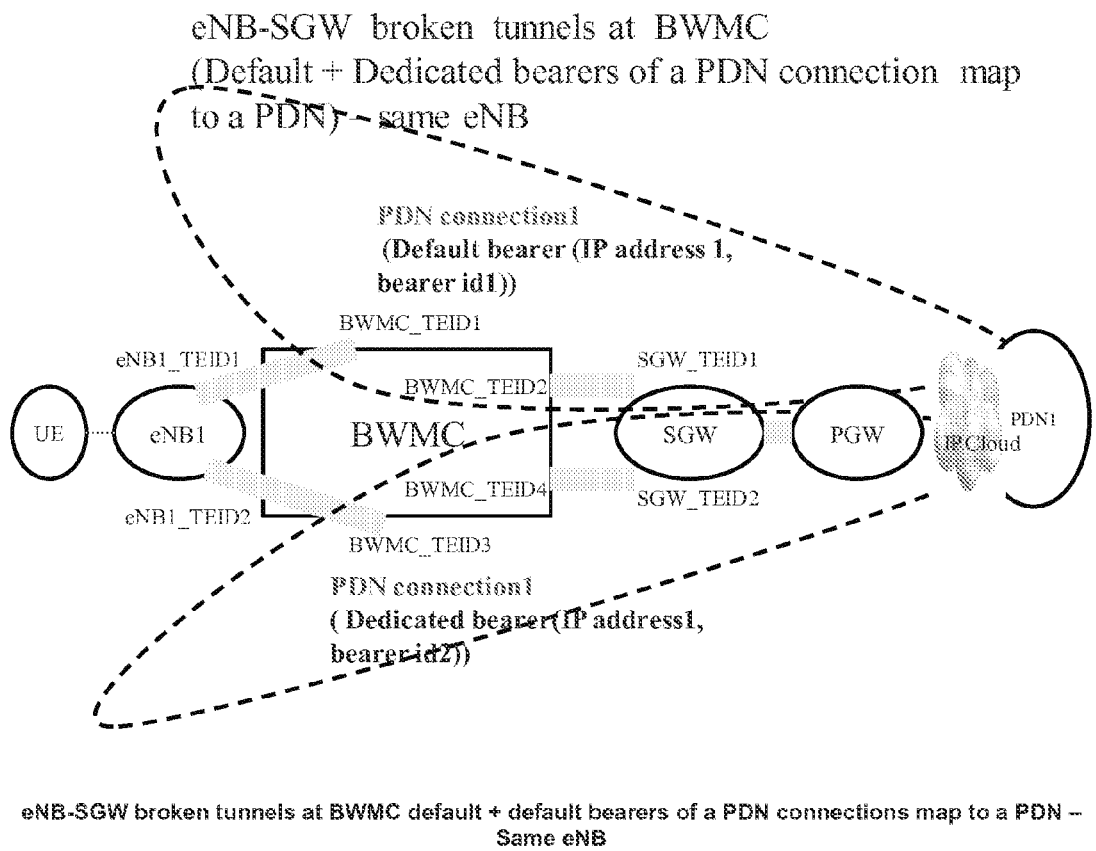
FIG. 28 is a diagram illustrating an example PDN connection map of eNB-SGW broken tunnels at BWMC of two default bearers of different PDN connections to different PDNs. The PDN connection 1 and PDN connection 2 map to PDN1 and PDN2 respectively.
Figure 29:
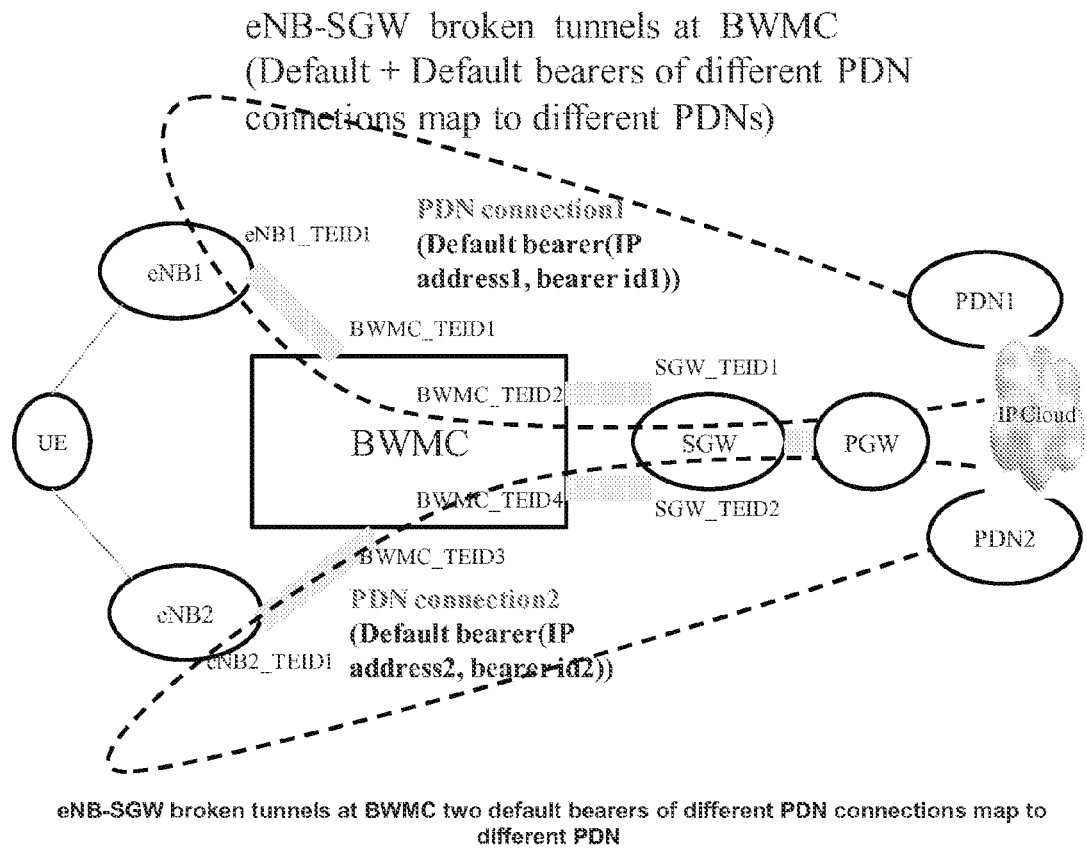
FIGS. 29-43 are message sequence charts illustrating call flows for performing one or more of procedures or functions described herein
Figure 30:
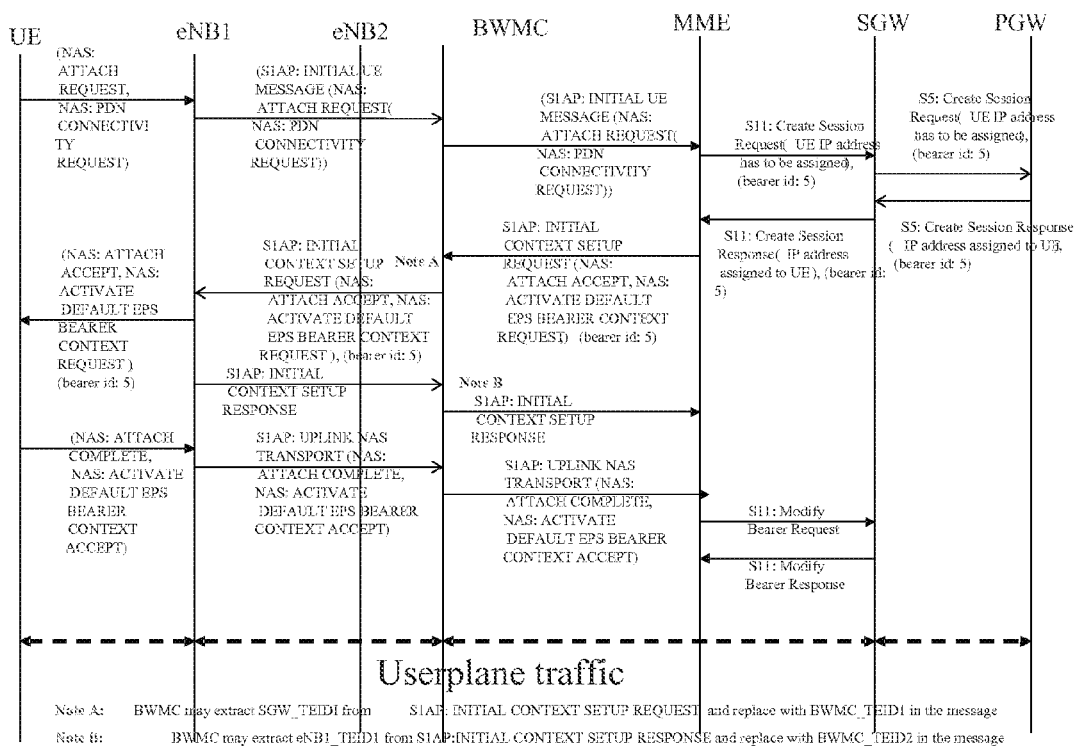
Figure 31:
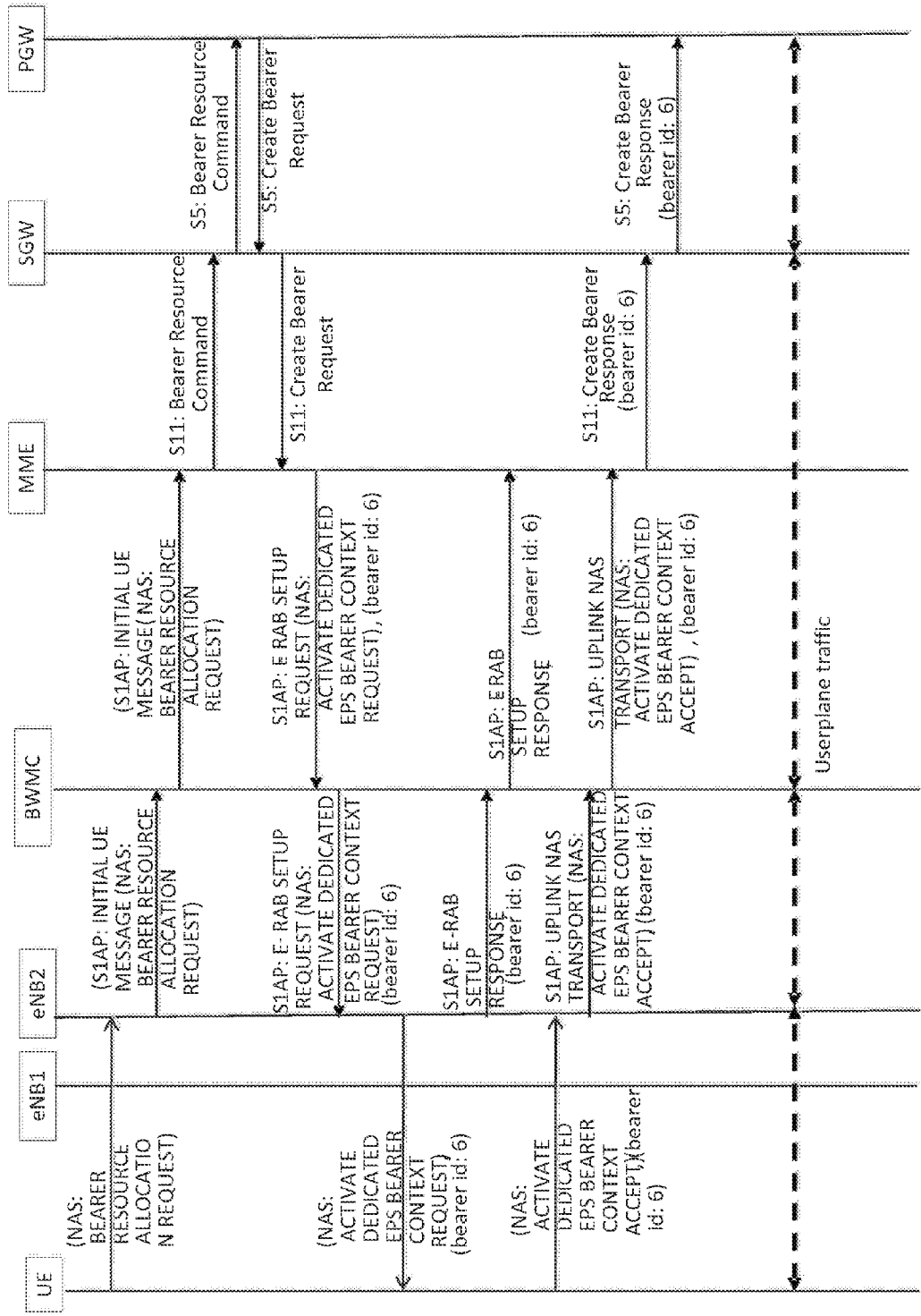
Figure 32:
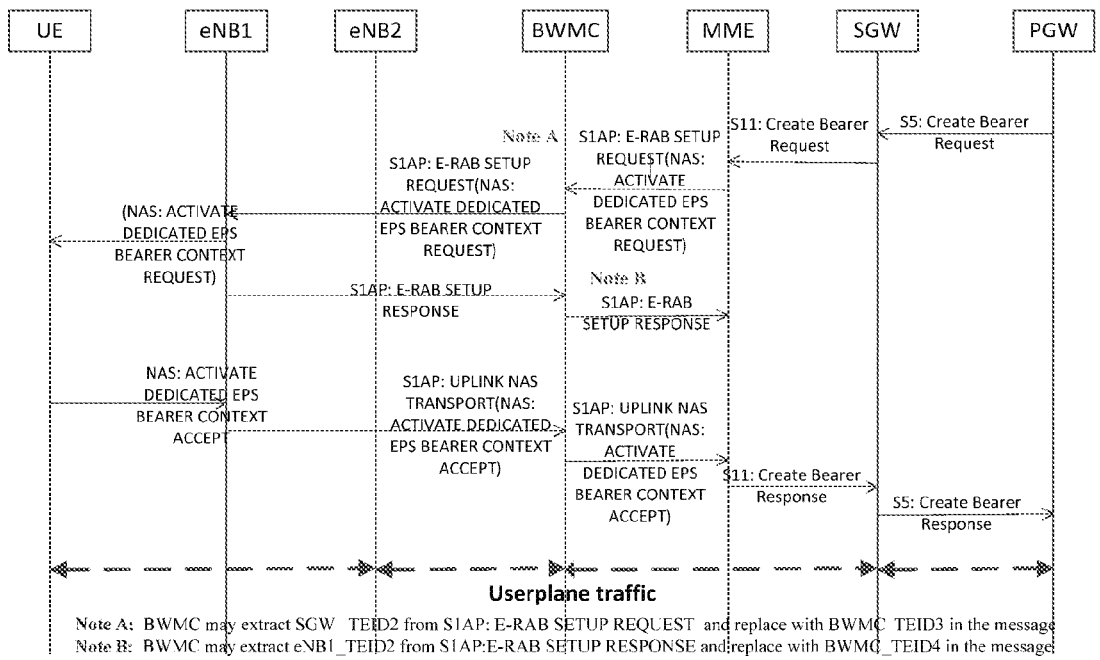
Figure 33:
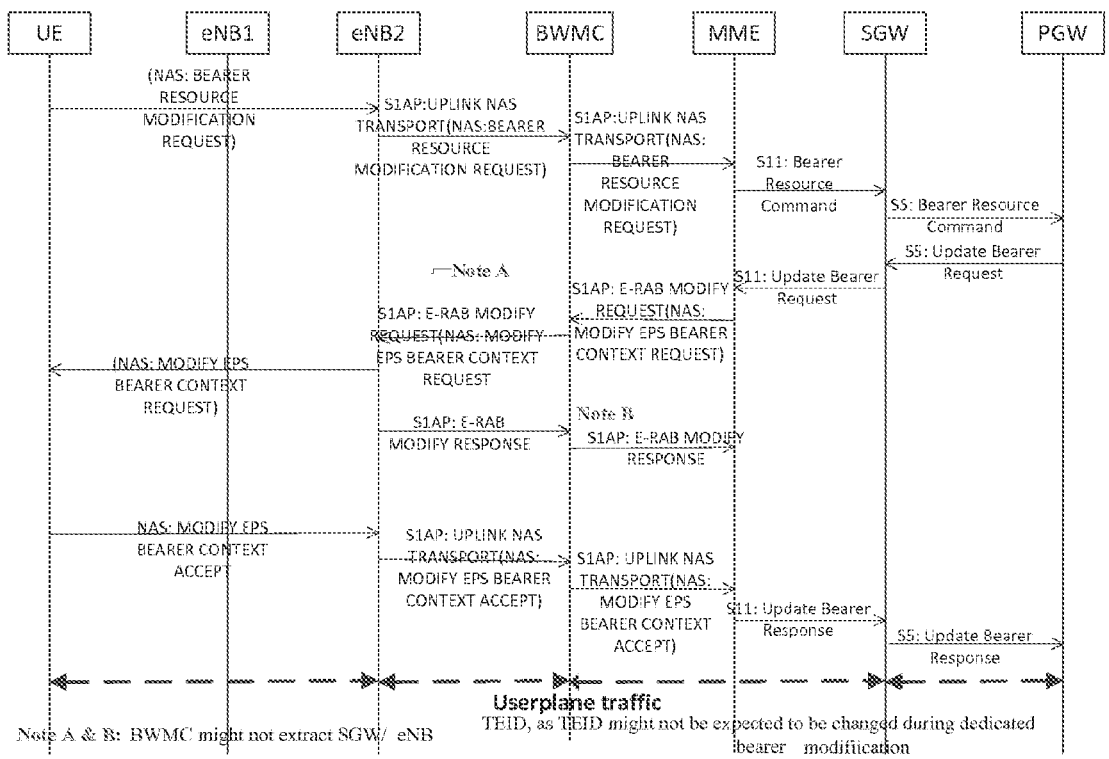
Figure 34:
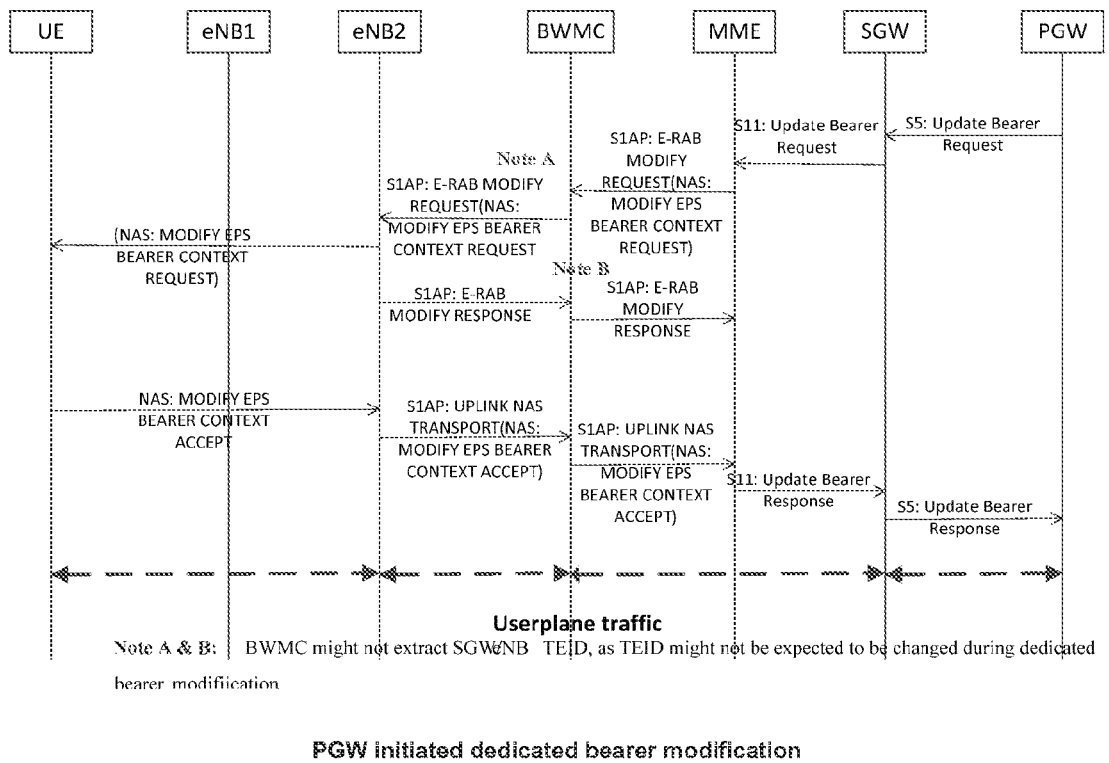
Figure 35:
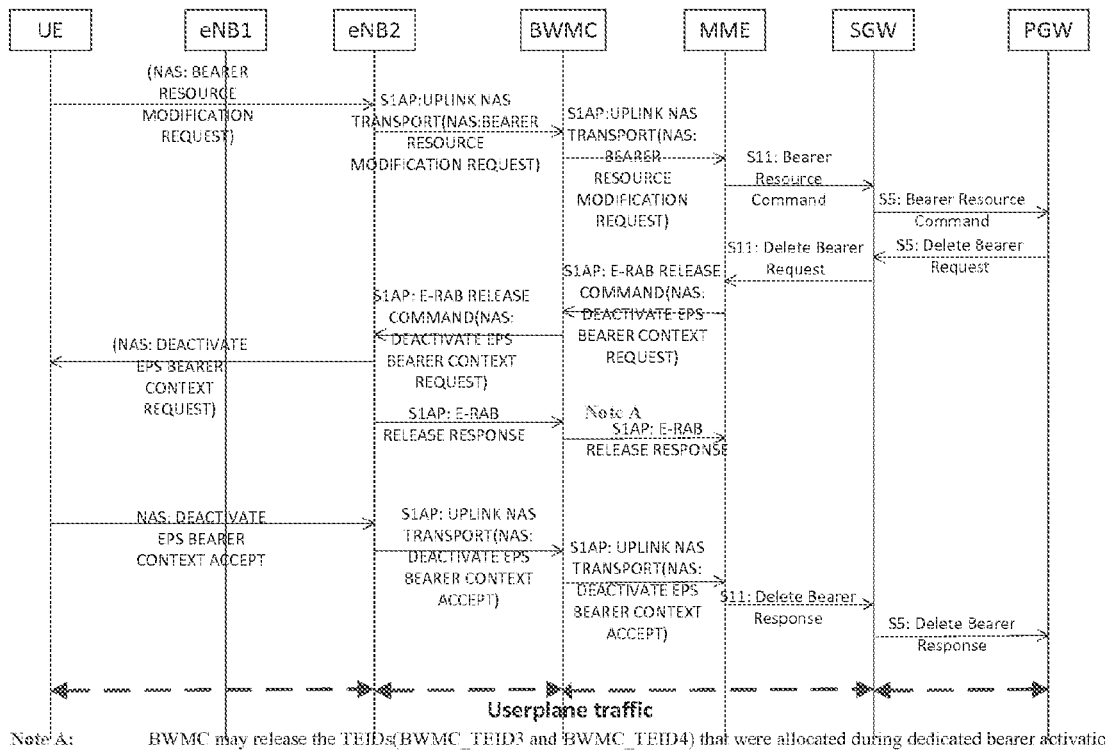
Figure 36:
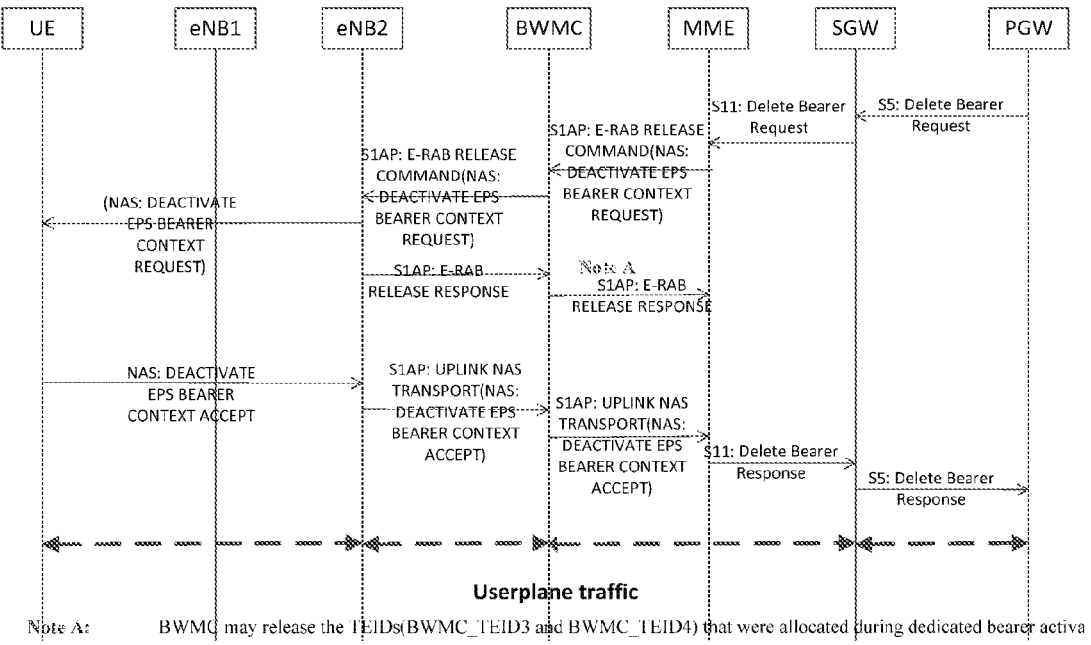
Figure 37:
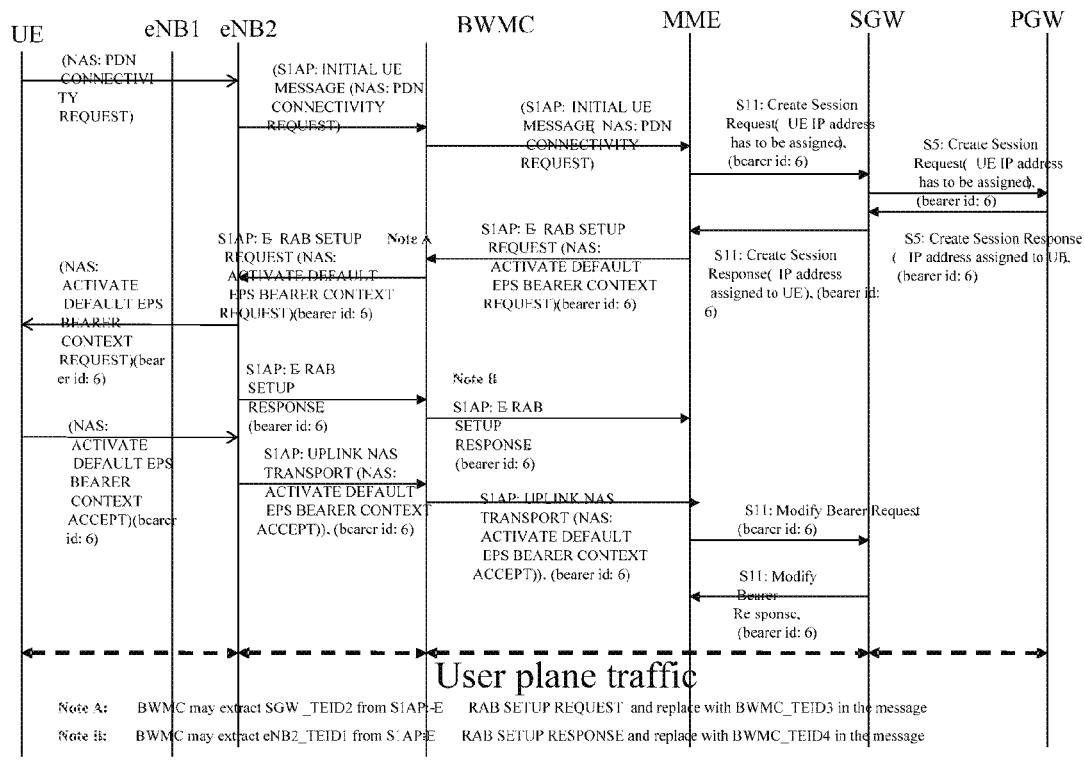
Figure 38:
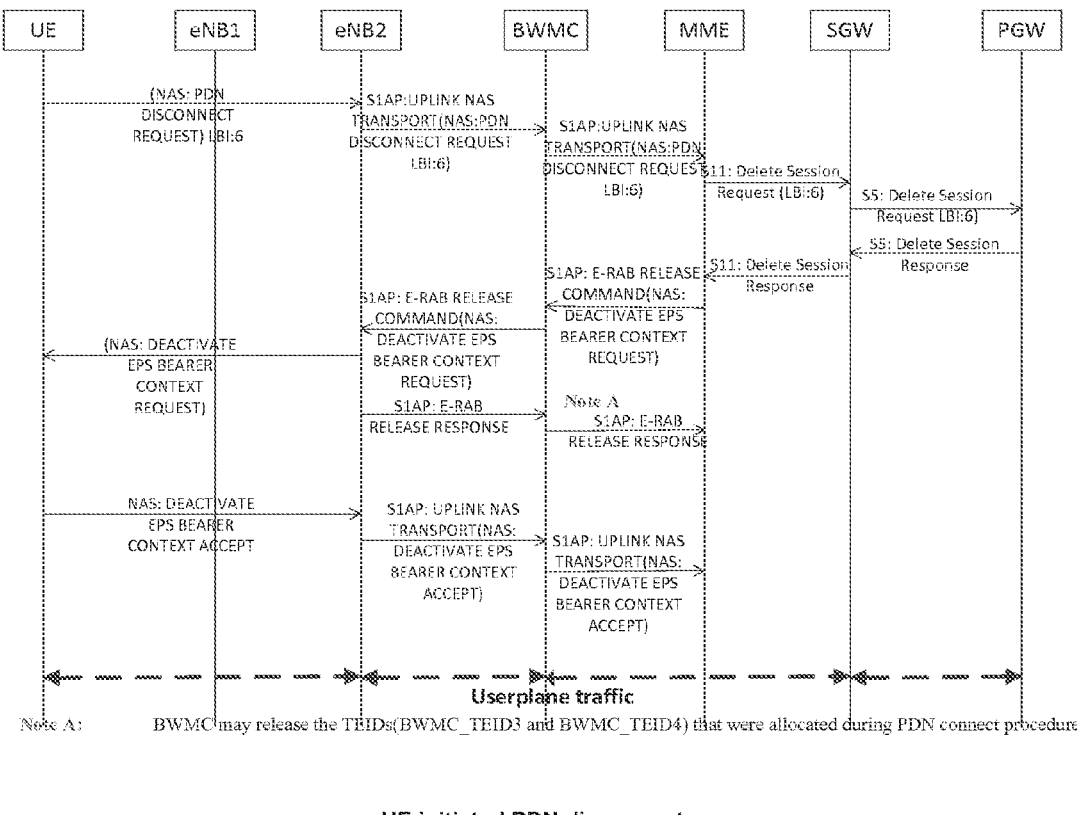
Figure 39:
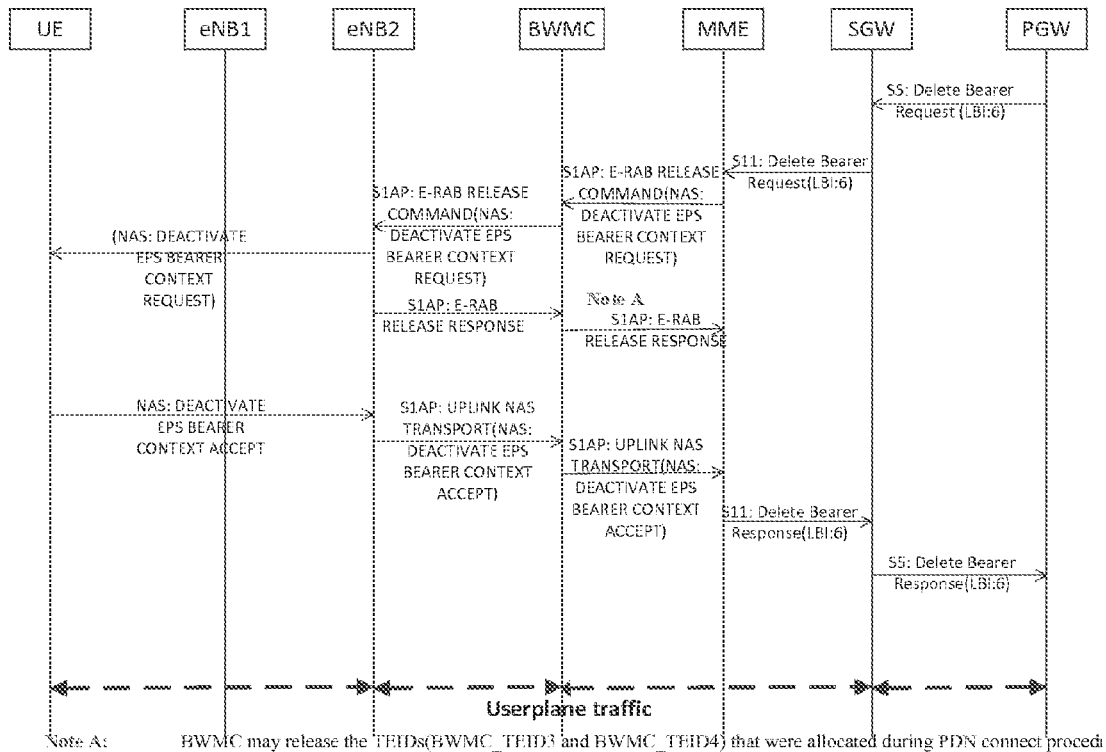
Figure 40:
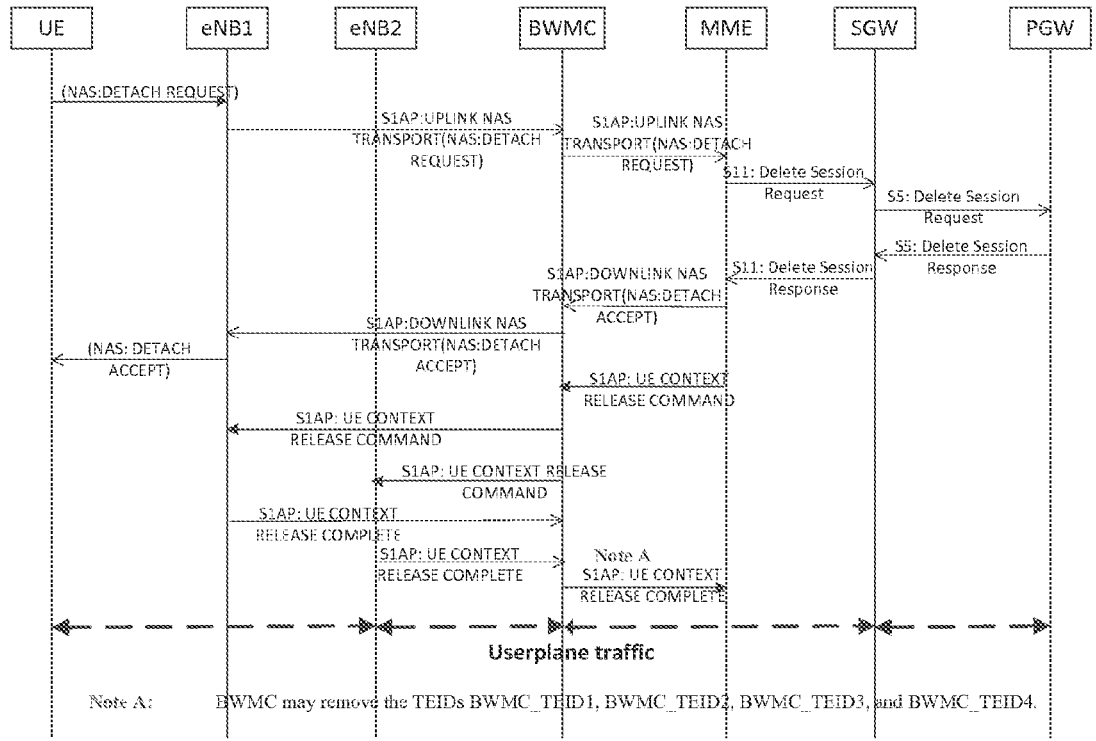
Figure 41:
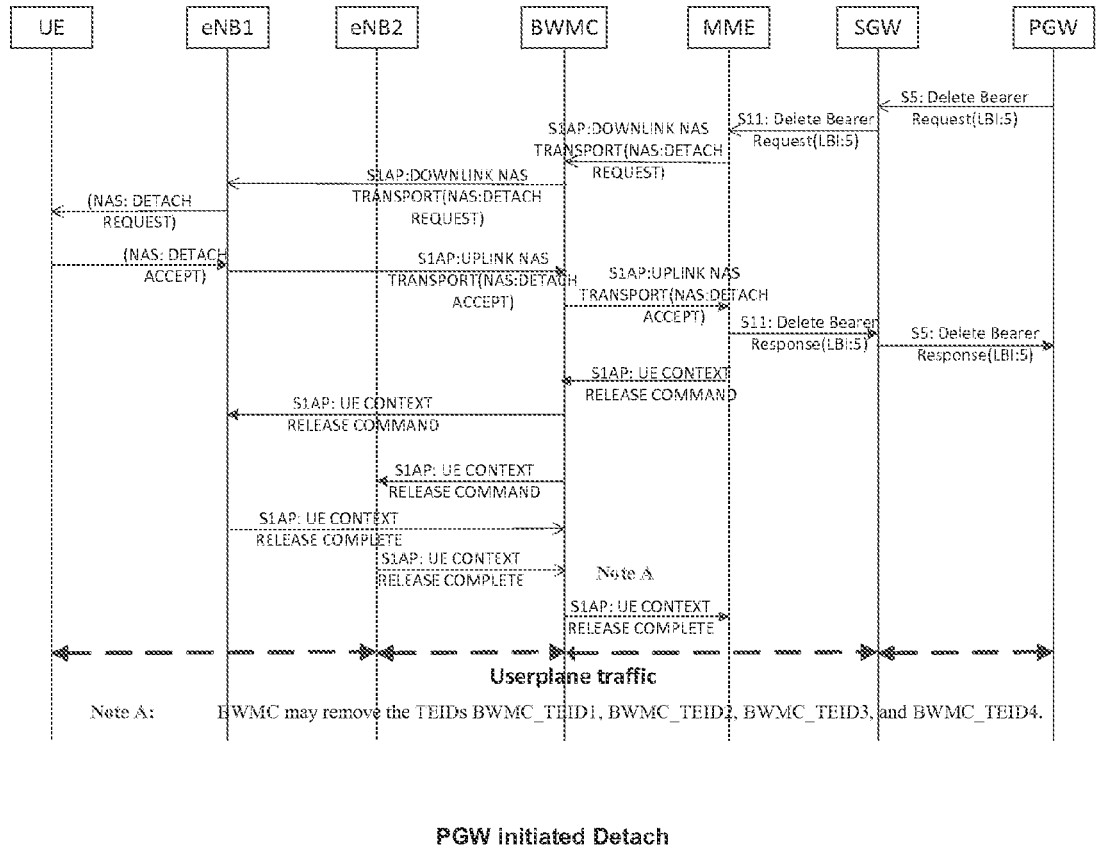

FIG. 25 is a block diagram illustrating a portion of a system 70 and certain connections between elements of the system 70. The three physical S1 connections may be shown in FIG. 25 including eNB1-BWMC, eNB2-BWMC and BWMC-MME. Also shown may be four logical S1-connections such as an eNB1-BWMC logical S1-connection 1, which may be identified by eNB1 UE S1AP ID1, BWMC UE S1AP ID1 identities; a BWMC-MME logical S1-connection 1, which may be identified by BWMC UE S1AP ID2, MME UE S1AP ID1 identities; a eNB2-BWMC logical S1-connection 1, which may be identified by eNB2 UE S1AP ID1, BWMC UE S1AP ID3 identities; and a BWMC-MME logical S1-connection 2, which may be identified by BWMC UE S1AP ID4, MME UE S1AP ID2 identities.

According to example embodiments, BWMC functions may be provided and/or used. For example, the BWMC described herein may include functions for an Attach/Registration procedure on multiple interfaces; a Detach/DeRegistration procedure on multiple interfaces; a PDN connectivity request on multiple interfaces; Uplink traffic on multiple interfaces; Downlink traffic on multiple interfaces; Capability to have default and dedicated bearers of a PDN across (H)eNBs; load balancing (e.g., —Distribution of dedicated bearers across (H)eNBs); Failover (e.g., re-establish bearers on available interfaces during unavailability of an interface); Mapping between (H)eNB TEID and SGW TEID for user plane traffic; Hiding (H)eNB details, and acting as if BWMC may be sending control and/or user plane messages to MME/SGW.

For example, the BWMC may provide Uplink traffic on multiple interfaces. In one embodiment, a UE may send across user plane traffic on multiple bearers that may have been created. The (H)eNB may use TEID of BWMC for the bearer to send the user plane traffic (e.g. uplink). The BWMC may replace the TEID with the SGW TEID and may send across to the SGW.

Additionally, the BWMC may provide Downlink traffic on multiple interfaces. For example, a SGW may use TEID of BWMC for the bearer to send the user plane traffic (e.g. downlink). The BWMC may replace TEID with (H)eNB TEID.

The BWMC may also include the capability to have default and/or dedicated bearers of a PDN across (H)eNBs. For example, the BWMC may distribute default and/or dedicated bearers of a PDN across (H)eNBs. The BWMC may maintain a list of bearer ids of a PDN. During detach, for example, if a default bearer of a PDN may be released. The BWMC may release the dedicated bearers of the PDN (e.g. even if those bearers may be spread across (H)eNBs).

In embodiments, the BWMC may also include load balancing including distribution Of dedicated bearers across (H)ENBs. For example, the BWMC may distribute the dedicated bearers of a PDN across (H)eNBs based on a load. According to an embodiment, the BWMC may select lightly loaded (H)eNB to establish a dedicated bearer. With such an approach, The BWMC may use each of the interfaces available to a UE.

The BWMC may further include a failover that may, for example, re-establish bearers on available interfaces during unavailability of an interface. The BWMC may re-establish the bearers on an available (H)eNB, if it may notice that a (H)eNB may be down. After establishing the bearers, if user plane traffic may be pending at the BWMC, it may route the traffic accordingly on newly established bearers.

Additionally, in an embodiment, the BWMC may provide mapping between (H)eNB TEIDs and SGW TEIDs for user plane traffic. During the bearer creation, the BWMC may extract (H)eNB TEID and SGW TEID information from the S1-MME control messages and may maintain a map ((H) eNB TEID←→BWMC TEID←→SGW-TEID). The (H)eNB may forward the user plane traffic by including BWMC TEID. After receiving the message, the BWMC may then replace the BWMC TEID with SGW TEID and may send across the data to SGW. The same procledure may apply for the user plane traffic from SGW to (H)eNB.

The BWMC may also hide (H)eNB details and may act as if the BWMC may be sending control and/or user plane messages to a MME and/or SGW. For example, (H)eNB details may be hidden to the MME. The MME may assume the BWMC may be at the other end of S1-MME. As such, the control messages may pass through the BWMC and the BWMC may ensure to route the messages properly to the respective (H)eNBs. When a message may be received, the BWMC may determine (e.g. check) if it may be a control message or user plane traffic. Control messages may be sent to the MME on a S1-MME interface and the user plane traffic may be sent across to the SGW on the S1-U link. The BMWC may be described in more detail below.

Message sequences may be provided based on the systems described herein. For example, the methods or procedures described herein and the corresponding message sequence charts (e.g. shown in FIGS. 29-43) may be extended extend to the embodiments herein. The methods or procedures include procedures for UE/PGW initiated Attach/Detach, Default/Dedicated Bearer Activation/Modification/Deactivation, PDN Connect/Disconnect, and the like.

Figure 42:
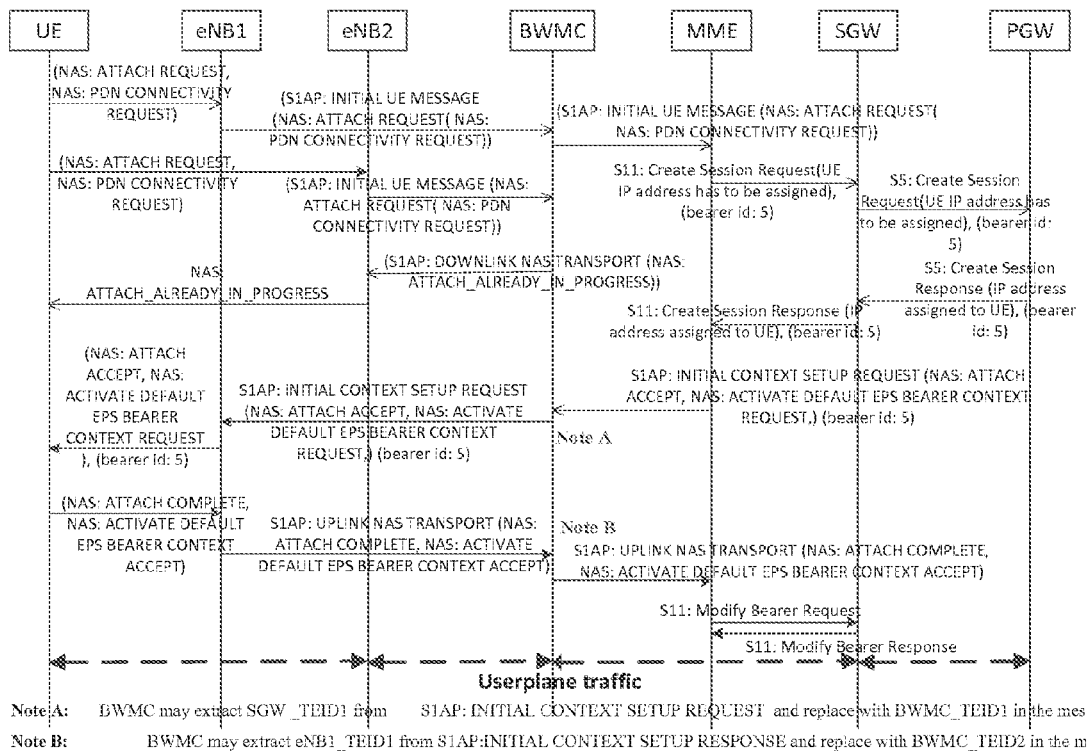
Figure 43:
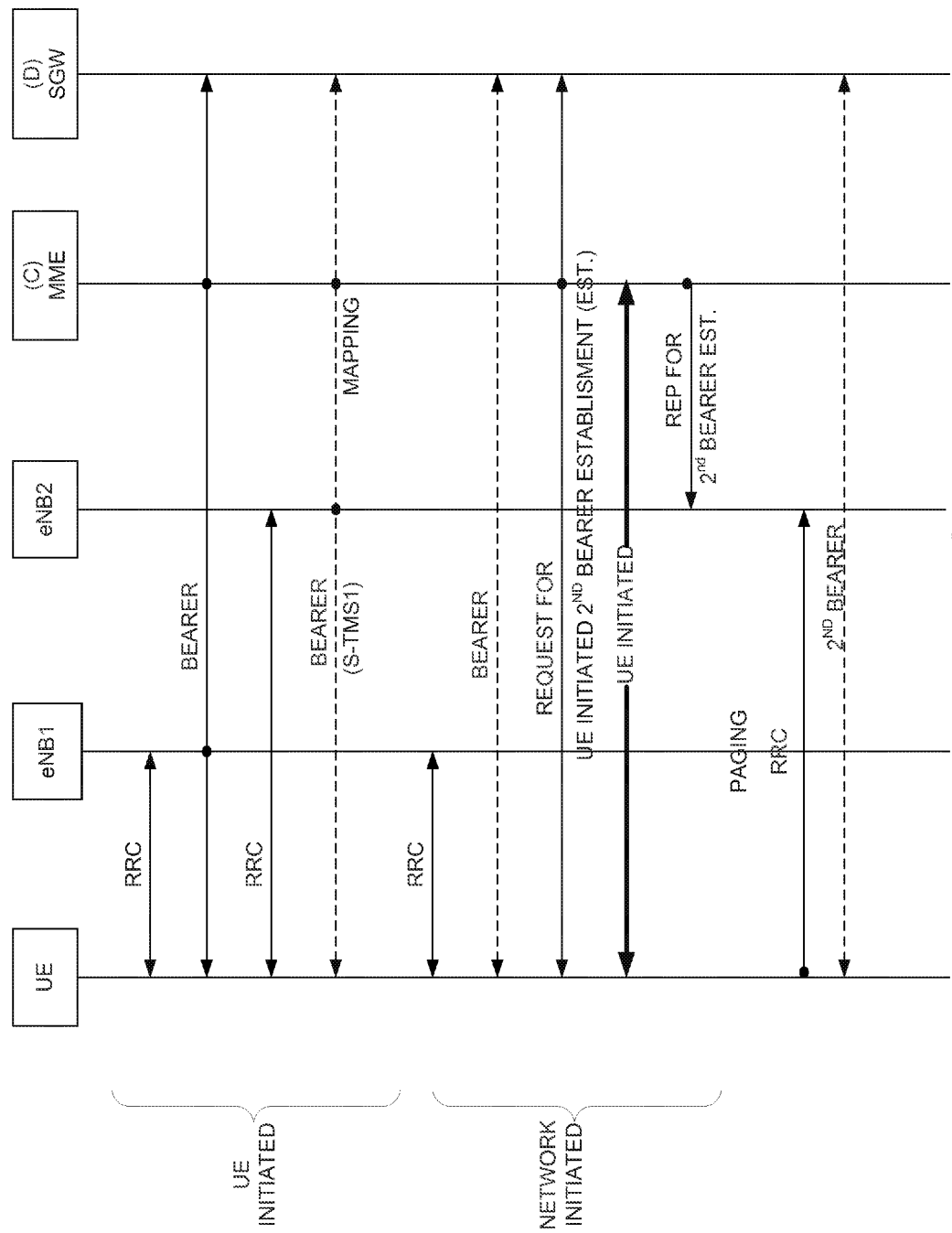

In an embodiment, an attach procedure that may include new messages introduced herein may be provided, performed, and/or used. For example, an attach on multiple (H)eNBs as well as other procedures on multiple (H)eNBs (e.g. as shown in FIGS. 42 and 43) may be performed. In such an embodiment, a UE may try to send across two different ATTACH REQUESTs to different (H)eNBs at the same time. The BWMC may enable the first ATTACH REQUEST to go up to the MME to register with the MME network. According to an example embodiment, the secondary ATTACH REQUESTs may be suppressed by the BWMC and may not be forwarded to the MME. The BWMC may establish BWMC S1-MME connections to the (H)eNBs that may have forwarded the secondary ATTACH REQUESTs to the BWMC.

To register with a network (e.g. an LTE network), the UE constructs, for example, a NAS:ATTACH REQUEST, NAS: PDN CONNECTIVITY REQUEST and may send such requests to eNB1 on radio interface.

Since there may not be a S1 connection between the eNB1 and BWMC, the eNB1 may establish S1 connection and may forward, for example, the NAS:ATTACH REQUEST, NAS:PDN CONNECTIVITY REQUEST in a S1AP:INITIAL UE MESSAGE. Additionally, since there may not be a S1 connection between the BWMC and MME, the BWMC may establish a S1 connection and may forward, for example, the NAS:ATTACH REQUEST, NAS:PDN CONNECTIVITY REQUEST in a S1AP:INITIAL UE MESSAGE.

In an embodiment, the eNB2 may be available to a UE such that the UE may construct a NAS:ATTACH REQUEST, NAS:PDN CONNECTIVITY REQUEST and may send such a request across to the eNB2 on a radio interface.

Since there may not be a S1 connection between the eNB2 and BWMC, the eNB2 may establish a S1 connection and may forward the NAS:ATTACH REQUEST, NAS:PDN CONNECTIVITY REQUEST in a SAP: INITIAL UE MESSAGE.

As the BWMC may have already received the NAS: ATTACH REQUEST, NAS:PDN CONNECTIVITY REQUEST from the UE on the eNB1 interface, the BWMC may suppress the message and may not forward the message to the MME.

In an example embodiment, the BWMC may construct a S1AP:DOWNLINK NAS TRANSPORT and/or NAS:ATTACH_ALREADY_IN_PROGRESS and may send such messages across to eNB2. The eNB2 may send across a NAS:ATTACH_ALREADY_IN_PROGRESS to the UE. After receiving the NAS:ATTACH_ALREADY_IN_PROGRESS, the UE may not expect the secondary ATTACH procedure to complete.

As the MME may receive the NAS:PDN CONNECTIVITY REQUEST, it may create a session with the SGW by sending a S11:Create Session Request with bearer id:5. It may be the MME's responsibility to identify an unused bearer id.

The SGW may send across a S11:Create Session Request to the PGW as a UE IP may have to be assigned. The PGW may allocate an IP address using a DHCP server or local IP address pool. The DHCP server functionality may be collocated on the PGW. If the DHCP server may be external to the PGW, a radius and/or diameter interface may be used.

In an embodiment, the PGW may create an EPS bearer context for the UE and may send a S5:Create Session Response to SGW with standard parameters. Additionally, the SGW may send a S11:Create Session Response to the MME with standard parameters.

The MME, according to an example embodiment, may send a S1AP:INITIAL CONTEXT SETUP REQUEST (e.g. a NAS:ATTACH ACCEPT, NAS:ACTIVATE DEFAULT EPS BEARER CONTEXT REQUEST) to the BWMC with one or more of the following parameters: AMBR (e.g. from HSS), an EPS bearer ID, QoS Paransm S1-U IP and TEID (SGW_TEID1) of the SGW, PDN address information (e.g.

from the SGW), a session management configuration (e.g. UL TFT, Radio Bearer Identity, SDF, and the like), and/or any other suitable parameter.

The BWMC may break a eNB1-SGW tunnel and may create two tunnels (e.g. eNB1_TEID1-BWMC_TEID1, BWMC_TEID2-SGW_TEID1) such that ne tunnel from the BWMC to eNB1 and another tunnel from the BWMC to SGW may be created. In embodiments, it may be the responsibility of the BWMC to create a map between these two tunnels and use the map for the user plane traffic. The BWMC may extract a S1-U IP and TEID (SGW_TEID1) of the SGW from the S1AP:INITIAL CONTEXT SETUP REQUEST and may store locally on the BWMC. The BWMC may replace a S1-U IP and TEID (SGW_TEID1) of the SGW with the BWMC's IP address and the BWMC_TEID1 values and may send across the modified S1AP: INITIAL CONTEXT SETUP REQUEST (NAS:ATTACH ACCEPT, NAS:ACTIVATE DEFAULT EPS BEARER CONTEXT REQUEST) to the eNB1.

In example embodiments, the eNB1 may set up the EPS bearer and may forward NAS:ATTACH ACCEPT, NAS: ACTIVATE DEFAULT EPS BEARER CONTEXT REQUEST to the UE.

After establishing a bearer on the eNB1, the eNB1 may send a S1AP:INITIAL CONTEXT SETUP RESPONSE to the BWMC by including its S1-U IP and TEID (eNB1_TEID1). The S1AP:INITIAL CONTEXT SETUP RESPONSE may have a list of bearers that may have been successfully setup on eNB1.

The BWMC may extract the S1-U IP and TEID (eNB1_TEID1) of the eNB1 from the S1AP:INITIAL CONTEXT SETUP RESPONSE and may store such information locally on the BWMC. The BWMC may replace S1-U IP and TEID (eNB1_TEID1) of eNB1 with BWMC's IP address and BWMC TEID2 values and send across the modified S1AP:INITIAL CONTEXT SETUP RESPONSE to MME.

The UE may establish the bearer and may send across a NAS:ATTACH COMPLETE, NAS:ACTIVATE DEFAULT EPS BEARER CONTEXT ACCEPT to the eNB1. The eNB1 may then send a S1AP:UPLINK NAS TRANSPORT (NAS:ATTACH COMPLETE, NAS:ACTIVATE DEFAULT EPS BEARER CONTEXT ACCEPT) message to the BWMC. The BWMC may send across the S1AP: UPLINK NAS TRANSPORT (NAS:ATTACH COMPLETE, NAS:ACTIVATE DEFAULT EPS BEARER CONTEXT ACCEPT) to the MME. In an embodiment, the MME may send across a S11:Modify Bearer Request to the SGW and the MME may include the BWMC's S1-U IP and BWMC_TEID2 in the message.

If the SGW may receive user plane DL data from a PGW for the UE, the SGW may buffer the data until it may receive the S1:Modify Bearer Request from the MME. After receiving the S11:Modify Bearer Request, the SGW may send across DL user plane traffic to the BWMC using BWMC's S1-U IP and TEID2. Additionally, the SGW may send across the S11:Modify Bearer Response to the MME, for example, after storing the BWMC's S1-U IP and BWMC_TEID2.

According to an example embodiment, the eNB1 may send UL user data to BWMC on S1-U using BWMC's IP address and BWMC's BMWC_TEID1. BWMC may change IP address to SGW's IP address and TEID to SGW's SGW_TEID1 and may send across the user data to SGW.

The SGW may send DL user data to BWMC on S1-U using BWMC's IP address and BWMC's BWMC_TEID2.

The BWMC may change the IP address to eNB1's IP address and TEID to eNB1_TEID1 and may send across the user data to eNB1.

In example embodiments, new messages may be provided and/or used. A new message may include ATTACH_ALREADY_IN_PROGRESS. For example, when the BWMC may receive a secondary AttachRequest from another (H)eNB or other H(e)NBs, the BWMC may not forward the AttachRequest to the MME. Instead, the BWMC may suppress the attach request, may create a S1 connection to the (H)eNB, and may include a NAS:ATTACH_ALREADY_IN_PROGRESS (e.g. a new NAS message) in S1AP:DownlinkNASTransport( ). After receiving the NAS:ATTACH_ALREADY_IN_PROGRESS, the UE may assume that UE may be already registered with the network. As such the attach method or procedure may be performed with a single (H)eNB or with multiple (H)eNBs, such that BWMC S1-MME connections may be created on secondary (H)eNBs as well.

According to an embodiment, the BWMC S1-MME may be the interface between the (H)eNB and BWMC that may support BWM. The BWMC S1-MME may be a new interface or may use messages that may be added to the existing S1-MME interface to support BWM.

Additionally, an (H)eNB may have an option configured by an operator to have BWM including a flag bwmcEnableFlag. In an embodiment, if the flag value may be false, an (H)eNB may not contact the BWMC and may follow the normal flow to connect to the MME directly.

Figure 44:
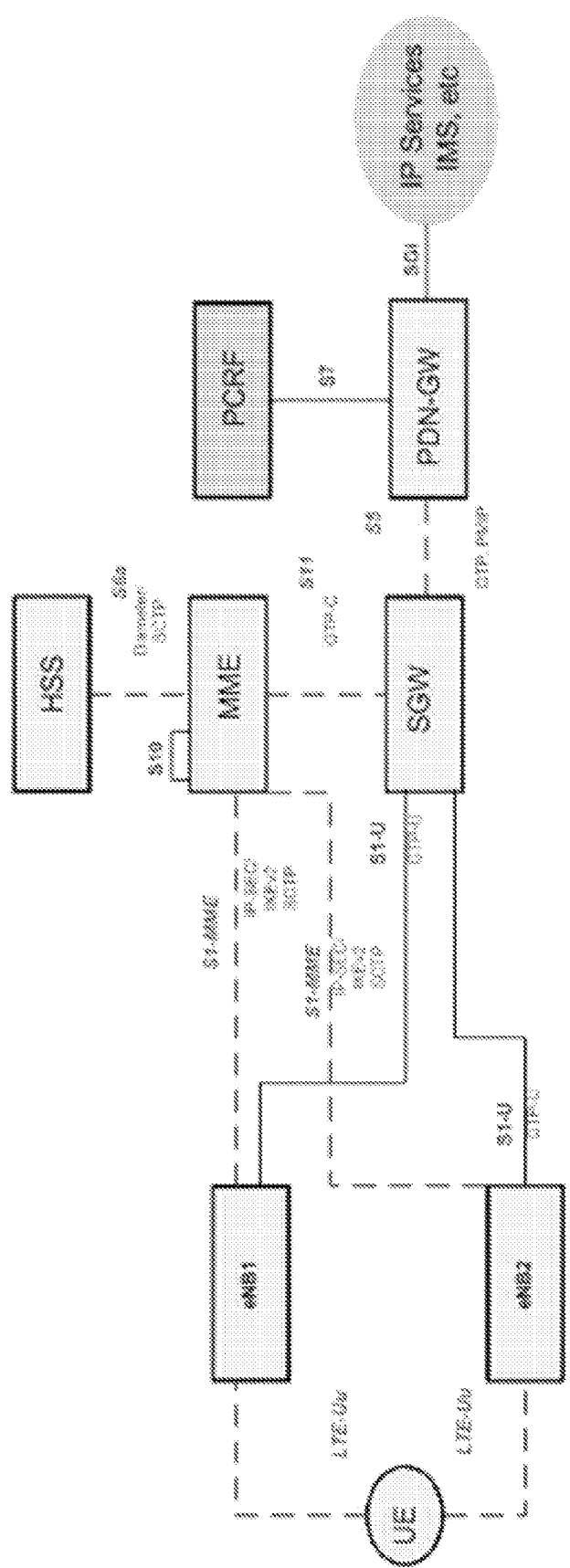
FIG. 44 is a block diagram illustrating example system in which multiple RRC connections may be established and marinated.

In embodiments, multiple RRC connections (e.g. with the same or multiple eNBs) may be maintained between a UE and an eNB and/or a base station in parallel (e.g. even after a handover or soft handover and a release of the original connection in favor of a new connection following the handover or soft handover). For example, as shown in FIGS. 43 and 44, a first RRC connection may be established and maintained between the UE and the eNB1 and a second RRC connection may be established and maintained between the UE and the eNB2. Additionally, RRC connections may also be provided between the UE and other components (e.g. RNCs, base stations, and the like) of the network such that the UE may establish and maintain multiple RRC connections at the same time. As such, in example embodiments, multiple RRC connections (e.g. multiple RRC connections with an eNB and/or a RRC connection for each eNB) may be provided such that different tunnels may be established in parallel.

In example embodiments, the UE, for example, using the multiple RRC connections may simultaneously send and/or receive data, information, messages, requests, and the like to and from multiple base stations or eNBs. Additionally, such RRC connections may be established and/or maintained at a higher layer of the network or system such that less coordination between the components may be used, IP flow mobility may be extended (e.g. multiple flows may be provided) using such RRC connections, independent bearers may be separated to exchange packets (e.g. that may be provided or established via such RRC connections), and the like. Such multiple RRC connections may be associated together in a core network (CN) of the communication network. Additionally, the eNBs and RRC connections established therewith may be geographically spaced out (e.g. rather than being co-located) to increase robustness (e.g. improve stability of connections such that at least one connection may be maintained).

Systems and methods disclosed herein may provide procedures and/or methods regarding how to establish multiple RRC connections (e.g. between the UE and/or the eNBs or base stations). FIG. 44 is a block diagram illustrating example system in which multiple RRC connections may be established and marinated. For example, in one embodiment, it may be overkill to attach to a cell each time (e.g. create attachment each time). As such, an attach, for example, to eNBs (e.g. to establish multiple RRC connections therewith) may be performed based on requests (e.g. as needed) or based on conditions (e.g. environmental conditions).

Systems and methods disclosed herein may further provide information to a core network to enable the core network to know that there may be multiple entry and exit points (e.g. multiple connections). In an example embodiment, such information may be piggybacked with the multiple RRC connections (e.g. may be provided when establishing such connections). For example, a MME in the core network (or the PGW, H(e)NB-GW, and/or SGW) may receive such information or a message that may include such information that may provide an indication of the multiple RRC connections. The MME, in an embodiment, may then update a list of eNBs that may have a connection that may be used to provide coordination in the network of such connections.

In embodiments, systems and methods disclosed herein may establish a RRC connection to an eNB (e.g. from a UE) and, after such establishment, may attach the UE to the core network (CN) via the eNB. The release attach request to attach to the CN may then be released. At this point, there may not be an IP address assigned. According to example embodiments, a PDP context may be initiated that may provide an indication to connect a packet of the network (e.g. associated with the attach request or in response thereto) such that an IP address may be assigned and communication may be started.

In additional embodiments, systems and methods disclosed herein may provide a determination (e.g. at an eNB) as to whether to establish or remove (e.g. tear down) a connection based on network connections or a determination on which connection to route (e.g. by the network) data or data flows.

Additionally, BandWidth Management (BWM) functionality in the Mobility Management Entity (MME) of a 3GPP Evolved Packet Core (EPC) may also be provided as described herein (e.g. with such multiple connections). For example, the exchange of IP packet flows between the EPC and the UE via simultaneous connections to multiple (H)eNB may also be provided. In an embodiment, the exchange of IP packet flows between the UE and the EPC via simultaneous connections to multiple (H)eNBs may be provided using a BWMC "edge" node between the (H)eNBs and the EPC. Additionally, an establishment of EPS-Bearers between the UE and PGW when multiple connections may be established or maintained may be provided as disclosed herein. To enable multiple connections, procedures, methods, and/or components (e.g. a BWMC) may be provided as described herein along with functions of affected network elements including the User Equipment (UE), (Home) evolved NodeB ((H)eNB), Serving Gateway (SGW), Packet Data Network Gateway (PGW), and Home Subscriber Server (HSS).

Such functions (e.g. along with extensions and modifications to network procedures, messages, and information elements related to RRC, NAS, S1, S5, S6a, and S11 protocols) may include, for example, UE establishment of multiple simultaneous RRC connections via different eNBs and associated changes to UE "reachability timer" behavior in the MME including an inclusion of "eNB Global Address" as part of RRC Connection procedure, a conditional inclusion of "S-TMSI" as part of RRC Connection procedure, a "RRC Connection Update" message as part of RRC Connection procedure, a specification of a NAS "Update eNB List" procedure between the UE and MME, an inclusion of "List of RABs" in S11 "Release Access Bearer Request" message from the MME to SGW to deactivate the subset of RABs for the affected (H)eNB, and the like; an attach and/or detach when simultaneous connections to multiple eNBs may be allowed by a UE capability and subscription including a use a "BWM-flag" as part of subscription information exchanged via a S6a "Location Update" procedure between the MME and HSS during the "Attach" procedure, a use of a S1AP "Initial UE Message" for UE-initiated "Dedicated Bearer Activation" procedure on a secondary eNB where a corresponding default bearer may not exist, a use of multiple S1AP "UE Context Release Command" messages for a "Detach" procedure when default and dedicated bearers of a PDN connection may be distributed across different (H)eNBs, and the like; and a network initiated service request when UE may be idle on a secondary eNB including a use of a NAS "Re-establish Connection Request" message between the MME and UE to initiate a RRC connection on a secondary (H)eNB (e.g. this may eliminate paging when a RRC connection may already exist on a primary eNB). As such, the establishment, maintenance, and release of multiple connections that may enable bandwidth aggregation, load balancing, connection robustness, and the like across multiple H(e)NBs may be provided.

Additionally, in embodiments, bearer activation procedures may be provided as disclosed herein (e.g. for multiple connections). For example, a UE may be configured to connect to multiple eNBs and may establish parallel EPS-Bearers between the UE and the PGW and may us both the EPS Bearers for IP flow-based communications with a Packet Data Network (PDN) such as the Internet or Operator Service Network.

To perform such bearer activation procedures, the UE may have established RRC connections on multiple eNBs (e.g. the eNB1 and eNB2), the UE may be attached to the Core Network and may have established a Default Bearer with the PGW. Additionally, there may be no EPS-Bearer established with the eNB2 such that the UE may not yet communicate with a Packet Data Network (PDN) via the eNB2. In one embodiment, since there may be no EPS-Bearer established between the eNB2 and PGW, there may be no S1AP connection between the eNB2 and SGW. The methods or procedures disclosed herein may first set up such a S1AP connection and then a Dedicated EPS-Bearer via the eNB2. The UE may be enhanced to recognize a dedicated bearer on the eNB2 without a default bearer. Additionally, the PGW may initiate a procedure via the eNB1, but requests that the EPS-Bearer be established via the eNB2. Signaling may also be introduced to indicate in the message to eNB1 that a bearer activation may apply to the eNB2.

Additionally, one RRC connection may established, for example, via the eNB1. In such an embodiment, methods whereby a PGW initiates the establishment of an RRC connection with eNB2 first, followed by the establishment of a dedicated EPS-Bearer connection via the eNB2 may be provided. The PGW may initiate a procedure via eNB1, but requests that an EPS-Bearer be established via the eNB2. This may trigger the UE to first set up an RRC connection with the eNB2, followed by a procedure to establish an EPS Bearer via the eNB2.

Methods and/or procedures for bearer modification and deactivation and/or bearer fail-over may also be provided as described herein. To perform such procedures for bearer modification, signaling may be introduced for deactivation of a dedicated bearer between a secondary eNB via a primary eNB (e.g. with a default bearer). Additionally, to perform such procedures for a bearer fail-lover, a MME may recognize that a radio link via the eNB may have failed (e.g. a radio link failure (RLF) may have occurred). When the MME may recognize that the radio link via eNB2 may have failed, the MME executes a 'lossless' bearer handover, by creating a message on a S11 interface between the MME and SGW as described herein.

Methods and/or procedures for PDN Connectivity Establishment may be established. Such a methods or procedures may set up a default bearer via the eNB2 and an IP connection that may be made to a PDN2 via eNB2. Additionally, sending a NAS:PDN CONNECTIVITY REQUEST in S1AP: INITIAL UE MESSAGE may be used for such methods and/or procedures.

Figure 45:
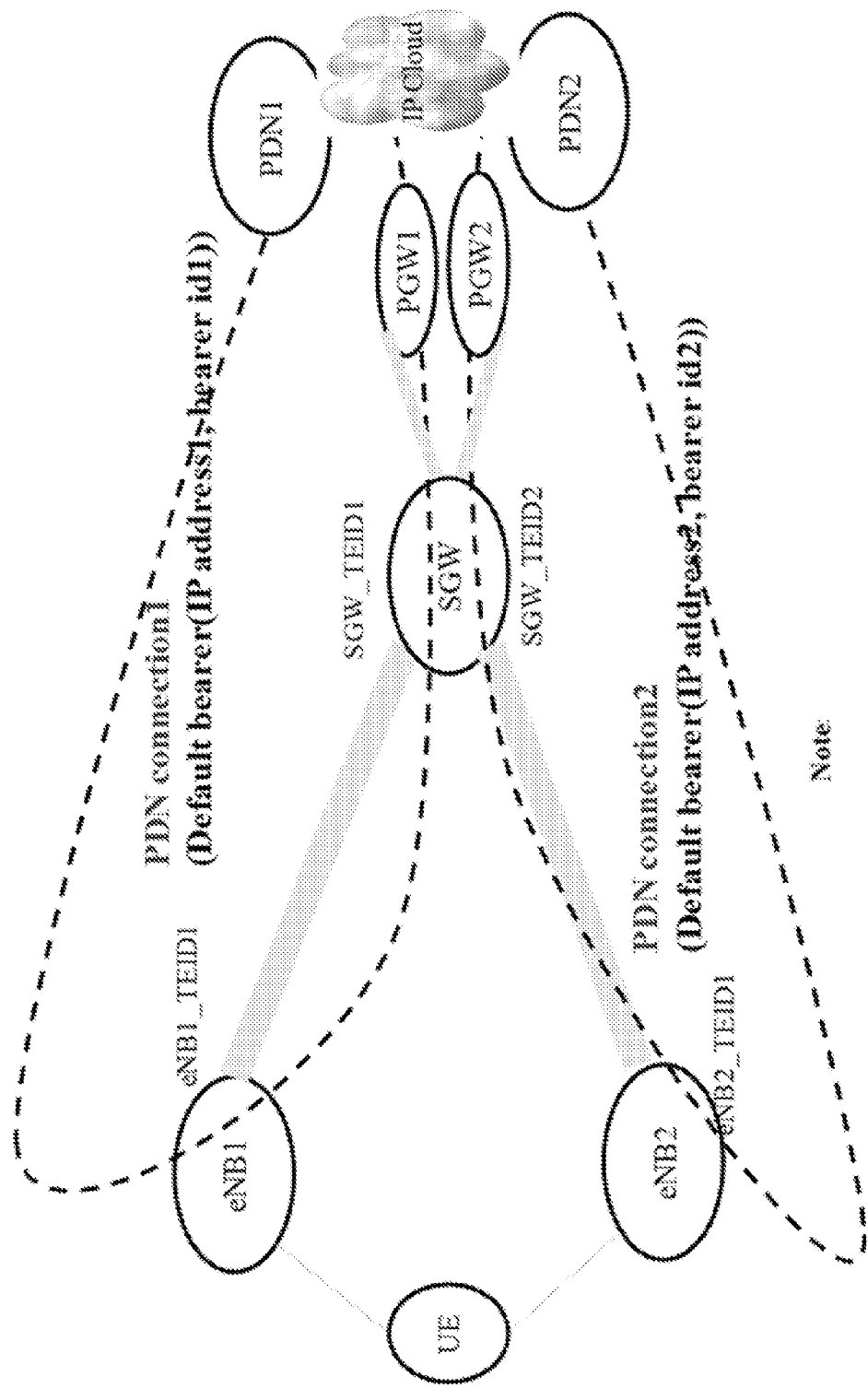
FIG. 45 is a diagram illustrating an example PDN connection map of eNB-SGW tunnels of two default bearers of respective PDN connections to different PDNs via multiple PGWs.

FIG. 45 depicts an example embodiment of tunnels associated with bearers of different PDN connections that may be mapped to different PDNs (e.g. via PGWs). As shown in FIG. 45, multiple connections may be established between a UE and eNBs (e.g. eNB1 and eNB2). Additionally, default bearers may belong to different PDN connections. In an example embodiment, the default bearers may have different IP addresses. Additionally, a PDN connection 1 and/or a PDN connection 2 may map to PDN1 and PDN2 via PGW1 and PGW2 respectively. Such bearers may have different bearer ids.

Figure 46:
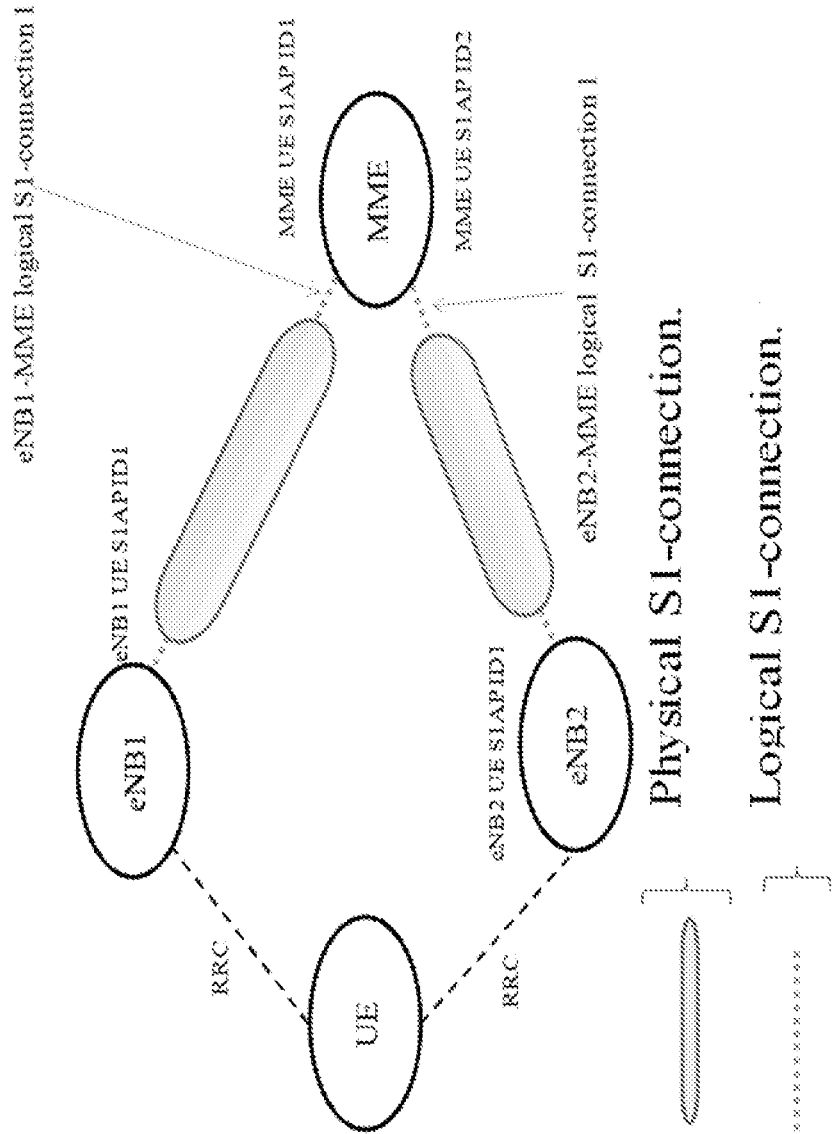
FIG. 46 is a diagram illustrating connections such as logical connections and RRC connections across multiple eNBs.

FIG. 46 depicts an example embodiment of multiple connections for a UE across multiple eNBs. As shown in FIG. 46, a UE may have a first RRC connection with eNB1 and a second RRC connection with eNB2. Additionally, there may be physical S1 connections such as eNB1-MME and eNB2-MME and logical S1-connections such as eNB1-MME logical S1-connection 1 that may be identified by eNB1 UE S1AP ID1, MME UE S1AP ID1 and eNB2-MME logical S1-connection 1 that may be identified by eNB2 UE S1AP ID1, MME UE S1AP ID2, for example, between the eNBs and a MME.

The systems and methods disclosed herein may provide, perform, and/or use an attach and/or registration procedures when multiple RRC connections may be established (e.g. may exist), a dedicated bearer activation, modification, and/or deactivation on multiple interfaces or connections, service request procedures, bearer mobility or IP flow mobility (IFOM), PDN disconnect procedures or methods on multiple interfaces or connections, a S1 release, a detach or de-registration procedure or method, and the like. For example, in addition to the BWM-MME functions described above such as capability to have default and/or dedicated bearers of a PDN across (H)eNBs, load balancing including distribution of dedicated bearers across (H)eNBs, PDN connectivity requests on multiple interfaces; uplink traffic on multiple interfaces, downlink traffic on multiple interfaces, failover including re-establishing bearers on available interfaces during unavailability of an interface, an attach and/or registration procedures when multiple RRC connections may be established (e.g. may exist), a dedicated bearer activation, modification, and/or deactivation on multiple interfaces or connections, service request procedures, bearer mobility or IP flow mobility (IFOM), PDN disconnect procedures or methods on multiple interfaces or connec-tions, a S1 release, a detach or de-registration procedure or method, and the like may be provided, performed, and/or used.

In an embodiment, the attach and/or registration procedure or method (e.g. when multiple RRC connections may be established) may be used to register a UE with an EPC network. For example, currently, the UE may have zero or one RRC connection. The procedures or methods disclosed herein may be used to establish multiple RRC connections per UE, such that UE may choose or select an RRC connection or interface to send across NAS:ATTACH REQUEST, NAS:PDN CONNECTIVITY REQUEST to (H)eNB when multiple (H)eNBs may be available. In an example embodiment, the (H)eNB may create a S1-MME logical connection with a MME and may send across NAS:ATTACH REQUEST, NAS:PDN CONNECTIVITY REQUEST to the MME. The S1-U tunnel may then be established from the (H)eNB to SGW for the default bearer.

After establishing RRC connections with available (H)eNBs, the UE may send across a NAS:ATTACH REQUEST, NAS:PDN CONNECTIVITY REQUEST on one RRC interface (connecting to an (H)eNB) to register with the network. After the registration and/or attach procedure may be completed or done, the UE may send across a NAS: PDN CONNECTIVITY REQUEST OR NAS: BEARER RESOURCE ALLOCATION REQUEST on other RRC interfaces or connection to use secondary (H)eNBs.

As described above, dedicated bearer activation, modification, and/or deactivation on multiple interfaces or connections (e.g. multiple RRC connections) may be provided, performed, and/or used. For example, a dedicated bearer activation may be sent across on the available (H)eNBs.

Such an activation may be sent when initiated by the UE or NW (Network). In an embodiment, UE initiated dedicated bearer modification and/or deactivation may be sent across on the available (H)eNBs. The MME may send across the downlink S1AP messages to the respective (H)eNB where the bearer may have been setup. Additionally, when a network may initiate dedicated bearer modification and/or deactivation, the MME may send across the downlink S1AP messages to the respective (H)eNB where the bearer may have been setup.

In embodiments, service request procedures or methods may be provided, performed, and/or used. For example, currently in 3GPP LTE, a PAGING procedure may be used by the MME, to bring a UE back into the LTE network. In embodiments, with a NAS: NAS: REESTABLISH CONN REQUEST disclosed herein, the MME may bring the UE back into the LTE network on a particular RRC/S1-MME interface. The MME may send across a NAS: REESTABLISH CONN REQUEST to the UE including a global (H)eNB ID. The UE may re-establish a RRC/S1-MME connection via a specified (H)eNB or specified (H)eNBs.

Bearer mobility and/or IP flow mobility (IFOM) may be provided, performed, and/or used. For example, currently in 3GPP LTE, 'Bearer Mobility' and IFOM across multiple (H)eNBs may not be provided (e.g. may not exist). As such, in embodiments described herein, a UE, (H)eNB, and/or MME may initiate a 'Bearer Mobility' procedure or method to move a few bearers from one (H)eNB to another (H)eNB. Additionally, a UE and/or PGW may initiate a 'IFOM' procedure or method to move a few IP flows from one bearer (e.g. a first bearer on (H)eNB1) to another bearer (e.g. a second bearer on (H)eNB2).

Additionally, as described above, an S1 release may be provided, performed, and/or used. When a S1 release may be performed, for example, the MME may include the bearers that may be setup on a H(eNB) that may have gone down.

The MME may include these bearers in S11:Release Access Bearer Request.

In embodiments, a detach and/or de-registration procedure and/or method may be provided, performed, and/or used. For example, a detach procedure may be used to de-register UE from the EPC network (e.g. when multiple RRC interfaces (H(eNB)s) and/or connections thereto may be available to the UE. In a UE initiated detach, the UE may have the option to send a detach request on each (H)eNB that may be connected to MME. The MME may also clean up S1-MME logical connections between (H)eNBs and MME. When a network may initiate a detach (e.g. via a HSS, MME, PGW, SGW, and the like), the MME may send a detach request to the UE on one or more of the (H)eNBs and may eventually clean the all S1-MME logical connections between the (H)eNBs and MME.

When default/dedicated bearers of a PDN may be distributed across multiple (H)eNBs, if a default bearer of a PDN may be released by the UE, MME, SGW, PGW, and the like, the MME may take care of sending a different S1AP:E-RAB RELEASE COMMAND to the respective (H)eNBs and may include respective bearer ids in NAS PDUs. In an example embodiment, the UE may not send multiple detach requests to MME.

Figure 47:
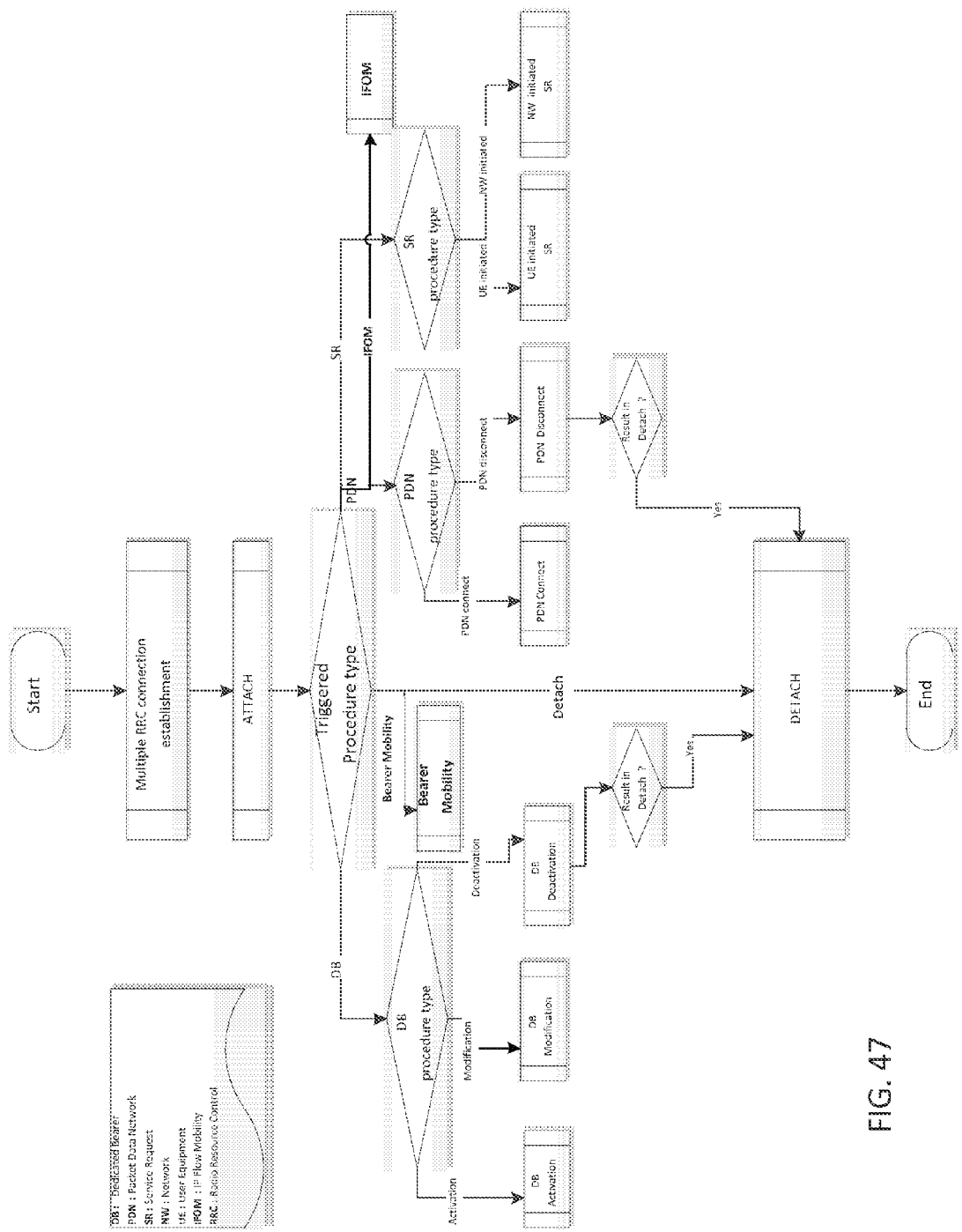
FIG. 47 is an example flow chart of an example method and a subset of procedures associated therewith for establishing and maintaining multiple connections such as multiple RRC connections.

FIG. 47 depicts an example embodiment of procedures and/or methods that may be used herein. For example, FIG. 47 may provide a list of procedures that may supported by a system such as a BWM-MME and their interaction (e.g. from an LTE standpoint). In embodiments, "IFOM (IP Flow Mobility)" and "Bearer Mobility" may be additional procedures that may be performed as disclosed herein. Other procedures in the diagram may be modified to support BWM-MME.

As shown in FIG. 47, multiple RRC connection establishment that may use a BWM-MME (Bandwidth Management-MME)_Attach_Detach_ServiceRequest, an attach including UE initiated dedicated bearer activation procedure that may use a BWM-MME (Bandwidth Management-MME)_Attach_Detach_ServiceRequest, a detach that may use a BWM-MME (Bandwidth Management-MME)_Attach_Detach_ServiceRequest, a service request (SR) and procedures thereof that may use a BWM-MME (Bandwidth Management-MME)_Attach_Detach_ServiceRequest, dedicated bearers (DB) including an attach, dedicated bearer procedures that may use a BWM-MME (Bandwidth Management-MME)_Dedicated bearer_PDN, a Packet Data Network (PDN) including PDN connection procedures that may use a BWM-MME (Bandwidth Management-MME)_ Dedicated bearer_PDN, IFOM (IP flow mobility) that may use a BWM-MME (Bandwidth Management-MME)_ IFOM, bearer mobility that may use a BWM-MME (Bandwidth Management-MME)_IFOM, and the like may be procedures and/or methods that may be performed.

Figure 48:
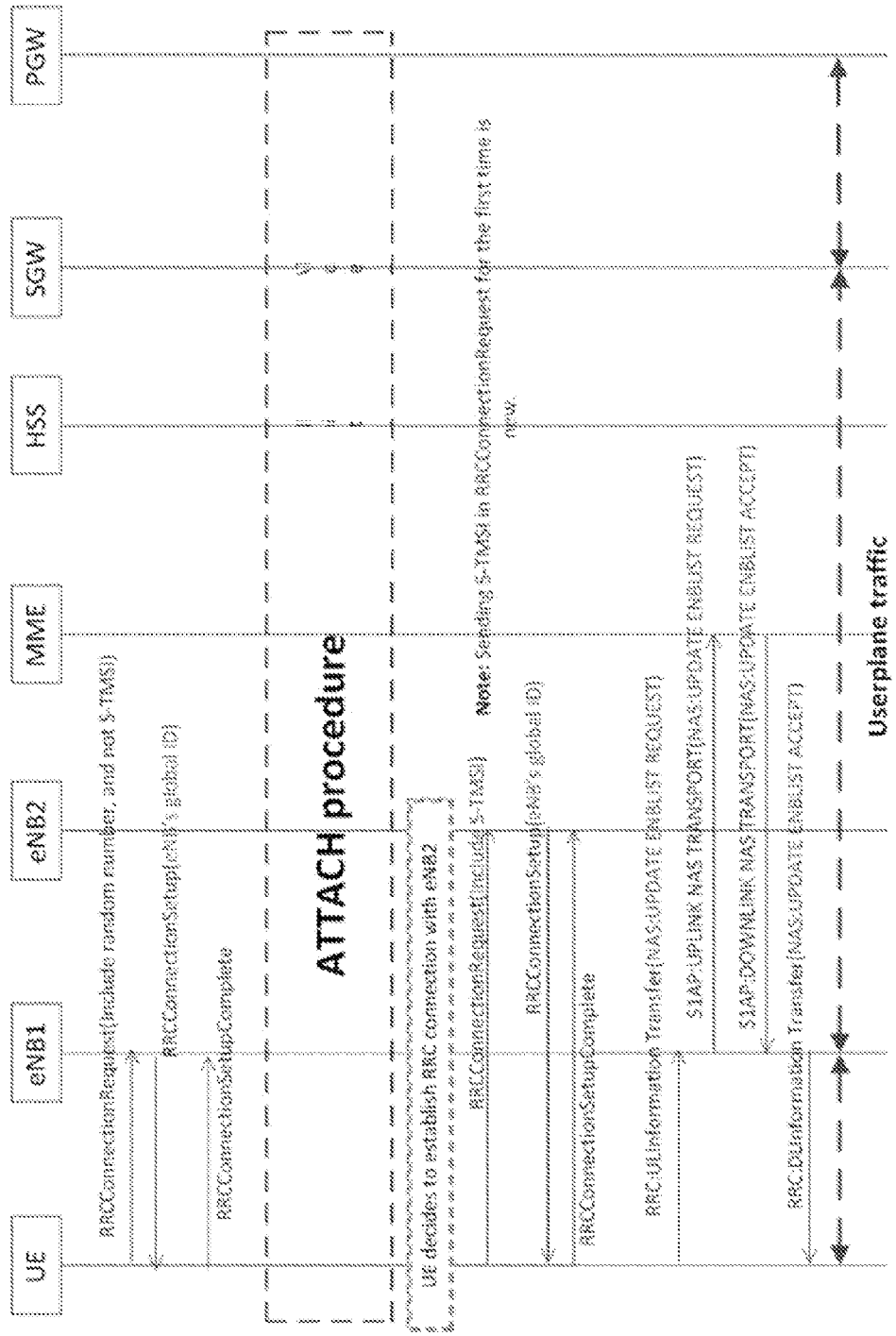
FIGS. 48-68 are example message sequence charts illustrating call flows for performing one or more of procedures or functions described herein.

As described above, multiple RRC connections and interfaces may be supported. For example, a primary RRC connection may be established followed by other RRC connections as shown in FIG. 48. In such an embodiment, a UE may establish a RRC connection with eNB1 (e.g. a first RRC connection) and may perform the attach procedure. After the attach procedure, the UE may establish the remaining RRC connections with the remaining eNBs (e.g. eNB2 shown in FIG. 48). The UE may then update the MME with the list of eNBs that it may be connected to.

Various messages may be provided and/or used to establish a primary RRC followed by other RRC connections. For example, a RRCConnectionSetup message (e.g. RRC:RRC-ConnectionSetup) may be used to establish a SRB1. In an embodiment, a new IE, globaleNBID may be added to RRCConnectionSetup message. Additionally, such a message may also include, provide, and/or use a signaling radio bearer: SRB0, RLC-SAP: TM, logical channel: CCCH, direction: E-UTRAN to UE, and the like.

An example RRCConnectionSetup message may be as follows:

```
-- ASN1START
RRCConnectionSetup ::=              SEQUENCE {
    rrc-TransactionIdentifier           RRC-TransactionIdentifier,
    criticalExtensions                  CHOICE {
        c1                                  CHOICE {
            rrcConnectionSetup-r8               RRCConnectionSetup-r8-IEs,
            spare7 NULL,
            spare6 NULL, spare5 NULL, spare4 NULL,
            spare3 NULL, spare2 NULL, spare1 NULL
        },
        criticalExtensionsFuture            SEQUENCE { }
    }
}
RRCConnectionSetup-r8-IEs ::=       SEQUENCE {
    radioResourceConfigDedicated        RadioResourceConfigDedicated,
    globaleNBID                         GlobaleNBID,
    nonCriticalExtension                SEQUENCE { }   OPTIONAL -- Need OP
}
GlobaleNBID::=                      CHOICE {
    MacroeNBID                          BIT STRING (SIZE (20),
    HomeeNBID                           BIT STRING (SIZE (28))
}
-- ASN1STOP
```

Additionally, as described above, a NAS: UPDATE ENBLIST REQUEST message may be used to establish a primary RRC connection followed by additional RRC connections. Such a message may be sent by the UE to the network to update the MME with the list of eNBs it may be connected to. The NAS: UPDATE ENBLIST REQUEST message may include a message type such as UPDATE ENBLIST REQUEST, a significance such as dual, a direction such as UE to network, and the like and/or information in Table 1.

After finishing the attach procedure on the eNB1, the UE may send across a RRCConnectionRequest to the eNB2 by including, for example, S-TMSI. The eNB2 may send across a RRCConnectionSetup to the UE by including a global ID of the eNB2. In response to receiving the RRCConnetionSetup, the UE may send across a RRCConnectionSetupComplete to the eNB2. The UE may then construct the NAS:UPDATE ENBLIST REQUEST which may include a list of eNBs (e.g. eNB1 and eNB2) that it may be connected

TABLE 1

UPDATE ENBLIST REQUEST message content

| IEI | Information Element | Type/Reference | Presence | Format | Length |
|---|---|---|---|---|---|
| | Protocol discriminator | Protocol discriminator 9.2 | M | V | ½ |
| | Procedure transaction identity | Procedure transaction identity 9.4 | M | V | 1 |
| | Update eNBList request message identity | Message type 9.8 | M | V | 1 |
| | Request type | Request type 9.9.4.14 | M | V | ½ |
| 27 | Protocol configuration options | Protocol configuration options 9.9.4.11 | O | TLV | 3-253 |
| | Connected eNBs | 1 . . . <maxnoofeNBs> | O | TBD | TBD |
| | > Global eNB ID | 9.2.1.37(3GPP 36.413) | M | TBD | TBD |

A method or procedure for establishing a primary RRC followed by additional RRC connections may be performed as described below. For example, initially, no RRC connection may be established between a UE and eNBs such as eNB1 and eNB2. The UE may send across the RRCConnectionRequest to the eNB1, for example, by including a random value. The eNB1 may then send across the RRCConnectionSetup to the UE which may include a global ID of the eNB1. In response to receiving the RRCConnectionSetup, the UE may send across RRCConnectionSetupComplete to the eNB1. The UE may then finish the attach procedure on the eNB1 (e.g. as described above). In such an embodiment, the UE may or may not include the eNB ID List in NAS:ATTACH REQUEST.

to and may send such a request and list across to the eNB1 in a RRC:ULInformationTransfer message.

According to an example embodiment, the eNB1 may then send across the S1AP:UPLINK NAS TRANSPORT (NAS:UPDATE ENBLIST REQUEST) to the MME such that the MME may send across the S1AP:DOWNLINK NAS TRANSPORT(NAS:UPDATE ENBLIST ACCEPT) to the eNB1. After receiving the S1AP:DOWNLINK NAS TRANSPORT(NAS:UPDATE ENBLIST ACCEPT, the eNB1 may send across a RRC:DLInformationTransfer(NAS:UPDATE ENBLIST ACCEPT) to the UE.

After establishing RRC connections as described above, user plane traffic may be routed. For example, the eNB1 may send uplink user plane data (UL) or UL user data to the SGW on the S1-U using SGW's IP address and SGW_TEID1.

Additionally, the SGW may send downlink user plane data (DL) or DL user data to the eNB1 on the S1-U using eNB1's IP address and eNB1_TEID1.

Figure 49:
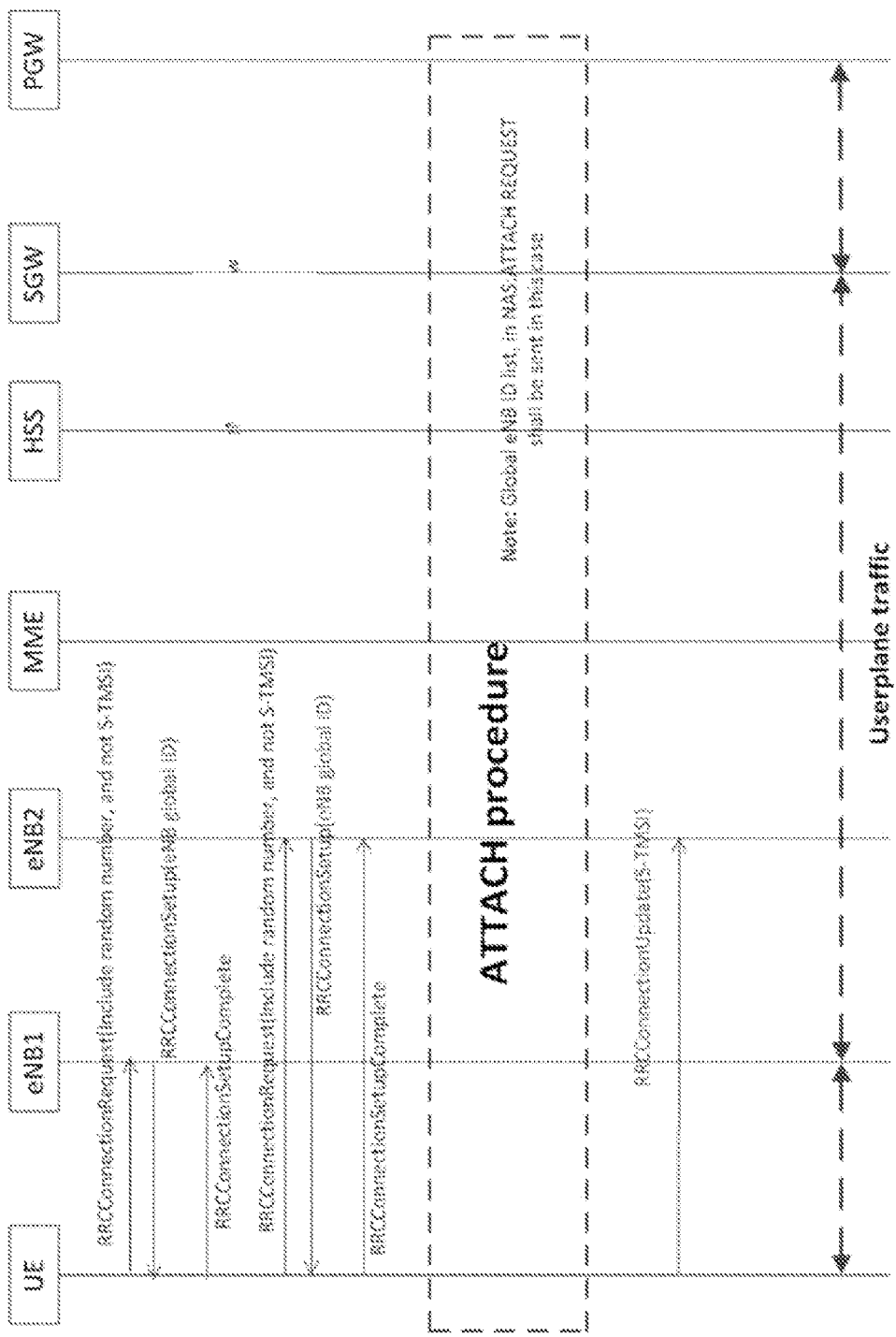

In another embodiment, each of the multiple RRC connections may be established at once or at the same time as shown in FIG. 49. In such an embodiment, the UE may establish RRC connections with each of the available eNBs (e.g. the eNB and eNB2) and may then perform the attach procedure. After completing or finishing the attach procedure, the UE may send across a RRCConnectionUpdate to the eNB2 by, for example, including S-TMSI.

Various messages may be provided and/or used to establish multiple RRC connections at once. For example, a RRCConnectionSetup message (e.g. RRC:RRCConnectionSetup) may be used to establish a SRB1. In an embodiment, a new IE, globaleNBID may be added to RRCConnectionSetup message. Additionally, as described above, such a message may also include, provide, and/or use a signaling radio bearer: SRB0, RLC-SAP: TM, logical channel: CCCH, direction: E-UTRAN to UE, and the like.

An example RRCConnectionSetup message may be as follows:

```
-- ASN1START
RRCConnectionSetup ::=             SEQUENCE {
    rrc-TransactionIdentifier          RRC-TransactionIdentifier,
    criticalExtensions                 CHOICE {
        c1                                 CHOICE {
            rrcConnectionSetup-r8              RRCConnectionSetup-r8-IEs,
            spare7 NULL,
            spare6 NULL, spare5 NULL, spare4 NULL,
            spare3 NULL, spare2 NULL, spare1 NULL
        },
        criticalExtensionsFuture           SEQUENCE { }
    }
}
RRCConnectionSetup-r8-IEs ::=      SEQUENCE {
    radioResourceConfigDedicated       RadioResourceConfigDedicated,
    globaleNBID                        GlobaleNBID,
    nonCriticalExtension               SEQUENCE { }   OPTIONAL -- Need
OP
}
GlobaleNBID::=                     CHOICE {
    MacroeNBID                         BIT STRING (SIZE (20),
    HomeeNBID                          BIT STRING (SIZE (28))
}
-- ASN1STOP
```

Additionally, a RRCConnectionUpdate message may be provided. The RRCConnectionUpdate message may be used to update eNB with S-TMSI information of the UE. Such a message may also provide, include, and/or use signaling radio bearer: SRB0; RLC-SAP: TM; logical channel: CCCH; direction: UE to E-UTRAN; and the like.

An example RRCConnectionUpdate message may be as follows:

```
-- ASN1START
RRCConnectionUpdate ::=            SEQUENCE {
    criticalExtensions                 CHOICE {
        rrcConnectionUpdate-r8             RRCConnectionUpdate-r8-IEs,
        criticalExtensionnFuture           SEQUENCE { }
    }
}
RRCConnectionUpdate-r8-IEs ::=     SEQUENCE {
    ue-Identity                        InitialUE-Identity,
    spare                              BIT STRING (SIZE (1))
}
InitialUE-Identity ::=             SEQUENCE {
    s-TMSI                             S-TMSI
}
-- ASN1STOP
```

TABLE 2

RRCConnectionUpdate Information
RRCConnectionUpdate field descriptions ue-Identity
UE identity included to facilitate contention resolution by lower layers.
It may be s-TMSI.

A method or procedure for establishing multiple RRC connections at once or at the same time may be performed as described below. For example, initially, no RRC connection between the UE, eNB1, and eNB2 may be established. As such, the UE may send across a RRCConnectionRequest to the eNB1 by including a random value. The eNB1 may then send across a RRCConnectionSetup to the UE which may include a global ID of the eNB1.

After receiving the RRCConectionSetup, the UE may send across RRCConnectionSetupComplete to eNB1. The UE may also send across a RRCConnectionRequest to the eNB2 by including a random value.

The eNB2 may then send across a RRCConnectionSetup to UE by including a global ID of the eNB2. In response to receiving the RRCConectionSetup from the eNB2, the UE may send across a RRCConnectionSetupComplete to the eNB2. The UE may finish the attach procedure (e.g. as described herein) on the eNB1. In such an embodiment, the UE may include an eNB ID List in NAS:ATTACH REQUEST. The eNBIDList may have the eNB1, eNB2 global IDs. The UE may send across the RRCConnection-Update with S-TMSI to the eNB2.

After establishing RRC connections as described above, user plane traffic may be routed. For example, the eNB1 may send uplink user plane data (UL) or UL user data to the SGW on the S1-U using SGW's IP address and SGW_TEID1. Additionally, the SGW may send downlink user plane data (DL) or DL user data to the eNB1 on the S1-U using eNB1's IP address and eNB1_TEID1.

Figure 50:
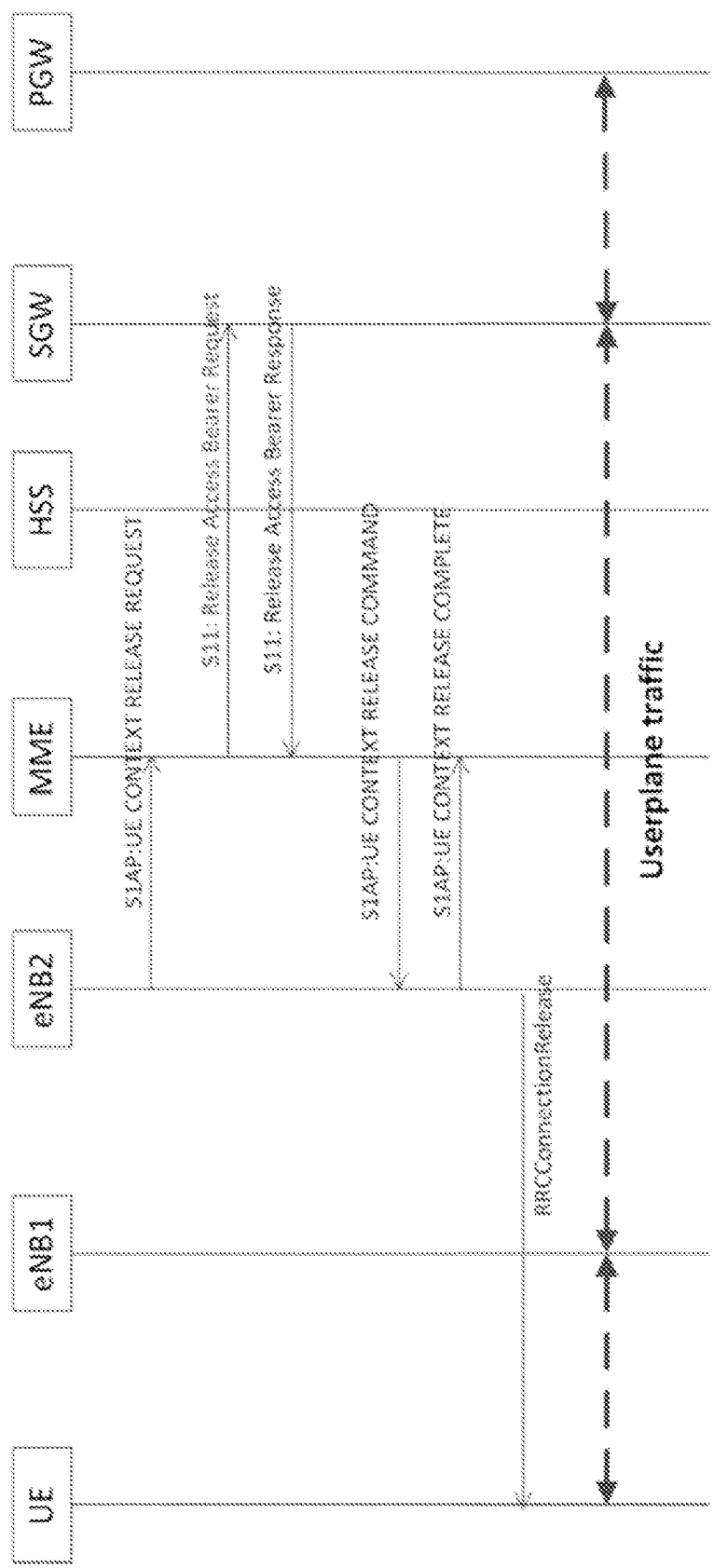

In embodiments, a RRC connection release and/or a S1 release may be provided, performed, and/or used (e.g. as shown in FIG. 50). For example, an eNB (e.g. the eNB1 or the eNB2) may start a S1 release procedure to release a logical S1-MME connection and EPS bearers at the eNB. The EPS bearers at the MME and SGW may not be released.

Various messages may be provided/or used to perform such a release. For example, a S11:Release Access Bearer Request message (e.g. that may include the information in Table 3) may be provided and/or used. The Release Access Bearers Request message may be sent on the S1 interface by the MME to the SGW as part of the S1 release procedure. A list of RABs (e.g. ListofRABs) may be sent on S11 interface to deactivate EPS bearers. Such bearers may not be released at the SGW, but rater deactivated. Currently (e.g. in existing 3GPP LTE), the list of RABs may not be sent on the S11 interface. However, as described herein, as the UE connects to multiple eNBs, the MME may inform the SGW to deactivate the bearers that may have been established on the eNB that may have triggered the S1 release procedure. Other bearers that may have been established on different eNBs may not be deactivated.

TABLE 3

| Information Element (IE) in Release Access Bearers Request | | | | |
|---|---|---|---|---|
| Information elements | P | Condition/Comment | IE Type | Ins. |
| List of RABs | C | May be present on S4 interface when this message is used to release a subset of all active RABs according to the RAB release procedure. Several IEs with this type and instance values may be included as necessary to represent a list of RABs to be released. May be present on S11 interface when this message is used to deactivate a subset of all active RABs according to the RAB release procedure. Several IEs with this type and instance values May be included as necessary to represent a list of RABs to be released. | EBI | 0 |
| Private Extension | O | Vendor or operator specific information | Private Extension | VS |

A method or procedure for providing RRC connection release and/or a S1 release may be performed as described below. Initially, RRC connections between the UE, eNB, and eNB2 may be established (e.g. may have already been established as described above). For example, a primary RRC connection followed by other RRC connections may be established to have multiple RRC connections between the UE, eNB1, and eNB2.

In an embodiment, the eNB2 may send across a S1AP:UE CONTEXT RELEASE REQUEST to the MME during the S1 release procedure. The MME may then send across the S11:Release Access Bearer Request to the SGW with the list of bearers that may have been activated on eNB2.

In response thereto, the SGW may send across the S11: Release Access Bearer Response to MME after deactivating the bearers that may have been present in the S11:Release Access Bearer Request message. In an embodiment, the SGW may not release these bearers. The SGW may not deactivate the bearers that may have been established other than eNB2. Additionally, the SGW may delete the S1-U TEID information of the eNB2, but may preserve S1-U TEID information from the SGW or the standpoint thereo.

According to an example embodiment, the MME may send across the S1AP:UE CONTEXT RELEASE COMMAND to the eNB2. The eNB2 may then send across the RRCConnectionRelease to the UE and the eNB2 may release the bearers locally that may have been established for the UE. The eNB2 may send across the S1AP:UE CONTEXT RELEASE COMPLETE to the MME. In response thereto, the MME may not release the bearers and may preserve the UE context. The UE state may be modified to an IDLE mode at the MME.

After releasing or deactivating an RRC connection (e.g. the eNB2) as described above, user plane traffic may be routed (e.g. via the eNB1). For example, the eNB1 may send uplink user plane data (UL) or UL user data to the SGW on the S1-U using SGW's IP address and SGW_TEID1. Additionally, the SGW may send downlink user plane data (DL) or DL user data to the eNB1 on the S1-U using eNB1's IP address and eNB1_TEID1.

In embodiments, an attach and/or a UE initiated dedicated bearer activation procedure or method may be provided, performed, and/or used. For example, an attach and/or registration procedure and a dedicated bearer activation, modification, and/or deactivation on multiple interfaces may be provided and/or performed.

Figure 51:
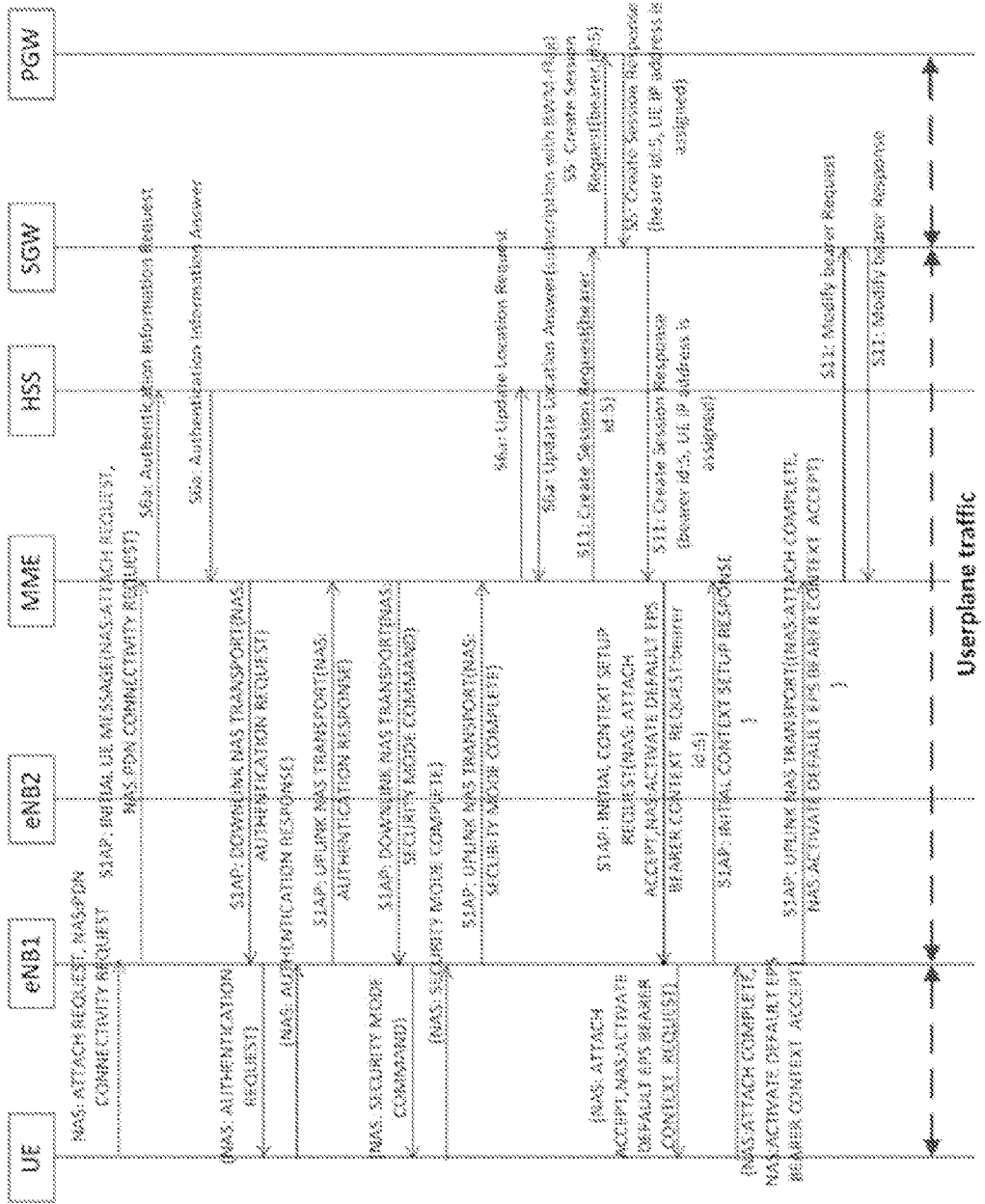

An example attach procedure or method may be shown in FIG. 51. Various messages may be provided/or used to perform such an attach. For example, a S6a: Update Location Answer may be used. The Subscription-Data AVP in the S6a:Update Location Answer may have BWM-Flag, and set to 0 by default. The BWM-Flag AVP may be of type Unsigned32 and it may include a bit mask. The definition of the bits may be shown in Table 4.

TABLE 4

BWM-Flag

| Bit | Name | Description |
|---|---|---|
| 0 | BWM solution is not supported | This bit, when set, may indicate that the BWM solution may not be applicable to UE |
| 1 | BWM solution is supported | This bit, when set, may indicate that the BWM solution may be applicable to UE |

Note:
Bits not defined in this table may be cleared by the sending entity and discarded by the receiving entity.

As described above, during RRC connection establishment eNB may send across its global eNB ID to the UE. The UE may receive global eNB IDs from different RRC connections established with multiple eNBs. The UE may send across a list of global eNB IDs in a NAS: ATTACH REQUEST during the attach and/or registration procedure.

For example, a NAS: ATTACH REQUEST (with eNB global IDs list that UE connected to during RRC connection establishment) may also be provided and/or used. Such a message may be sent by the UE to the network in order to perform an attach procedure. The NAS: ATTACH REQUEST may include a message type: ATTACH REQUEST, a significance: dual, a direction: UE to network, and the like and/or information in Table 5.

TABLE 5

ATTACH REQUEST message content

| IEI | Information Element | Type/Reference | Presence | Format | Length |
|---|---|---|---|---|---|
|  | Protocol discriminator | Protocol discriminator 9.2 | M | V | ½ |
|  | Security header type | Security header type 9.3.1 | M | V | ½ |
|  | Attach request message identity | Message type 9.8 | M | V | 1 |
|  | EPS attach type | EPS attach type 9.9.3.11 | M | V | ½ |
|  | NAS key set identifier | NAS key set identifier 9.9.3.21 | M | V | ½ |
|  | Old GUTI or IMSI | EPS mobile identity 9.9.3.12 | M | LV | 5-12 |
|  | UE network capability | UE network capability 9.9.3.34 | M | LV | 3-14 |
|  | ESM message container | ESM message container 9.9.3.15 | M | LV-E | 2-n |
| 19 | Old P-TMSI signature | P-TMSI signature 10.5.5.8 | O | TV | 4 |
| 50 | Additional GUTI | EPS mobile identity 9.9.3.12 | O | TLV | 13 |
| 52 | Last visited registered TAI | Tracking area identity 9.9.3.32 | O | TV | 6 |
| 5C | DRX parameter | DRX parameter 9.9.3.8 | O | TV | 3 |
| 31 | MS network capability | MS network capability 9.9.3.20 | O | TLV | 4-10 |
| 13 | Old location area identification | Location area identification 9.9.2.2 | O | TV | 6 |
| 9- | TMSI status | TMSI status 9.9.3.31 | O | TV | 1 |
| 11 | Mobile station classmark 2 | Mobile station classmark 2 9.9.2.4 | O | TLV | 5 |
| 20 | Mobile station classmark 3 | Mobile station classmark 3 9.9.2.5 | O | TLV | 2-34 |
| 40 | Supported Codecs | Supported Codec List 9.9.2.10 | O | TLV | 5-n |
| F- | Additional update type | Additional update type 9.9.3.0B | O | TV | 1 |
|  | Connected eNBs | 1 . . . <maxnoofeNBs> | O | TBD | TBD |
|  | > Global eNB ID | 9.2.1.37 | M | TBD | TBD |

Figure 52:
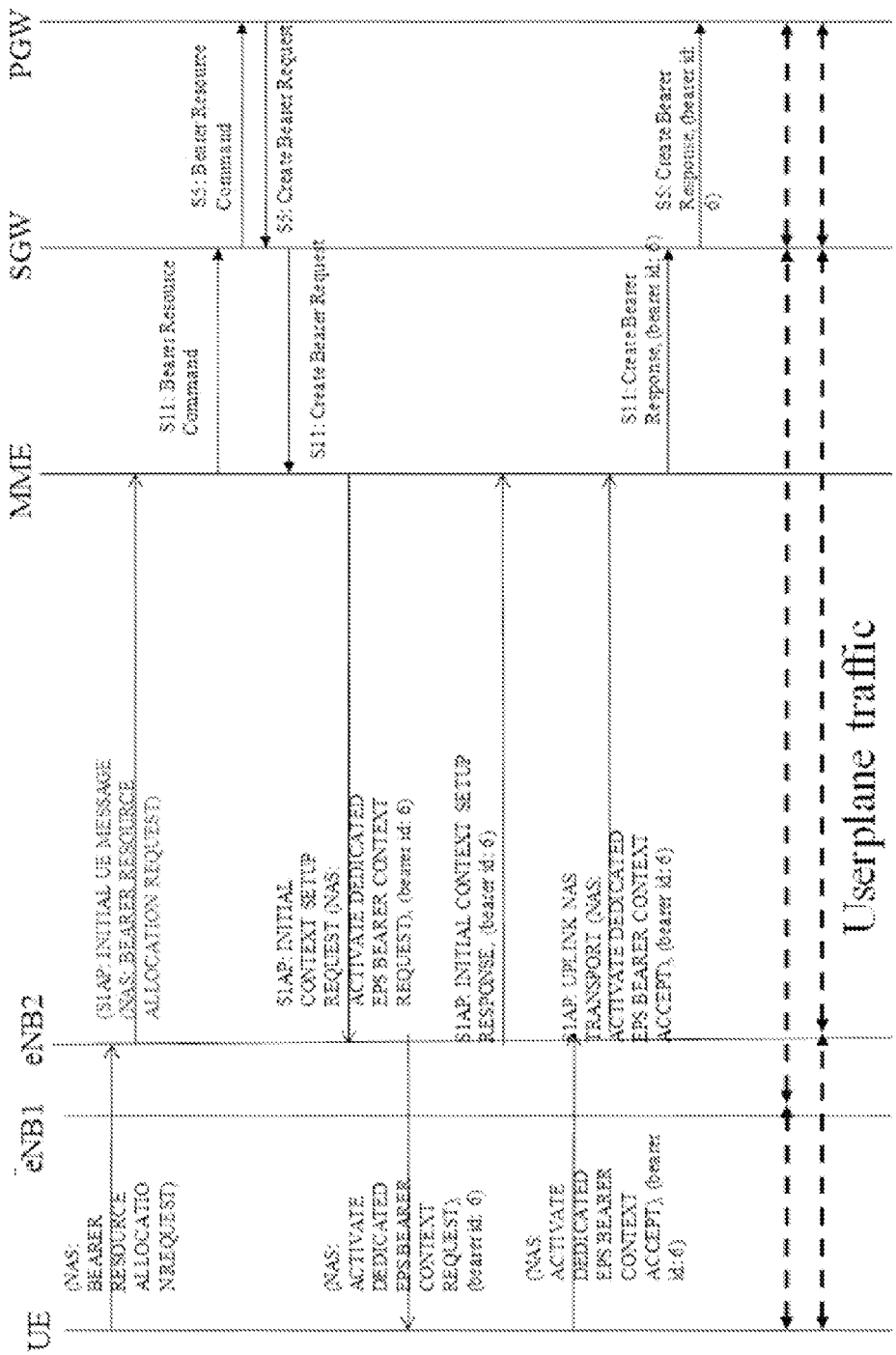

A UE initiated dedicated bearer activation (e.g. as shown in FIG. 52) may be provided, performed, and/or used. For example, the UE may request for a dedicated bearer when a bearer may be used with certain QoS (e.g. as described above). The UE may include LBI (e.g. default bearer) in the NAS: BEARER RESOURCE ALLOCATION REQUEST to inform the network (e.g. MME, SGW, PGW, and the like) that a new dedicated bearer may be associated with the LBI of the PDN connection.

A method or procedure for performing a UE initiated dedicated bearer activation may be provided (e.g. as shown in FIG. 52 and described at least in part above). Initially, RRC connections between the UE, eNB1, and eNB2 may be established (e.g. may have already been established as described above) or set up. Additionally, there may be no S1 logical connection from the eNB2 to the MME and the UE may be already registered with a network such as a LTE network, the UE may send across S-TMSI along with NAS: BEARER RESOURCE ALLOCATION REQUEST to the eNB2. In an embodiment, as there may be no logical S1 connection from the eNB2 to MME for the combination of eNB2, UE, the NAS: BEARER RESOURCE ALLOCATION REQUEST may be forwarded in a S1AP: INITIAL UE MESSAGE, by including S-TMSI and NAS: BEARER RESOURCE ALLOCATION REQUEST.

The MME (e.g. in addition to initiating the dedicated bearer activation procedure with SGW, by sending the S11: Bearer Resource Command described herein) may associate both the S1 logical connections of the UE (e.g. eNB1-MME & eNB2-MME) using or based on the S-TMSI.

The MME may further identify an unused bearer (id:6) and may send across the S1AP: INITIAL CONTEXT SETUP REQUEST (NAS: ACTIVATE DEDICATED EPS BEARER CONTEXT REQUEST)) to the eNB2. The S1AP: INITIAL CONTEXTSETUP REQUEST may have bearer id:6, Qos, and SGW S1-U TEID (SGW_TEID2) for such a bearer. The dedicated bearer may have the same IP address of the default bearer of such a PDN connection.

In an embodiment, after establishing the bearer on the eNB2, it may send the S1AP: INITIAL CONTEXTSETUP RESPONSE, (bearer id: 6) to the MME by including its S1-U IP and TEID (eNB2_TEID1). The S1AP: INITIAL CONTEXTSETUP RESPONSE may have the list of bearers that may have been successfully setup on eNB2.

Figure 53:
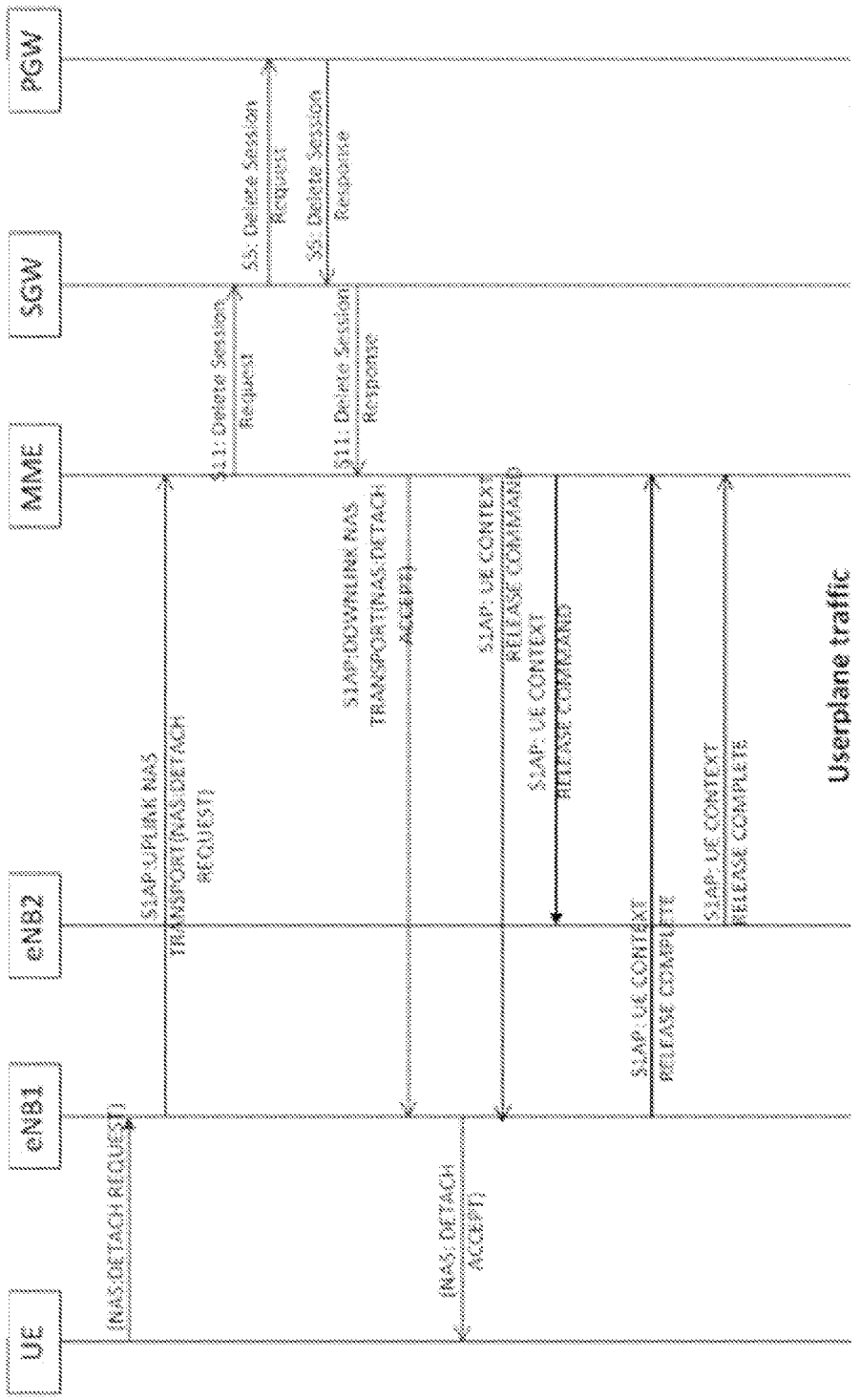

Detach procedures (e.g. as described herein and above) may be provided, performed, and/or used. An example detach procedure that may be provided, performed, and/or used herein may be shown in FIG. 53. The UE may send across a detach request (e.g. a UE initiated detach) to de-register from the network as described herein. As shown in FIG. 53, S1AP messages may be used to perform the detach (e.g. a UE initiated detach). For example, default and/or dedicated bearers of a PDN connection may be distributed across the eNB1 and eNB2 and, as such, two S1AP: UE CONEXT RELEASE COMMANDs may be used. Additionally, the MME in such a procedure may include the LBI of the PDN and, if the UE may have more than one PDN connection, for each PDN connection, the MME may send across a S1:DeleteSessionRequest. In embodiments, the MME may also send across S1AP: UE CONTEXT RELEASE COMMAND to the eNB1 and eNB2 to tear down both the S1-MME logical connections. The RRC connections from the UE to the eNB1 and eNB2 may then be released at this point of time, after receiving 'RRC ConnectionRelease' from the eNB1 and eNB2.

Figure 54:
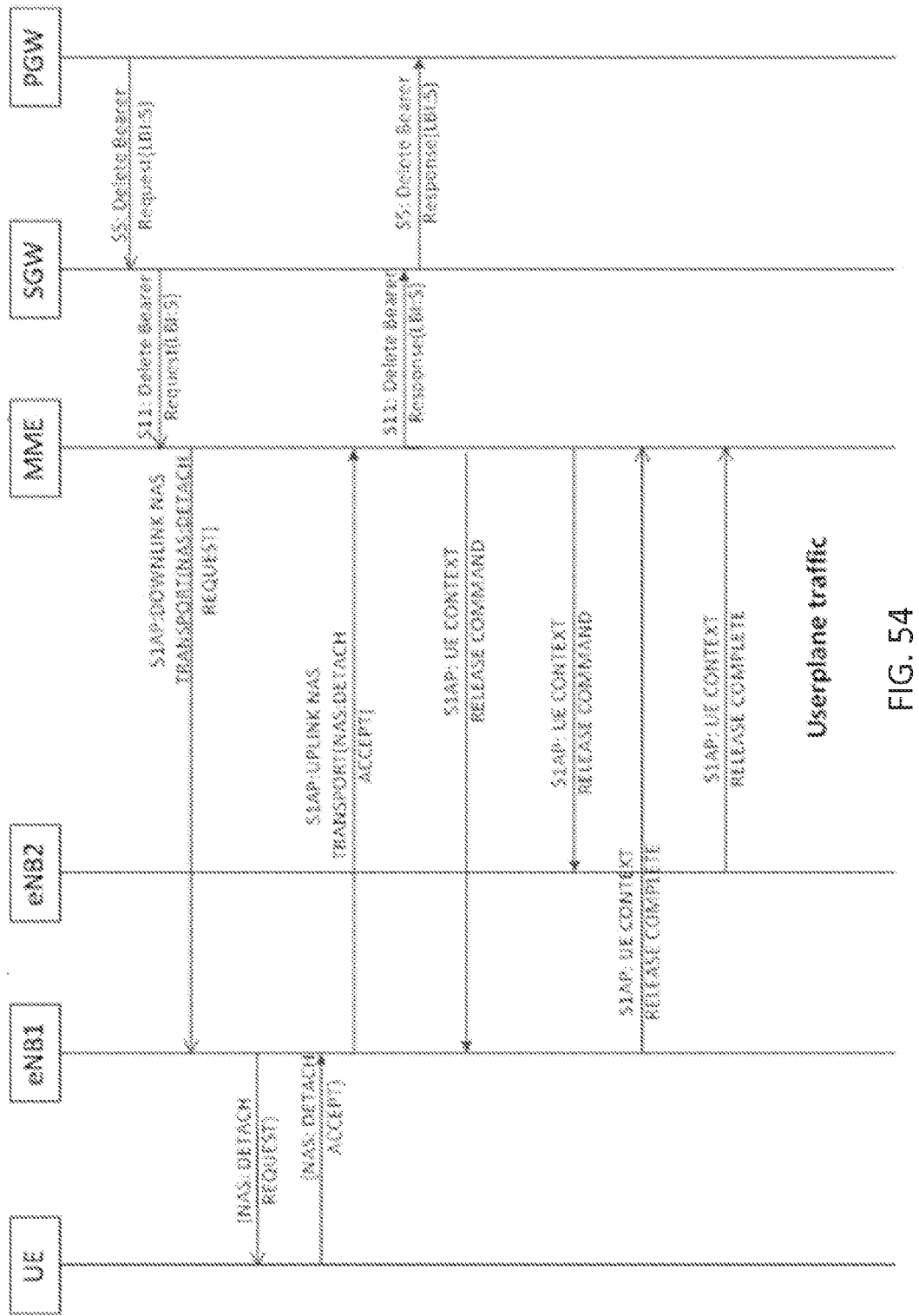

Another example detach procedure that may be performed, provided, and/or used herein may include a PGW initiated detach shown in FIG. 54. For example, a PGW may trigger detach procedure in order to detach UE from the network as shown in FIG. 54. In such an embodiment, the MME may send across a S1AP: UE CONTEXT RELEASE COMMAND to the eNB1 and eNB2 to tear down both the S1-MME logical connections. The RRC connections from the UE to eNB1 and eNB2 may then be released at this point of time, after receiving 'RRC ConnectionRelease' from the eNB1 and eNB2.

Service request (SR) procedures and/or methods may be provided, performed, and/or used. In an example embodiment, a service Request procedure may be either a UE initiated service request or a Network (e.g. SGW) initiated service request. Additionally, there may be no changes herein to the standard UE initiated service request procedure.

Figure 55:
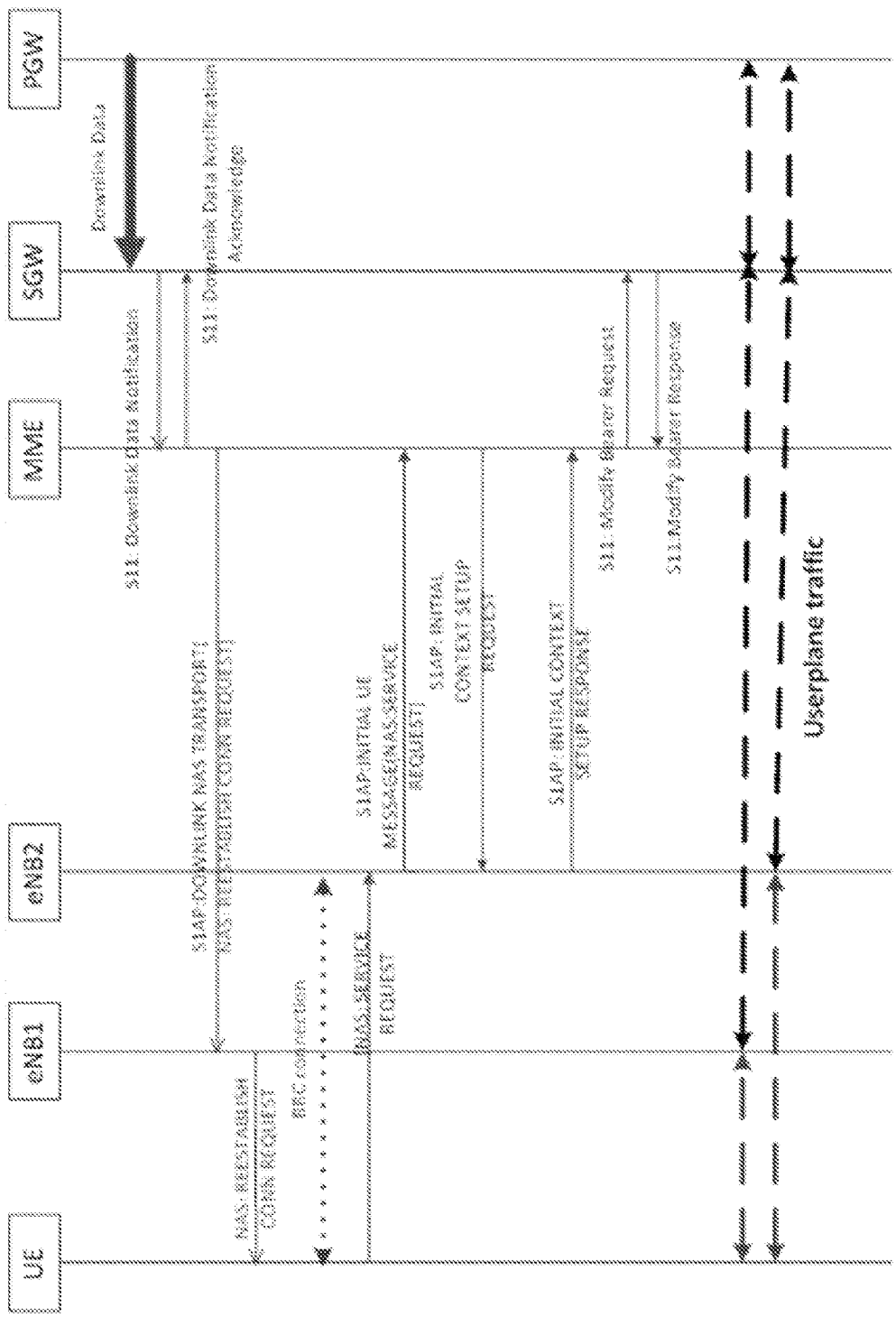

In embodiments, the SGW initiated service request may be modified as described herein and shown in FIG. 55 (e.g. where the UE may be in IDLE mode). Additionally, there may be a new scenario or trigger for a PGW initiated dedicated bearer modification to result in service request procedure.

In a SGW initiated service request (e.g. where UE may be in IDLE mode), when the SGW may receive downlink data for the UE from the PGW, the SGW may initiate the procedure and/or method, for example, shown in FIG. 55. Such a service request procedure may be performed without PAGING.

Various messages may be provided and/or used to perform the SGW initiated SR. For example, a NAS: REESTABLISH CONN REQUEST may be provided and/or used. Such a message may be sent by the MME and may be used to request the UE to re-establish a connection from the UE to MME (RRC+S1). In such an embodiment, as there may be no RRC connection available, from the UE to eNB2, a RRC connection from the UE to eNB2 and S1 logical connection from the eNB2 to MME may be re-established. Such a message may include a direction of MME→UE and may include the information shown in Table 6 below.

TABLE 6

REESTABLISH CONN REQUEST message content

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | reestablish conn request message identity | Message type 9.8 (TBD) | M | V | 1 |
| | reestablish eNBs | 1 ... <maxnoofeNBs> | M | V | 1 |
| | >Global eNB ID | 9.2.1.37 (3GPP 36.413) | M | V | 1 |

A method or procedure for initiating a SR at a SGW may be performed as described below (e.g. and shown in FIG. 55). Initially, RRC connections between the UE and the eNB1 may be established or set up and the UE may be in IDLE mode. Additionally, an attach procedure, a UE initiated dedicated bearer activation procedure and/or default and dedicated bearers of a PDN distributed across (H)eNBs may be performed and/or used.

In an embodiment, to perform such a SGW initiated SR, the PGW may send downlink data for the UE to SGW. The SGW may send across a S11: Downlink Data Notification to the MME. MME may send across S11: Downlink Data Notification Acknowledge to SGW.

The MME may send across a S1AP:DOWNLINK NAS TRANSPORT(NAS:REESTABLISH CONN REQUEST) to the eNB1 and may include the eNB global ID in the NAS:REESTABLISH CONN REQUEST for which RRC connection status may be IDLE.

In response thereto, for example, the eNB1 may send across NAS:REESTABLISH CONN REQUEST to the UE. After receiving the NAS:REESTABLISH CONN REQUEST with the eNB2 information, the UE may establish a RRC connection with the eNB2 and may send across a NAS:SERVICE REQUEST to the eNB2.

The eNB2 may then send across S1AP:INITIAL UE MESSAGE(NAS:SERVICE REQUEST) to the MME, as there may be no S1 logical connection from the eNB2 to the MME. Additionally, the MME may send across a S1AP: INITIAL CONTEXT SETUP REQUEST to the eNB2 with the list of bearers that may be setup. The MME may include the bearers that may have been in INACTIVE mode at the MME. In example embodiments, bearers may have entered into INACTIVE mode when the UE may enter into the IDLE state or mode.

The eNB2 may perform bearer sync-up with UE and may send across S1AP:INITIAL CONTEXT SETUP RESPONSE to the MME. The UE may then delete the bearers that may be INACTIVE at UE and may not be in the list received from the eNB2. Additionally, the MME may send across the S11:Modify Bearer Request to the SGW and the SGW may send across the S11:Modify Bearer Response to the MME.

After performing a SGW initiated SR, user plane traffic may be routed. For example, the eNB2 may send uplink user plane data (UL) or UL user data to the SGW on S1-U using the SGW's IP address and SGW_TEID2. Additionally, the SGW may send downlink user plane data (DL) or DL user data to the eNB2 on S1-U using eNB1's IP address and eNB2_TEID1.

As described above, PGW initiated dedicated bearer modification procedure and/or method may be provide, performed, and/or used herein. The PGW initiated dedicated bearer modification procedure may be described below and shown in FIG. 56 where the UE may be in IDLE mode. In an example embodiment, the service request procedure or method that may be PGW initiated may be without PAGING.

Figure 56:
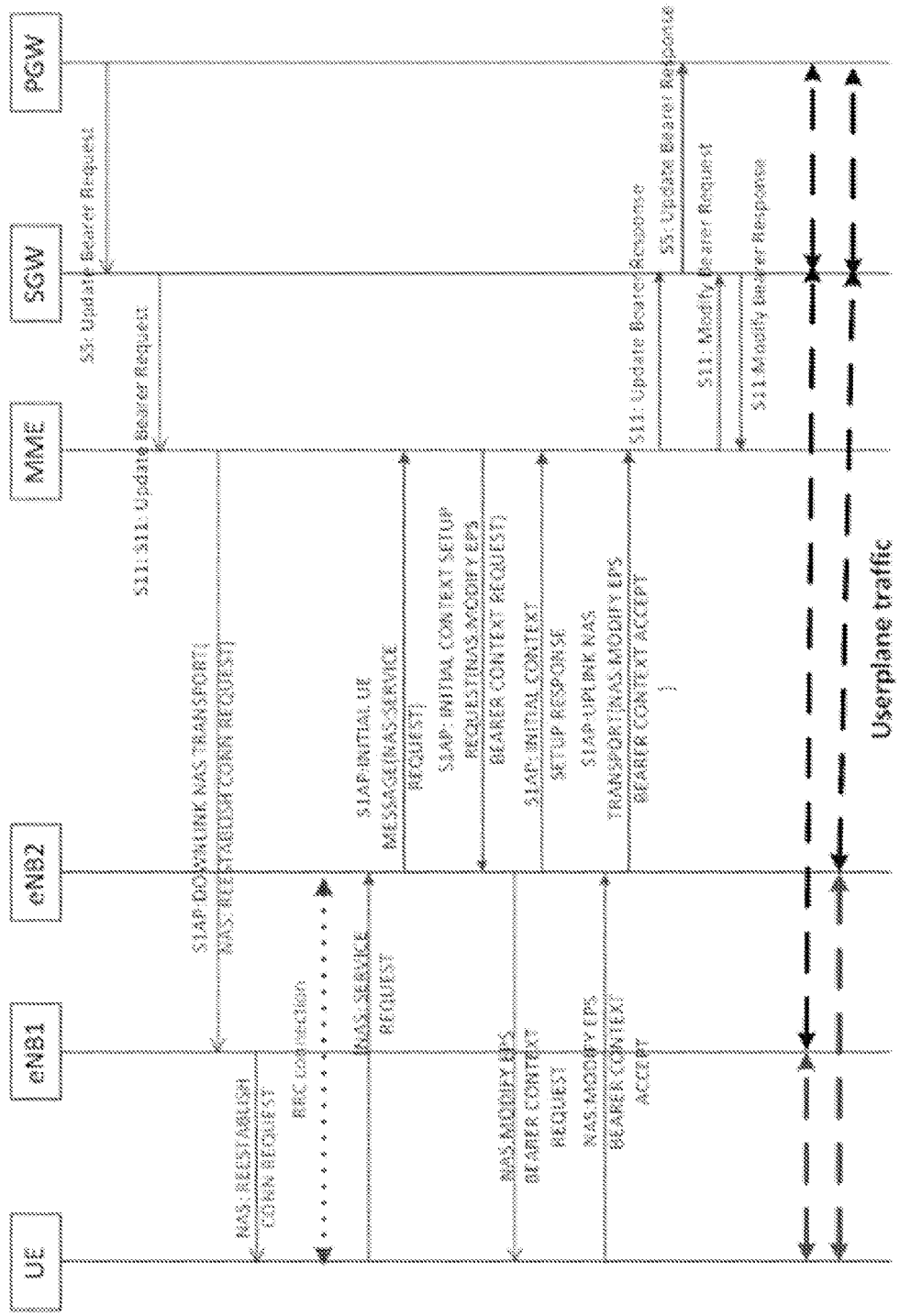

A method or procedure for initiating a dedicated bearer modification or SR at a PGW may be performed as described below (e.g. and shown in FIG. 56). Initially, RRC connections between the UE and the eNB1 may be established or set up and the UE may be in IDLE mode. Additionally, various messages may be provided and/or used such as NAS: REESTABLISH CONN REQUEST. Such a message may be sent by the MME and may be used to request the UE to re-establish a connection from the UE to the MME (RRC+S1). In such an embodiment, as there may be no RRC connection available, for example, from the UE to eNB2, an RRC connection from the UE to eNB2 and S1 logical connection from the eNB2 to MME may be re-established. Such a message may include a direction: MME→UE and the information in Table 7.

TABLE 7

REESTABLISH CONN REQUEST message content

| IEI | Information Element | Type/Reference | Presence | Format | Length |
| --- | --- | --- | --- | --- | --- |
| | Protocol discriminator | Protocol discriminator 9.2 | M | V | ½ |
| | Security header type | Security header type 9.3.1 | M | V | ½ |
| | reestablish conn request message identity | Message type 9.8 (TBD) | M | V | 1 |
| | reestablish eNBs | 1 . . . <maxnoofeNBs> | M | V | 1 |
| | > Global eNB ID | 9.2.1.37 (3GPP 36.413) | M | V | 1 |

To perform such a PGW initiated procedure, the attach procedure. UE initiated dedicated bearer activation procedure, default and dedicated bearers of a PDN distributed across (H)eNBs that may be provided may be performed and/or used. Additionally, in the PGW initiated SR, the PGW may send a S5:Update Bearer Request to the SGW. The SGW may then send across a S11:Update Bearer Request to the MME.

The MME, in an embodiment, may send across a S1AP: DOWNLINK NAS TRANSPORT(NAS:REESTABLISH CONN REQUEST) to the eNB1 and may include the eNB global ID in NAS:REESTABLISH CONN REQUEST for which RRC connection status may be IDLE.

In response thereto, the eNB1 may send across the NAS: REESTABLISH CONN REQUEST to the UE. After receiving the NAS:REESTABLISH CONN REQUEST with the eNB2 information, the UE may establish RRC connection with the eNB2 and may send across a NAS:SERVICE REQUEST to the eNB2.

The eNB2 may send across a S1AP:INITIAL UE MESSAGE(NAS:SERVICE REQUEST) to the MME, as there may be no S1 logical connection from the eNB2 to the MME. The MME may then send across a S1AP:INITIAL CONTEXT SETUP REQUEST(NAS:MODIFY EPS BEARER CONTEXT REQUEST) to the eNB2.

In an embodiment (e.g. in response thereto, the eNB2 may send across a S1AP:INITIAL CONTEXT SETUP RESPONSE to the MME and a NAS:MODIFY EPS BEARER CONTEXT REQUEST to the UE. The UE may then send across the NAS:MODIFY EPS BEARER CONTEXT ACCEPT to the eNB2.

After receiving such a message, the eNB2 may send across a S1AP:UPLINK NAS TRANSPORT(NAS: MODIFY EPS BEARER CONTEXT ACCEPT) to the MME. The MME may send then across the S11:Update Bearer Response to the SGW such that the SGW may send across the S5:Update Bearer Response to the PGW. The MME may also send across the S11:Modify Bearer Request to the SGW and the SGW may send across the S11:Modify Bearer Response to the MME.

After performing a PGW initiated dedicated bearer modification or SR, user plane traffic may be routed. For example, the eNB2 may send uplink user plane data (UL) or UL user data to the SGW on S1-U using the SGW's IP address and SGW_TEID2. Additionally, the SGW may send downlink user plane data (DL) or DL user data to the eNB2 on S1-U using the eNB1's IP address and eNB2_TEID1.

Figure 57:
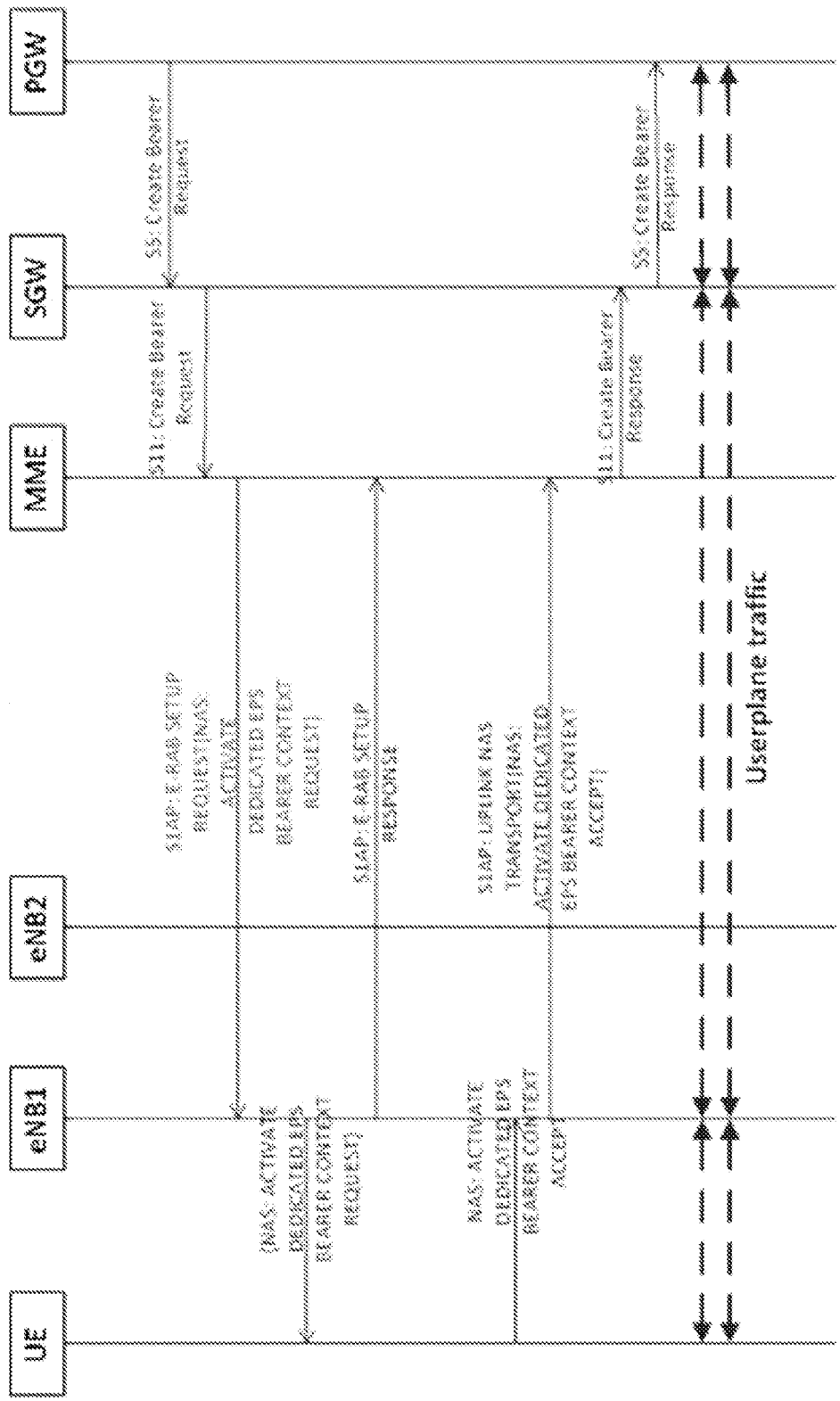

In an example embodiment, a PGW initiated dedicated bearer activation, for example, on a primary (attached) eNB may be provided, performed, and/or used. FIG. 57 illustrates an example embodiment of a PGW initiated dedicated bearer activation on an eNB (e.g. the eNB1) where attach as described above may be completed or done. The PGW initiated dedicated bearer activation shown in FIG. 57 may include procedures similar to the attach procedure described above along with the default and dedicated bearers of a PDN distributed across (H) PGW initiated dedicated bearer activation (On secondary eNB and RRC may be established with UE)

PGW initiated dedicated bearer activation, for example, on a secondary eNB and RRC connection that may be established with the UE. In such an embodiment (e.g. PGW initiated dedicated bearer, for example, on the secondary eNB and RRC connection), default and dedicated bearers of a PDN connection may have the same IP address and different bearer ids. Such bearers may have the same IP address even if bearers may be spread across different (H)eNBs. The Secondary eNB (e.g. the eNB2) may be the eNB that may be different from the eNB where the attach may have been performed or completed or done.

In example embodiments, the PGW initiated dedicated bearers activation, for example, on the secondary eNB and RRC connection may use an attach and/or registration procedure as described herein a dedicated bearer activation, modification, and/or deactivation on multiple interfaces, capability to have default and dedicated bearers of a PDN across (H)eNBs load balancing including distribution of dedicated bearers across (H)eNBs, service request, and the like.

The information described herein may be part or used with a network such as an LTE network or system. In an embodiment, each eNB in the network (e.g. the LTE network) may have an identifier (e.g. a Global eNB ID) that may be understood by the UE and MME. When a RRC connection may be established from the UE to an eNB, the eNB may send across this ID to the UE as described herein. According to an embodiment, when the UE may have multiple RRC connections with eNBs, the UE may send across a list of eNB IDs in NAS: ATTACH REQUEST to the MME. The MME may then store the eNB ID and may use them to create MME initiated S1 logical connections as described above.

The PGW may initiate the dedicated bearer activation procedure to establish a dedicated bearer procedure with the UE to push a QoS profile. In such an embodiment, the PGW may include LBI (default bearer) in the S5:Create Bearer Request to inform the network (e.g. the MME or SGW) that a new dedicated bearer may be associated with the LBI of the PDN connection.

Figure 58:
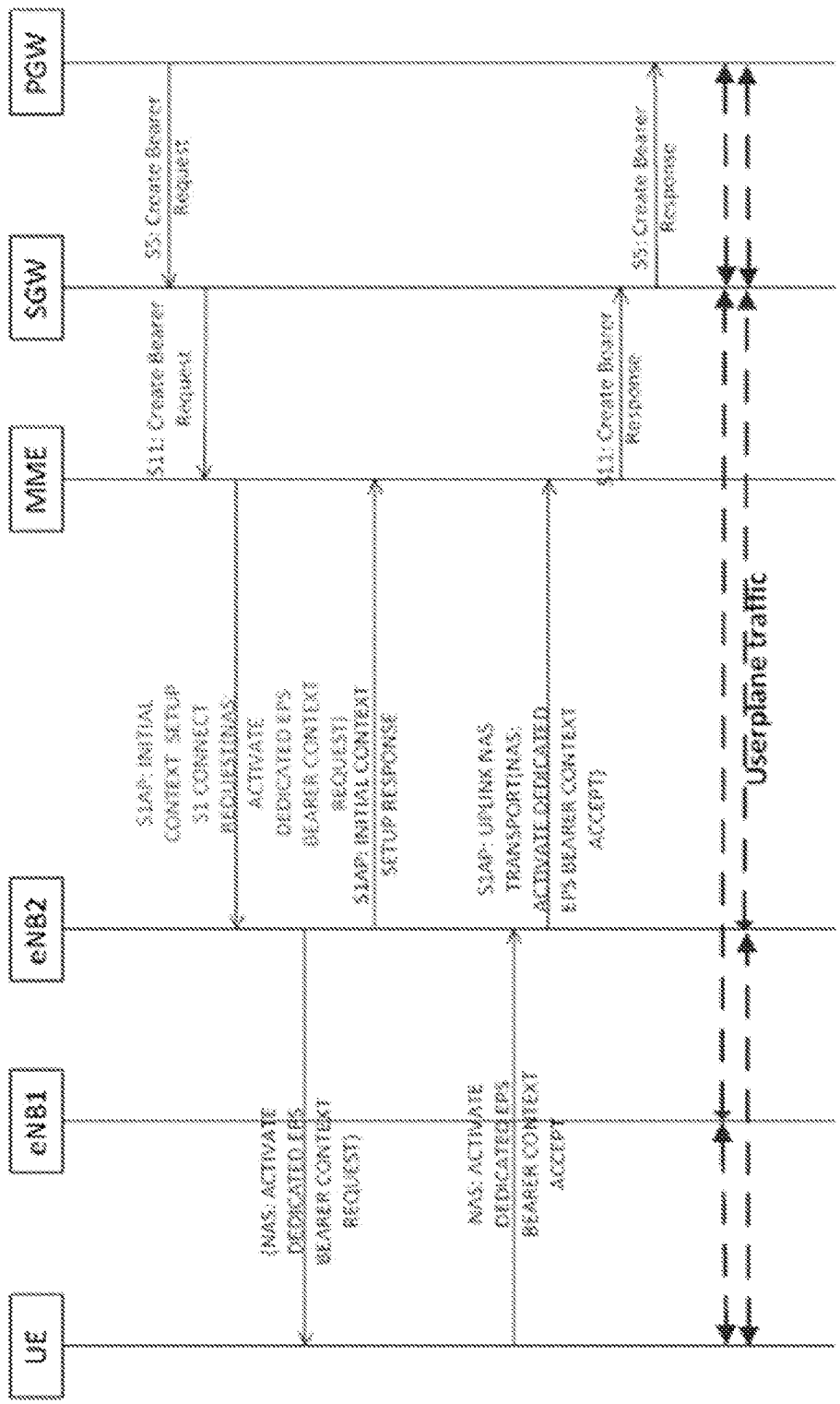

A method or procedure for initiating a dedicated bearer activation procedure (e.g. on a secondary eNB with a RRC connection established with the UE) at a PGW may be performed as described herein (e.g. and shown in FIG. 58). Initially, RRC connections between the UE and the eNB1 and the eNB2 may be established or set up. Additionally, the MME may have other eNBs the UE may be connected to and the eNB1 and eNB2 may be served by the same SGW.

In an example embodiment, the eNB2 (e.g. the secondary eNB) may map the UE from S-TMSI received from the MME. After the attach procedure, the UE may update each the eNBs with its S-TMSI. A RRC re-establishment or other RRC procedure with the eNBs other than primary eNB to update eNBs with S-TMSI may be performed.

Various messages may be provided and/or used to perform a PGW initiated dedicated bearer activation procedure such as a S1AP: INITIAL CONTEXT SETUP S1 CONNECT REQUEST or INITIAL CONTEXT SETUP S1 CONNECT REQUEST, and the like. Such a message may be sent by the MME to request the setup of a UE context and may include a direction such as MME→eNB and/or additional information.

TABLE 8

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| S-TMSI | O | | 9.2.3.6 | | YES | reject |
| UE Aggregate Maximum Bit Rate | M | | 9.2.1.20 | | YES | reject |
| E-RAB to Be Setup List | M | | | | YES | reject |
| >E-RAB to Be Setup Item IEs | | 1 to <maxnoofE-RABs> | | | EACH | reject |
| >>E-RAB ID | M | | 9.2.1.2 | | — | |
| >>E-RAB Level QoS Parameters | M | | 9.2.1.15 | Includes QoS parameters | — | |
| >>Transport Layer Address | M | | 9.2.2.1 | | — | |
| >>GTP-TEID | M | | 9.2.2.2 | | — | |
| >>NAS- | O | | 9.2.3.5 | | — | |

TABLE 8-continued

| PDU | | | | | |
|---|---|---|---|---|---|
| UE Security Capabilities | M | 9.2.1.40 | | YES | reject |
| Security Key | M | 9.2.1.41 | The KeNB may be provided after the key-generation in the MME. | YES | reject |
| Trace Activation | O | 9.2.1.4 | | YES | ignore |
| Handover Restriction List | O | 9.2.1.22 | | YES | Ignore |
| UE Radio Capability | O | 9.2.1.27 | | YES | Ignore |
| Subscriber Profile ID for RAT/Frequency priority | O | 9.2.1.39 | | YES | Ignore |
| CS Fallback Indicator | O | 9.2.3.21 | | YES | reject |
| SRVCC Operation Possible | O | 9.2.1.58 | | YES | ignore |

| Range bound | Explanation |
|---|---|
| maxnoofE-RABs | Maximum no. of E-RAB allowed towards one UE, the maximum value is 256. |

The PGW may then send across S5: Create Bearer Request to SGW with the LBI, EPS bearer id:0, and/or PGW S5-U PGW TEID. By sending the EPS bearer id:0, the PGW may expect the MME to assign a proper bearer id. Additionally, the SGW may send the S11: Create Bearer Request to the MME, by including LBI, EPS bearer id:0 and S1-U SGW TEID (SGW_TEID2). By sending the EPS bearer id:0, the SGW may expect the MME to assign a proper bearer id.

In an embodiment, the MME may identify an unused bearer (id:6) and may send across a S1AP: INITIAL CONTEXT SETUP S1 CONNECT REQUEST (NAS: ACTIVATE DEDICATED EPS BEARER CONTEXT REQUEST) to the eNB2. The MME may have the list of the eNB IDs (Global eNB ID) the UE may be connected to. The MME may select an eNB from the list that may be served by the SGW that may be sending the S11: Create Bearer Request and may send across the S1AP: INITIAL CONTEXT SETUP S1 CONNECT REQUEST (NAS: ACTIVATE DEDICATED EPS BEARER CONTEXT REQUEST). The MME may create a S1 logical connection and may include a MME UE S1AP ID2(MME UE S1AP ID) in the message, as there may be no S1 logical connection from the MME to eNB2. The S1AP: INITIAL CONTEXT SETUP S1 CONNECT REQUEST may have a bearer id:6, Qos, and/or SGW S1-U TEID (SGW_TEID2) for such a bearer. The dedicated bearer may have the same IP address of the default bearer of such a PDN connection (e.g. as shown in FIG. 46 that may illustrate logical S1-connections for UE across multiple eNBs).

The eNB2 may identify a unique eNB2 UE S1AP ID1 (eNB UE S1AP ID) for the newly created S1 logical connection and may set up the EPS bearer id:6 and may forward NAS: ACTIVATE DEDICATED EPS BEARER CONTEXT REQUEST, (bearer id: 6), and the like to the UE.

After establishing the bearer on the eNB2, it may send a S1AP: INITIAL CONTEXT SETUP RESPONSE, (bearer id: 6) to the MME by including its S1-U IP and TEID (eNB2_TEID1). The S1AP: INITIAL CONTEXT SETUP RESPONSE may have the list of bearers that may have been successfully setup on the eNB2 and newly created eNB2 UE S1AP ID1.

The UE may establish the bearer and may send across NAS: ACTIVATE DEDICATED EPS BEARER CONTEXT ACCEPT, (bearer id: 6) to the eNB2. The eNB2 may send the S1AP: UPLINK NAS TRANSPORT (NAS: ACTIVATE DEDICATED EPS BEARER CONTEXT ACCEPT), (bearer id: 6) message to the MME. The MME may send across the S11: Create Bearer Response (bearer id:6) to the SGW. The MME may include eNB2's S1-U IP and eNB2_TEID1 in the message as well as the LBI (default bearer). The SGW may then send across the S5: Create Bearer Response (bearer id:6) to the PGW. The SGW may include LBI (default bearer) in such a message.

After performing a PDW initiated dedicated bearer activation (e.g. on a secondary eNB and RRC connection), user plan traffic may be routed. For example, the eNB2 may send uplink user plane data (UL) or UL user data to the SGW on S1-U using SGW's IP address and SGW_TEID2. Additionally, the SGW may send downlink user plane data (DL) or DL user data to the eNB2 on S1-U using eNB2's IP address and eNB2_TEID1.

Figure 59:
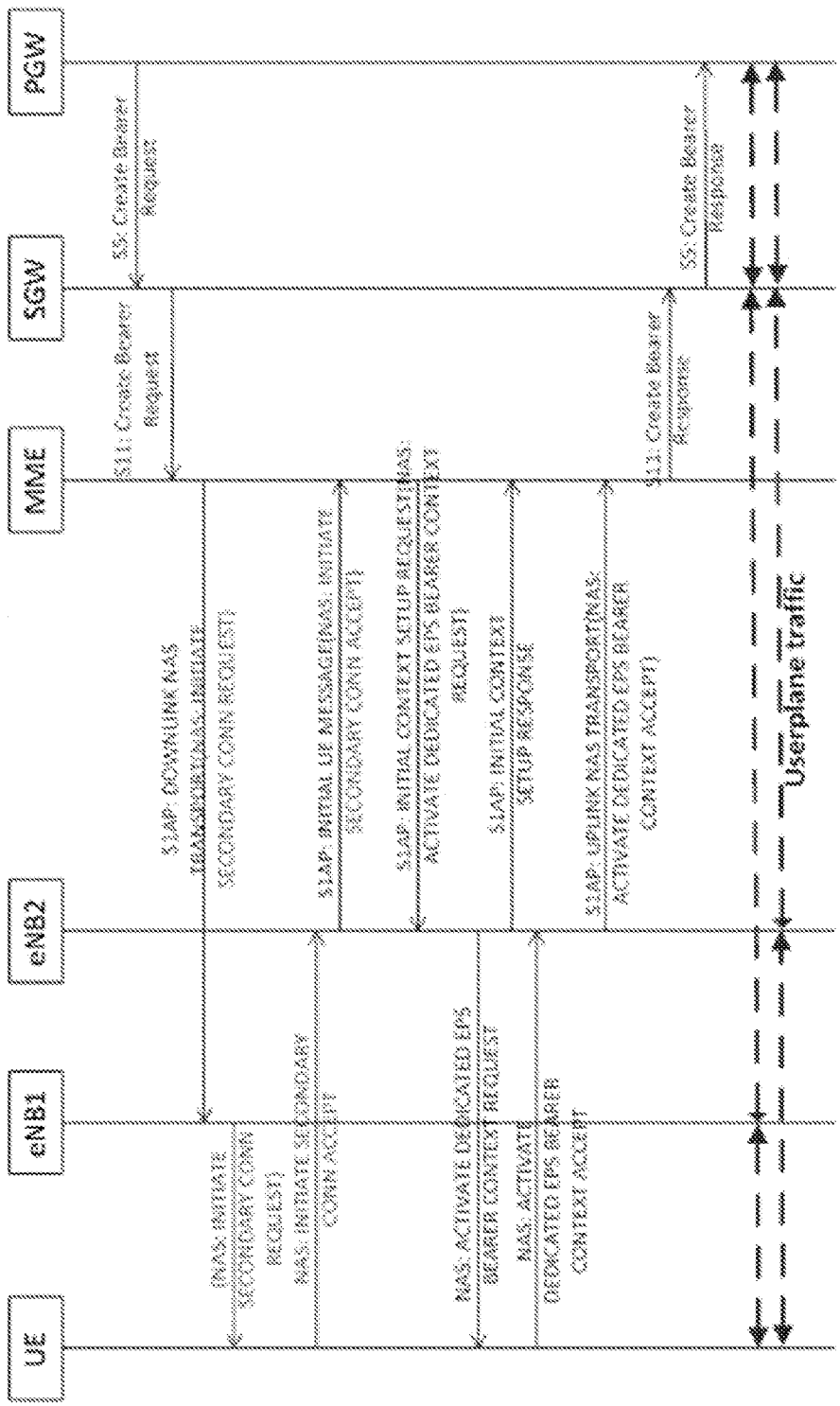

In additional embodiments, a PGW initiated dedicated bearer activation, for example, on a secondary eNB via a primary (attach) eNB where an RRC may be established with the UE may be provided, performed, and/or used (e.g. as shown in FIG. 59). In such an embodiment, default and dedicated bearers of a PDN connection may have the same IP address and different bearer ids. Such bearers may have the same IP address even if they may be spread across different (H)eNBs.

In example embodiments, the PGW initiated dedicated bearer activation, for example, on the secondary eNB via the primary (attach) eNB with a RRC connection may use an attach and/or registration procedure as described herein, a dedicated bearer activation, modification, and/or deactivation on multiple interfaces, capability to have default and dedicated bearers of a PDN across (H)eNBs load balancing including distribution of dedicated bearers across (H)eNBs, service request, and the like.

The PGW may initiate a dedicated bearer activation procedure to establish a dedicated bearer procedure with the UE to push a QoS profile. The PGW may include the LB I (default bearer) in the S5:Create Bearer Request to inform the network (e.g. the MME or SGW) that the new dedicated bearer may be associated with the LBI of the PDN connection.

A method or procedure for initiating a dedicated bearer activation procedure (e.g. on a secondary eNB via a primary (attach) eNB and RRC connection) at a PGW may be performed as described herein (e.g. and shown in FIG. 59). Initially, RRC connections between the UE and the eNB1 and the eNB2 may be established or set up. Additionally, the MME may not have other eNBs details that the UE may be connected to and the eNB1 and eNB2 may be served by the same SGW.

Various messages or information may be provided and/or used to perform a PGW initiated dedicated bearer activation procedure such as a NAS: INITIATE SECONDARY CONN REQUEST. Such a message may be sent by the MME and may be used to request the UE to initiate a secondary connection from the UE to MME. In such an embodiment, as there may be a RRC connection available, for example, from the UE to eNB2, a S1 logical connection may be established from eNB2 to MME. Such a message may include a direction such as MME→UE, a message format, a list of eNBs that may be served by the SGW, and/or information in Table 9.

TABLE 9

INITIATE SECONDARY CONN REQUEST message content

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Initiate secondary conn request message identity | Message type 9.8 (TBD) | M | V | 1 |
| | Supported eNBs | 1 . . . <maxnoofeNBs> | M | V | 1 |
| | > Global eNB ID | 9.2.1.37 (3GPP 36.413) | M | V | 1 |

The messages may also include a NAS: INITIATE SECONDARY CONN ACCEPT. Such a message may be sent by the UE to the MME after making sure that it may have selected a secondary eNB from the eNB list that may be provided in NAS: INITIATE SECONDARY CONN REQUEST and may establish a RRC connection with it. Such a message may include a direction such as UE→MME, a message formation, and/or information shown in Table 10.

TABLE 10

INITIATE SECONDARY CONN ACCEPT message content

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Initiate secondary conn accept message identity | Message type 9.8 (TBD) | M | V | 1 |

The messages may also include a NAS: INITIATE SECONDARY CONN REJECT. Such a message may be sent when the UE may not have a RRC connection to the eNBs mentioned in the NAS: INITIATE SECONDARY CONN REQUEST. The UE may send the NAS: INITIATE SECONDARY CONN REJECT to the MME via the eNB1. After receiving the NAS: INITIATE SECONDARY CONN REJECT from the MME, the MME may try to establish the dedicated bearer on the eNB1 by sending a S1AP: E-RAB SETUP REQUEST. Such a message may include a direction such as UE→MME, a message format, and/or information shown in Table 11.

TABLE 11

INITIATE SECONDARY CONN REJECT message content

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Initiate secondary conn reject message identity | Message type 9.8 (TBD) | M | V | 1 |

To perform a PGW initiated dedicated bearer activation (e.g. with a secondary eNB via a primary (attach) eNB and a RRC connection established with the UE, the PGW may send across a S5: Create Bearer Request to the SGW by including the LBI, EPS bearer id:0, and PGW S5-U PGW TEID. By sending the EPS bearer id:0, the PGW may expect the MME to assign a proper bearer id.

The SGW may further send the S11: Create Bearer Request to MME by including the LBI, EPS bearer id:0, and S1-U SGW TEID (SGW_TEID2). By sending the EPS bearer id:0, the SGW may expect the MME to assign a proper bearer id.

As there may no other eNB associated with the UE that may be served by the SGW, the MME may send across the S1AP: DOWNLINK NAS TRANSPORT(NAS: INITIATE SECONDARY CONN REQUEST) to the eNB1. The MME may include the list of eNBs that may be served by the SGW in the NAS: INITIATE SECONDARY CONN REQUEST message. In an embodiment, there may be a limit on the number of eNBs that may be included in the NAS: INITIATE SECONDARY CONN REQUEST message.

The eNB1 may forward the NAS: INITIATE SECONDARY CONN REQUEST to the UE. The UE may then select an eNB (e.g. the eNB2) from the list included in NAS: INITIATE SECONDARY CONN REQUEST, to which it may have a RRC connection available or already established. The UE may send across the NAS: INITIATE SECONDARY CONN ACCEPT to the selected eNB (e.g.

the eNB2). The UE may include a S-TMSI along with the NAS message as the UE may be sending the NAS message for the first time on the eNB2. In an embodiment (e.g. when the UE may not find the eNB from the list included in the NAS: INITIATE SECONDARY CONN REQUEST to which it may have or may establish an RRC connection), the UE may send across the NAS: INITIATE SECONDARY CONN REJECT to the eNB1 in a S1AP: UPLINK NAS TRANSPORT message. If the MME may receive a NAS: INITIATE SECONDARY CONN REJECT, the MME may try to setup the dedicated bearer on the eNB1 by sending a S11AP:E-RAB SETUP REQUEST, if MME may see that the eNB1 may be free. Otherwise, the MME may fail the dedicated bearer procedure by sending a result code with "No Resource Available" in the S11: Create bearer Response.

As there may be no S1 logical connection from the eNB2 to the MME, the eNB2 may create a S1 logical connection and may send across a S1AP: INITIAL UE MESSAGE (NAS: INITIATE SECONDARY CONN ACCEPT) to the MME. The eNB2 may include the eNB2 UE S1AP ID1 created for the newly created S1 logical connection.

The MME may identify an unused bearer (id:6) and may send across a S1AP: E-RAB SETUP REQUEST (NAS: ACTIVATE DEDICATED EPS BEARER CONTEXT REQUEST) to the eNB2. The S1AP: INITIAL CONTEXT SETUP REQUEST may have a bearer id:6, Qos, and SGW S1-U TEID (SGW_TEID2) for such a bearer. The dedicated bearer may also have the same IP address of the default bearer of the PDN connection. The MME may set 'MME UE S1AP ID' to MME UE S1AP ID2 and 'eNB UE S1AP ID' to 'eNB2 UE S1AP ID1' as there may be no S1-MME logical connection from the eNB2-MME (e.g. as shown in FIG. 46 that may illustrate logical S1-connections for UE across multiple eNBs). The eNB2 may also set up a EPS bearer id:6, and may forward a NAS: ACTIVATE DEDICATED EPS BEARER CONTEXT REQUEST, (bearer id: 6) to the UE.

After establishing the bearer on the eNB1, it (e.g. the eNB2) may send a S1AP: INITIAL CONTEXT SETUP RESPONSE, (bearer id: 6) to the MME by including its S1-U IP and TEID (eNB2_TEID1). The S1AP: INITIAL CONTEXT SETUP RESPONSE may have the list of bearers that may have been successfully setup on eNB2.

The UE may then establish the bearer and may send across NAS: ACTIVATE DEDICATED EPS BEARER CONTEXT ACCEPT, (bearer id: 6) to the eNB2. The eNB2 may then send a S1AP: UPLINK NAS TRANSPORT (NAS: ACTIVATE DEDICATED EPS BEARER CONTEXT ACCEPT), (bearer id: 6) message to the MME.

The MME may send across a S11: Create Bearer Response (bearer id:6) to the SGW. In an embodiment, the MME may include eNB2's S1-U IP and eNB2_TEID1 in the message as well as the LBI (default bearer). The SGW may send across S5:Create Bearer Response (bearer id:6) to the PGW, which may include the LBI (default bearer).

After performing a PGW initiated dedicated bearer activation as described above, user plan traffic may be routed. For example, the eNB2 may send uplink user plane data (UL) or UL user data to the SGW on S1-U using SGW's IP address and SGW_TEID2. Additionally, the SGW may send downlink user plane data (DL) or DL user data to the eNB2 on S1-U using eNB1's IP address and eNB2 TEID1.

In embodiments, a PGW initiated dedicated bearer activation, for example, on a secondary eNB via a primary (attach) eNB with no RRC connection established with the UE may be provided, performed, and/or used. In such an embodiment, default and dedicated bearers of a PDN connection may have the same IP address and different bearer ids. Such bearers may have the same IP address even if they may be spread across different (H)eNBs.

In example embodiments, the PGW initiated dedicated bearer activation, for example, on the secondary eNB via the primary (attach) eNB with no RRC connection may use an attach and/or registration procedure as described herein, a dedicated bearer activation, modification, and/or deactivation on multiple interfaces, capability to have default and dedicated bearers of a PDN across (H)eNBs load balancing including distribution of dedicated bearers across (H)eNBs, service request, and the like.

The PGW may initiate a dedicated bearer activation procedure to establish a dedicated bearer procedure with the UE to push a QoS profile. The PGW may include the LBI (default bearer) in the S5:Create Bearer Request to inform the network (e.g. the MME or SGW) that the new dedicated bearer may be associated with the LBI of the PDN connection.

Figure 60:
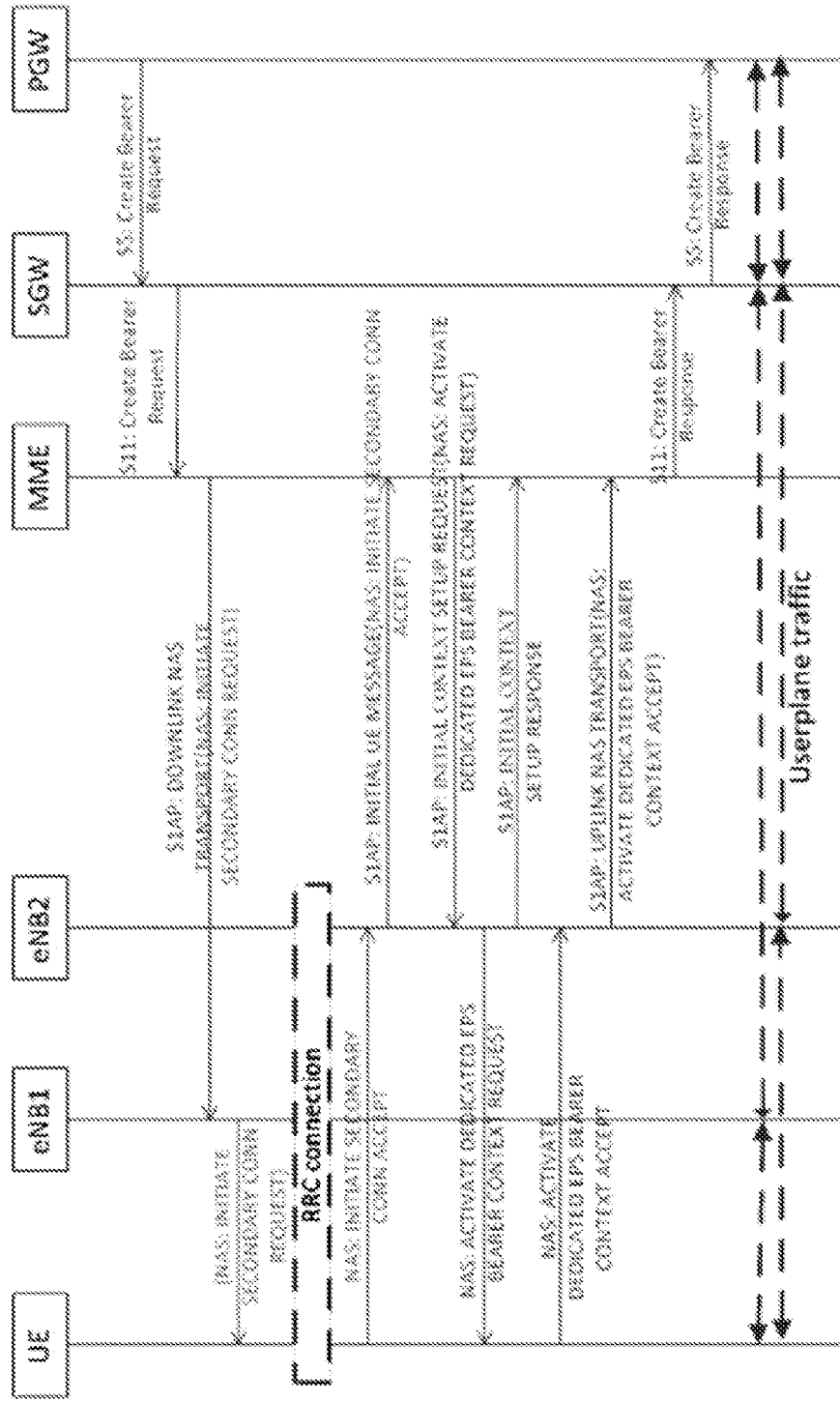

A method or procedure for initiating a dedicated bearer activation procedure (e.g. on a secondary eNB via a primary (attach) eNB and no RRC connection) at a PGW may be performed as described herein (e.g. and shown in FIG. 60). Initially, a RRC connection between the UE and the eNB1 may be established or set up. Additionally, the MME may not have other eNBs details that the UE may be connected to and the eNB1 and eNB2 may be served by the same SGW.

Various messages or information may be provided and/or used to perform a PGW initiated dedicated bearer activation procedure such as a NAS: INITIATE SECONDARY CONN REQUEST. Such a message may be sent by the MME and may be used to request the UE to initiate a secondary connection from the UE to MME. In such an embodiment, as there may not be a RRC connection available, for example, from the UE to eNB2, a S1 logical connection may be established from eNB2 to the MME. Such a message may include a direction such as MME→UE, a message format, a list of eNBs that may be served by the SGW, and/or information in Table 12.

TABLE 12

| INITIATE SECONDARY CONN REQUEST message content | | | | |
|---|---|---|---|---|
| IEI Information Element | Type/Reference | Presence | Format | Length |
| Protocol discriminator | Protocol discriminator 9.2 | M | V | ½ |
| Security header type | Security header type 9.3.1 | M | V | ½ |
| initiate secondary conn request message identity | Message type 9.8 (TBD) | M | V | 1 |
| Supported eNBs | 1 . . . <maxnoofeNBs> | M | V | 1 |
| > Global eNB ID | 9.2.1.37 (3GPP 36.413) | M | V | 1 |

Additionally, the messages may include a NAS: INITIATE SECONDARY CONN ACCEPT. Such a message may sent by the UE to the MME, after making sure that it may have selected a secondary eNB from the eNB list that may be provided in the NAS: INITIATE SECONDARY CONN REQUEST and may have established a RRC connection with it. Such a message may include a direction such as UE→MME, a message format, and/or information in Table 13.

TABLE 13

INITIATE SECONDARY CONN ACCEPT message content

| IEI | Information Element | Type/ Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Initiate secondary conn accept message identity | Message type 9.8 | M | V | 1 |

A NAS: INITIATE SECONDARY CONN REJECT may also be included in the messages. Such a message may be sent when the UE may not have a RRC connection to the eNBs mentioned in NAS: INITIATE SECONDARY CONN REQUEST. The UE may send NAS: INITIATE SECONDARY CONN REJECT to the MME via the eNB1. After receiving the NAS: INITIATE SECONDARY CONN REJECT from the MME, the MME may try to establish the dedicated bearer on the eNB1 by sending a SLAP: E-RAB SETUP REQUEST. Such a message may include a direction such as UE→MME, a message format, and/or information in Table 14.

TABLE 14

INITIATE SECONDARY CONN REJECT message content

| IEI | Information Element | Type/ Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Initiate secondary conn reject message identity | Message type 9.8 | M | V | 1 |

To perform a PGW initiated dedicated bearer activation (e.g. with a secondary eNB via a primary (attach) eNB and no RRC connection established with the UE), in addition to an attach and distributing default and/or dedicated bearers of a PDN across the (H)eNBs, the PGW may send across a S5: Create Bearer Request to the SGW including the LBI, EPS bearer id:0 and PGW S5-U PGW TEID. By sending EPS bearer id:0, the PGW may expect the MME to assign a proper bearer id.

The SGW may send a S11: Create Bearer Request to MME, by including the LBI, EPS bearer id:0 and S1-U SGW TEID (SGW_TEID2). By sending EPS bearer id:0, the SGW may also expect the MME to assign a proper bearer id.

As there may be no other eNB associated with UE that may be served by the SGW, the MME may send across a SLAP: DOWN LINK NAS TRANSPORT(NAS: INITIATE SECONDARY CONN REQUEST) to the eNB1. The MME may include the list of eNBs that may be served by the SGW in the NAS: INITIATE SECONDARY CONN REQUEST message. In an embodiment, there may be a limit on the number of eNBs that may be included in the NAS: INITIATE SECONDARY CONN REQUEST message.

The eNB1 may forward a NAS: INITIATE SECONDARY CONN REQUEST to the UE. The UE may select a eNB (e.g. the eNB2) from the list included in NAS: INITIATE SECONDARY CONN REQUEST, to which it may establish a RRC connection. The UE may then establish a RRC connection to the eNB2. The UE may send across a NAS: INITIATE SECONDARY CONN ACCEPT to the selected eNB (e.g. the eNB2). According to an embodiment, the UE may include S-TMSI along with the NAS message, as UE may be sending the NAS message for the first time on the eNB2. If the UE may not find an eNB from the list included in the NAS: INITIATE SECONDARY CONN REQUEST, to which it may establish RRC connection, the UE may send across a NAS: INITIATE SECONDARY CONN REJECT to the eNB1 in a S1AP: UPLINK NAS TRANSPORT message. If MME may receive a NAS: INITIATE SECONDARY CONN REJECT, the MME may try to setup the dedicated bearer on the eNB1 by sending S1AP:E-RAB SETUP REQUEST, if MME sees that the eNB1 may be free, otherwise the MME may fail the dedicated bearer procedure by sending result code with "No Resource Available" in a S11: Create bearer Response.

As there may not be a S1 logical connection from the eNB2 to MME, the eNB2 may create a S1 logical connection and may send across a S1AP: INITIAL UE MESSAGE (NAS: INITIATE SECONDARY CONN ACCEPT) to the MME. The eNB2 may include eNB2 UE S1AP ID1 created for the newly created S1 logical connection (e.g. in such a message).

The MME may identify unused bearer (id:6) and may send across a S1AP: INITIAL CONTEXT SETUP REQUEST (NAS: ACTIVATE DEDICATED EPS BEARER CONTEXT REQUEST)) to the eNB2. The S1AP: INITIAL CONTEXT SETUP REQUEST may have bearer id:6, Qos, and SGW S1-U TEID (SGW_TEID2) for such a bearer. The dedicated bearer may have the same IP address of the default bearer of this PDN connection. The MME may set 'MME UE S1AP ID' to MME UE S1AP ID2, and 'eNB UE S1AP ID' to 'eNB2 UE S1AP ID1' as there may not be a S1-MME logical connection from eNB2 to MME (e.g. as shown in FIG. 46 that may illustrate logical S1-connections for UE across multiple eNBs).

The eNB2 may set up the EPS bearer id:6, and may forward a NAS: ACTIVATE DEDICATED EPS BEARER CONTEXT REQUEST, (bearer id: 6) to the UE. After establishing the bearer on the eNB1, it (e.g. the eNB1) may send a S1AP: INITIAL CONTEXT SETUP RESPONSE, (bearer id: 6) to the MME by including its S1-U IP and TEID (eNB2_TEID1). The S1AP: INITIAL CONTEXT SETUP RESPONSE may have the list of bearers that may have been successfully setup on the eNB2.

The UE may then establish the bearer and may send across a NAS: ACTIVATE DEDICATED EPS BEARER CONTEXT ACCEPT, (bearer id: 6) to the eNB2. The eNB2 may send a S1AP: UPLINK NAS TRANSPORT (NAS: ACTIVATE DEDICATED EPS BEARER CONTEXT ACCEPT), (bearer id: 6) message to the MME (e.g. in response thereto).

The MME may send across S11: Create Bearer Response (bearer id:6) to the SGW that may include teNB2's S1-U IP and eNB2_TEID1 in and/or the LBI (default bearer) in the message. The SGW may then send across a S5: Create Bearer Response (bearer id:6) to the PGW and the SGW may include the LBI (default bearer) in the message.

User plane traffic may be routed (e.g. after performing the PGW initiated dedicated bearer activation described above and shown in FIG. 60). For example, the eNB2 may send uplink user plane data (UL) or UL user data to the SGW on S1-U using SGW's IP address and SGW_TEID2. Additionally, the SGW may send downlink user plane data (DL) or DL user data to the eNB2 on S1-U using eNB1's IP address and eNB2_TEID1.

Figure 61:
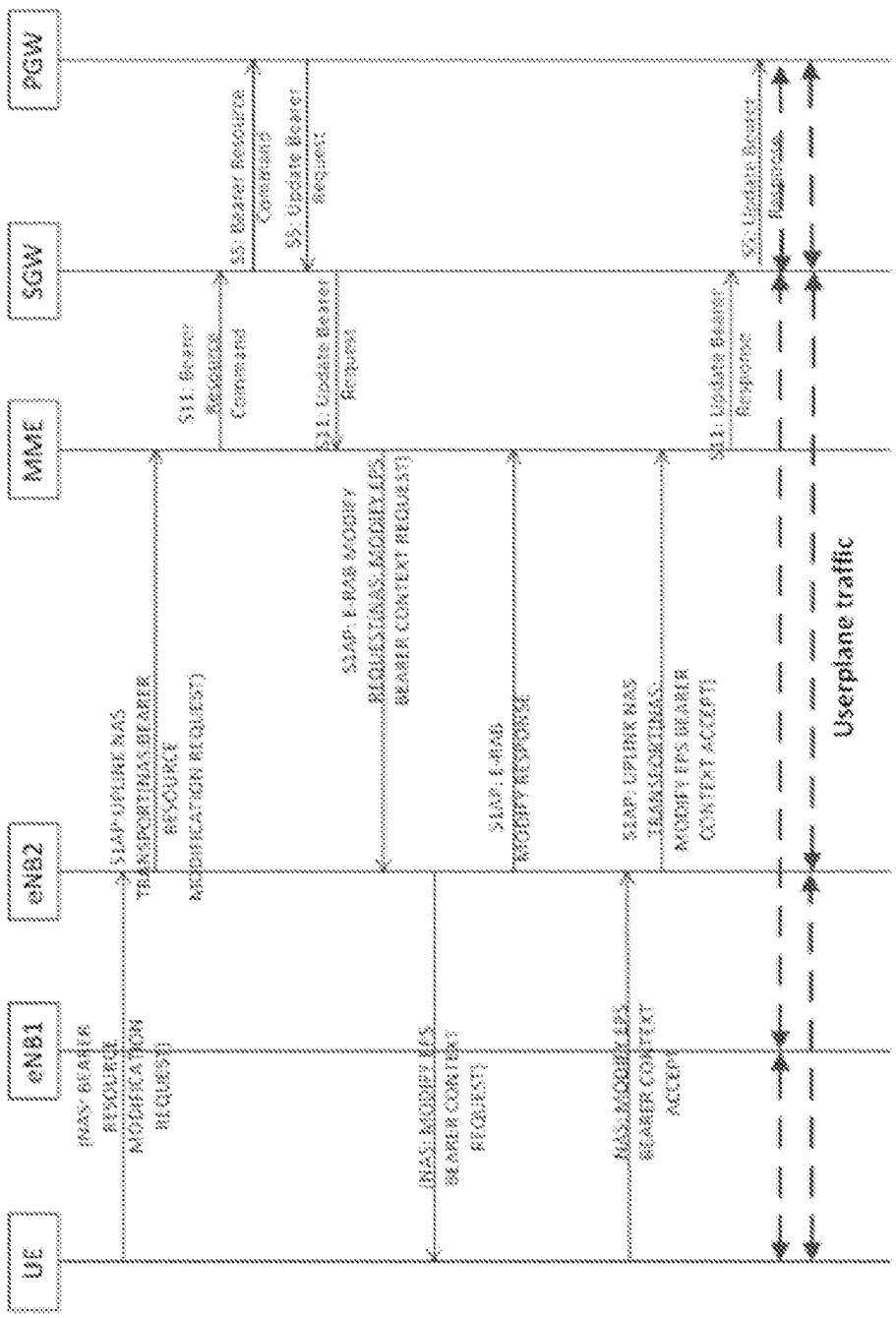
Figure 62:
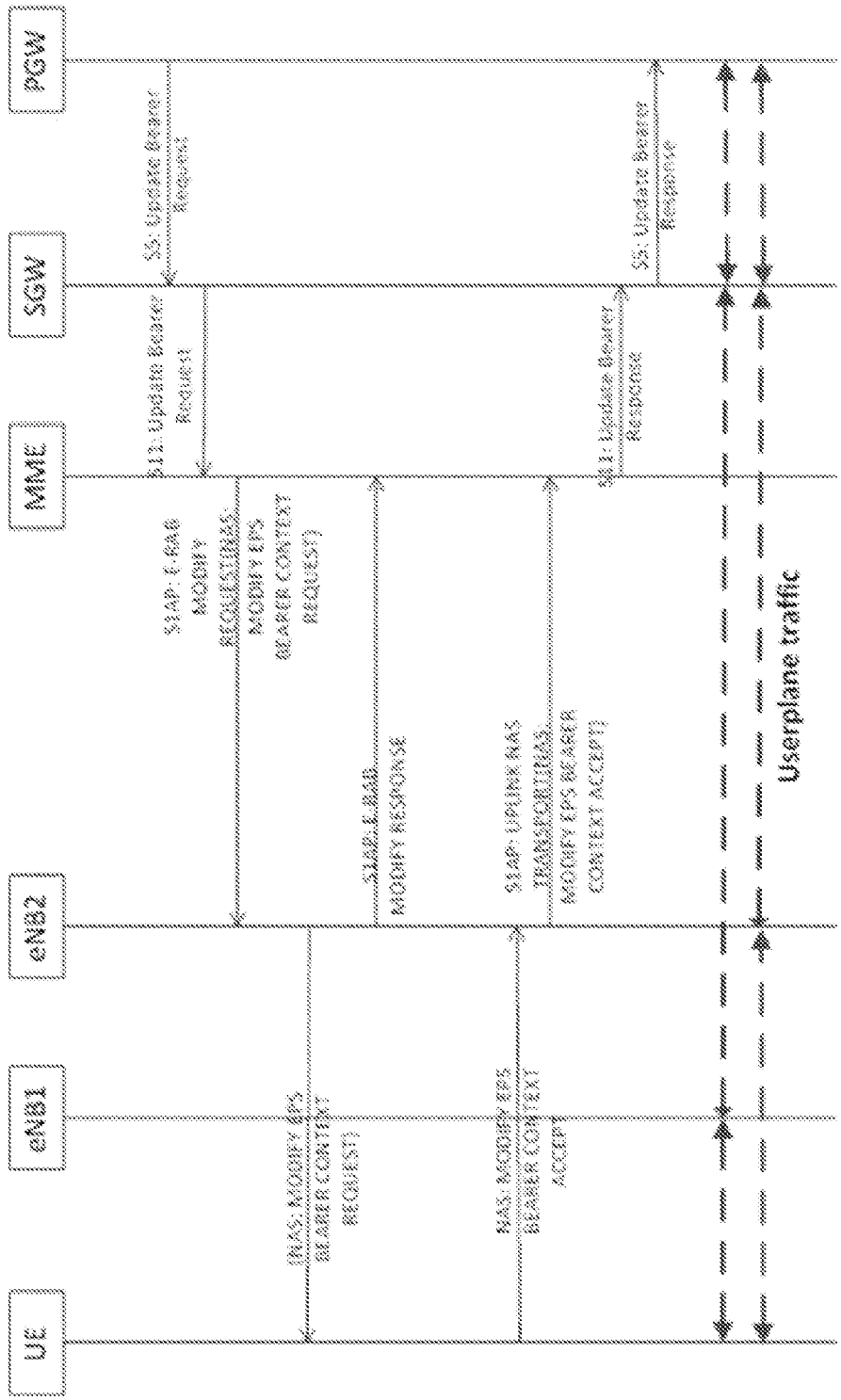
Figure 63:
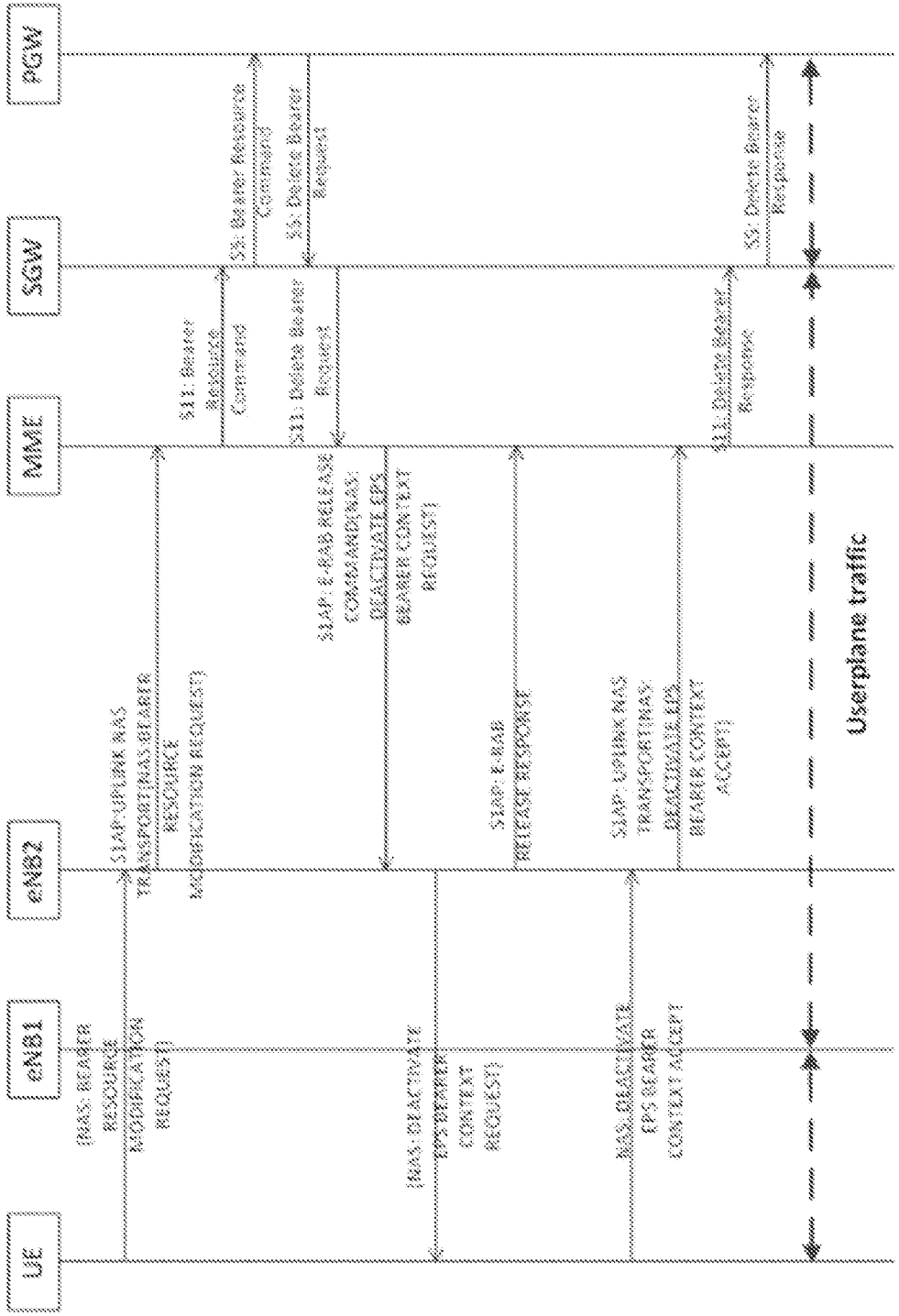
Figure 64:
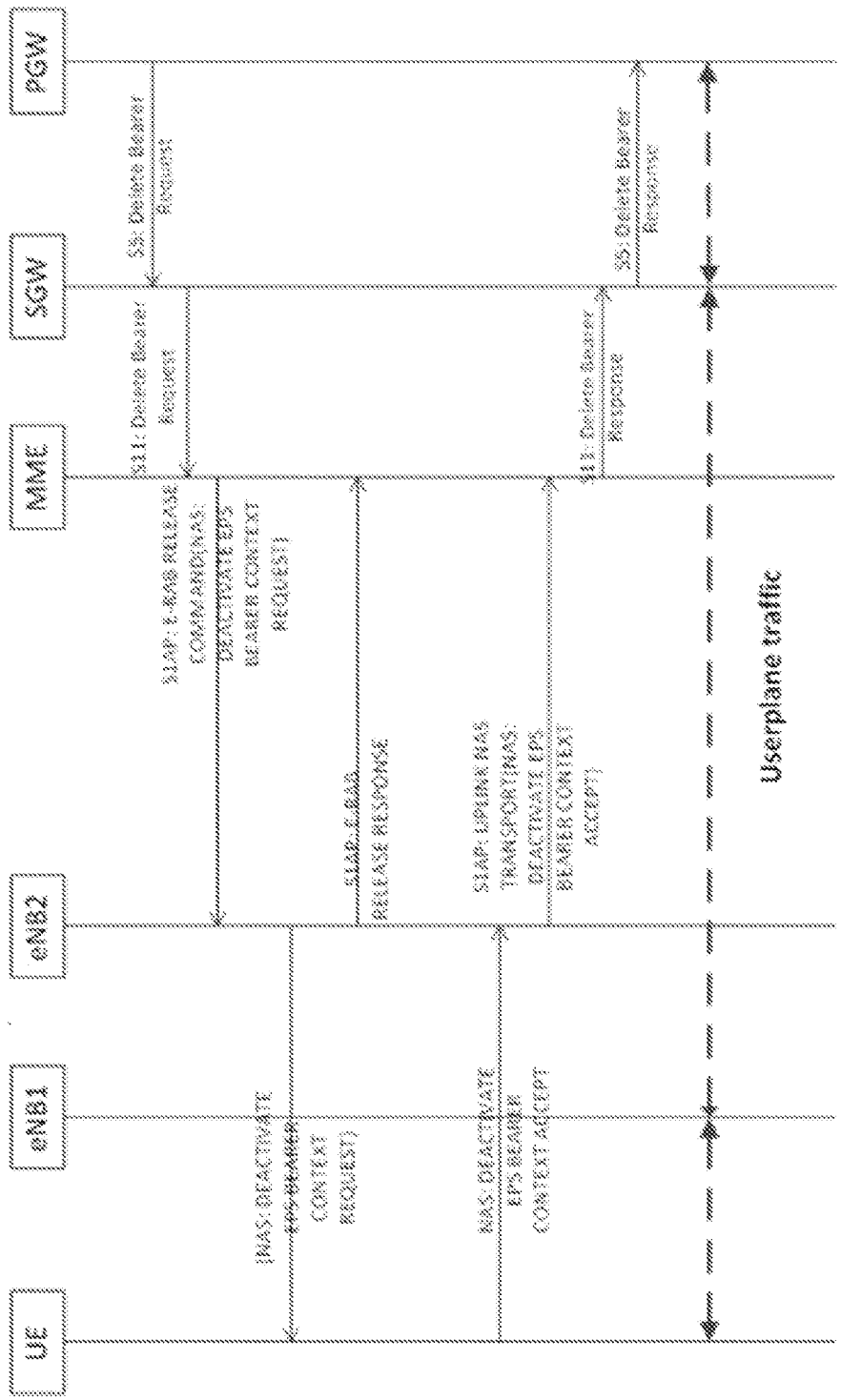

Additionally, in embodiments, a UE initiated dedicated bearer modification (e.g. as shown in FIG. 61), a PGW initiated dedicated bearer modification (e.g. as shown in FIG. 62), a UE dedicated bearer deactivation (e.g. as shown in FIG. 63), a PGW initiated dedicated bearer deactivation (e.g. as shown in FIG. 64), and the like may also be provided, performed, and/or used.

Such a UE initiated dedicated bearer modification (e.g. as shown in FIG. 61), a PGW initiated dedicated bearer modification (e.g. as shown in FIG. 62), a UE dedicated bearer deactivation (e.g. as shown in FIG. 63), a PGW initiated dedicated bearer deactivation (e.g. as shown in FIG. 64), and the like may include or perform an attach and/or registration procedure, a dedicated bearer activation, modification, and/or deactivation on multiple interface, a capability to have default and/or dedicated bearers of a PDN across (H)eNBs load balancing including distribution of dedicated bearers across (H)eNBs as described herein.

According to an example embodiment, a failover and/or re-establishing bearers may be provided, performed, and/or used. For example, the MME may move bearers from one (H)eNB to another (H)eNB when the MME may realize that an (H)eNB may be down. As such, a failover may occur and bearers may be re-established on available interfaces during unavailability of an interface as described herein.

Figure 65:
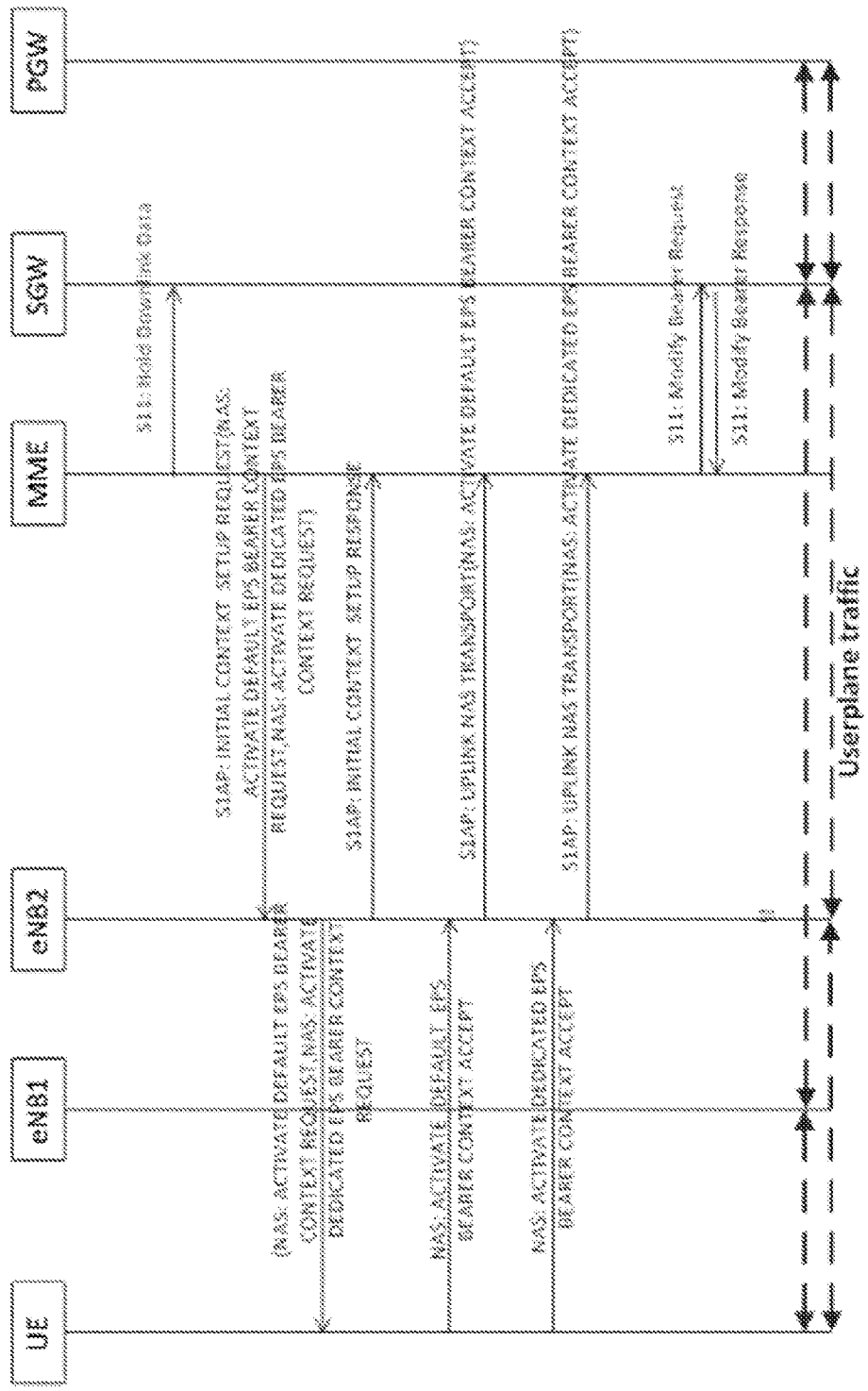

A method or procedure for providing a failover and/or re-establishing bearers may be may be performed as described herein (e.g. and shown in FIG. 65). Initially, RRC connections between the UE and the eNB1 may be established or set up as well as the eNB2. Additionally, default and/or dedicated bearers may be setup on both the eNBs (e.g. eNB1 and eNB2) and the eNBs (e.g. the eNB1 and eNB2) may be served by the same SGW. In an embodiment, the MME may be triggered to reestablish the bearers by any suitable message, indication, procedure, method, and the like.

Various messages or information may be provided and/or used to perform a failover and/or a bearer re-establishment such as a S11: HOLD DOWNLINK DATA. Such a message may be sent by the MME to the SGW to hold downlink data of the bearers at the SGW. The list of bearers may be provided in or along with the message. In an embodiment, such a message may include a direction such as MME→SGW as well as information in Table 15 and/or bearer context information in Table 16. A bearer context may be provided therefor in Table 16.

TABLE 15

Information Elements in S11: HOLD DOWNLINK DATA

| Information elements | P | Condition/Comment | IE Type | Ins. |
|---|---|---|---|---|
| Bearer Contexts to be held | M | Several IEs with the same type and instance value may be included as necessary to represent a list of Bearers to be held. | Bearer Context | 0 |
| Private Extension | O | | Private Extension | VS |

TABLE 16

Bearer Context to be held within Hold Downlink Data

| Octets 1 | Bearer Context IE Type = 93 (decimal) |
|---|---|
| Octets 2 and 3 | Length = n |
| Octets 4 | Spare and Instance fields |

| Information elements | P | Condition/Comment | IE Type | Ins. |
|---|---|---|---|---|
| EPS Bearer ID | M | | EBI | 0 |

To perform a failover and/or re-establishment (e.g. in addition to other procedures and/or methods such as an attach), the MME may determine, detect, and/or realize that the eNB1 may be down. The MME may then send across a S11:Hold Downlink Data with the list of the bearers that may have been established on the eNB1.

The MME may identify a suitable eNB (e.g. the eNB2) and may send across the S1AP: INITIAL CONTEXT SETUP REQUEST (NAS: ACTIVATE DEFAULT EPS BEARER CONTEXT REQUEST, NAS: ACTIVATE DEDICATED EPS BEARER CONTEXT REQUEST) to the eNB2 by including the list of bearers that may have been established on the eNB1.

The eNB2 may set up the EPS bearers and may forward, for example, the ACTIVATE DEFAULT EPS BEARER CONTEXT REQUEST, NAS: ACTIVATE DEDICATED EPS BEARER CONTEXT REQUEST to the UE.

After establishing the bearers on the eNB2, it may send a S1AP: INITIAL CONTEXT SETUP RESPONSE to the MME by including its S1-U IP and TEIDs (eNB2_TEID<x> where x may vary based on the number of bearers that it may setup). The S1AP: INITIAL CONTEXT SETUP RESPONSE may have the list of bearers that may have been successfully setup on the eNB2.

The UE may establish the bearers and may send across, for example, NAS: ACTIVATE DEFAULT EPS BEARER CONTEXT ACCEPT) to the eNB2. The eNB2 may send a S1AP: UPLINK NAS TRANSPORT (NAS: ACTIVATE DEFAULT EPS BEARER CONTEXT ACCEPT) message to the MME.

The UE may then establish the bearers and may send across NAS: ACTIVATE DEDICATED EPS BEARER CONTEXT ACCEPT to the eNB2. The eNB2 may send a S1AP: UPLINK NAS TRANSPORT (NAS: ACTIVATE DEDICATED EPS BEARER CONTEXT ACCEPT) message to the MME.

The MME may then send across a S11: Modify Bearer Request to the SGW that may include eNB2's S1-U IP and eNB2_TEID<x> where x may vary based on the number of bearers that it may set up in the message.

The SGW may send across a S11: Modify Bearer Response to the MME. The SGW may enable or allow the downlink data on the newly created tunnels on the eNB2 for the same bearers.

After performing a failover or re-establishment as described above, user plan data may be routed. For example, the eNB2 may send uplink user plane data (UL) or UL user data to the SGW on S1-U using SGW's IP address and SGW_TEID<x>. In an example embodiment, additionally TEIDs may also be used if more than one bearer may be moved to the eNB2. Additionally, the SGW may send downlink user plane data (DL) or DL user data to the eNB2 on S1-U using eNB2's IP address and eNB2_TEID<x>. Additional TEIDs may be used if more than one bearer may be moved to the eNB2.

Figure 66:
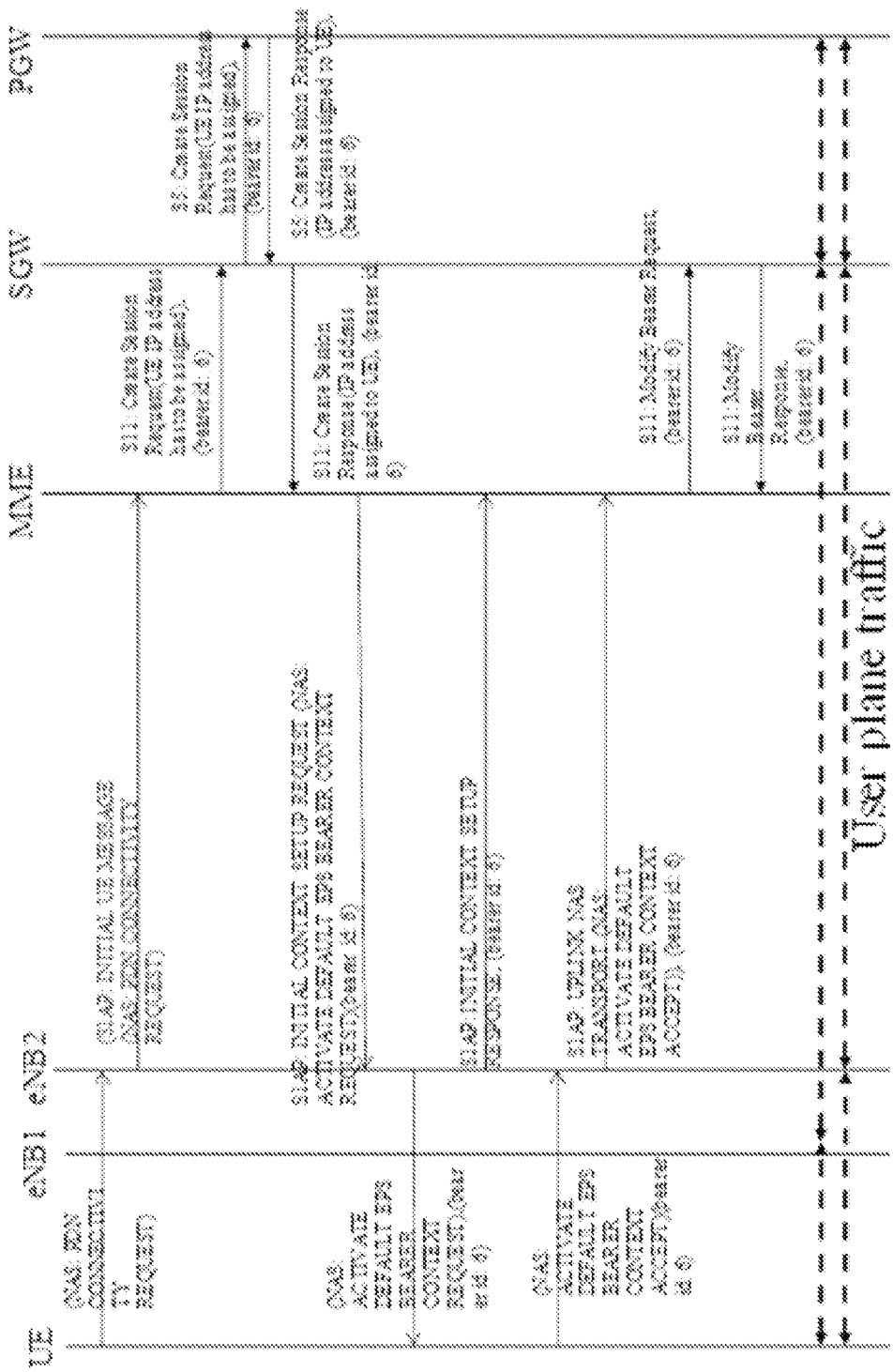
Figure 67:
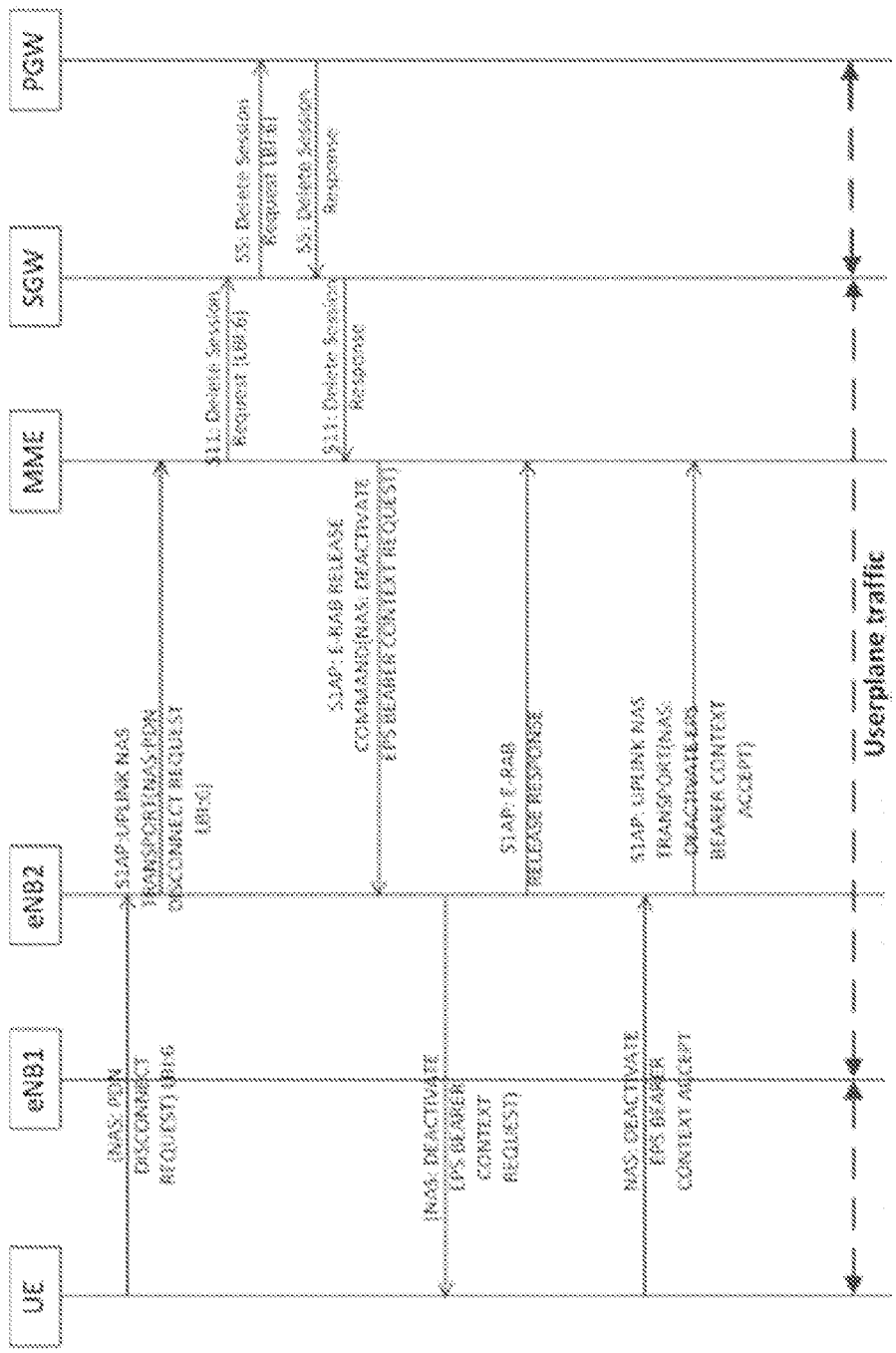
Figure 68:
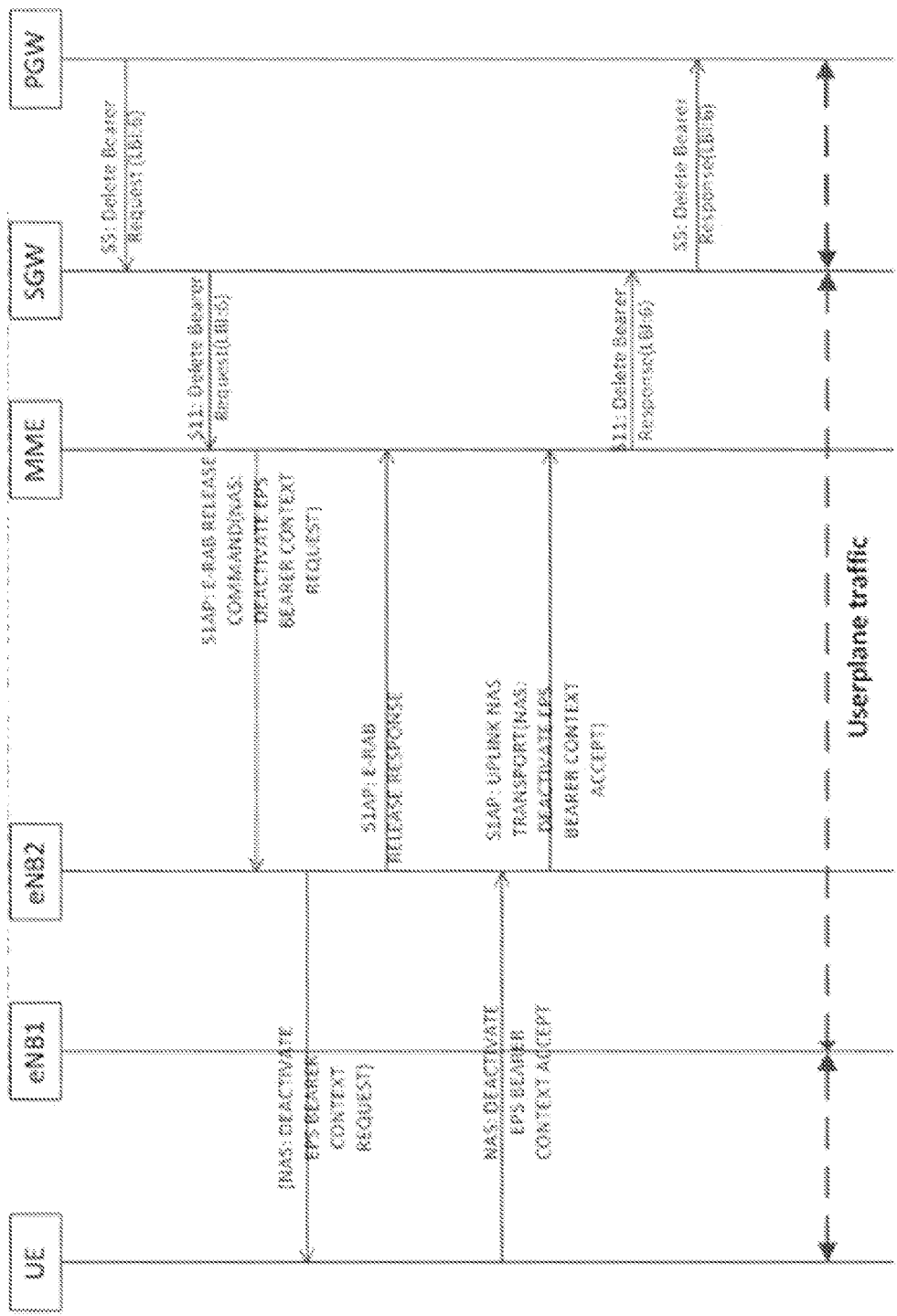

In additional embodiments, PDN connection procedures including a UE initiated PDN connection (e.g. as shown in FIG. 66), a UE initiated PDN disconnect (e.g. as shown in FIG. 67), PGW initiated PDN disconnect (e.g. as shown in FIG. 68), and the like may be provided, performed, and/or used. Such PDN connection procedures may perform and/or use a PDN connectivity request on multiple interfaces as well as a PDN disconnect procedure on multiple interface that may be described herein.

or more of its bearers to another eNB (e.g. the eNB2). The MME may then establish the bearers on the eNB2 and may send across a S11:Modify Bearer Request procedure to the SGW to update the new S1-U TEID information. In such an embodiment, there may not be a change to SGW-PGW interface. Once completed, the MME may then release the bearers on the eNB1 and the eNB1 may inform the UE to release the bearers.

Figure 72:
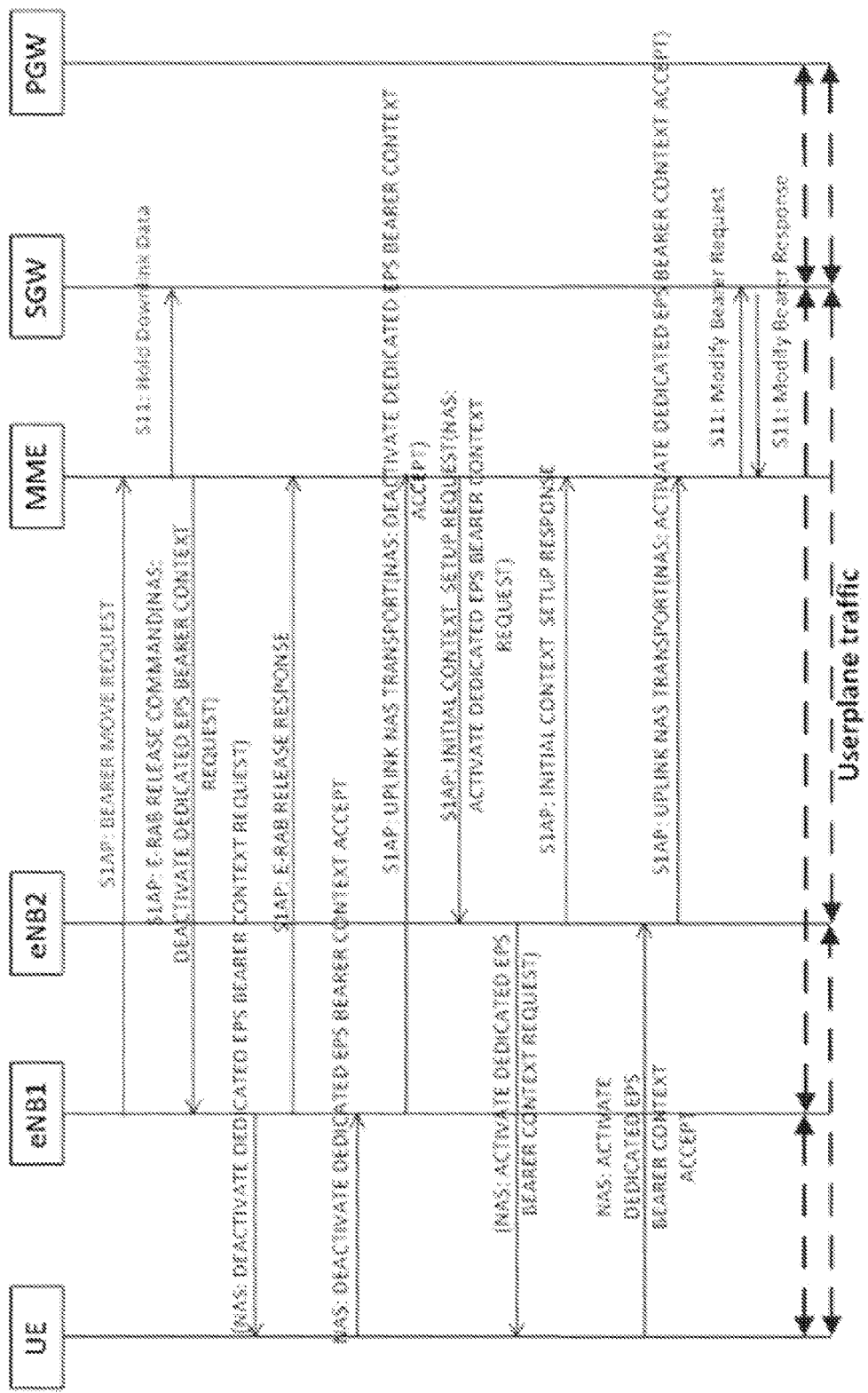
FIGS. 72-76 are example message sequence charts illustrating call flows for performing one or more of procedures or functions described herein.

A method or procedure for initiating bearer mobility at an eNB may be may be performed as described herein (e.g. as shown in FIG. 72). Initially, a RRC connections between the UE and the eNB1 and eNB may be established or set up. Additionally, default and/or dedicated bearers may be set up on both the eNBs (e.g. the eNB1 and eNB2) and the eNBs (e.g. the eNB1 and eNB2) may be served by the same SGW.

In example embodiments, various messages may be provided and/or used for initiating bearer mobility at an eNB such as a S1AP: BEARER MOVE REQUEST. Such a message may be sent by the eNB to the MME to move at least one of the bearers. In an embodiment, the MME may select an idle eNB to move the bearers to and the eNB may include the list of bearers in SLAP: BEARER MOVE REQUEST message. Such a message may include a direction such as eNB→MME and/or additional information.

TABLE 17

| IE/Group Name | Presence | Range | IE type and reference | Semantics description | Criticality | Assigned Criticality |
|---|---|---|---|---|---|---|
| Message Type | M | | 9.2.1.1 | | YES | reject |
| eNB UE S1AP ID | M | | 9.2.3.4 | | YES | reject |
| MME UE S1AP ID | M | | 9.2.3.3 | | YES | reject |
| E-RAB to be Move List | M | | | | YES | reject |
| >E-RAB To Be Move Item IEs | | 1 to <maxnoofE-RABs> | | | EACH | reject |
| >>E-RAB ID | M | | 9.2.1.2 | | — | |

| Range bound | Explanation |
|---|---|
| maxnoofE-RABs | Maximum no. of E-RAB allowed towards one UE, the maximum value may be 256. |

Figure 69:
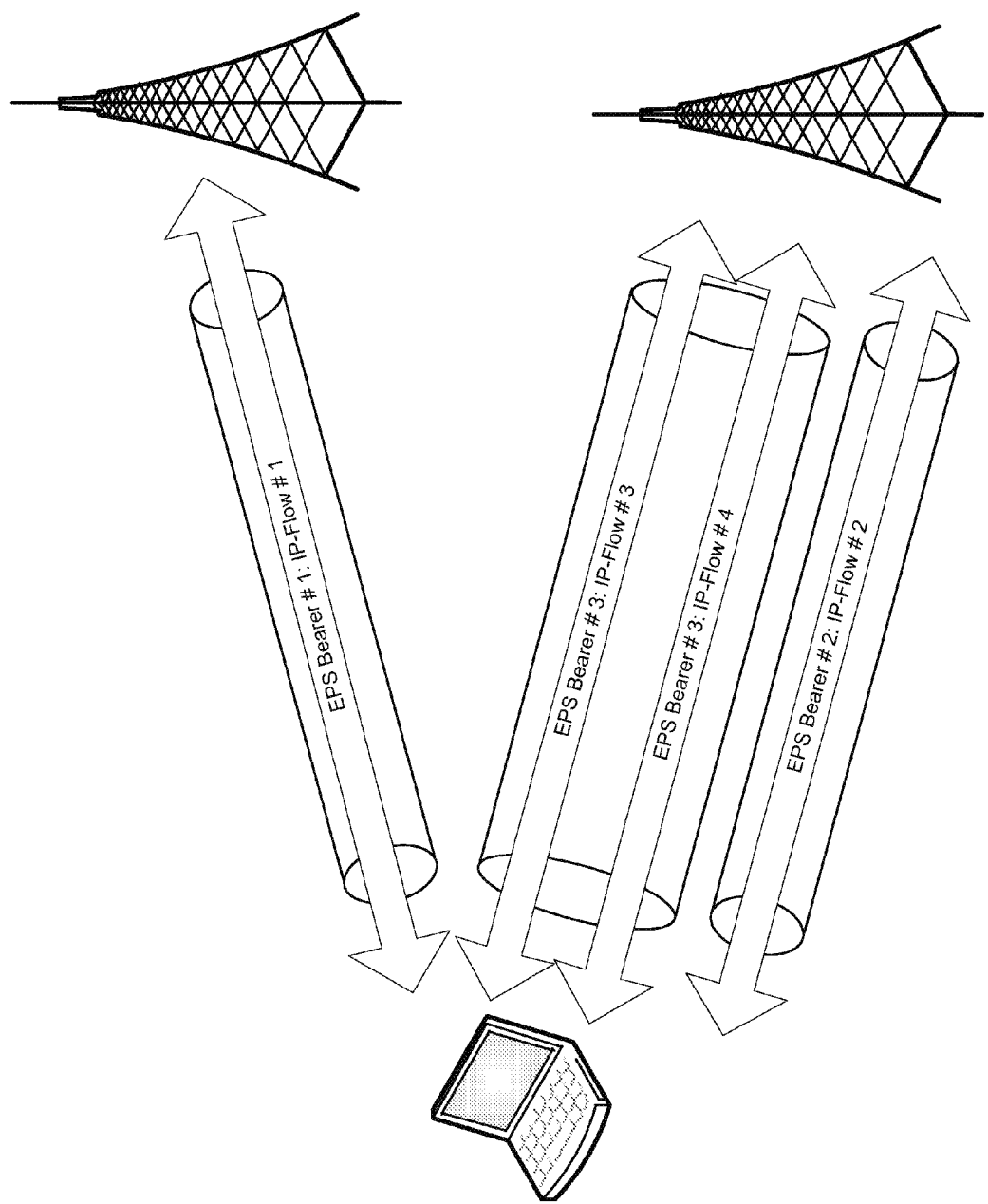
FIG. 69 illustrates an example embodiment of multiple IP flows.
Figure 70:
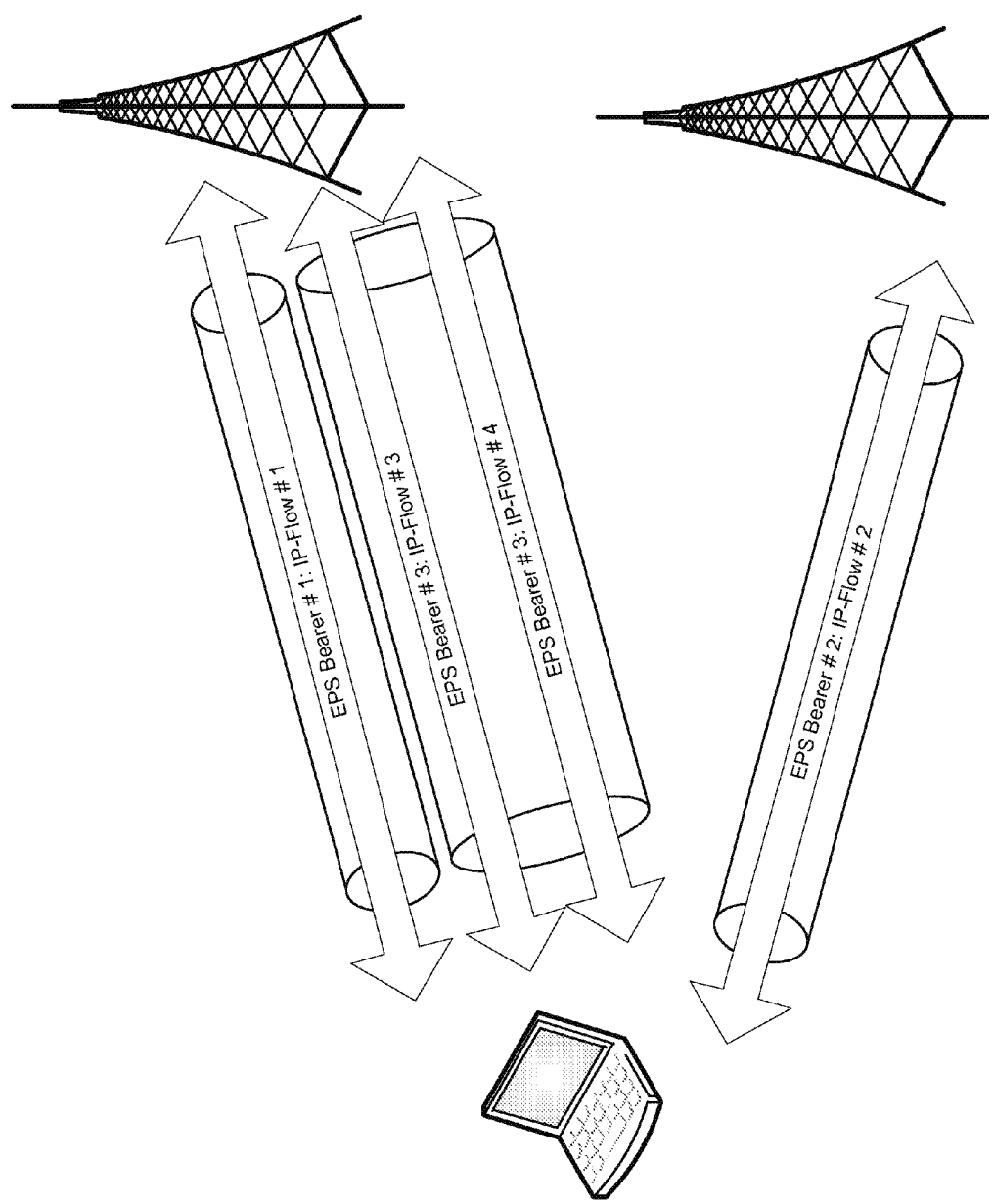
FIG. 70 illustrates an example embodiment of bearer mobility.
Figure 71:
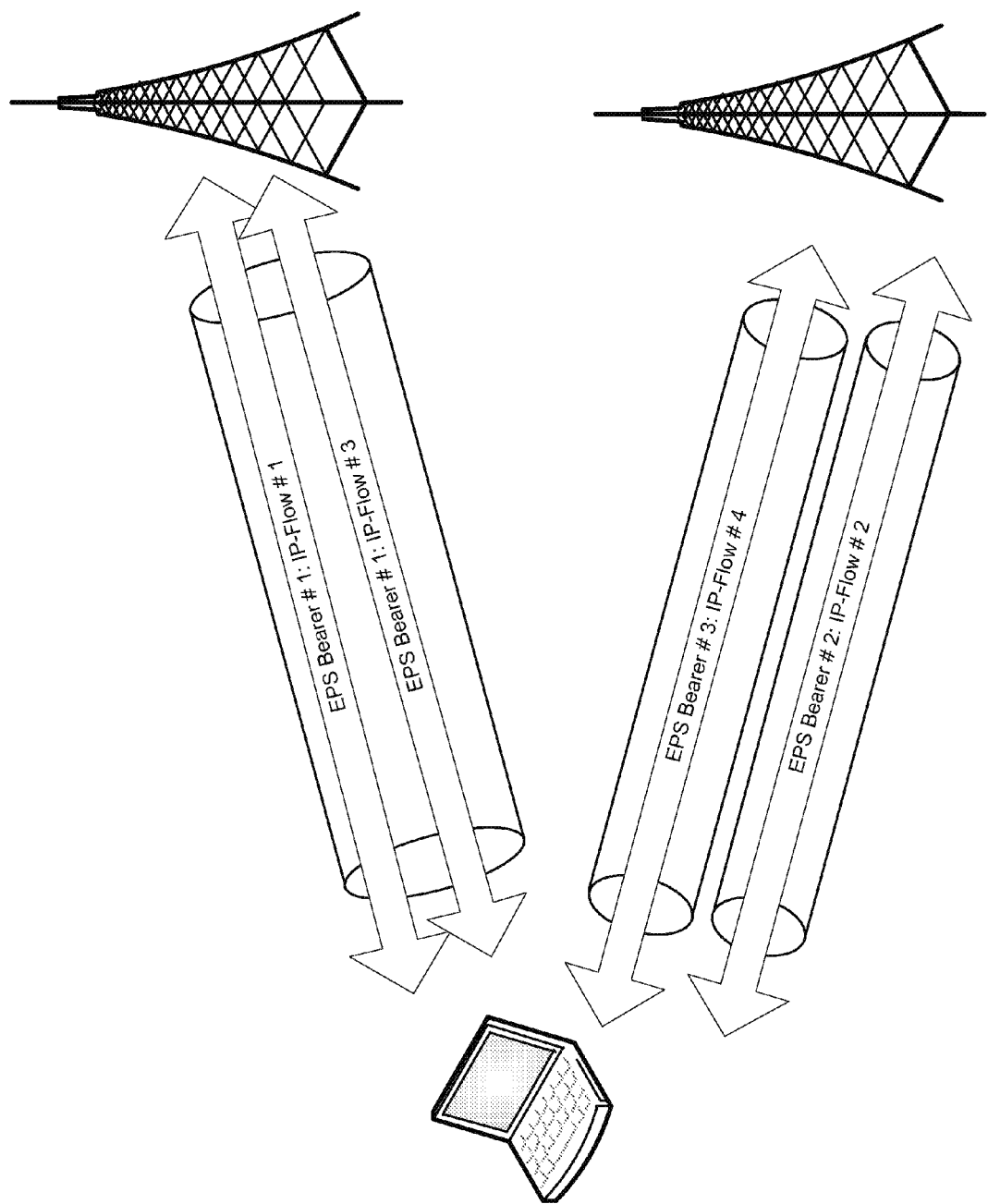
FIG. 71 illustrates an example embodiment of IP flow mobility.

Additionally, bearer mobility and/or IP flow mobility (IFOM) may be provided and/or used (e.g. with multiple RRC connections). FIG. 69 illustrates a simultaneous connection to multiple eNBs (e.g. the eNB1 and eNB2), along with 1 EPS-Bearer via the eNB1 and 2 EPS-Bearers (e.g. EPS-Bearer s2 and 3) via the eNB2. The EPS-Bearers 1 and 2 may carry an IP flow each, whereas EPS-Bearer 3 may carry more than one IP flow as shown therein. In example embodiments, in bearer mobility, a bearer may be moved from one connection or eNB to another connection or eNB such that IP flows associated with that bear being moved may also be moved (e.g. as shown in FIG. 70). IP flow mobility may enable a an IP flow (a single IP flow or a portion thereo) to be moved from an EPS Bearer on an eNB to another EPS Bearer on another eNB to, for example, fine tune bandwidth control (e.g. as shown in FIG. 71).

In an embodiment, an eNB initiated bearer mobility may be provided and/or used. In such an eNB initiated bearer mobility, an eNB (e.g. the eNB1) may determine or discover that there may be an overload condition and it may initiate the bearer mobility method or procedure disclosed herein to move such bearers or move information from such bearers to another connection such as another RRC connection in the multiple RRC connections or another bearer. As such, the eNB (e.g. the eNB1) may inform the MME to move one The messages may also include the S11: HOLD DOWNLINK DATA. Such a message may be sent by the MME to SGW to hold downlink data of the bearers at the SGW. The list of bearers may be provided the message. Such a message may also include a direction such as MME→SGW and/or information in Table 18. A bearer context may be provided therefor in Table 19.

TABLE 18

| Information Elements in S11: HOLD DOWNLINK DATA | | | | |
|---|---|---|---|---|
| Information elements | P | Condition/Comment | IE Type | Ins. |
| Bearer Contexts to be held | M | Several IEs with the same type and instance value may be included as necessary to represent a list of Bearers to be held. | Bearer Context | 0 |
| Private Extension | O | | Private Extension | VS |

TABLE 19

| Bearer Context to be held within Hold Downlink Data | |
|---|---|
| Octets 1 | Bearer Context IE Type = 93 (decimal) |
| Octets 2 and 3 | Length = n |
| Octets 4 | Spare and Instance fields |
| Information elements | P    Condition/Comment    IE Type    Ins. |
| EPS Bearer ID | M    EBI    0 |

To perform an eNB initiated bearer mobility (e.g. in addition to an attach and/or default and/or dedicated bearers of a PDN being distributed across (H)eNBs as described herein), the eNB1 may send across a S1AP: BEARER MOVE REQUEST to the MME, by including the list of bearers that it may wish to move.

The MME may send across a S11:Hold Downlink Data with the list of the bearers it may get or receive from the eNB1 in a S1AP: BEARER MOVE REQUEST. Additionally, the MME may send across a SLAP: E-RAB RELEASE COMMAND (NAS: DEACTIVATE EPS BEARER CONTEXT REQUEST) to the eNB1 with the list of bearers that may have been provided or included in the S1AP: BEARER MOVE REQUEST.

The eNB1 may release the bearer s and may forward a NAS: DEACTIVATE EPS BEARER CONTEXT REQUEST to the UE. After releasing the bearers on the eNB1, it may further send a S1AP: E-RAB RELEASE RESPONSE to the MME. The S1AP: E-RAB RELEASE RESPONSE may include or have the list of bearers that may have been successfully released on the eNB1.

The UE may then release the bearers and may send across a NAS: DEACTIVATE EPS BEARER CONTEXT ACCEPT to the eNB1. After receiving such a message, the eNB1 may send a SLAP: UPLINK NAS TRANSPORT (NAS: DEACTIVATE EPS BEARER CONTEXT ACCEPT)), (bearer id: 6) message to the MME.

The MME may then determine or identify a suitable eNB (e.g. the eNB2) to move to and may send across a S1AP: INITIAL CONTEXT SETUP REQUEST (NAS: ACTIVATE DEDICATED EPS BEARER CONTEXT REQUEST) to the eNB2 by including the list bearers that may have been included in S1AP: BEARER MOVE REQUEST message. In response thereto, the eNB2 may set up the EPS bearers and may forward, for example, a NAS: ACTIVATE DEDICATED EPS BEARER CONTEXT REQUEST to the UE.

After establishing the bearers on eNB2, it (e.g. the eNB2) may send a S1AP: INITIAL CONTEXT SETUP RESPONSE to the MME by including its S1-U IP and TEIDs (eNB2_TEID<x> where x may vary based on the number of bearers that it may setup. The S1AP: INITIAL CONTEXT SETUP RESPONSE may include or have the list of bearers that may have been successfully setup on the eNB2.

The UE may then establish the bearers and may send across a NAS: ACTIVATE DEDICATED EPS BEARER CONTEXT ACCEPT to the eNB2. After receiving such a message, the eNB2 may send a S1AP: UPLINK NAS TRANSPORT (NAS: ACTIVATE DEDICATED EPS BEARER CONTEXT ACCEPT) message to the MME.

In an embodiment, the MME may send across a S11: Modify Bearer Request to the SGW that may include eNB2's S1-U IP and eNB2_TEID<x> where x may vary based on the number of bearers that it would set up) in the message. The SGW may then send across a S11: Modify Bearer Response to the MME and the SGW may enable or allow the downlink data on the newly created tunnels on the eNB2 for the same bearers.

After performing an eNB initiated bearer mobility, user plan data may be routed. For example, the eNB2 may send uplink user plane data (UL) or UL user data to the SGW on S1-U using SGW's IP address and SGW_TEID<x>. As described above, more than one TEID may be used if more than one bearer may be moved to the eNB2. Additionally, the SGW may send downlink user plane data (DL) or DL user data to the eNB2 on S1-U using eNB2's IP address and eNB2_TEID<x>. Similarly, more than one TEID may be used if more than one bearer may be moved to the eNB2.

A MME (or even PGW) initiated bearer mobility may also be provided and/or used as described herein. In an embodiment, based on criteria such as policy or network conditions, and the like, the MME (or PGW) may initiate a bearer mobility. For example, a PGW may send across a S11: Update Bearer Request to the MME via the SGW, to modify QoS and other parameters. Such a procedure or operation may trigger the MME to move one or more bearers from an eNB (e.g. the eNB1) to another eNB (e.g. the eNB2). The MME may establish the bearers on eNB2 and may send across the S11:Modify Bearer Request procedure to SGW to update the new S1-U TEID information. According to an example embodiment, there may not be a change to the SGW-PGW interface. The MME may then release the bearers on the eNB and the eNB1 may inform the UE to release the bearers.

Figure 73:
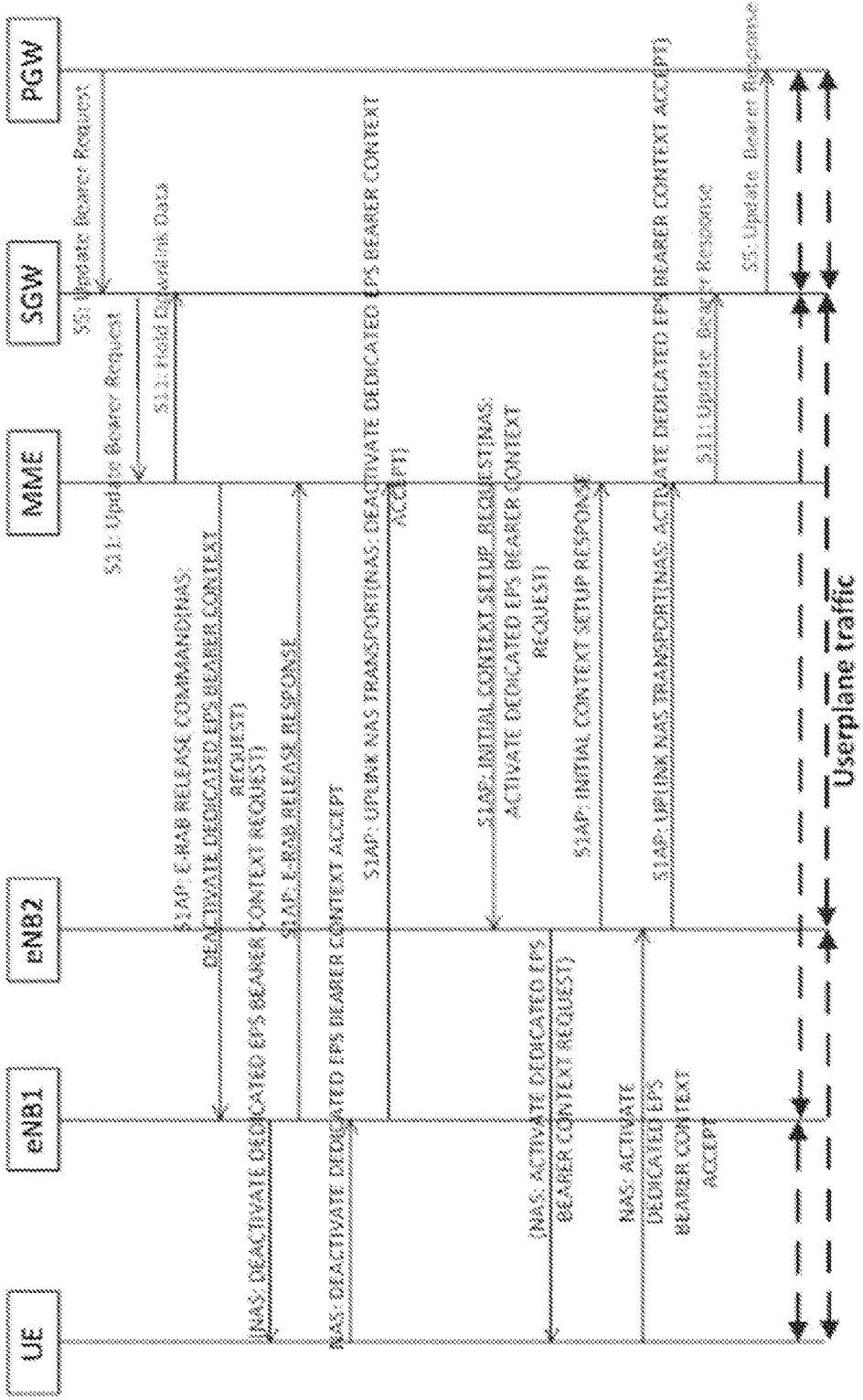

A method or procedure for initiating bearer mobility at a MME may be performed as described herein (e.g. as shown in FIG. 73). Initially, a RRC connections between the UE and the eNB1 and eNB may be established or set up. Additionally, default and/or dedicated bearers may be set up on both the eNBs (e.g. the eNB1 and eNB2) and the eNBs (e.g. the eNB1 and eNB2) may be served by the same SGW.

In example embodiments, various messages may be provided and/or used for initiating bearer mobility at a MME such as a S1AP: INITIAL CONTEXT SETUP REQUEST that may include a modified QoS. For example, a modified QoS from a S11:Update Bearer Request may be inserted or included in S1AP: INITIAL CONTEXT SETUP REQUEST. The modified QoS may then be sent across in a S1AP:E-RAB MODIFY REQUEST (e.g. another message that may be used herein). As the bearers may be setup on the eNB2, the MME may take final changes and may send then across in S1AP: INITIAL CONTEXT SETUP REQUEST message.

Such messages may include a bearer context within an update bearer response (e.g. as shown in Table 20) and may have TEID information. The S1-U eNodeB F-TEID, S1-U SGW F-TEID may be IEs that may be used.

TABLE 20

Bearer Context within Update Bearer Response

| Octet 1 | Bearer Context IE Type = 93 (decimal) |
|---|---|
| Octets 2 and 3 | Length = n |
| Octet 4 | Spare and Instance fields |

| Information elements | P | Condition/Comment | IE Type | Ins. |
|---|---|---|---|---|
| EPS Bearer ID | M | | EBI | 0 |
| Cause | M | This IE Indicates if the bearer handling was successful, and if not, gives information on the reason. | Cause | 0 |
| S1-U eNodeB F-TEID | O | This IE may be sent on the S11 interface if the S1-U interface is used. | F-TEID | 0 |
| S1-U SGW F-TEID | O | This IE may be sent on the S11 interface. It may be used to correlate the bearers with those in the Create Bearer Request. | F-TEID | 1 |
| S12 RNC F-TEID | C | This IE may be included on the S4 interface when direct tunnel flag is set to 1. | F-TEID | 1 |

Another message may include a S1: HOLD DOWN LINK DATA. Such a message may be sent by the MME to the SGW to hold downlink data of the bearers at the SGW. The list of bearers may be provided in the message. Such a message may also include a direction such as MME→SGW and/or information, for example, in Table 21 as well as may provide a bearer context, for example, in Table 22.

TABLE 21

Information Elements in S11: HOLD DOWNLINK DATA

| Information elements | P | Condition/Comment | IE Type | Ins. |
|---|---|---|---|---|
| Bearer Contexts to be held | M | Several IEs with the same type and distance value may be included as necessary to represent a list of Bearers to be held. | Bearer Context | 0 |
| Private Extension | O | | Private Extension | VS |

TABLE 22

Bearer Context to be held within Hold Downlink Data

| Octets 1 | Bearer Context IE Type = 93 (decimal) |
|---|---|
| Octets 2 and 3 | Length = n |
| Octets 4 | Spare and Instance fields |

| Information elements | P | Condition/Comment | IE Type | Ins. |
|---|---|---|---|---|
| EPS Bearer ID | M | | EBI | 0 |

To perform a MME initiated bearer mobility, an attach may be performed and default and dedicated bearers of a PDN may be distributed across (H)eNBs. The PGW may send across a S11: Update Bearer Request message to the SGW with certain QoS parameters and may include dedicated bearers. The SGW may then send across the S11: Update Bearer Request message to the MME.

Based on the QoS parameters that may be received from the SGW, the MME may determine or decide to move the bearers from the eNB1 to another eNB (e.g. the eNB2). The MME may then send across a S11:Hold Downlink Data message to the SGW and a S1AP: E-RAB RELEASE COMMAND (NAS: DEACTIVATE EPS BEARER CONTEXT REQUEST) to the eNB1 with the list of bearers that may be moved from the eNB1.

In response thereto, the eNB1 may release the bearer s and may forward a NAS: DEACTIVATE EPS BEARER CONTEXT REQUEST to the UE. After releasing the bearers on the eNB1, it may send a S1AP: E-RAB RELEASE RESPONSE to the MME. The SLAP: E-RAB RELEASE RESPONSE may include or have the list of bearers that may have been successfully released on the eNB1.

The UE may release the bearers and may send across a NAS: DEACTIVATE EPS BEARER CONTEXT ACCEPT to the eNB1. The eNB1 may send a S1AP: UPLINK NAS TRANSPORT (NAS: DEACTIVATE EPS BEARER CONTEXT ACCEPT)), (bearer id: 6) message to the MME.

The MME may determine or identify a suitable eNB (e.g. the eNB2) and may send across a S1AP: INITIAL CONTEXT SETUP REQUEST (NAS: ACTIVATE DEDICATED EPS BEARER CONTEXT REQUEST)) to the eNB2 by including the list bearers that may have been released on the eNB1 along with modified QoS information.

The eNB2 may set up the EPS bearers and may forward a NAS: ACTIVATE DEDICATED EPS BEARER CONTEXT REQUEST to the UE. After establishing the bearers on the eNB2, it may send a S1AP: INITIAL CONTEXT SETUP RESPONSE to the MME by including its S1-U IP and TEIDs (e.g. eNB2_TEID<x> where x may vary based on the number of bearers that it may setup). The S1AP: INITIAL CONTEXT SETUP RESPONSE may have the list of bearers that may have been successfully setup on the eNB2.

The UE may then establish the bearers and may send across a NAS: ACTIVATE DEDICATED EPS BEARER CONTEXT ACCEPT to the eNB2. The eNB2 may send a SLAP: UPLINK NAS TRANSPORT (NAS: ACTIVATE DEDICATED EPS BEARER CONTEXT ACCEPT) message to the MME.

In response thereto, the MME may send across S11: Update Bearer Response to the SGW. The MME may include, in the message, eNB2's S1-U IP and eNB2_TEID<x> where x may vary based on the number of bearers that it may set up. The SGW may enable or allow the downlink data on the created tunnels on the eNB2 for the same bearers. The SGW may then send across a S11: Update Bearer Response to the PGW.

After providing or performing MME initiated bearer mobility, user plane traffic may be routed. For example, the eNB2 may send uplink user plane data (UL) or UL user data to the SGW on S1-U using SGW's IP address and SGW_TEID<x>. As described above, additional TEIDS may be used if more than one bearer may be moved to the eNB2. Additionally, the SGW may send downlink user plane data (DL) or DL user data t theo eNB2 on S1-U using eNB2's IP address and eNB2_TEID<x>. Similarly, additional TEIDs may be used if more than one bearer may be moved to the eNB2.

Figure 74:
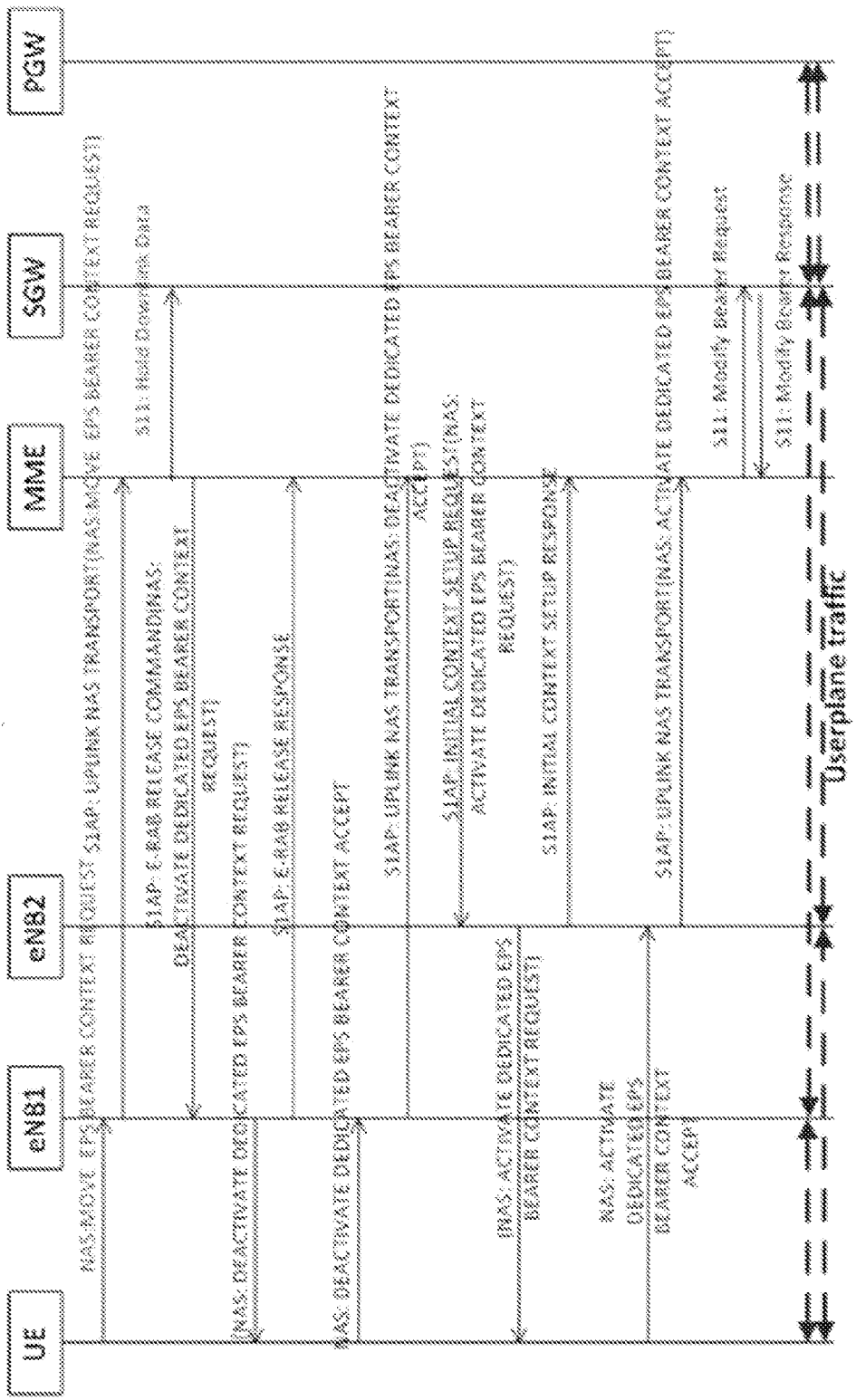

In additional embodiments, a UE initiated bearer mobility (e.g. as shown in FIG. 74) may be provided, performed, and/or used as described herein. For example, a UE may request that the MME move one of its bearers from one eNB (e.g. the eNB1) to another eNB (e.g. the eNB2). The MME may then establish the bearers on the eNB2. According to an example embodiment, the MME may choose an available eNB and may send across a S11:Modify Bearer Request procedure to the SGW to update the S1-U TEID information. Additionally, in an embodiment, there may not be changes to the SGW-PGW interface. The MME may release the bearer on the eNB1 and the eNB1 may inform the UE to release the bearer.

A method or procedure for initiating bearer mobility at a UE may be performed as described herein (e.g. as shown in FIG. 74). Initially, RRC connections between the UE and the eNB1 and eNB may be established or set up. Additionally, default and/or dedicated bearers may be set up on both the eNBs (e.g. the eNB1 and eNB2) and the eNBs (e.g. the eNB1 and eNB2) may be served by the same SGW.

In example embodiments, various messages may be provided and/or used for initiating bearer mobility at a UE such as a NAS: MOVE EPS BEARER CONTEXT REQUEST. Such a message may be sent by the UE to request that an active EPS bearer context be moved. According to embodiments, such a message may include a message type such as MOVE EPS BEARER CONTEXT REQUEST, a significance such as dual, a direction such as UE to network, and/or information shown in Table 23

TEXT REQUEST) to the eNB1 with the bearer that may have be included in the NAS:MOVE EPS BEARER CONTEXT REQUEST.

The eNB1 may then release the bearers and may forward a NAS: DEACTIVATE EPS BEARER CONTEXT REQUEST to the UE. After releasing the bearer on the eNB1, it (e.g. the eNB1) may send a S1AP: E-RAB RELEASE RESPONSE to the MME. The S1AP: E-RAB RELEASE RESPONSE may have the bearer that may have been successfully released on the eNB1.

The UE may then release the bearer and may send across a NAS: DEACTIVATE EPS BEARER CONTEXT ACCEPT to the eNB1. The eNB1 may send a S1AP: UPLINK NAS TRANSPORT (NAS: DEACTIVATE EPS BEARER CONTEXT ACCEPT)), (bearer id: 6) message to the MME.

In an embodiment, the MME may determine or identify a suitable eNB (e.g. the eNB2 to move the bearer to) and may send across a S1AP: INITIAL CONTEXT SETUP REQUEST (NAS: ACTIVATE DEDICATED EPS BEARER CONTEXT REQUEST) to the eNB2 by including the bearer that may have been included in the NAS:MOVE EPS BEARER CONTEXT REQUEST message.

The eNB2 may set up the EPS bearer and may forward the NAS: ACTIVATE DEDICATED EPS BEARER CONTEXT REQUEST to the UE. After establishing the bearer on the eNB2, it (e.g. the eNB2) may send a S1AP: INITIAL CONTEXT SETUP RESPONSE to the MME by including its S1-U IP and TEID (eNB2_TEID1). The S1AP: INITIAL CONTEXT SETUP RESPONSE may have the bearer that may have been successfully setup on the eNB2.

TABLE 23

MOVE EPS BEARER CONTEXT REQUEST message content

| IEI | Information Element | Type/Reference | Presence | Format | Length |
|---|---|---|---|---|---|
| | Protocol discriminator | Protocol discriminator 9.2 | M | V | ½ |
| | EPS bearer identity | EPS bearer identity 9.3.2 | M | V | ½ |
| | Procedure transaction identity | Procedure transaction identity 9.4 | M | V | 1 |
| | Move EPS bearer context request message identity | Message type 9.8 | M | V | 1 |
| | ESM cause | ESM cause 9.9.4.4 | M | V | 1 |
| 27 | Protocol configuration options | Protocol configuration options 9.9.4.11 | O | TLV | 3-253 |

To perform a UE initiated bearer mobility, an attach may be performed and/or default and/or dedicated bearers of a PDN may be distributed across the (H)eNBs. Additionally, the UE may send across a NAS:MOVE EPS BEARER CONTEXT REQUEST to the eNB1 to move one of its bearers to another eNB (e.g. the eNB2). The UE may include the EPS bearer id in the NAS message.

The eNB1 may send across a S1AP:UPLINK NAS TRANSPORT(NAS:MOVE EPS BEARER CONTEXT REQUEST) to the MME. In response thereto, in an embodiment, the MME may send across a S11:Hold Downlink Data with the bearer that may have received from the eNB1 in the S1AP:UPLINK NAS TRANSPORT(NAS:MOVE EPS BEARER CONTEXT REQUEST).

The MME may send across a S1AP: E-RAB RELEASE COMMAND (NAS: DEACTIVATE EPS BEARER CON- The UE may establish the bearer and may send across a NAS: ACTIVATE DEDICATED EPS BEARER CONTEXT ACCEPT to the eNB2. The eNB2 may then send a S1AP: UPLINK NAS TRANSPORT (NAS: ACTIVATE DEDICATED EPS BEARER CONTEXT ACCEPT) message to the MME.

After receiving such a message, the MME may send across a S11: Modify Bearer Request to the SGW. The MME may include eNB2's S1-U IP and eNB2_TEID1 in the message. The SGW may then send across a S11: Modify Bearer Response to the MME and the SGW may enable or allow the downlink data on the created tunnel on the eNB2 for the same bearer.

User plane traffic may be routed (e.g. after a UE initiated bearer mobility). For example, the eNB2 may send uplink user plane data (UL) or UL user data to the SGW on S1-U using SGW's IP address and SGW_TEID<x>. In embodiments, as described above, additional TEIDs, may be used if more than one bearer may be moved to the eNB2. Additionally, the SGW may send downlink user plane data (DL) or DL user data to the eNB2 on S1-U using eNB2's IP address and eNB2_TEID<x>. Additional TEIDs may also be used if more than one bearer may be moved to the eNB2.

As described above, IP flow mobility (IFOM) may be provided, performed, and/or used herein (e.g. when multiple RRC connections may be established and/or maintained). In one embodiment, such IP flow mobility may include a PGW initiated IP flow mobility. In such an embodiment, a PGW may send across a S11: Update Bearer Request to the MME via the SGW to, for example, move an IP flow of a dedicated bearer or RRC connection to another dedicated bearer or RRC connection. Such bearers may be distributed across different eNBs and may belong to the same PDN connection. Additionally, a packet filter ID may be used and may be unique across the TFTs within a PDN connection.

Figure 75:
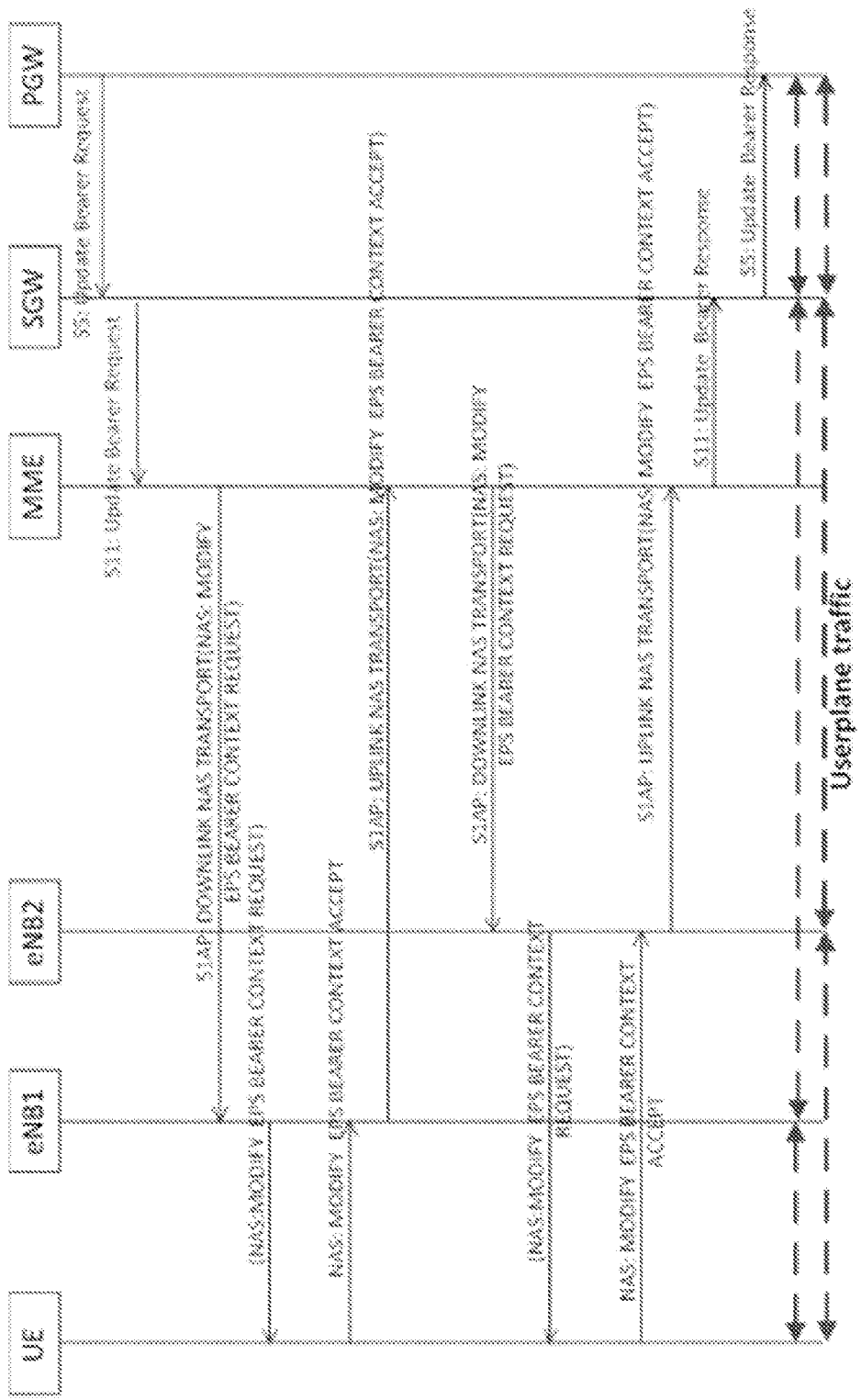

A method or procedure for initiating IP flow mobility at a PGW may be performed as described herein (e.g. as shown in FIG. 75). Initially, RRC connections between the UE and the eNB1 and eNB2 may be established or set up. Additionally, an attach may be performed on the eNB1 as described herein, dedicated bearers may be set up on both the eNBs (e.g. the eNB1 and eNB2), and the eNBs (e.g. the eNB1 and eNB2) may be served by the same SGW. A first IP flow (e.g. IP FLOW1) may be on the eNB1.

In example embodiments, various messages or functions may be provided and/or used for initiating IP flow mobility at a PGW such as S1AP:DOWNLINK NAS TRANSPORT (NAS:MODIFY EPS BEARER CONTEXT REQUEST) that may be constructed by the MME and may be sent across to the eNB1 and eNB2.

To perform a PGW initiated IP flow mobility (e.g. in addition to an attach procedure and default and/or dedicated bearers of a PDN being distributed across (H)eNBs), the PGW may send across a S11: Update Bearer Request message to the SGW by including EPS bearer id:6 for a dedicated bearer that may be on eNB1, and EPS bearer id:7 for a dedicated bearer that may be on eNB2 As the PGW may wish or want (e.g. like) to move the first IP flow (e.g. IP FLOW1) from bearer id:6 (e.g. the eNB1) to bearer id:7 (e.g. the eNB2), the PGW may delete the packet filter of the IP FLOW1 from a TFT that may be associated with bearer id:6 and may add the packet filter of IP FLOW1 to a TFT that may be associated with bearer id:7.

In an embodiment, the SGW may send across a S11: Update Bearer Request message to MME. Based on TFT parameters that may be received from the SGW (e.g. in a message such as the S11: Update Bearer Request message or other message), the MME may construct multiple (e.g. two) S1AP:DOWNLINK NAS TRANSPORT(NAS:MODIFY EPS BEARER CONTEXT REQUEST(s)). In a first NAS: MODIFY EPS BEARER CONTEXT REQUEST, the MME may include EPS bearer id:6, and the modified TFT where TFT may not have a packet filter for IP FLOW1 and may send across such a message to the eNB1. In a second NAS:MODIFY EPS BEARER CONTEXT REQUEST, the MME may include EPS bearer id:7, and the modified TFT where TFT may have the packet filter for IP FLOW1 and may send across such a message to the eNB2.

In response thereto, the eNB1 may send across the NAS: MODIFY EPS BEARER CONTEXT REQUEST to UE and the UE may send across a NAS:MODIFY EPS BEARER CONTEXT ACCEPT to eNB1. The eNB1 may then send across a S1AP:UPLINK NAS TRANSPORT(NAS: MODIFY EPS BEARER CONTEXT ACCEPT) to the MME.

The eNB2 may also send across a NAS:MODIFY EPS BEARER CONTEXT REQUEST to the UE and the UE may send across a NAS:MODIFY EPS BEARER CONTEXT ACCEPT to the eNB2. In response thereto, the eNB2 may send across a S1AP:UPLINK NAS TRANSPORT(NAS: MODIFY EPS BEARER CONTEXT ACCEPT) to the MME. The MME may send across a S11: Update Bearer Response to the SGW and the SGW may send across S11: Update Bearer Response to the PGW.

User plane traffic may then be routed (e.g. after a PGW initiated IP flow mobility). For example, the eNB2 may send uplink user plane data (UL) or UL user data to the SGW on S1-U using SGW's IP address and SGW_TEID<x> and the SGW may send downlink user plane data (DL) or DL user data to the eNB2 on S1-U using eNB2's IP address and eNB2_TEID<x>.

In additional embodiments, a UE initiated IP flow mobility may be provided, performed, and/or used. In such an embodiment, a UE may request that the MME move one of its IP flows from a dedicated bearer or RRC connection (e.g. on eNB1 or established with the eNB1) to another dedicated bearer or RRC connection (e.g. on eNB2 or established with the eNB2). Additionally, a packet filter ID may be used and may unique across TFTs within a PDN connection.

Figure 76:
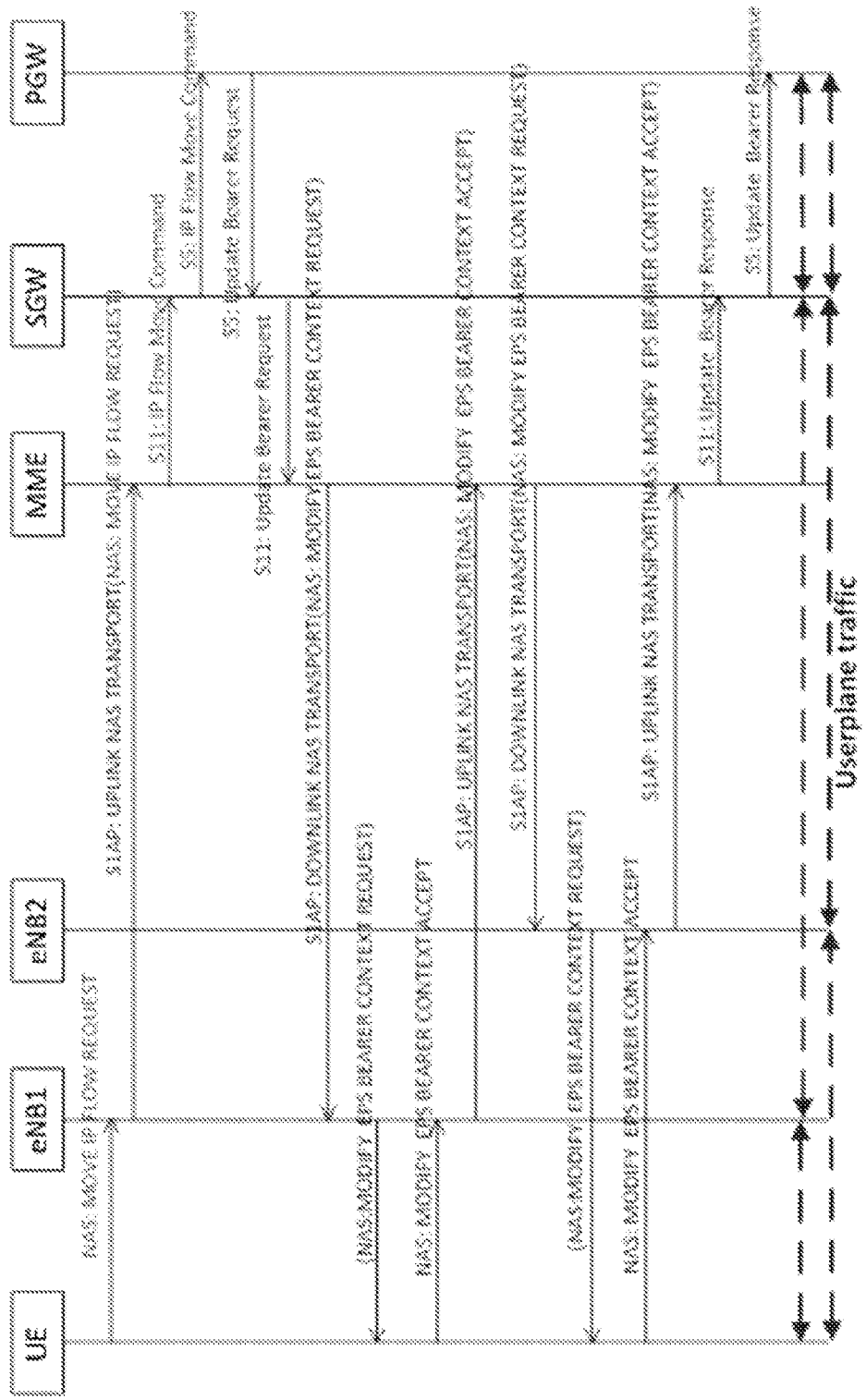

For example, a method or procedure for initiating IP flow mobility at a UE may be performed as described herein (e.g. as shown in FIG. 76). Initially, RRC connections between the UE and the eNB1 and eNB2 may be established or set up. Additionally, an attach may be performed on the eNB1 as described herein, dedicated bearers may be set up on both the eNBs (e.g. the eNB1 and eNB2), default and/or dedicated bearers on the eNBs (e.g. the eNB1 and the eNB2) may belong to the same PDN connection, and the eNBs (e.g. the eNB1 and eNB2) may be served by the same SGW. A first IP flow (e.g. IP FLOW1) may be on the eNB1.

In example embodiments, various messages or functions may be provided and/or used for initiating IP flow mobility at a UE such as NAS: MOVE IP FLOW REQUEST. Such a message may be sent by the UE to the network to move an IP flow from one bearer to another bearer. Such a message may include a message type such as MOVE IP FLOW REQUEST, a significance such as dual, a direction such as UE to network, and/or information shown in Table 24.

TABLE 24

MOVE IP FLOW REQUEST message content

| IEI | Information Element | Type/Reference | Presence | Format | Length |
|---|---|---|---|---|---|
| | Protocol discriminator | Protocol discriminator 9.2 | M | V | ½ |
| | EPS bearer identity | EPS bearer identity 9.3.2 | M | V | ½ |
| | EPS bearer identity Dest | EPS bearer identity 9.3.2 | M | V | ½ |

TABLE 24-continued

MOVE IP FLOW REQUEST message content

| IEI | Information Element | Type/Reference | Presence | Format | Length |
|---|---|---|---|---|---|
| | Procedure transaction identity | Procedure transaction identity 9.4 | M | V | 1 |
| | Move ip flow request message identity | Message type 9.8 | M | V | 1 |
| | EPS bearer identity for packet filter | Linked EPS bearer identity 9.9.4.6 | M | V | ½ |
| | EPS bearer identity for packet filter Dest | Linked EPS bearer identity 9.9.4.6 | M | V | ½ |
| | Spare half octet | Spare half octet 9.9.2.9 | M | V | ½ |
| | Traffic flow aggregate | Traffic flow aggregate description 9.9.4.15 | M | LV | 2-256 |
| | Traffic flow aggregate Dest | Traffic flow aggregate description 9.9.4.15 | M | LV | 2-256 |
| 5B | Required traffic flow QoS | EPS quality of service 9.9.4.3 | O | TLV | 3-11 |
| 5B | Required traffic flow QoS Dest | EPS quality of service 9.9.4.3 | O | TLN | 3-11 |
| 58 | ESM cause | ESM cause 9.9.4.4 | O | TV | 2 |
| 27 | Protocol configuration options | Protocol configuration options 9.9.4.11 | O | TLV | 3-253 |

The messages may further include a S11: IP FLOW MOVE COMMAND. In an embodiment, an IP FLOW MOVE COMMAND message may be sent from a MME to a SGW and may be forwarded to a PGW as part of the UE requested IP flow mobility procedure. Such a message may include the information in Table 25.

TABLE 25

Information Elements in a IP Flow Move Command

| Information elements | P | Condition/Comment | IE Type | Ins. |
|---|---|---|---|---|
| Linked EPS Bearer ID (LBI) | M | | EBI | 0 |
| Linked EPS Bearer ID Dest (LBI) | M | | EBI | 0 |
| Procedure Transaction Id (PTI) | M | | PTI | 0 |
| Flow Quality of Service (Flow QoS) | C | This IE may be included, except for a Bearer resource release. | Flow QoS | 0 |
| Flow Quality of Service Dest (Flow QoS) | C | This IE may be included, except for a Bearer resource release. | Flow QoS | 0 |
| Traffic Aggregate Description (TAD) | M | The TAD consists of the description of the packet filter(s) for a traffic flow aggregate. | TAD | 0 |
| Traffic Aggregate Description Dest (TAD) | M | The TAD consists of the description of the packet filter(s) for a traffic flow aggregate. | TAD | 0 |
| RAT Type | C | This IE may be included for MS initiated PDP Context modification procedure and Secondary PDP context activation procedure. | RAT Type | 0 |
| Serving Network | O | This IE may be included in the MS initiated PDP Context modification procedure. | Serving Network | 0 |
| User Location Information (ULI) | O | This IE may be included in the MS initiated PDP Context modification procedure. | ULI | 0 |
| EPS Bearer ID | C | This IE indicates the EPS Bearer that needs to be modified. It may be included for MS initiated PDP Context modification procedure. For EUTRAN this IE may be present if it is triggered by the NAS Bearer Resource Modification Request message and its value may be set to the value of the "EPS bearer identity for packet filter" IE received in that NAS message. | EBI | 1 |
| EPS Bearer ID Dest | C | This IE indicates the EPS Bearer that needs to be modified. It may be included for MS initiated PDP Context modification procedure. For EUTRAN this IE may be present if it is triggered by the NAS Bearer Resource Modification Request message and its value may be set to the value of the "EPS bearer identity for packet filter" IE received in that NAS message. | EBI | 1 |
| Indication Flags | O | This IE may be included if any one of the applicable flags is set to 1.<br>Applicable flags:<br>Change Reporting Support Indication: this flag may be included in the MS initiated PDP Context modification procedure. | Indication | 0 |

TABLE 25-continued

Information Elements in a IP Flow Move Command

| Information elements | P | Condition/Comment | IE Type | Ins. |
|---|---|---|---|---|
| S4-U SGSN F-TEID | C | Direct Tunnel Flag: this flag may be included in the MS initiated PDP Context Modification procedure. This IE may be included on the S4 interface when direct tunnel is not established in the MS initiated PDP Context modification procedure | F-TEID | 0 |
| S12 RNC F-TEID | C | This IE may be included on the S4 interface when direct tunnel flag is set to 1 in the MS initiated PDP Context modification procedure. | F-TEID | 1 |
| Protocol Configuration Options (PCO) | O | | PCO | 0 |
| Private Extension | O | | Private Extension | VS |

To perform a U initiated IP flow mobility (e.g. in addition to an attach procedure and default and/or dedicated bearers of a PDN being distributed across (H)eNBs), the UE may send across a NAS:MOVE IP FLOW REQUEST to the eNB1 to move one of its IP flows from a dedicated bearer:6 (e.g. on the eNB1) to another dedicated bearer:7 (e.g. on the eNB2). The UE may include the source EPS bearer id:6, source TAD (trafficflow aggregate description), destination EPS bearer id:7, destination TAD, and the like in the NAS message.

The eNB1 may send across a S1AP:UPLINK NAS TRANSPORT(NAS:MOVE IP FLOW REQUEST) to the MME. The MME may then send across a S11:IP Flow Move Command to the SGW with the desired parameters that may be received from the UE in the NAS:MOVE IP FLOW REQUEST.

The SGW may send across a S5:IP Flow Move Command to the PGW. In an embodiment, the PGW may construct a S5:Update Bearer Request and may send across such a message to the SGW. The PGW may remove a packet filter (e.g. of IP FLOW1) from a source bearer TFT associated with a source EPS bearer and may add a packet filter to a destination bearer TFT associated with a destination EPS bearer.

After receiving such a message, the SGW may send across S1:Update Bearer Request to the MME. As there may no QoS changes, according to an embodiment, the MME may send across a S1AP:DOWNLINK NAS TRANSPORT (NAS:MODIFY EPS BEARER CONTEXT REQUEST) to the eNB1 (e.g. for the source EPS bearer:6).

The eNB1 may then send across a NAS:MODIFY EPS BEARER CONTEXT REQUEST to the UE and the UE may send across a NAS:MODIFY EPS BEARER CONTEXT ACCEPT to the eNB1.

In response thereto, the eNB1 may send across a S1AP: UPLINK NAS TRANSPORT(NAS:MODIFY EPS BEARER CONTEXT ACCEPT) to the MME. As there may be no QoS changes, the MME may send across a S1AP: DOWNLINK NAS TRANSPORT(NAS:MODIFY EPS BEARER CONTEXT REQUEST) to the eNB2 (e.g. for destination EPS bearer:7).

The eNB2 may send across a NAS:MODIFY EPS BEARER CONTEXT REQUEST to the UE. The UE may then send across a NAS:MODIFY EPS BEARER CONTEXT ACCEPT to the eNB2 such that the eNB2 may send across a S1AP:UPLINK NAS TRANSPORT(NAS: MODIFY EPS BEARER CONTEXT ACCEPT) to the MME. The MME may then send across a S11:Update Bearer Response to the SGW and the SGW may send across a S5:Update Bearer Response to the PGW.

User plane traffic may then be routed (e.g. after or during a UE initiated IP flow mobility. For example, the eNB2 may send uplink user plane (UL) or UL user data to the SGW on S1-U using SGW's IP address and SGW_TEID<x>. IP FLOW 1 may then be transferred via the eNB2. Additionally, the SGW may send downlink user plane data (DL) or DL user data to the eNB2 on S1-U using eNB2's IP address and eNB2_TEID<x>. The IP FLOW 1 may also be transferred via the eNB2.

Figure 77:
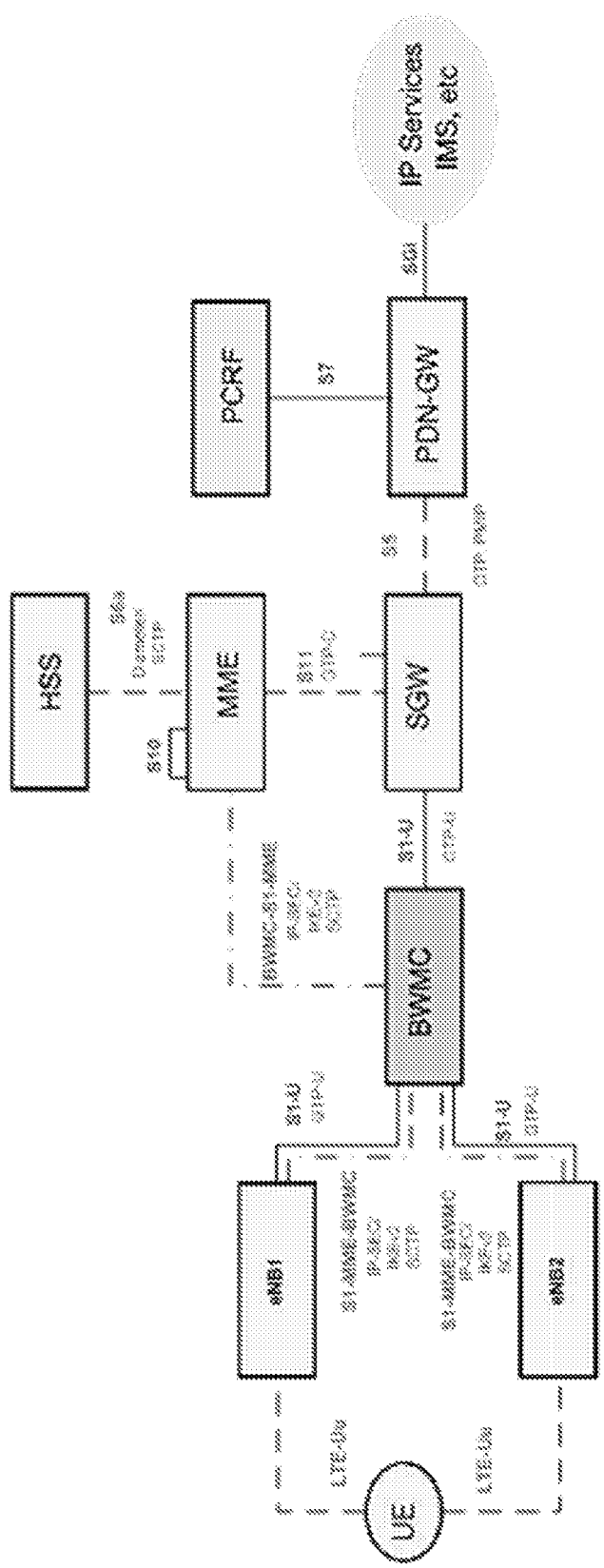
FIGS. 77-78 depict block diagrams illustrating example system with a BWMC and in which multiple RRC connections may be established and marinated.
Figure 78:
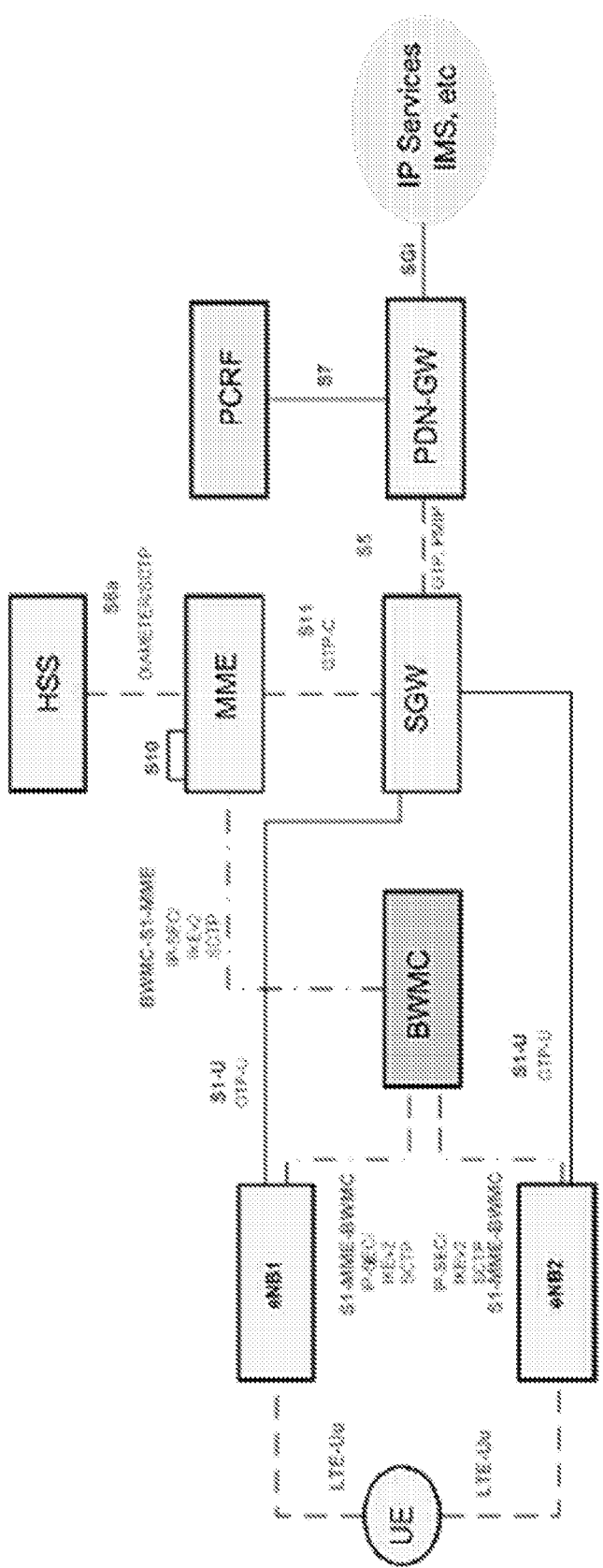

According to an embodiment, a BWMC (e.g. a Bandwidth Management Controller) may be provided and/or used, for example, with multiple RRC connections. FIGS. 77-78 depict example architectures that may include a BWMC controller. As shown in FIGS. 77-78, the BWMC may be between the eNBs (e.g. the eNB1 and eNB2) and the SGW and may be in communication therewith. The BWMC may control a mapping of (H)eNB Tunnel Endpoint IDs (TEIDs) and SGW TEIDs for user plane traffic, may provide an interface with multiple (H)eNBs, may hide (H)eNB details and may act as if it may be sending control/user plane data to MME/SG, may provide control plane functionality between (H)eNBs and the MME (S1-MME), may provide "indirect" user plane between (H)eNBs and the SGW (S1-U), may provide a "direct" user plane between (H)eNBs and the SGW (S1-U), and the like. The BWMC may also reduce or not unduly impact the loading on the existing network nodes such as the MME and SGW by using "flow mobility" across multiple eNBs.

Figure 79:
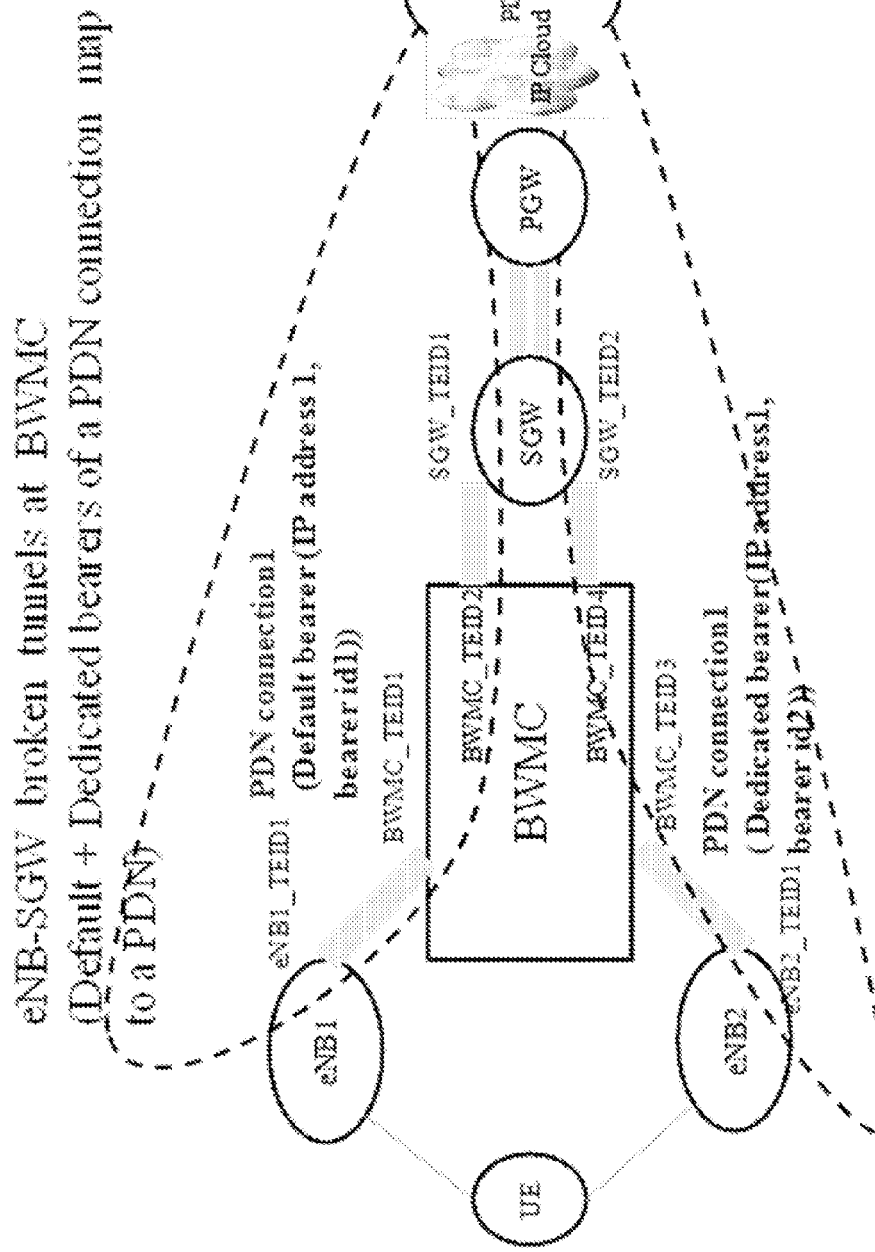
FIG. 79 is a diagram illustrating an example PDN connection map of eNB-SGW tunnels that may be broken at a BWMC of default and dedicated bearers of a PDN connection.

FIG. 79-82 illustrate example PDN connection maps that may be used with a BWMC. For example, FIG. 79 may illustrate eNB-SGW broken tunnels at a BWMC where default, dedicated bearers of a PDN connection may map to a PDN. As shown in FIG. 79, default and dedicated bearers may belong to the same PDN connection 1 and as such they may share the same IP address. The PDN connection 1 may also map to PDN1. According to an embodiment, such bearers may have different bearer ids.

Figure 80:
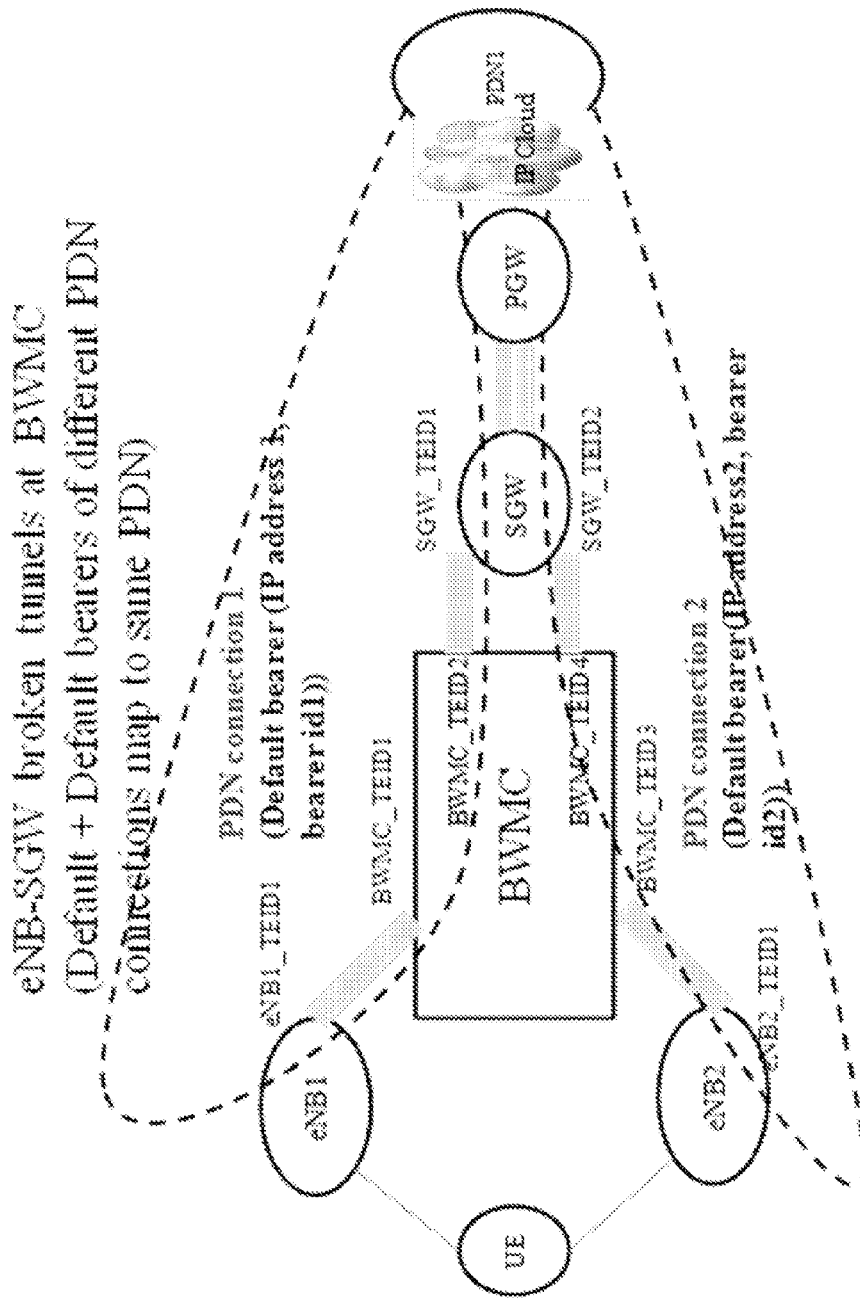
FIG. 80 is a diagram illustrating an example PDN connection map of eNB-SGW tunnels that may be broken at a BWMC of two default bearers of respective PDN connections to the same PDN.

FIG. 80 illustrates eNB-SGW broken tunnels at a BWMC where two default bearers of different PDN connections may map to the same PDN. In FIG. 80, two default bearers of different PDN connections (e.g. PDN connection 1 & PDN connection2) may be connected to the same PDN1. Such bearers may have different IP addresses and may have bearers with different bearer ids.

Figure 81:
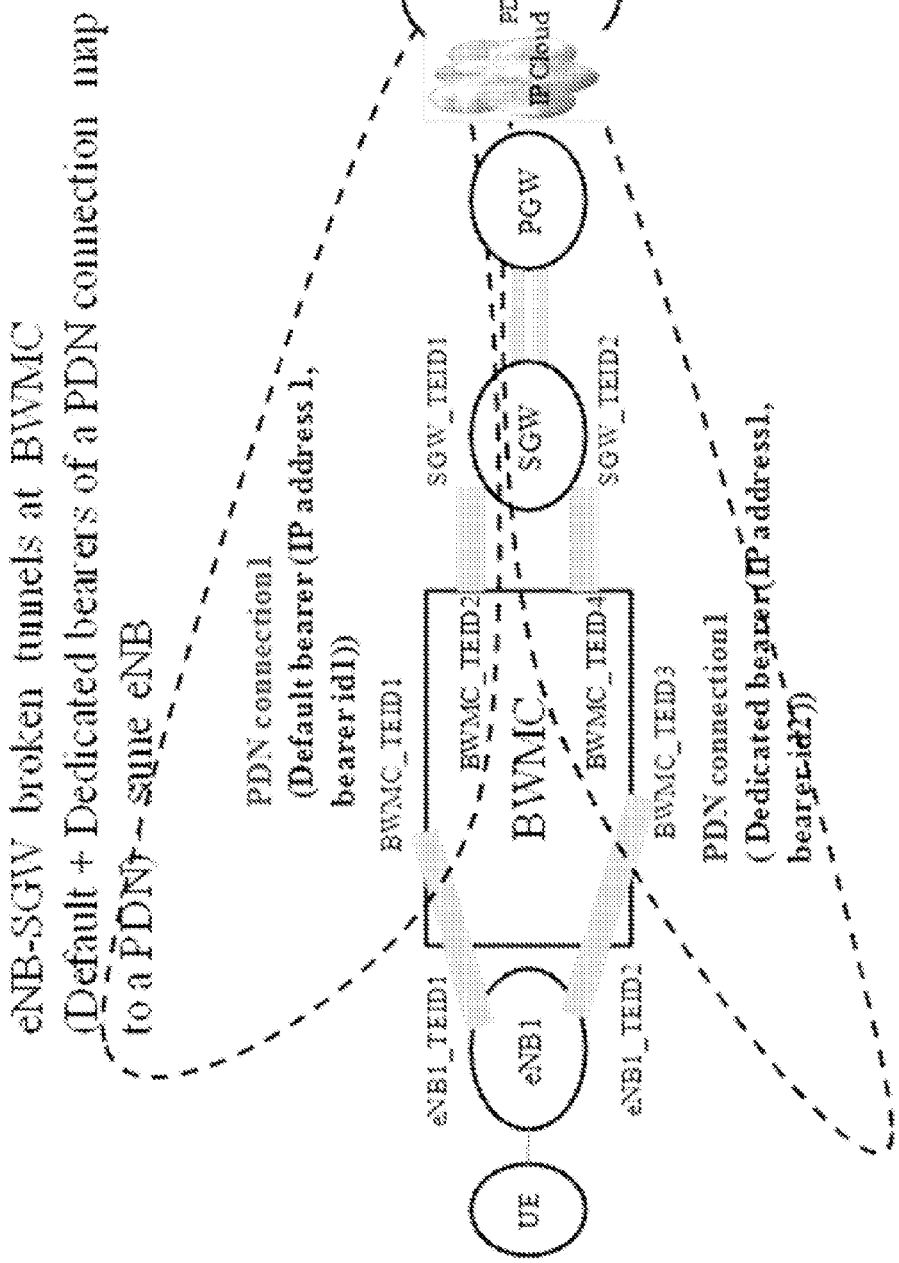
FIG. 81 is a diagram illustrating an example PDN connection map of eNB-SGW tunnels that may be broken at a BWMC of default and dedicated default bearers of respective PDN connections to the same PDN.

FIG. 81 illustrates eNB-SGW broken tunnels at a BWMC where default and dedicated bearers of a PDN connection may map to a PDN using the same eNB. As shown in FIG. 81, default and dedicated bearers of a PDN connection may be connected to the same PDN1. Such bearers may have same IP address, but may have different bearer ids and may be established on the same eNB (e.g. the eNB1).

Figure 82:
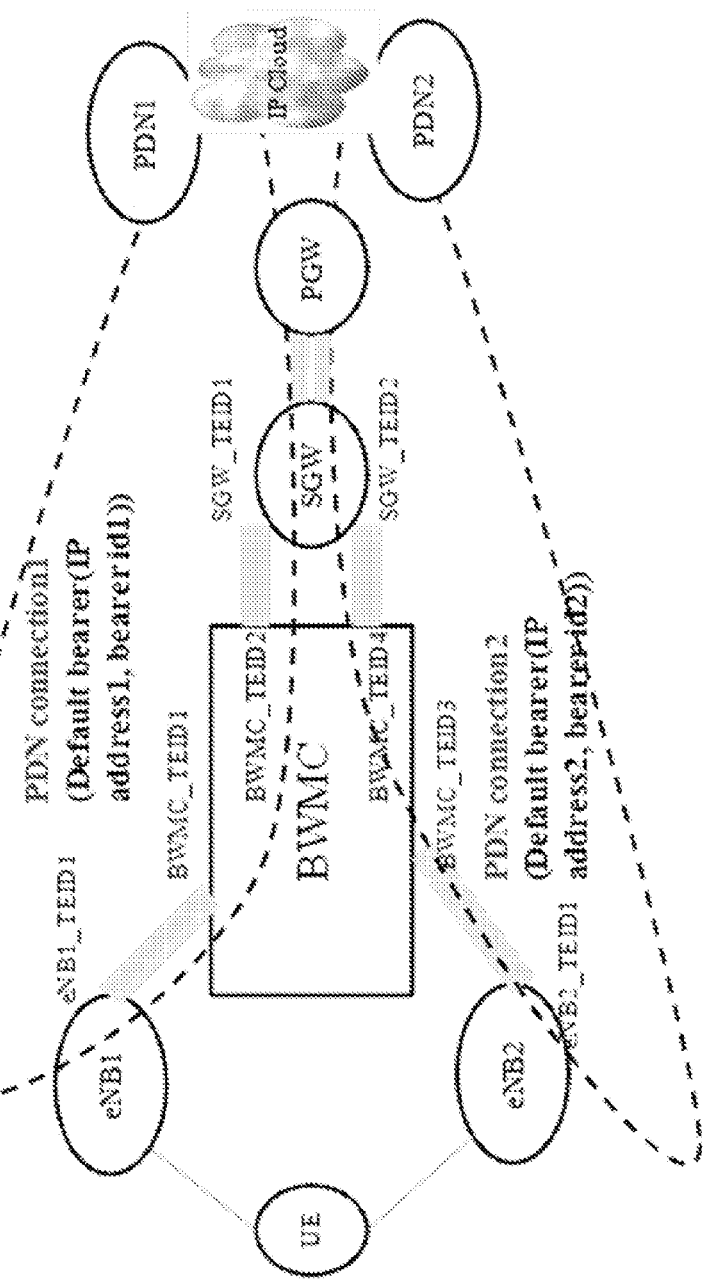
FIG. 82 is a diagram illustrating an example PDN connection map of eNB-SGW tunnels that may be broken at a BWMC of two default bearers of respective PDN connections to different PDNs.

FIG. 82 illustrate eNB-SGW broken tunnels at a BWMC where two default bearers of different PDN connections may map to different PDNs. In FIG. 82, default bearers may belong to different PDN connections and may have different IP addresses. The PDN connection1 & PDN connection 2 may map to PDN1 and PDN2 respectively. Additionally, such bearers may have different bearer ids.

Figure 83:
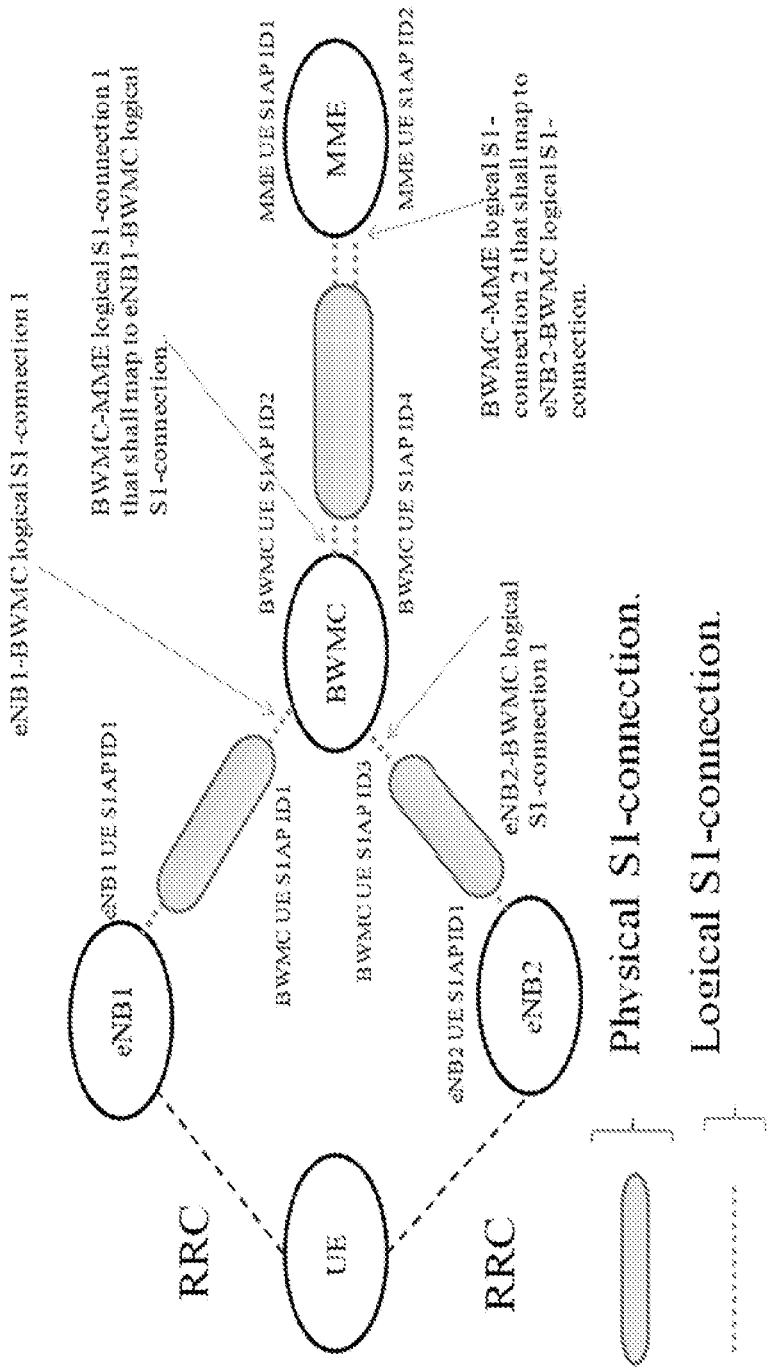
FIG. 83 is a diagram illustrating connections such as logical connections and RRC connections across multiple eNBs and a BWMC.

FIG. 83 is a diagram illustrating connections such as logical connections and RRC connections across multiple eNBs and a BWMC. As shown in FIG. 83, there may be three physical S1 connections such as eNB1-BWMC, eNB2-BWMC, and BWMC-MME. Additionally, there may be four logical S1-connections such as eNB1-BWMC logical S1-connection 1 that may be identified by eNB1 UE S1AP ID1, BWMC UE S1AP ID1, BWMC-MME logical S1-connection 1 may be identified by BWMC UE S1AP ID2, MME UE S1AP ID1, eNB2-BWMC logical S1-connection 1 that may be identified by eNB2 UE S1AP ID1, BWMC UE S1AP ID3, BWMC-MME logical S1-connection 2 that may be identified by BWMC UE S1AP ID4, MME UE S1AP ID2.

In embodiments described herein, the BWMC may be placed between (H)eNB and MME. There may be a BWMC S1-MME link that may exist between a (H)eNB and BWMC. Multiple (H)eNBs may connect to a single BWMC. Another S1-MME link may be provided between the BWMC and MME. For the MME, the BWMC may act as an eNB, hiding the details of (H)eNBs. In an embodiment, a HeNB premises may include a HeNB and a CGW (e.g. a converged gateway). The CGW may have the intelligence to segregate data flows based on policies (e.g. segregation). According to an example embodiment, the procedures described above (e.g. with respect to BWM or BWM-MME) may be applied to the BWMC. For example, an attach procedure (e.g. as described herein) or a UE initiated dedicated bearer activation (e.g. as described herein) may be performed. Other procedures and/or methods (or call flows) may also be provided and/or used.

Additionally, in embodiments, the BWMC that may be used may be a stand-alone component, may be co-located with MME, and/or may be co-located with eNB/H(e)NB. When the BWMC may be co-located with the MME, in an embodiment, the BWMC may support a user plane as it may be a burden on the MME to support both the user plane and control plane thereby degrading the performance of the MME.

In example embodiments, interfaces (e.g. as described above) may be provided and/or used herein. For example, a LTE-Uu interface may be provided and/or used. The LTE-Uu may be an interface between the UE and an eNB that may support embodiments disclosed herein.

For example, the UE may be modified to connect to multiple (H)eNBs at the same time. As such, the UE may have an option configured by the user to have BWM for such multiple connections that may be defined as a "bwmmeEnableFlag." According to an example embodiment, if the flag value may be FALSE, the UE may not have capability to connect to multiple (H)eNBs at the same time. However, if the flag value may be TRUE, the UE may be able to connect to multiple (H)eNBs at the same time. Additionally, the UE may establish a RRC connection dynamically when a new candidate (H)eNB may be identified by the UE. The LTE-Uu may support (e.g. may include or carry) one or more of the following messages: the RRCConnectionSetup, the RRCConnectionUpdate, and the like.

A S1-MME and/or a NAS interface may also be provided and/or used. The S1-MME may be the interface between a (H)eNB and MME. In embodiments, the S1-MME interface may be an extension of the S1 interface to support the embodiments disclosed herein or a new interface. The S1-MME interface may support (e.g. may include or carry) the S1AP: INITIAL CONTEXT SETUP S1 CONNECT REQUEST, the SLAP: BEARER MOVE REQUEST, and the like.

The NAS may be the interface or protocol (e.g. messages) that may be used between the UE and MME. The NAS may support (e.g. may include or carry) one or more of the following messages described herein: NAS: UPDATE ENB-LIST REQUEST, NAS: ATTACH REQUEST, NAS: INITIATE SECONDARY CONN REQUEST, NAS: INITIATE SECONDARY CONN ACCEPT, NAS: INITIATE SECONDARY CONN REJECT, NAS: MOVE EPS BEARER CONTEXT REQUEST, NAS: MOVE IP FLOW REQUEST, and the like.

In an embodiment, a S11 interface may be provided and/or used. The S11 may be the interface between the MME and SGW. The S11 interface may support (e.g. may include or carry) the S11:Release Access Bearer Request, S11: Hold Downlink Data, S11:Update Bearer Request, S11: IP Flow Move Command, and the like.

Additionally, a S5 and a S6a interface may be provided and/or used. The S5 may be the interface between the SGW and PGW that may support (e.g. may include or carry) the S5:Release Access Bearer Request message, a S5: IP Flow Move Command, and the like. The S6a may be the interface between the MME and HSS that may support (e.g. may include or carry) one or more of the following messages: S6a:Update Location Answer (e.g. during an attach procedure the HSS may send across the BWM-Flag in a subscription), S6a:Insert Subscriber Data Request (e.g. an ISD request may have the BWM-Flag in a subscription), and the like.

In example embodiments, multiple RRC connections may have an impact on a UE and network nodes. For example, the UE may maintain a state machine for each RRC connection that may be established between the UE and an eNB. The UE may also share spectrum with the eNBs. In an embodiment, the UE may maintain a RRC connection ID at an application level above the RRC layer to logically group a set of radio bearers under a RRC connection ID. The RRC connection ID may be used locally at the UE and may not be sent across to eNB.

The UE may also have an option configured by the user to have BWM including a "BWM-Flag." as described above. If the flag value may be FALSE, the UE may not have capability to connect to multiple (H)eNBs at the same time. Additionally, if the flag value may be TRUE, the UE may connect to multiple (H)eNBs at the same time. The UE may further establish a RRC connection when a new (H)eNB may be identified by the UE.

The (H)eNB may also be impacted as described above as well as the MME. For example, with regard to the MME, the purpose of the UE Context Release Request procedure may be to enable the eNB to request the MME to release the UE-associated logical S1-connection due to a E-UTRAN generated reason (e.g. "TX2RELOCOverall Expiry"). Such a procedure may use UE-associated signaling. The UE CONTEXT RELEASE REQUEST message may indicate the appropriate cause value, for example, "User Inactivity", "Radio Connection With UE Lost," and the like for the requested UE-associated logical S1-connection release.

When a MME may receive a S1AP:UE CONTEXT RELEASE REQUEST from an eNB, the MME may release the logical S1-connection associated with the eNB and may update corresponding connection state variable to IDLE. The MME may also maintain a global state variable for each UE and may have states such as CONNECTED, IDLE, and the like. The global state variable at the MME may become IDLE, for example, when the logical S1-connections/RRC connections may be released.

Periodic tracking area updating may be used to periodically notify the availability of the UE to the network. The procedure is controlled in the UE by the periodic tracking area update timer (timer T3412). The value of timer T3412 may be sent by the network to the UE in the ATTACH ACCEPT message and may be sent in the TRACKING AREA UPDATE ACCEPT message. The UE may apply this value in all tracking areas of the list of tracking areas that may be assigned to the UE, until a new value may be received.

The timer T3412 may be reset and started with its initial value, for example, when the UE may go from EMM-CONNECTED to EMM-IDLE mode. The timer T3412 may be stopped when the UE may enter a EMM-CONNECTED mode or EMM-DEREGISTERED state. When timer T3412 may expire, the periodic tracking area updating procedure may be started and the timer may be set to its initial value for the next start. With multiple RRC connections, the UE may start the T3412 timer when the UE may enter a EMM-IDLE mode on the RRC connections.

Typically, the MME may run a mobile/UE reachable timer with a similar value to the UE's periodic TAU timer. If this timer may expire in the MME, the MME may deduce that the UE may be 'out of coverage' at that moment. However, the MME may not know for how long the UE may have been or may be out of coverage and, as such, the MME may not immediately delete the UE's bearers. Instead the MME may clear a PPF flag in the MME and may start an Implicit Detach timer. With the PPF clear, the MME may not page the UE in E-UTRAN coverage and may send a Downlink Data Notification Reject message to the Serving GW (e.g. the SGW) when receiving a Downlink Data Notification message from the Serving GW. If the Implicit Detach timer may expire before the UE contacts the network, the MME may deduce that the UE may have been or may be 'out of coverage' for a long period of time and implicitly detach the UE.

The MME may stop a mobile/UE reachable timer when a NAS message may be received from the UE on a RRC/S1 interface and the MME may cancel Implicit Detach timer, for example, when a NAS message may be received from the UE on a RRC/S1 interface.

A HSS may also be impacted (e.g. to support multiple RRC connections). For example, the MME may download subscription data from the HSS. The Subscription-Data AVP may include or have BWM-Flag that may be set to 0 by default. Modified S6a messages may also be used such as a S6a:Insert Subscriber Data Request and/or S6a:Update Location Answer. In embodiments, the BWM-Flag AVP may be of type Unsigned32 and it may include a bit mask. The bits that may be included therein may be shown and described in Table 26.

TABLE 26

BWM-Flag

| Bit | Name | Description |
|---|---|---|
| 0 | BWM solution is not supported | This bit, when set, may indicate that the BWM solution may not be applicable to UE |
| 1 | BWM solution is supported | This bit, when set, may indicate that the BWM solution may be applicable to UE |

Note:
Bits not defined in this table may be cleared by the sending entity and discarded by the receiving entity.

In example embodiments, the SGW and PGW may also be impacted as described herein.

Figure 84A:
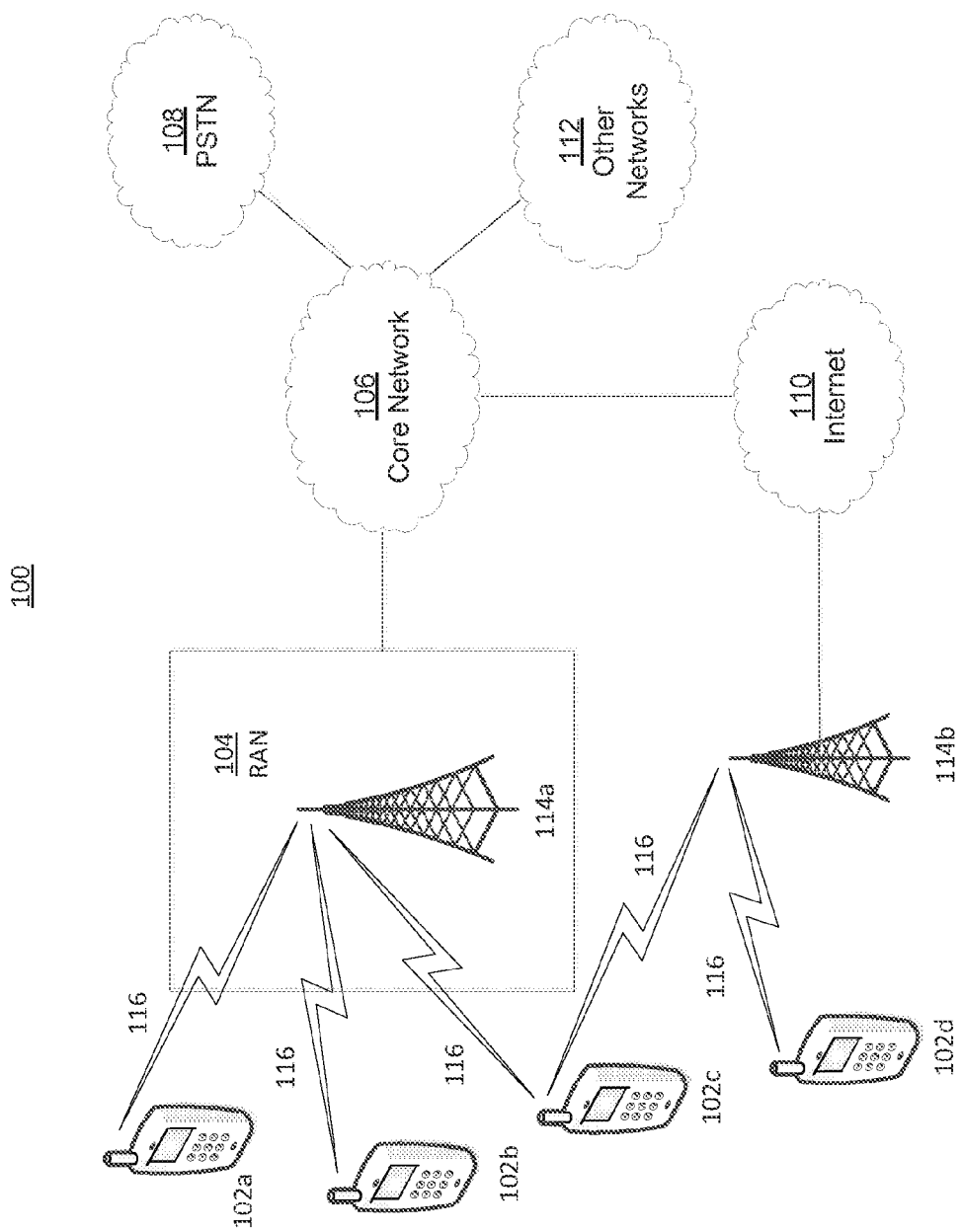
FIG. 84A depicts a diagram of an example communications system in which one or more disclosed embodiments may be implemented.

FIG. 84A depicts a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 84A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, and/or 102d may be any type of device configured to operate and/or communicate in a wireless environment. By way of example, the WTRUs 102a, 102b, 102c, and/or 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, and/or 102d to facilitate access to one or more communication networks, such as the core network 106/107/109, the Internet 110, and/or the networks 112. By way of example, the base stations 114a and/or 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114*b* may be configured to transmit and/or receive wireless signals within a particular geographic region, which may be referred to as a cell (not shown). The cell may further be divided into cell sectors. For example, the cell associated with the base station 114*a* may be divided into three sectors. Thus, in one embodiment, the base station 114*a* may include three transceivers, i.e., one for each sector of the cell. In another embodiment, the base station 114*a* may employ multiple-input multiple output (MIMO) technology and, therefore, may utilize multiple transceivers for each sector of the cell.

The base stations 114*a* and/or 114*b* may communicate with one or more of the WTRUs 102*a*, 102*b*, 102*c*, and/or 102*d* over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, and/or 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114*a* and the WTRUs 102*a*, 102*b*, and/or 102*c* may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114*a* and the WTRUs 102*a*, 102*b*, and/or 102*c* may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 84A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114*b* and the WTRUs 102*c*, 102*d* may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 84A, the base station 114*b* may have a direct connection to the Internet 110. Thus, the base station 114*b* may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102*a*, 102*b*, 102*c*, and/or 102*d*. For example, the core network 106/107/109 may provide call control, billing services, mobile location-based services, pre-paid calling, Internet connectivity, video distribution, etc., and/or perform high-level security functions, such as user authentication. Although not shown in FIG. 84A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, and/or 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102*a*, 102*b*, 102*c*, and/or 102*d* in the communications system 100 may include multi-mode capabilities, i.e., the WTRUs 102*a*, 102*b*, 102*c*, and/or 102*d* may include multiple transceivers for communicating with different wireless networks over different wireless links. For example, the WTRU 102*c* shown in FIG. 84A may be configured to communicate with the base station 114*a*, which may employ a cellular-based radio technology, and with the base station 114*b*, which may employ an IEEE 802 radio technology.

Figure 84B:
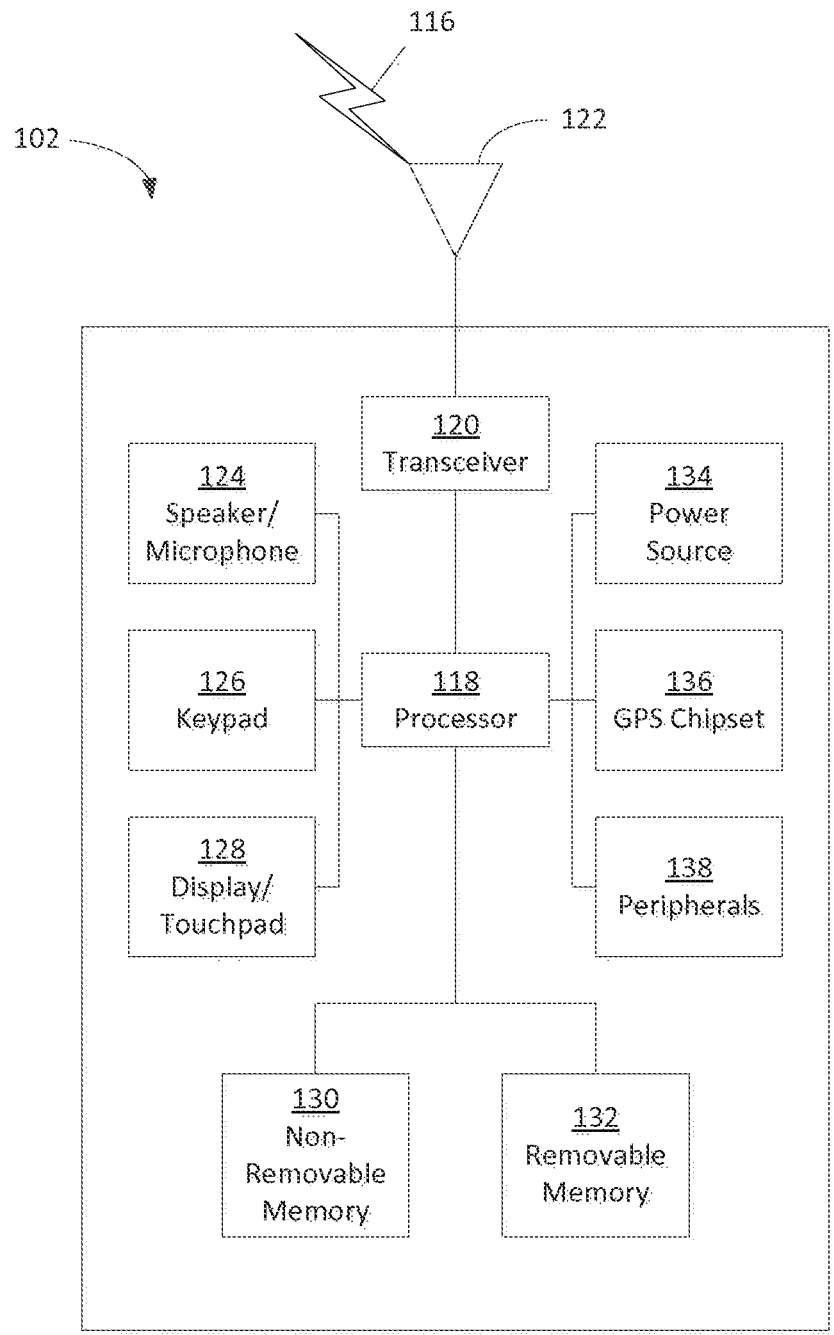
FIG. 84B depicts a system diagram of an example wireless transmit/receive unit (WTRU) that may be used within the communications system illustrated in FIG. 84A.

FIG. 84B depicts a system diagram of an example WTRU 102. As shown in FIG. 84B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114*a* and 114*b*, and/or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 84B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 84B depicts the processor 118 and the transceiver 120 as separate components, it may be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 84B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 84C:
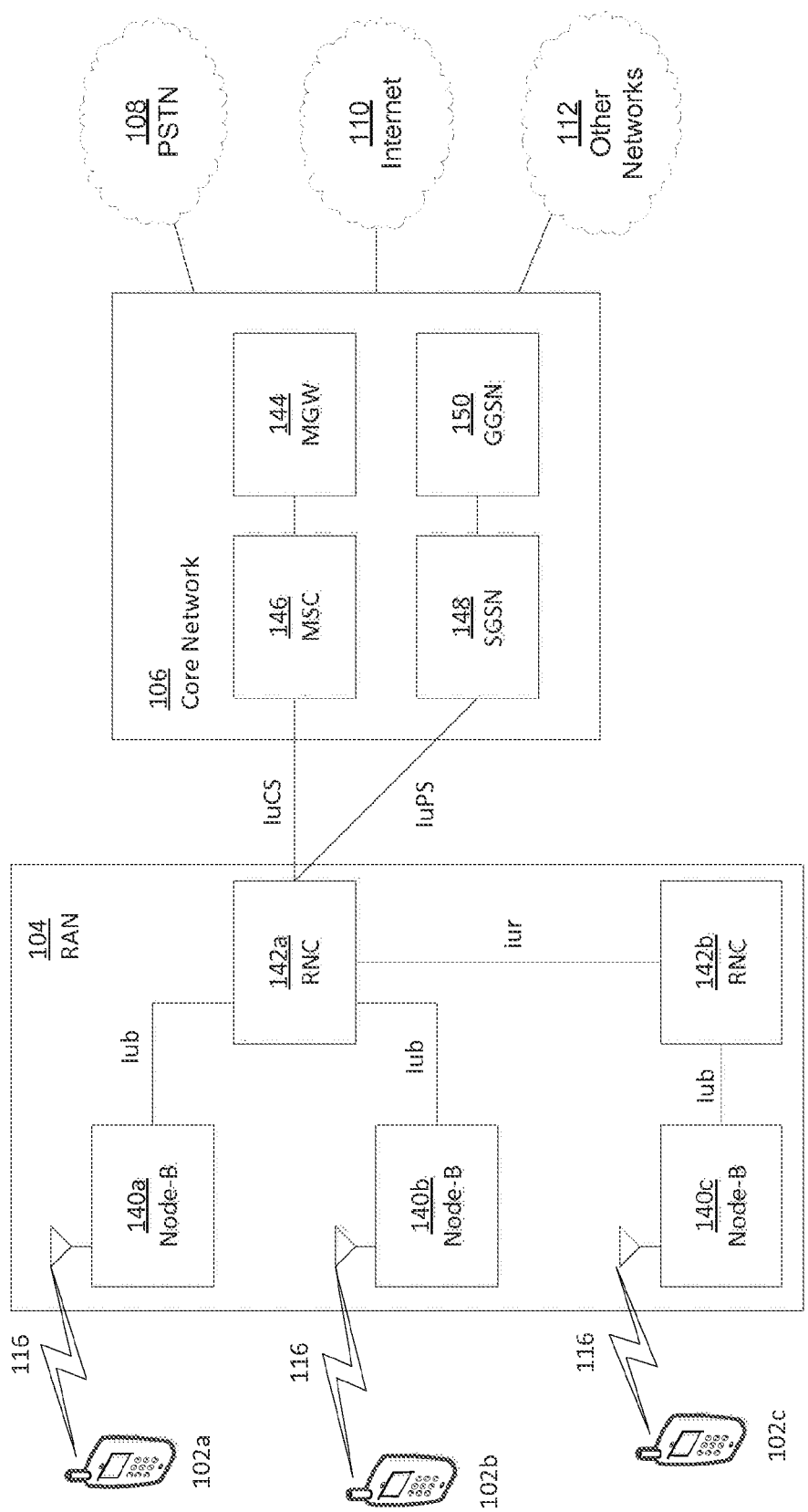
FIG. 84C depicts a system diagram of an example radio access network and an example core network that may be used within the communications system illustrated in FIG. 84A.

FIG. 84C depicts a system diagram of the RAN 103 and the core network 106 according to an embodiment. As noted above, the RAN 103 may employ a UTRA radio technology to communicate with the WTRUs 102a, 102b, and/or 102c over the air interface 115. The RAN 103 may also be in communication with the core network 106. As shown in FIG. 84C, the RAN 103 may include Node-Bs 140a, 140b, and/or 140c, which may each include one or more transceivers for communicating with the WTRUs 102a, 102b, and/or 102c over the air interface 115. The Node-Bs 140a, 140b, and/or 140c may each be associated with a particular cell (not shown) within the RAN 103. The RAN 103 may also include RNCs 142a and/or 142b. It will be appreciated that the RAN 103 may include any number of Node-Bs and RNCs while remaining consistent with an embodiment.

As shown in FIG. 84C, the Node-Bs 140a and/or 140b may be in communication with the RNC 142a. Additionally, the Node-B 140c may be in communication with the RNC 142b. The Node-Bs 140a, 140b, and/or 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, and/or 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 84C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and/or 102c with access to circuit-switched networks, such as the PSTN 108, to facilitate communications between the WTRUs 102a, 102b, and/or 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and/or 102c with access to packet-switched networks, such as the Internet 110, to facilitate communications between and the WTRUs 102a, 102b, and/or 102c and IP-enabled devices.

As noted above, the core network 106 may also be connected to the networks 112, which may include other wired or wireless networks that are owned and/or operated by other service providers.

Figure 84D:
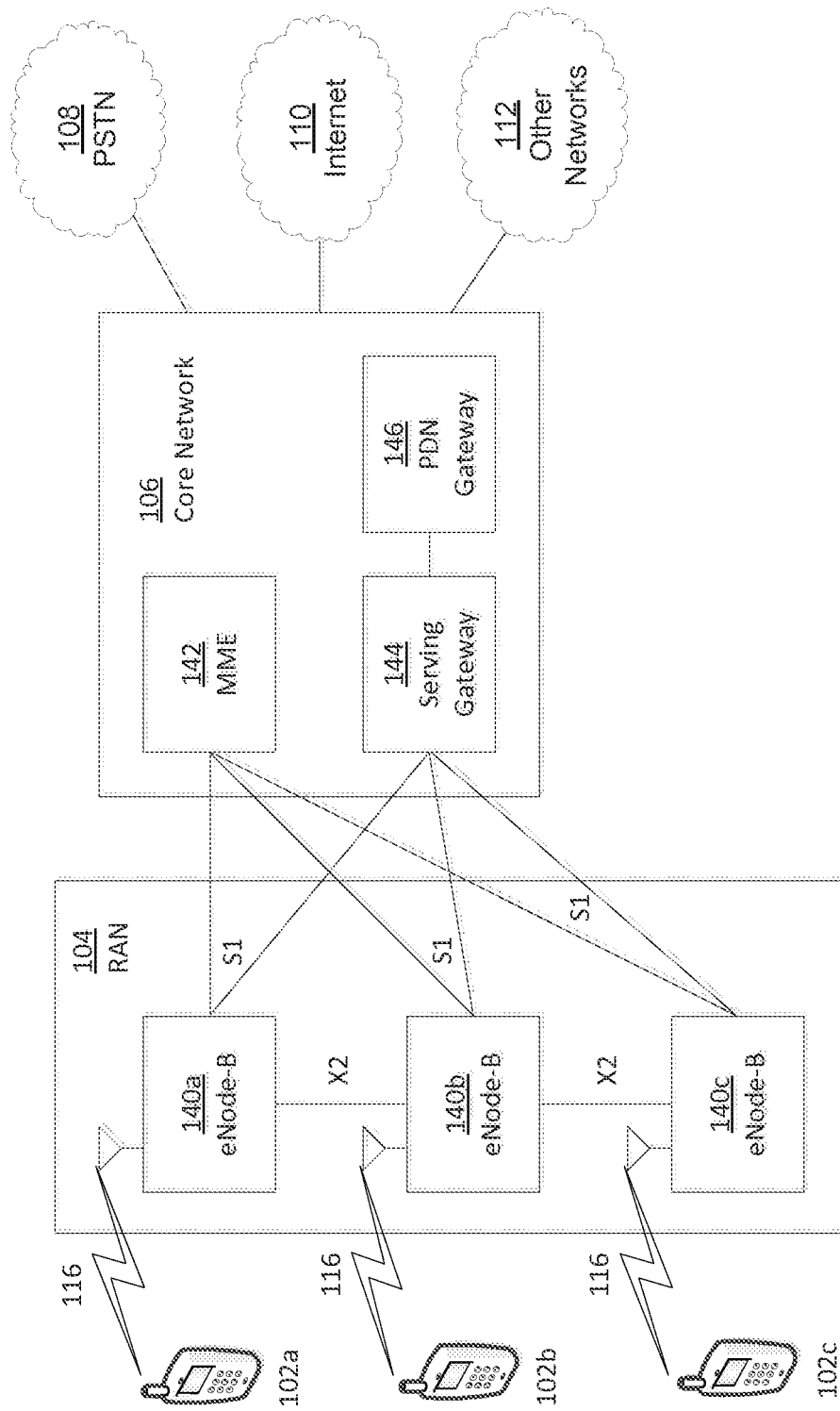
FIG. 84D depicts a system diagram of another example radio access network and an example core network that may be used within the communications system illustrated in FIG. 84A.

FIG. 84D depicts a system diagram of the RAN 104 and the core network 107 according to an embodiment. As noted above, the RAN 104 may employ an E-UTRA radio technology to communicate with the WTRUs 102a, 102b, and/or 102c over the air interface 116. The RAN 104 may also be in communication with the core network 107.

The RAN 104 may include eNode-Bs 160a, 160b, and/or 160c, though it will be appreciated that the RAN 104 may include any number of eNode-Bs while remaining consistent with an embodiment. The eNode-Bs 160a, 160b, and/or 160c may each include one or more transceivers for communicating with the WTRUs 102a, 102b, and/or 102c over the air interface 116. In one embodiment, the eNode-Bs 160a, 160b, and/or 160c may implement MIMO technology. Thus, the eNode-B 160a, for example, may use multiple antennas to transmit wireless signals to, and receive wireless signals from, the WTRU 102a.

Each of the eNode-Bs 160a, 160b, and/or 160c may be associated with a particular cell (not shown) and may be configured to handle radio resource management decisions, handover decisions, scheduling of users in the uplink and/or downlink, and the like. As shown in FIG. 84D, the eNode-Bs 160a, 160b, and/or 160c may communicate with one another over an X2 interface.

The core network 107 shown in FIG. 84D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and/or 160c in the RAN 104 via an S1 interface and may serve as a control node. For example, the MME 162 may be responsible for authenticating users of the WTRUs 102a, 102b, and/or 102c, bearer activation/deactivation, selecting a particular serving gateway during an initial attach of the WTRUs 102a, 102b, and/or 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and/or 160c in the RAN 104 via the S1 interface. The serving gateway 164 may generally route and forward user data packets to/from the WTRUs 102a, 102b, and/or 102c. The serving gateway 164 may also perform other functions, such as anchoring user planes during inter-eNode B handovers, triggering paging when downlink data is available for the WTRUs 102a, 102b, and/or 102c, managing and storing contexts of the WTRUs 102a, 102b, and/or 102c, and the like.

The serving gateway 164 may also be connected to the PDN gateway 166, which may provide the WTRUs 102a, 102b, and/or 102c with access to packet-switched networks, such as the Internet 110, to facilitate communications between the WTRUs 102a, 102b, and/or 102c and IP-enabled devices.

The core network 107 may facilitate communications with other networks. For example, the core network 107 may provide the WTRUs 102a, 102b, and/or 102c with access to circuit-switched networks, such as the PSTN 108, to facilitate communications between the WTRUs 102a, 102b, and/or 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, and/or 102c with access to the networks 112, which may include other wired or wireless networks that are owned and/or operated by other service providers.

Figure 84E:
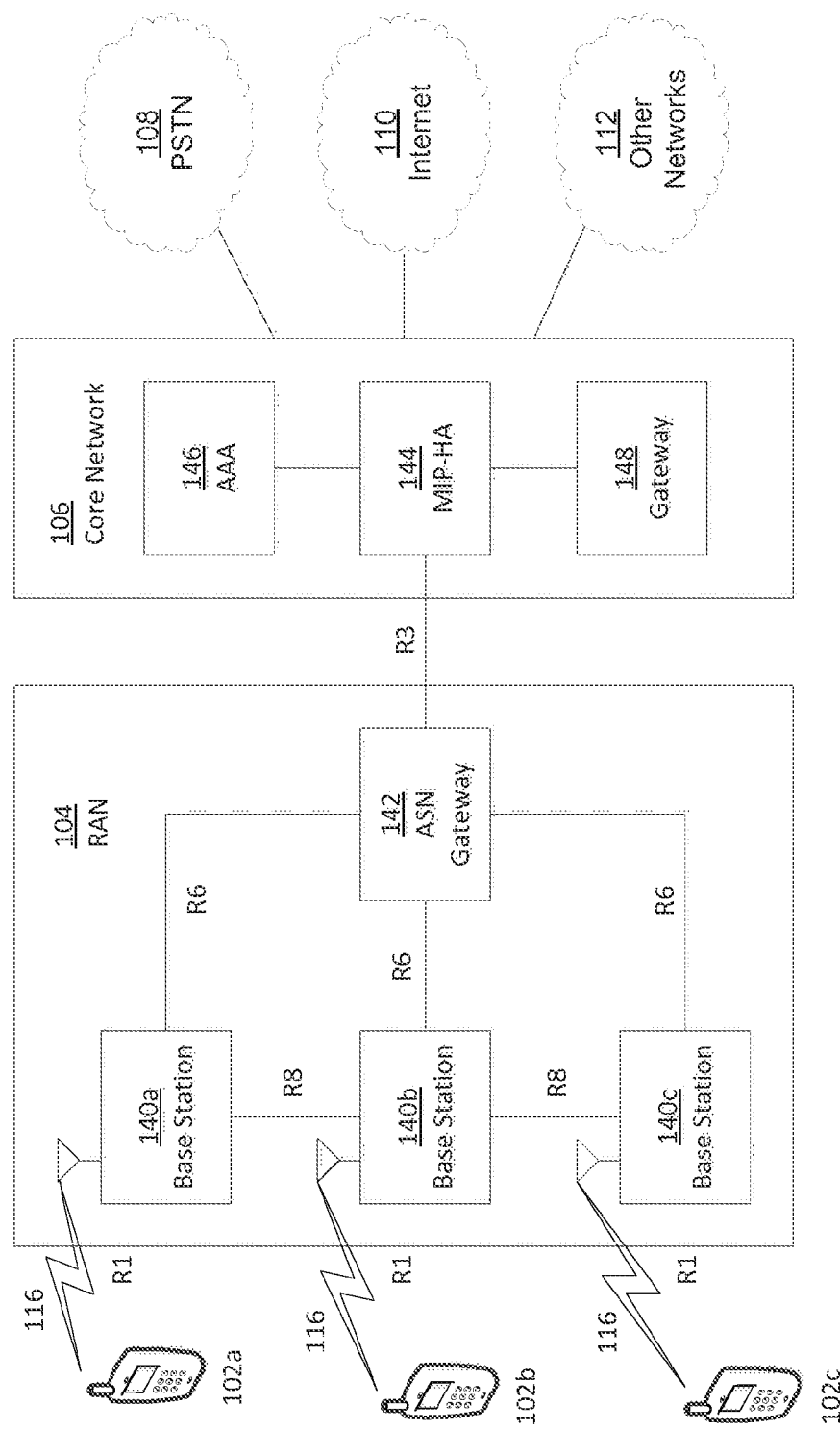
FIG. 84E depicts a system diagram of another example radio access network and an example core network that may be used within the communications system illustrated in FIG. 84A.

FIG. 84E depicts a system diagram of the RAN 105 and the core network 109 according to an embodiment. The RAN 105 may be an access service network (ASN) that employs IEEE 802.16 radio technology to communicate with the WTRUs 102a, 102b, and/or 102c over the air interface 117. As will be further discussed below, the communication links between the different functional entities of the WTRUs 102a, 102b, and/or 102c, the RAN 105, and the core network 109 may be defined as reference points.

As shown in FIG. 84E, the RAN 105 may include base stations 180a, 180b, and/or 180c, and an ASN gateway 182, though it will be appreciated that the RAN 105 may include any number of base stations and ASN gateways while remaining consistent with an embodiment. The base stations 180a, 180b, and/or 180c may each be associated with a particular cell (not shown) in the RAN 105 and may each include one or more transceivers for communicating with the WTRUs 102a, 102b, and/or 102c over the air interface 117. In one embodiment, the base stations 180a, 180b, and/or 180c may implement MIMO technology. Thus, the base station 180a, for example, may use multiple antennas to transmit wireless signals to, and receive wireless signals from, the WTRU 102a. The base stations 180a, 180b, and/or 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, and/or 102c and the RAN 105 may be defined as an R1 reference point that implements the IEEE 802.16 specification. In addition, each of the WTRUs 102a, 102b, and/or 102c may establish a logical interface (not shown) with the core network 109. The logical interface between the WTRUs 102a, 102b, and/or 102c and the core network 109 may be defined as an R2 reference point, which may be used for authentication, authorization, IP host configuration management, and/or mobility management.

The communication link between each of the base stations 180a, 180b, and/or 180c may be defined as an R8 reference point that includes protocols for facilitating WTRU handovers and the transfer of data between base stations. The communication link between the base stations 180a, 180b, and/or 180c and the ASN gateway 182 may be defined as an R6 reference point. The R6 reference point may include protocols for facilitating mobility management based on mobility events associated with each of the WTRUs 102a, 102b, and/or 102c.

As shown in FIG. 84E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and/or 102c to roam between different ASNs and/or different core networks. The MIP-HA 184 may provide the WTRUs 102a, 102b, and/or 102c with access to packet-switched networks, such as the Internet 110, to facilitate communications between the WTRUs 102a, 102b, and/or 102c and IP-enabled devices. The AAA server 186 may be responsible for user authentication and for supporting user services. The gateway 188 may facilitate interworking with other networks. For example, the gateway 188 may provide the WTRUs 102a, 102b, and/or 102c with access to circuit-switched networks, such as the PSTN 108, to facilitate communications between the WTRUs 102a, 102b, and/or 102c and traditional land-line communications devices. In addition, the gateway 188 may provide the WTRUs 102a, 102b, and/or 102c with access to the networks 112, which may include other wired or wireless networks that are owned and/or operated by other service providers.

Although not shown in FIG. 84E, it should and/or may be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, and/or 102c between the RAN 105 and the other ASNs. The communication link between the core network 109 and the other core networks may be defined as an R5 reference, which may include protocols for facilitating interworking between home core networks and visited core networks.

Although the terms UE or WTRU may be used herein, it may and should be understood that the use of such terms may be used interchangeably and, as such, may not be distinguishable.

Additionally, although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for providing multiple connections, the method comprising:
   establishing, at a wireless transmit and receive unit, a first (RRC) connection with a first network node associated with a core network;
   establishing, at the wireless transmit and receive unit, a second RRC connection with a second network node associated with the core network, wherein the first and second RRC connections are configured to be maintained in parallel such that a component in the core network is configured to coordinate the first and second RRC connections between the wireless transmit and receive unit and the first and second network nodes;
   receiving, at the wireless transmit and receive unit, data simultaneously from the first and the second network nodes via the first and second RRC connections configured to be maintained in parallel; and
   sending, from the wireless transmit and receive unit, data simultaneously to the first and second network nodes via the first and second RRC connections configured to be maintained in parallel.

2. The method of claim 1, wherein the second network node is the same network node as the first network node.

3. The method of claim 1, wherein the first network node is a first eNB and the second network node is a second eNB.

4. The method of claim 2, wherein the wireless transmit and receive unit is attached to the core network via the first network node and a first bearer is established between the wireless transmit and receive unit and the core network via the first network node, wherein a second bearer is established between the wireless transmit and receive unit and the core network via the second network node, and wherein no connection exists between the second network node and the core network.

5. The method of claim 4, wherein the core network establishes the second bearer via the second network node using signaling via the first network node.

6. The method of claim 5, wherein the second bearer is modified using signaling via the first network node.

7. The method of claim 1, further comprising sending a message to the core network indicating that the first RRC connection and the second RRC connection have been established.

8. The method of claim 1, wherein the first RRC connection is associated with a first bearer and the second RRC connection is associated with a second bearer, and wherein the first and second bearers are independent of each other.

9. The method of claim 8, further comprising moving the first bearer associated with the first RRC connection to the second RRC connection.

10. The method of claim 1, further comprising moving at least a portion of an IP flow from the first RRC connection to the second RRC connection.

11. The method of claim 1, further comprising:
    attaching to the core network in response to an attach request after establishing the first RRC connection and the second RRC connection.

12. A wireless transmit and receive unit for providing multiple connections, comprising:
a memory; and
processor configured to:
establish a first radio resource control (RRC) connection with a first network node associated with a core network;
establish a second RRC connection with a second network node associated with the core network wherein the first and second RRC connections are configured to be maintained in parallel such that a component in the core network is configured to coordinate the first and second RRC connections between the wireless transmit and receive unit and the first and second network nodes;
receive data simultaneously from the first and the second network nodes via the first and second RRC connections configured to be maintained in parallel; and
send data simultaneously to the first and second network nodes via the first and second RRC connections configured to be maintained in parallel.

13. The wireless transmit and receive unit of claim 12, wherein the first network node is a first eNB and the second network node is a second eNB.

14. The wireless transmit and receive unit of claim 12, wherein the processor is configured to: provide a message to the core network indicating that the wireless transmit and receive unit has established the first RRC connection and the second RRC connection.

15. The wireless transmit and receive unit of claim 12, wherein the first RRC connection is associated with a first bearer and the second RRC connection is associated with a second bearer, and wherein the first and second bearers are independent of each other.

16. The wireless transmit and receive unit of claim 12, wherein the wireless transmit and receive unit is further configured to request that at least a portion of an IP flow be moved from the first RRC connection to the second RRC connection.

17. A method for providing multiple connections, the method comprising:
establishing, at a wireless transmit and receive unit, a first radio resource control (RRC) connection associated with a first bearer with a first network node associated with a core network;
establishing, at the wireless transmit and receive unit, a second RRC connection associated with a second bearer with a second network node associated with the core network, wherein the second bearer is independent of the first bearer, wherein the first RRC and second RRC connections are configured to be maintained in parallel such that a component in the core network is configured to coordinate the first and second RRC connections between the wireless transmit and receive unit and the first and second network nodes;
receiving, at the wireless transmit and receive unit, data simultaneously from the first and the second network nodes via the first and second RRC connections configured to be maintained in parallel; and
sending, from the wireless transmit and receive unit, data simultaneously to the first and second network nodes via the first and second RRC connections configured to be maintained in parallel.

18. The method of claim 17, wherein the second network node is the same network node as the first network node.

19. The method of claim 17, further comprising providing a message to a network indicating that the wireless transmit and receive unit has established the first RRC connection and the second RRC connection.

20. The method of claim 17, further comprising requesting that the first bearer associated with the first RRC connection be moved to the second RRC connection.

21. The method of claim 17, further comprising:
attaching to the core network in response to an attach request after establishing the first RRC connection and the second RRC connection.

22. The method of claim 1, wherein the first RRC and second RRC connections are established to be maintained in parallel in response to at least one of the following: a request or a condition.

23. The method of claim 1, wherein the first and second RRC connections are geographically spaced apart.

24. The method of claim 1, wherein different tunnels are established in parallel via the first and second RRC connections.

25. The method of claim 1, wherein the component comprises a mobility management gateway (MME), and wherein the first and second RRC connection are established and maintained at the higher layer of the core network by the mobility management gateway (MME).

* * * * *